US011665367B2

(12) United States Patent
Tsukuba

(10) Patent No.: US 11,665,367 B2
(45) Date of Patent: May 30, 2023

(54) IMAGE PROCESSING APPARATUS AND METHOD

(71) Applicant: SONY CORPORATION, Tokyo (JP)

(72) Inventor: Takeshi Tsukuba, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/982,301

(22) PCT Filed: Mar. 18, 2019

(86) PCT No.: PCT/JP2019/011048

§ 371 (c)(1),
(2) Date: Sep. 18, 2020

(87) PCT Pub. No.: WO2019/188466

PCT Pub. Date: Oct. 3, 2019

(65) Prior Publication Data

US 2021/0021870 A1 Jan. 21, 2021

(30) Foreign Application Priority Data

Mar. 30, 2018 (JP) ............................ JP2018-069056

(51) Int. Cl.
*H04N 19/60* (2014.01)
*H04N 19/129* (2014.01)
(Continued)

(52) U.S. Cl.
CPC ........... *H04N 19/60* (2014.11); *H04N 19/129* (2014.11); *H04N 19/159* (2014.11);
(Continued)

(58) Field of Classification Search
None
See application file for complete search history.

(56) References Cited

U.S. PATENT DOCUMENTS 9,294,774 B2 * 3/2016 Lee ...................... H04N 19/159
10,264,283 B2 * 4/2019 Lee ........................ H04N 19/61
(Continued)

FOREIGN PATENT DOCUMENTS

AU 2016247089 A1 * 11/2016 ............ H04N 19/11
EP 3439304 A1 * 2/2019 ........... H04N 19/105
(Continued)

OTHER PUBLICATIONS

Choi et al., Joint Video Exploration Team (JVET) of ITU-T SG 16 WP 3 and ISO/IEC JTC 1/SC 29/WG 11 2nd Meeting: San Diego, USA, Feb. 20-26, 2016, Document: JVET-B0033_v2 (Year: 2016).*
(Continued)

*Primary Examiner* — Reza Aghevli
(74) *Attorney, Agent, or Firm* — Paratus Law Group, PLLC

(57) ABSTRACT

There is provided an image processing apparatus and a method capable of achieving reduction of a drop of coding efficiency (improvement of coding efficiency). Coded data is decoded to generate coefficient data. An inverse orthogonal transform is performed for the generated coefficient data according to an inverse orthogonal transform type controlled on the basis of a coding parameter. For example, the present disclosure is applicable to an image processing apparatus, an image coding apparatus, an image decoding apparatus, or the like.

20 Claims, 57 Drawing Sheets

11

| Component | PredMode | # of Transform Pair | Signaling | |
|---|---|---|---|---|
| | | | 1bit on/off flag | Nbit index |
| Luma | Intra | 9 | X | 3 |
| Luma | Inter | 9 | X | 3 |
| Chroma | Intra | 3 | X | 1 |
| Chroma | Inter | 2 | X | 0 |

(51) Int. Cl.

| | |
|---|---|
| ***H04N 19/159*** | (2014.01) |
| ***H04N 19/176*** | (2014.01) |
| ***H04N 19/186*** | (2014.01) |
| ***H04N 19/46*** | (2014.01) |
| ***H04N 19/70*** | (2014.01) |

(52) U.S. Cl.

CPC ......... *H04N 19/176* (2014.11); *H04N 19/186* (2014.11); *H04N 19/46* (2014.11); *H04N 19/70* (2014.11)

(56) References Cited

U.S. PATENT DOCUMENTS

| | | | | |
|---|---|---|---|---|
| 10,904,526 | B2 * | 1/2021 | Lee | H04N 19/198 |
| 2018/0098081 | A1 * | 4/2018 | Zhao | H04N 19/61 |
| 2018/0262777 | A1 * | 9/2018 | Filippov | H04N 19/12 |
| 2018/0332289 | A1 * | 11/2018 | Huang | H04N 19/96 |
| 2019/0007682 | A1 * | 1/2019 | Kanoh | H04N 19/12 |
| 2019/0158829 | A1 * | 5/2019 | Ohkawa | H04N 19/159 |
| 2019/0191163 | A1 * | 6/2019 | Lee | H04N 19/174 |
| 2019/0208203 | A1 * | 7/2019 | Tsukuba | H04N 19/46 |
| 2019/0222843 | A1 * | 7/2019 | Lee | H04N 19/159 |
| 2019/0246142 | A1 * | 8/2019 | Zhao | H04N 19/61 |
| 2019/0281321 | A1 * | 9/2019 | Zhao | H04N 19/61 |
| 2019/0373261 | A1 * | 12/2019 | Egilmez | H04N 19/96 |
| 2020/0137388 | A1 * | 4/2020 | Kanoh | H04N 19/154 |
| 2020/0213621 | A1 * | 7/2020 | Koo | H04N 19/70 |
| 2020/0213626 | A1 * | 7/2020 | Ikai | H04N 19/176 |
| 2020/0260096 | A1 * | 8/2020 | Ikai | H04N 19/44 |
| 2020/0280737 | A1 * | 9/2020 | Ikai | H04N 19/12 |
| 2020/0314426 | A1 * | 10/2020 | Salehifar | H04N 19/40 |
| 2020/0322604 | A1 * | 10/2020 | Lee | H04N 19/61 |
| 2020/0329242 | A1 * | 10/2020 | Ohkawa | H04N 19/12 |
| 2020/0374513 | A1 * | 11/2020 | Xiu | H04N 19/105 |
| 2020/0374516 | A1 * | 11/2020 | Heo | H04N 19/70 |
| 2021/0021871 | A1 * | 1/2021 | Koo | H04N 19/147 |
| 2021/0029357 | A1 * | 1/2021 | Koo | H04N 19/147 |
| 2021/0092372 | A1 * | 3/2021 | Misra | H04N 19/70 |
| 2021/0120269 | A1 * | 4/2021 | Chen | H04N 19/119 |
| 2021/0203990 | A1 * | 7/2021 | Choi | H04N 19/159 |

FOREIGN PATENT DOCUMENTS

| | | | | | |
|---|---|---|---|---|---|
| JP | PCT-JP2018-03590 | | | 9/2018 | |
| KR | 20180121514 | A | * | 11/2018 | H04N 19/12 |
| WO | WO 2016/123091 | A1 | | 8/2016 | |
| WO | WO 2018/021374 | A1 | | 2/2018 | |
| WO | WO-2018021374 | A1 | * | 2/2018 | H04N 19/12 |
| WO | WO-2019069782 | A1 | | 4/2019 | |

OTHER PUBLICATIONS

An et al., Unified Adaptive Loop Filter for Luma and Chroma, Joint Video Exploration Team (JVET) of ITU-T SG 16 WP 3 and ISO/IEC JTC 1/SC 29/WG 11, Jul. 13-21, 2017, pp. 1-27, 7th Meeting: Torino, IT.

V. Lorcy et al., Proposed improvements to the Adaptive multiple Core transform, Joint Video Exploration Team (JVET) of ITU-T SG 16 WP 3 and ISO/IEC JTC 1/SC 29/WG 11, May 26-Jun. 1, 2016, pp. 1-4, 3rd Meeting: Geneva, CH.

Choi et al., Adaptive Multiple Transform for Chroma, Joint Video Exploration Team (JVET) of ITU-T SG 16 WP 3 and ISO/IEC JTC 1/SC 29/WG 11, Feb. 20-26, 2016, pp. 1-6, 2nd Meeting: San Diego.

Suzuki et al., Description of SDR and HDR video coding technology proposal by Sony, Joint Video Experts Team (JVET) of ITU-T SG 16 WP 3 and ISO/IEC JTC 1/SC 29/WG 11, Apr. 10-20, 2018, pp. 1-7, 10th Meeting: San Diego.

Chen et al., Algorithm Description of Joint Exploration Test Model 7 (JEM7), Joint Video Exploration Team (JVET) of ITU-T SG 16 WP 3 and ISO/IEC JTC 1/SC 29/WG 11, Jul. 13-21, 2017, pp. i-iv, 1, and 28-35, 7th Meeting: Torino, IT.

* cited by examiner

| Component | PredMode | # of Transform Pair | Signaling | |
|---|---|---|---|---|
| | | | 1bit on/off flag | Nbit index |
| Luma | Intra | 9 | X | 3 |
| Luma | Inter | 9 | X | 3 |
| Chroma | Intra | 3 | X | 1 |
| Chroma | Inter | 2 | X | 0 |

| index | EMT_FLAG | EMT_IDX | Mode-dependent Transform Set (TrH×TrV) | | | | | | | | |
|---|---|---|---|---|---|---|---|---|---|---|---|
| | | | 0 | 1 | 2 | 3 | 4 | 5 | 6 | 7 | 8 |
| | | | Planar | DC | VER | HOR | VER | HOR | VER | HOR | INTER |
| 0 | 0 | - | DCT2×DCT2 | | | | | | | | |
| 1 | 1 | 0 | DST7×DST7 | DST7×DST7 | DST7×DST7 | DST7×DST7 | DST7×DST7 | DST7×DST7 | DST7×DST7 | DST7×DST7 | DST7×DST7 |
| 2 | 1 | 1 | DST7×DCT2 | DST7×DCT2 | DCT2×DST7 | DST7×DCT2 | DCT2×DST7 | DST7×DCT2 | DCT2×DST7 | DST7×DCT2 | FlipDST7×DST7 |
| 3 | 1 | 2 | DCT2×DST7 | DCT2×DST7 | FlipDST7×DST7 | DST7×FlipDST7 | FlipDST7×DST7 | DST7×FlipDST7 | FlipDST7×DST7 | DST7×FlipDST7 | DST7×FlipDST7 |
| 4 | 1 | 3 | FlipDST7×DST7 | FlipDST7×DST7 | DST7×DCT2 | DCT2×DST7 | DST7×DCT2 | DCT2×DST7 | DST7×DCT2 | DCT2×DST7 | FlipDST7×FlipDST7 |
| 5 | 1 | 4 | DST7×FlipDST7 | DST7×FlipDST7 | DST7×FlipDST7 | FlipDST7×DST7 | DST7×FlipDST7 | FlipDST7×DST7 | FlipDST7×DCT2 | DST7×TrDST7 | TrDST7×FlipDST7 |
| 6 | 1 | 5 | DST7×TrDST7 | DST7×TrDST7 | DCT2×TrDST7 | DST7×TrDST7 | DCT2×TrDST7 | DST7×TrDST7 | DCT2×TrDST7 | DCT2×TrDST7 | DST7×DCT2 |
| 7 | 1 | 6 | DCT2×TrDST7 | DCT2×TrDST7 | DST7×TrDST7 | DCT2×TrDST7 | DST7×TrDST7 | DCT2×TrDST7 | DST7×FlipDST7 | FlipDST7×DST7 | FlipDST7×DCT2 |
| 8 | 1 | 7 | TrDST7×DST7 | TrDST7×DST7 | FlipDST7×DCT2 | TrDST7×FlipDST7 | FlipDST7×DCT2 | TrDST7×FlipDST7 | TrDST7×DST7 | DCT2×FlipDST7 | DCT2×DST7 |

| | | | | | | | | | | | | | | | | | | |
|---|---|---|---|---|---|---|---|---|---|---|---|---|---|---|---|---|---|---|
| Intra Mode | 0 | 1 | 2 | 3 | 4 | 5 | 6 | 7 | 8 | 9 | 10 | 11 | 12 | 13 | 14 | 15 | 16 | 17 |
| Transform set | 0 | 1 | 5 | 3 | 5 | 3 | 5 | 3 | 5 | 3 | 5 | 3 | 5 | 3 | 7 | 7 | 7 | 7 |
| Intra Mode | 18 | 19 | 20 | 21 | 22 | 23 | 24 | 25 | 26 | 27 | 28 | 29 | 30 | 31 | 32 | 33 | 34 | |
| Transform set | 7 | 7 | 7 | 7 | 7 | 3 | 5 | 3 | 5 | 3 | 5 | 3 | 5 | 3 | 5 | 3 | 5 | |
| Intra Mode | 35 | 36 | 37 | 38 | 39 | 40 | 41 | 42 | 43 | 44 | 45 | 46 | 47 | 48 | 49 | 50 | 51 | 52 |
| Transform set | 2 | 4 | 2 | 4 | 2 | 4 | 2 | 4 | 2 | 4 | 2 | 6 | 6 | 6 | 6 | 6 | 6 | 6 |
| Intra Mode | 53 | 54 | 55 | 56 | 57 | 58 | 59 | 60 | 61 | 62 | 63 | 64 | 65 | 66 | 67…72 | 73 | | |
| Transform set | 6 | 6 | 2 | 4 | 2 | 4 | 2 | 4 | 2 | 4 | 2 | 4 | 2 | 4 | 0 | 8 | | |
| | | | | | | | | | | | | | | | LMChroma | Inter | | |

| METHOD | TRANSFORM PAIR NUMBER COMBINATION CONTROL METHOD | | | | | | | | | | EFFECT |
|---|---|---|---|---|---|---|---|---|---|---|---|
| | USE OF COLOR INFORMATION | USE OF MODE INFORMATION | | | USE OF SIZE INFORMATION | USE OF QP INFORMATION (Temparal ID) | | USE OF TRANSFORM COEFFICIENTS INFORMATION | | | |
| | LUMINANCE OR CHROMINANCE | INTRA CU OR INTER CU | BI-PREDICTION OR FORWARD PREDICTION | LMChroma | BLOCK SIZE | QP | Temporal ID | NUMBER OF NON-ZERO COEFFICIENTS | POSITION OF LAST COEFFICIENT | SUM OF ABSOLUTE VALUES OF NON-ZERO COEFFICIENTS | |
| #1 | × | | | | | | | △ | | | ·CODING EFFICIENCY IMPROVES BY INCREASING NUMBER OF TRANSFORM PAIRS IN CASE OF RELATIVELY LARGE CODE QUANTITY OF RESIDUAL SIGNAL |
| #2-1 | | × | | | | | | △ | | | |
| #2-2 | | × | × | | | | | △ | | | |
| #2-3 | | | | × | | | | △ | | | |
| #3 | | | | | × | | | △ | | | |
| #4-1 | | | | | | × | | △ | | | ·OVERHEAD DECREASES (WHILE IMPROVING CODING EFFICIENCY) BY DECREASING NUMBER OF TRANSFORM PAIRS IN CASE OF RELATIVELY LARGE CODE QUANTITY OF MODE INFORMATION |
| #4-2 | | | | | | | × | △ | | | |
| #5-1 | | | | | | | | × | | | |
| #5-2 | | | | | | | | | × | | |
| #5-3 | | | | | | | | | | × | |

Figure 36:
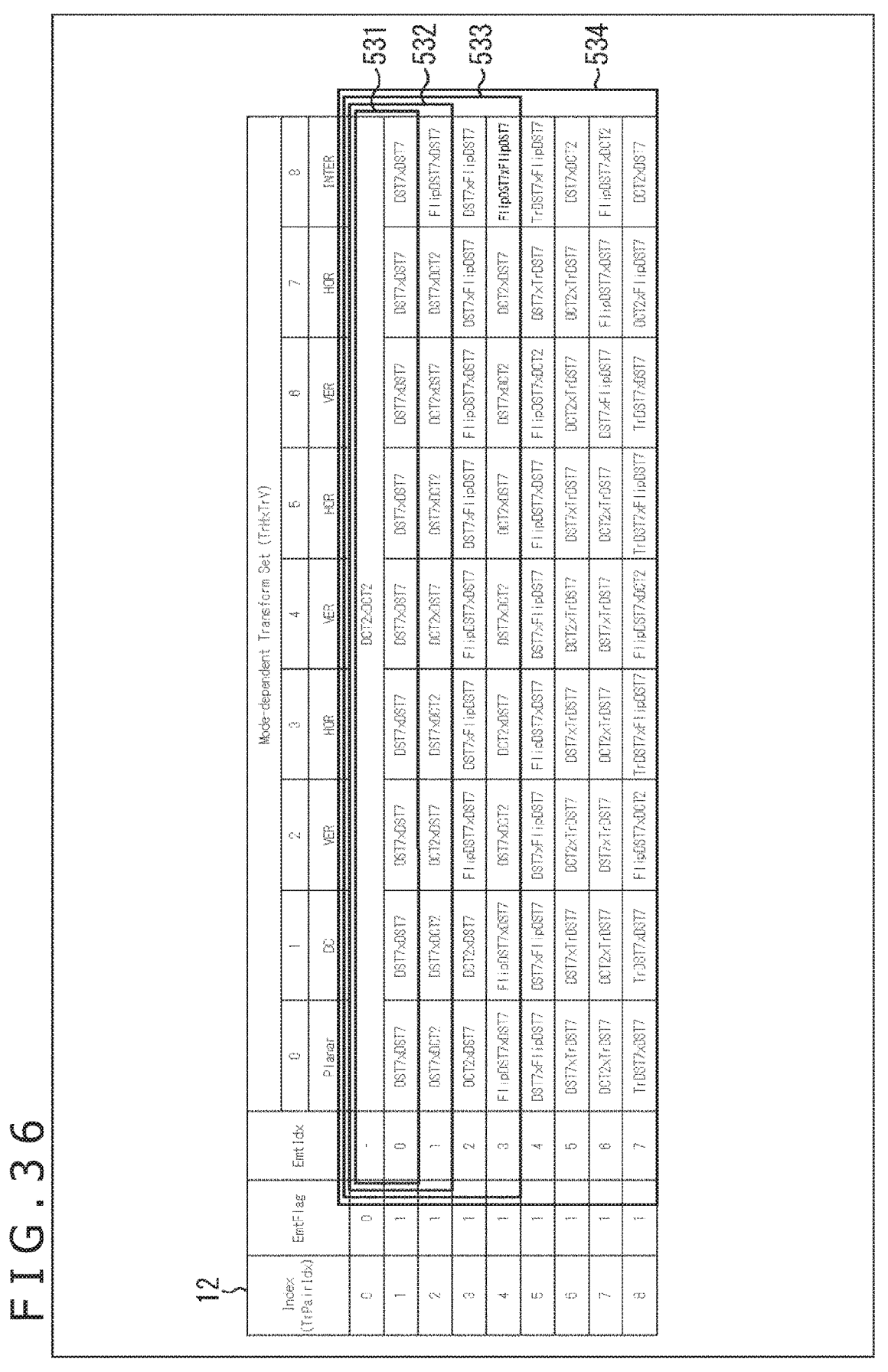

| Index (TrPairIdx) | EmtFlag | EmtIdx | Mode-dependent Transform Set (TrHxTrV) | | | | | | | | |
|---|---|---|---|---|---|---|---|---|---|---|---|
| | | | 0 | 1 | 2 | 3 | 4 | 5 | 6 | 7 | 8 |
| | | | Planar | DC | VER | HOR | VER | HOR | VER | HOR | INTER |
| 0 | 0 | - | DCT2xDCT2 | | | | | | | | |
| 1 | 1 | 0 | DST7xDST7 | DST7xDST7 | DST7xDST7 | DST7xDST7 | DST7xDST7 | DST7xDST7 | DST7xDST7 | DST7xDST7 | DST7xDST7 |
| 2 | 1 | 1 | DST7xDCT2 | DST7xDCT2 | DCT2xDST7 | DST7xDCT2 | DCT2xDST7 | DST7xDCT2 | DCT2xDST7 | DST7xDCT2 | FlipDST7xDST7 |
| 3 | 1 | 2 | DCT2xDST7 | DCT2xDST7 | FlipDST7xDST7 | DST7xFlipDST7 | FlipDST7xDST7 | DST7xFlipDST7 | FlipDST7xDST7 | DST7xFlipDST7 | DST7xFlipDST7 |
| 4 | 1 | 3 | FlipDST7xDST7 | FlipDST7xDST7 | DST7xDCT2 | DCT2xDST7 | DST7xDCT2 | DCT2xDST7 | DST7xDCT2 | DCT2xDST7 | FlipDST7xFlipDST7 |
| 5 | 1 | 4 | DST7xFlipDST7 | DST7xFlipDST7 | DST7xFlipDST7 | FlipDST7xDST7 | DST7xFlipDST7 | FlipDST7xDST7 | FlipDST7xDCT2 | DST7xTrDST7 | TrDST7xFlipDST7 |
| 6 | 1 | 5 | DST7xTrDST7 | DST7xTrDST7 | DCT2xTrDST7 | DST7xTrDST7 | DCT2xTrDST7 | DST7xTrDST7 | DCT2xTrDST7 | DCT2xTrDST7 | DST7xDCT2 |
| 7 | 1 | 6 | DCT2xTrDST7 | DCT2xTrDST7 | DST7xTrDST7 | DCT2xTrDST7 | DST7xTrDST7 | DCT2xTrDST7 | DST7xFlipDST7 | FlipDST7xDST7 | FlipDST7xDCT2 |
| 8 | 1 | 7 | TrDST7xDST7 | TrDST7xDST7 | FlipDST7xDCT2 | TrDST7xFlipDST7 | FlipDST7xDCT2 | TrDST7xFlipDST7 | TrDST7xDST7 | DCT2xFlipDST7 | DCT2xDST7 |

| Syntax element | Binarization | |
|---|---|---|
| | Process | Input parameters |
| emt_flag | FL | cMax = 1 |
| emt_idx | FL | cMax = numTrPair − 2 |

A

542

| Syntax element | Binarization | |
|---|---|---|
| | Process | Input parameters |
| emt_flag | FL | cMax = 1 |
| emt_idx | TR | cMax = numTrPair − 2, cRiceParam = 0 |

| emtFlag | NUMBER OF NON-ZERO COEFFICIENTS numSIG | componentID | NUMBER OF TRANSFORM PAIRS numTrPair |
|---|---|---|---|
| 0 | - | - | 1 |
| 1 | numSIG <= TH1 | - | 2 |
| | TH1 < numSIG | componentID==0 (luma) | N1 |
| | | componentID>0 (chroma) | N2 |

| emtFlag | NUMBER OF NON-ZERO COEFFICIENTS numSIG | CuPredMode | NUMBER OF TRANSFORM PAIRS numTrPair |
|---|---|---|---|
| 0 | — | — | 1 |
| 1 | numSIG <= TH1 | — | 2 |
| | TH1 < numSIG | Intra | N1 |
| | | Inter | N2 |

A

612

| emtFlag | CuPredMode | NUMBER OF NON-ZERO COEFFICIENTS numSIG | NUMBER OF TRANSFORM PAIRS numTrPair |
|---|---|---|---|
| 0 | — | — | 1 |
| 1 | Intra | numSIG <= TH1 | 2 |
| | | TH<numSIG | N1 |
| | Inter | — | N2 |

| emtFlag | NUMBER OF NON-ZERO COEFFICIENTS numSIG | CuPredMode | InterPredIDX | NUMBER OF TRANSFORM PAIRS numTrPair |
|---|---|---|---|---|
| 0 | – | – | – | 1 |
| 1 | numSIG <= TH1 | – | – | 2 |
| | TH1 < numSIG | Intra | – | N1 |
| | | Inter | FORWARD PREDICTION | N2 |
| | | | BI-PREDICTION | N3 |

| emtFlag | NUMBER OF NON-ZERO COEFFICIENTS numSIG | BLOCK SIZE size | NUMBER OF TRANSFORM PAIRS numTrPair |
|---|---|---|---|
| 0 | – | – | 1 |
| 1 | numSIG <= TH1 | – | 2 |
| | TH1 < numSIG | size<=TH2 (=32) | N3 |
| | | TH2<size<=TH3 (=256) | N2 |
| | | TH3<size | N1 |

| emtFlag | NUMBER OF NON-ZERO COEFFICIENTS numSIG | QP | NUMBER OF TRANSFORM PAIRS numTrPair |
|---|---|---|---|
| 0 | — | — | 1 |
| 1 | numSIG <= TH1 | — | 2 |
| | TH1 < numSIG | QP<=TH2 (=22) | N1 (=9) |
| | | TH2<QP<=TH3 (=37) | N2 (=5) |
| | | TH3<QP | N3 (=3) |

| emtFlag | NUMBER OF NON-ZERO COEFFICIENTS numSIG | temporalID | NUMBER OF TRANSFORM PAIRS numTrPair |
|---|---|---|---|
| 0 | – | – | 1 |
| 1 | numSIG <= TH1 | – | 2 |
| | TH1 < numSIG | temporalID<=TH2 (=1) | N1 (=9) |
| | | TH2<temporalID<=TH3 (=2) | N2 (=5) |
| | | TH3<temporalID | N3 (=3) |

| emtFlag | NUMBER OF NON-ZERO COEFFICIENTS numSIG | NUMBER OF TRANSFORM PAIRS numTrPair |
|---|---|---|
| 0 | - | 1 |
| 1 | numSIG <= TH1 | 2 |
| | TH1 < numSIG <= TH2 | N2 |
| | TH2 < numSIG | N1 |

| emtFlag | LAST COEFFICIENT POSITION lastPos | NUMBER OF TRANSFORM PAIRS numTrPair |
|---|---|---|
| 0 | — | 1 |
| 1 | lastPos <= TH1 | 2 |
| | TH1 < lastPos <= TH2 | N2 |
| | TH2< lastPos | N1 |

| emtFlag | SUM OF ABSOLUTE VALUES OF NON-ZERO COEFFICIENTS sumAbsLevel | NUMBER OF TRANSFORM PAIRS numTrPair |
|---|---|---|
| 0 | — | 1 |
| 1 | sumAbsLevel <= TH1 | 2 |
| | TH1 < sumAbsLevel <= TH2 | N2 |
| | TH2< sumAbsLevel | N1 |

| Index (TrPairIdx) | EmtFlag | EmtIdx | Transform Set (TrHxTrV) mode-dependent | | | |
|---|---|---|---|---|---|---|
| | | | M#3 | | | |
| | | | HOR | VER | DC+PLANAR | INTER |
| 0 | 0 | - | DST7xDST7 | DST7xDST7 | DST7xDST7 | DCT2xDCT2 |
| 1 | 1 | 0 | DST7xDCT2 | DCT2xDST7 | DST7xDCT2 | DST7xDST7 |
| 2 | 1 | 1 | DCT2xDCT2 | DCT2xDCT2 | DCT2xDST7 | DCT8xDST7 |
| 3 | 1 | 2 | DST7xDCT8 | DCT8xDST7 | DCT2xDCT2 | DST7xDCT8 |
| 4 | 1 | 3 | DCT2xDST7 | DST7xDCT2 | DCT8xDST7 | DCT8xDCT8 |
| 5 | 1 | 4 | DST7xDST1 | DST7xDCT8 | DST7xDCT8 | DST1xDCT8 |
| 6 | 1 | 5 | DCT8xDST7 | DCT2xDST1 | DST7xDST1 | DST7xDCT2 |
| 7 | 1 | 6 | DCT2xDST1 | DCT8xDCT2 | DCT2xDST1 | DCT8xDCT2 |
| 8 | 1 | 7 | DST1xDCT8 | DST7xDST1 | DST1xDST7 | DCT2xDST7 |
| 9 | 1 | 8 | DCT2xDCT8 | DST1xDST7 | DCT8xDCT2 | DCT8xDST1 |
| 10 | 1 | 9 | DST1xDST7 | DST1xDST1 | DST1xDCT8 | DST7xDST1 |
| 11 | 1 | 10 | DCT8xDCT2 | DST1xDCT8 | DST1xDST1 | DCT2xDCT8 |
| 12 | 1 | 11 | DST1xDST1 | DCT8xDCT8 | DCT2xDCT8 | DST1xDST1 |
| 13 | 1 | 12 | DCT8xDCT8 | DCT8xDST1 | DCT8xDCT8 | DST1xDCT2 |
| 14 | 1 | 13 | DST1xDCT2 | DCT2xDCT8 | DCT8xDST1 | DCT2xDST1 |
| 15 | 1 | 14 | DCT8xDST1 | DST1xDCT2 | DST1xDCT2 | DST1xDST7 |

| emtFlag | NUMBER OF NON-ZERO COEFFICIENTS numSIG | NUMBER OF TRANSFORM PAIRS numTrPair |
|---|---|---|
| 0 | – | 1 |
| 1 | numSIG <= TH1 | 2 |
| | TH1 < numSIG <= TH2 | N3 |
| | TH2< numSIG<=TH3 | N2 |
| | TH3<numSIG | N1 |

A

722

| emtFlag | LAST COEFFICIENT POSITION lastPos | NUMBER OF TRANSFORM PAIRS numTrPair |
|---|---|---|
| 0 | – | 1 |
| 1 | lastPos <= TH1 | 2 |
| | TH1 < lastPos <= TH2 | N3 |
| | TH2< lastPos <=TH3 | N2 |
| | TH3<lastPos | N1 |

B

723

| emtFlag | SUM OF ABSOLUTE VALUES OF NON-ZERO COEFFICIENTS sumAbsLevel | NUMBER OF TRANSFORM PAIRS numTrPair |
|---|---|---|
| 0 | – | 1 |
| 1 | sumAbsLevel <= TH1 | 2 |
| | TH1 < sumAbsLevel <= TH2 | N3 |
| | TH2< sumAbsLevel <=TH3 | N2 |
| | TH3<sumAbsLevel | N1 |

| some_header () | Descriptor |
|---|---|
| ... | |
| amt{**emt}_enabled_flag** | **ae(v)** |
| if (emt_enabled_flag) | |
| **emt_max_num_trpair_minusN** | **ae(v)** |
| **emt_min_num_trpair_minusN** | **ae(v)** |
| } | |

IMAGE PROCESSING APPARATUS AND METHOD

CROSS REFERENCE TO PRIOR APPLICATION

This application is a National Stage Patent Application of PCT International Patent Application No. PCT/JP2019/011048 (filed on Mar. 18, 2019) under 35 U.S.C. § 371, which claims priority to Japanese Patent Application No. 2018-069056 (filed on Mar. 30, 2018), which are all hereby incorporated by reference in their entirety.

TECHNICAL FIELD

The present disclosure relates to an image processing apparatus and a method, and particularly to an image processing apparatus and a method capable of reducing a drop of coding efficiency (improving coding efficiency).

BACKGROUND ART

Concerning luminance, in the related art, there has been disclosed adaptive primary core transforms (AMT: Adaptive Multiple Core Transforms) (for example, see NPL 1) which adaptively selects a primary transform from a plurality of different orthogonal transforms for each of a horizontal primary transform PThor (also referred to as primary horizontal transform) and a vertical primary transform PTver (also referred to as primary vertical transform) for each unit of TU (Transform Unit).

According to NPL 1, five one-dimensional orthogonal transforms are indicated as candidates of a primary transform, i.e., DCT-II, DST-VII, DCT-VIII, DST-I, and DCT-VI. In a case where AMT is applied, a two-bit index is signaled to indicate as orthogonal transform to be applied for a horizontal transform or a vertical transform in a transform set determined according to a prediction mode. One transform is selected from two candidates for each direction. In addition, it is proposed to further add two one-dimensional orthogonal transforms, i.e., DST-IV and IDT (Identity Transform: one-dimensional transform skip) to designate seven one-dimensional orthogonal transforms in total as primary transform candidates (for example, see NPL 2).

CITATION LSIT

Non Patent Literature

[NPL 1]

Jianle Chen, Elena Aishina, Gary J. Sullivan, Jens-Rainer, Jill Boyce, "Algorithm. Description of Joint Exploration Test Model 4," JVET-G1001_v1, Joint. Video Exploration Team (JVET) of ITU-T SG 16 WP 3 and ISO/IEC JTC 1/SC 29/NC 11 7th Meeting: Torino, IT, 13-21 Jul. 2017

[NPL 2]

V. Lorcy, P. Phillipe, "Proposed improvements to the Adaptive multiple Core transform" JVET-C0022, Joint Video Exploration Team (JVET) of ITU-T SG 16 WP 3 and ISO/IEC JTC 1/SC 29/WG 11 3rd Meeting: Geneva, CH, 26 May-1 Jun. 2016

SUMMARY

Technical Problem

Meanwhile, in a block which includes a relatively large code quantity of a residual signal and a small code quantity of AMT mode information, it is desirable to further reduce the code quantity of the residual signal. In contrast, in a block which includes a relatively small code quantity of a residual signal and a large code quantity of AMT mode information, it is desirable to further reduce the code quantity of the AMT mode information. According to the related-art method, however, the number of candidates of an AMT transform is fixed. In this case, the above desirable tendency is difficult to achieve. Coding efficiency may therefore drop as a result of a needless increase in the code quantities of the AMT mode information and the residual signal.

The present disclosure has been made in consideration of the aforementioned circumstances and achieves reduction of a drop of coding efficiency (improvement of coding efficiency).

Solution to Problem

An image processing apparatus according to one aspect of the present technology is directed to an image processing apparatus including a decoding section which decodes coded data to generate coefficient data, and an inverse orthogonal transform section which performs an inverse orthogonal transform for the coefficient data generated by the decoding section according to an inverse orthogonal transform type controlled on the basis of a coding parameter.

An image processing method according to one aspect of the present technology is directed to an image processing method including decoding coded data to generate coefficient data, and performing an inverse orthogonal transform for the generated coefficient data according to an inverse orthogonal transform type controlled on the basis of a coding parameter.

An image processing apparatus according to another aspect of the present technology is directed to an image processing apparatus including an orthogonal transform section which performs an orthogonal transform for image data according to an orthogonal transform type controlled on the basis of a coding parameter to generate coefficient data, and a coding section which codes the coefficient data generated by the orthogonal transform section to generate coded data.

An image processing method according to another aspect of the present technology is directed to an image processing method including performing an orthogonal transform for image data according to an orthogonal transform type controlled on the basis of a coding parameter to generate coefficient data, and coding the generated coefficient data to generate coded data.

According to the image processing apparatus and the method of one aspect of the present technology, coded data is decoded to generate coefficient data. An inverse orthogonal transform is performed for the generated coefficient data according to an inverse orthogonal transform type controlled on the basis of a coding parameter.

According to the image processing apparatus and the method of another aspect of the present technology, an orthogonal transform is performed for image data according to an orthogonal transform type controlled on the basis of a coding parameter to generate coefficient data. The generated coefficient data is coded to generate coded data.

Advantageous Effects of Invention

According to the present disclosure, image processing is achievable. Particularly, an increase in a memory capacity necessary for orthogonal transforms and inverse orthogonal transforms can be reduced. Moreover, code quantities of orthogonal transform mode information and residual signals can be more efficiently decreased. Note that advantageous effects to be produced are not limited to the advantageous effects described above, but may include any advantageous effects indicated in the present specification, or other advantageous effects recognizable from the present specification in addition to or in place of the advantageous effects described above.

BRIEF DESCRIPTION OF DRAWINGS

FIG. 1 is a diagram depicting an example of a selectable number of transform pairs according to coding parameters.

FIG. 2 is a diagram depicting examples of a selectable transform pair in each transform set.

FIG. 3 is a diagram depicting correspondence between transform sets and prediction modes.

FIG. 8 is a diagram depicting an example of a list of coding parameters used for control of the number of transform pairs.

FIG. 36 is a diagram depicting examples of a selectable number of transform pairs according to coding parameters.

FIG. 37 is a diagram depicting examples of coding and decoding of transform pair identification information.

FIG. 38 is a diagram depicting an example of a setting state of a selectable number of transform pairs using a method #1.

FIG. 40 is a diagram depicting examples of a setting state of a selectable number of transform pairs using a method #2-1.

FIG. 42 is a diagram depicting an example of a setting state of a selectable number of transform pairs using a method #2-2.

FIG. 44 is a diagram depicting an example of a setting state of a selectable number of transform pairs using a method #3.

FIG. 46 is a diagram depicting an example of a setting state of a selectable number of transform pairs using a method #4-1.

FIG. 48 is a diagram depicting an example of a setting manner of a selectable number of transform pairs using a method #4-2.

FIG. 50 is a diagram depicting an example of a setting state of a selectable number of transform pairs using a method #5-1.

FIG. 52 is a diagram depicting an example of a setting state of a selectable number of transform pairs using a method #5-2.

FIG. 54 is a diagram depicting an example of a setting state of a selectable number of transform pairs using a method #5-3.

FIG. 56 is a diagram depicting examples of a selectable number of transform pairs.

FIG. 57 is a diagram depicting examples of a setting manner of a selectable number of transform pairs.

FIG. 58 depicts syntax of an example of control information associated with setting of a selectable number of transform pairs.

DESCRIPTION OF EMBODIMENTS

Figure 4:
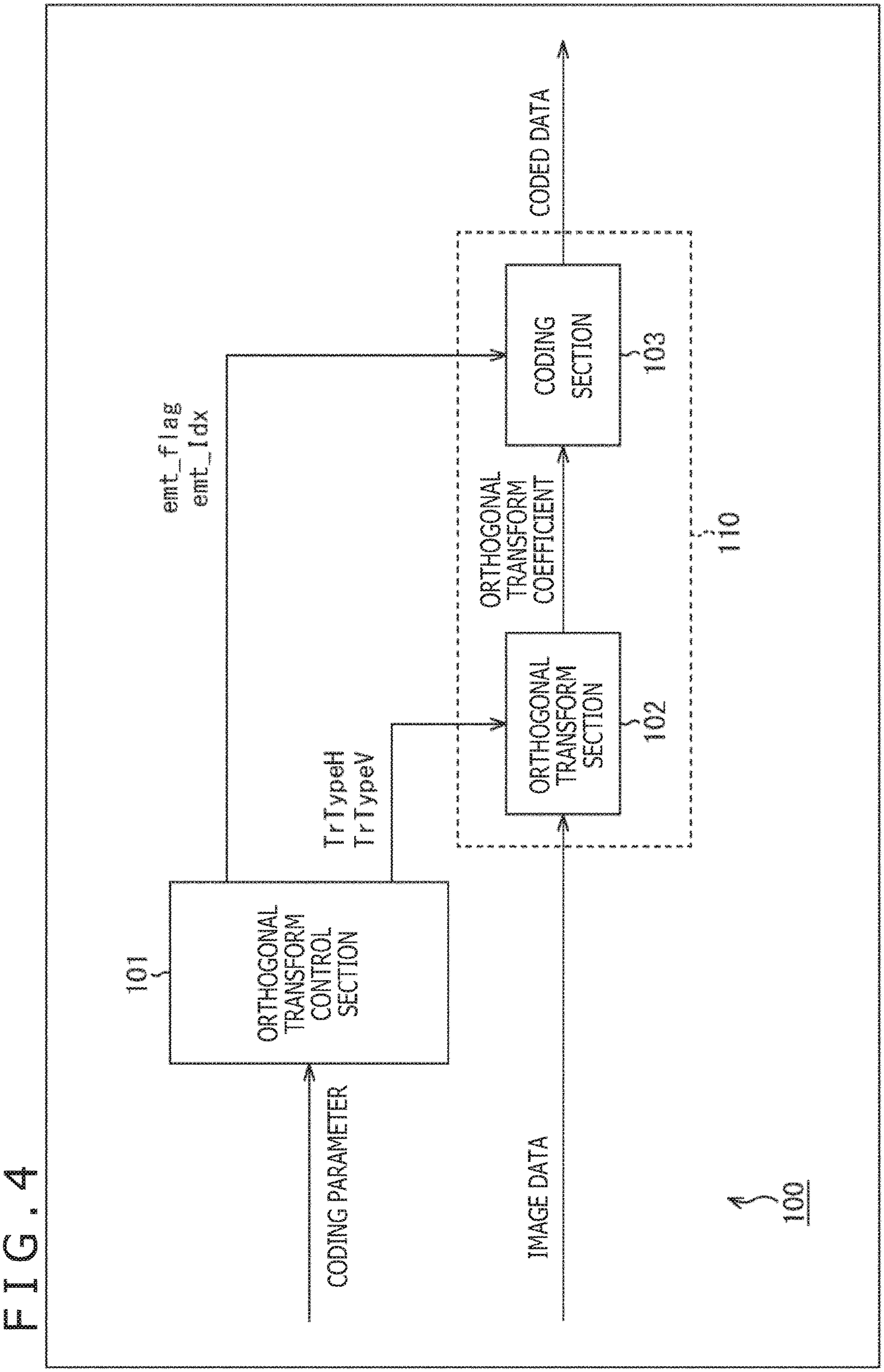
FIG. 4 is a block diagram depicting a main configuration example of an image coding apparatus.

Modes for carrying out the present disclosure (hereinafter referred to as embodiments) will be hereinafter described. Note that the description will be indicated in a following order.

1. Adaptive orthogonal transform.
2. Common concept
2-1. Image coding apparatus
2-2. Image decoding apparatus
2-3. Method list
2-4. Image coding apparatus
2-5. Image decoding apparatus
2-6. Others
3. First embodiment (method #1)
4. Second embodiment (method #2)
4-1. Method #2-1
4-2. Method #2-2
4-3. Method #2-3
5. Third embodiment (method #3)
6. Fourth embodiment (method #4)
6-1. Method #41-1
6-2. Method #4-2
7. Fifth embodiment (method #5)
7-1. Method #5-1
7-2. Method #5-2
7-3. Method #5-3
8. Application Examples
9. Supplementary Notes 1. Adaptive Orthogonal Transform <Documents and Others Supporting Technical Contents and Technical Terms>

A range disclosed by the present technology includes not only contents described in the embodiments, but also contents described in following NPLs known at the time of filling the present application.

NPL 1: (identified above)

NPL 3: TELECOMMUNICATION STANDARDIZATION SECTOR OF ITU (International Telecommunication Union), "Advanced video coding for generic audiovisual services," H.264, 04/2017

NPL 4: TELECOMMUNICATION STANDARDIZATION SECTOR OF ITU (International Telecommunication Union) "High efficiency video coding," H.265, 12/2016

Accordingly, contents described in the above NPLs are also considered as grounds for determining supporting elements. For example, even in a case where Quad Tree Block Structure described in NPL 4, and QTBT (Quad Tree Plus Binary Tree) Block Structure described in NPL 1 are not directly described in the embodiments, it is assumed that both Quad-Tree Block Structure and QTBT Block Structure are included in the disclosed scope of the present technology and meet supporting requirements of the claims. Moreover, for example, even in a case where technical terms such as parsing, syntax, and semantics are not directly described in the embodiments, it is similarly assumed that these technical terms are included in the disclosed scope of the present technology and meet supporting requirements of the claims.

Furthermore, in the present specification, a "block" (not a block representing a processing section) used for description to indicate a partial region of an image (picture) or a unit of processing represents any partial region in a picture unless specified otherwise. A size, a shape, characteristics, or the like of the block are not specifically limited. For example, it is assumed that the "block" includes any partial region (unit of processing) such as a TB (Transform Block), a TU (Transform. Unit), a PB (Prediction Block), a PU (Prediction Unit), an ACU (Smallest. Coding Unit), a CU (Coding Unit), an LCU (Largest Coding Unit), a CTB (Coding Tree Block), a CTU (Coding Tree Unit), a transform block, a sub-block, a macro-block, a tile, and a slice described in NPL 1, NPL 3, and NPL 4 described above. In addition, in designating a size of the block described above, a block size may be designated not only directly, but also indirectly. For example, the block size may be designated using identification information for identifying the size. Alternatively, for example, the block size may be designated according to a ratio of the block size to a size of a reference block (for example, LCU or SCU), or a difference from the size of the reference block. For example, in a case of transmission of information designating the block size as a syntax element or the like, this information may be information indirectly designating the size as described above. In this manner, reduction of an information volume of this information is achievable, and therefore, coding efficiency improves in some cases. In addition, designation of the block size includes designation of a block size range (for example, designation of allowable block size and the like).

Furthermore, in the present specification, coding includes not only whole processing for transforming an image into a bit stream, but also a part of this processing. For example, coding includes not only processing covering prediction processing, orthogonal transforms, quantization, arithmetic coding, and the like, but also processing as a general term of quantization and arithmetic coding, processing covering prediction processing, quantization, and arithmetic coding, and others. Similarly, decoding includes not only whole processing for transforming a bit stream into an image, but also a part of this processing. For example, decoding includes not only processing covering inverse arithmetic decoding, inverse quantization, inverse orthogonal transforms, prediction processing, and the like, but also processing covering inverse arithmetic decoding and inverse quantization, processing covering inverse arithmetic decoding, inverse quantization, and prediction processing, and others.

<Adaptive Orthogonal Transform>

There has been disclosed, in a test model described in NPL 1 (JEM4 (Joint Exploration Test Model 4), adaptive primary transforms (AMT (Adaptive Multiple core Transforms)) which adaptively selects a primary transform from a plurality of different one-dimensional orthogonal transforms for each of a horizontal primary transform PThor (also referred to as primary horizontal transform) and a vertical primary transform PTver (also referred to as primary vertical transform) in a luminance conversion block. Note that AMT is also referred to as EMT (Explicit Multiple core Transforms).

Specifically, in a case where an adaptive primary transform flag apt_flag indicating whether or not to perform an adaptive primary transform for a luminance transform block is 0 (false), DCT (Discrete Cosine Transform)—II or DST (Discrete Sine Transform)—VII is uniquely decided according to mode information in a primary transform. (TrSetIdx=4).

In a case where a current CU (Coding Unit) including a luminance transform block corresponding to a processing target is an intra CU in a state where the adaptive primary transform flag apt_flag is 1 (true), a transform set TrSet including orthogonal transforms corresponding to primary transform candidates for each of a horizontal direction (a direction) and a vertical direction (y direction) is selected from three transform sets TrSet (TrSetIdx=0, 1, 2). Note that each of DST-VII, DCT-VIII, and others described above indicates an orthogonal transform type.

This transform set TrSet is uniquely decided on the basis of (intra prediction mode information associated with) a correspondence table between mode information and transform sets. For example, as expressed in following Expression (1) and Expression (2), the determination is made such that a transform set identifier TrSetIdx for designating the corresponding transform set TrSet is set for each of transform sets TrSetH and TrSetV.

[Math. 1]

$$\text{TrSetH}=LUT\_\text{IntraModeToTrSet[IntraMode][0]} \quad (1)$$

$$\text{TrSetV}=LUT\_\text{IntraModeToTrSet[IntraMode][1]} \quad (2)$$

In these expressions, TrSetH represents a transform set of the primary horizontal transform PThor, while TrSetV represents a transform set of the primary vertical transform PTver. A lookup table LUT_IntraModeToTreSet is a correspondence table between mode information and transform sets. A first array of the lookup table LUT_IntraModeToTreSet[ ] [ ] designates intra prediction mode IntraMode as an argument, while a second array designates {H=0, V=1} as an argument.

For example, in a case of intra prediction mode number 19 (IntraMode==19), a transform set of a transform set identifier TrSetIdx=0 is selected as the transform set TrSetH (also referred to as primary horizontal transform set) of the primary horizontal transform PThor, and a transform set of a transform set identifier TrSetIdx=2 is selected as the transform set TrSetV (also referred to as primary vertical transform set) of the primary vertical transform PTver.

Note that a transform set InterTrSet (TrSetIdx=3) dedicated for an inter CU is allocated to each of the transform set TrSetH of the primary horizontal transform and the transform set TrSetV of the primary vertical transform in a case where the current CU including the luminance transform block corresponding to the processing target is an inter CU in a state where adaptive primary transform flag apt_flag is 1 (true).

Subsequently, an orthogonal transform to be applied is selected from the selected transform set TrSet for each of the horizontal direction and the vertical direction depending on the corresponding one of a primary horizontal transform designation flag pt_hor_flag and a primary vertical transform designation flag pt_ver_flag.

For example, as expressed in following Expression (3) and Expression (4), the orthogonal transform is derived from a definition table (LUT_TrSetToTrTypeIdx) of the transform set depicted in FIG. 1 while designating a primary (horizontal, vertical) transform set TrSet{H, V} and a primary (horizontal, vertical) transform designation flag pt_{hor, ver}_flag as arguments.

[Math. 2]

$$\text{TrTypeIdxH}=:UT\_\text{TrSetToTrTypeIdx[TrSetH]}[pt\_hor\_\text{flag}] \quad (3)$$

$$\text{TrTypeIdxV}=LUT\_\text{TrSetToTrTypeIdx[TrSetV]}[pt\_ver\_\text{flag}] \quad (4)$$

For example, in a case where the primary horizontal transform designation flag pt_hor_flag is 0 under Intra prediction mode number 34 (IntraMode==34) (i.e., primary horizontal transform set TraSetH is 0), a value of the transform type identifier TrTypeIdxH of Expression (3) is 4 on the basis of the transform set definition table (LUT_TrSetToTrTypeIdx). In this case, a transform type corresponding to the value of the transform type identifier TrTypeIdxH is DST-VTI. In other words, the transform set DST-VII for the transform set identifier TrSetIdx of 0 is selected as a transform type of the primary horizontal transform PThor. In addition, in a case where the primary horizontal transform designation flag pt_hor_flag is 1, DCT-VIII is selected as a transform type. Note that selection of a transform type includes selection of a transform type using the transform type identifier TrTypeIdx to select a transform type designated by the transform type identifier TrTypeIdx.

Note that a primary transform identifier pt_idx is derived from the primary horizontal transform designation flag pt_hor_flag and the primary vertical transform designation flag pt_ver_flag on the basis of following Expression (5). Specifically, a high-order 1 bit of the primary transform identifier pt_idx corresponds to a value of the primary vertical transform designation flag, while a low-order 1 bit corresponds to a value of the primary horizontal transform designation flag.

[Math. 3]

$$pt\_idx=(pt\_ver\_\text{flag}<<1)+pt\_hor\_\text{flag} \quad (5)$$

A bit string is generated by applying arithmetic coding to a bin string of the derived primary transform identifier pt_idx to perform coding. Note that the adaptive primary transform flag apt_flag and the primary transform identifier pt_idx are signaled in a luminance transform block.

As described above, NPL 1 proposes the five one-dimensional orthogonal transforms as primary transform candidates, i.e., DCT-II (DCT2), DST-VII (DST7), DCT-VIII (DCT8), DST-1 (DST1), and DCT-V (DCT5). In the related art, in a case where AMT is applied, it is performed to signal a two-bit index which indicates an orthogonal transform selected from a transform set determined according to a prediction mode and applied for a horizontal transform or a vertical transform, and select one transform from two candidates for each direction. In addition, NPL 2 proposes further adding two one-dimensional orthogonal transforms, i.e., DST-IV (DST4) and IDT (Identity Transform: one-dimensional transform skip) to the above orthogonal transforms and designating seven one-dimensional orthogonal transforms in total as primary transform candidates.

<Coding Efficiency>

Meanwhile, a more appropriate transform is generally likely to be selected as a transform of AMT is selected from a larger number of candidates (i.e., as the number of selectable transforms of AMT increases). In this case, a code quantity of a residual signal decreases. However, when the number of candidates increases, a code quantity of AMT mode information including information indicating an applied transform is likely to increase (become a large value). In other words, the code quantity of the AMI mode information decreases (becomes a small value) as the number of AMT transform candidates decreases. In this case, the code quantity of the residual signal is likely to increase.

However, when the code quantity of AMT mode information is relatively small with respect to the code quantity of the residual signal, an increase or decrease of the code quantity of AMT mode information becomes small with respect to an increase or decrease of the code quantity of the residual signal. Accordingly, in a block including a relatively large code quantity of a residual signal and a relatively small code quantity of AMT mode information, more efficient code quantity reduction is achievable by increasing the number of AMT transform candidates and decreasing the code quantity of the residual signal rather than by decreasing the code quantity of the AMT mode information.

Conversely, when the code quantity of AMT mode information is relatively large with respect to the code quantity of the residual signal, an increase or decrease of the code quantity of AMT mode information becomes large with respect to an increase or decrease of the code quantity of the residual signal. Accordingly, in a block including a relatively small code quantity of a residual signal and a relatively large code quantity of AMT mode information, more efficient code quantity reduction is achievable by decreasing the number of AMT transform candidates and decreasing the code quantity of the AMT mode information rather than by decreasing the code quantity of the residual signal.

According to the method in the related art, however, the number of AMT transform candidates is fixed. In this case, the above-described code quantity control is difficult to achieve. Coding efficiency may therefore drop as a result of a needless increase in the code quantities of the AMT mode information and the residual signal.

<2. Common Concept>

<Control of Orthogonal Transform Type Based on Coding Parameters>

Accordingly, an orthogonal transform type of a prediction residue of image data is controlled on the basis of coding parameters which are information associated with coding of the image data. Coefficient data is generated by orthogonally transforming the prediction residue according to the control of the orthogonal transform type and is coded to generate coded data.

For example, an image processing apparatus includes a control section which controls an orthogonal transform type of a prediction residue of image data on the basis of coding parameters which are information associated with coding of the image data, and a coding section which generates coefficient data by orthogonally transforming the prediction residue according to the control by the control section, and codes the coefficient data to Generate coded data.

In addition, an inverse orthogonal transform type of coefficient data generated from coded data of image data is controlled on the basis of coding parameters each of which is information associated with decoding of the coded data. The coded data is decoded to generate coefficient data. An inverse orthogonal transform is performed for the coefficient data according to the control of the inverse orthogonal transform type to generate image data.

For example, an image processing apparatus includes a control section which controls an inverse orthogonal transform type of coefficient data generated from coded data on the basis of coding parameters each of which is information associated with decoding of the coded data of image data, and a decoding section which generates coefficient data by decoding the coded data, and performs an inverse orthogonal transform for the coefficient data according to the control of the control section to generate image data.

In this manner, for example, a code quantity of a residual signal can be more reduced in a block including a relatively large code quantity of a residual signal and a small code quantity of AMT mode information, while a code quantity of AMT mode information can be more reduced in a block including a large code quantity of AMT mode information. Accordingly, reduction of a drop of coding efficiency (improvement of coding efficiency) is achievable.

For example, the control section may select an orthogonal transform type from the number of candidates corresponding to the number of the coding parameters. The coding section may orthogonally transform a prediction residue using a transform matrix of the orthogonal transform type selected by the control section.

Moreover, for example, the control section may set the number of candidates of an inverse orthogonal transform type according to the coding parameters, parse information included in the coded data and associated with the inverse orthogonal transform type on the basis of the set number of the candidates of the inverse orthogonal transform, and set the inverse orthogonal transform type on the basis of the parsed information associated with the inverse orthogonal transform type. The decoding section may perform an inverse orthogonal transform for coefficient data using a transform matrix of the inverse orthogonal transform type set by the control section.

In this manner, for example, the number of candidates of an applied orthogonal transform (inverse orthogonal transform) type increases, and therefore, the orthogonal transform (inverse orthogonal transform) type is selectable from a larger number of candidates in a block including a relatively large code quantity of a residual signal and a small code quantity of AEU mode information including information which indicates the applied orthogonal transform (inverse orthogonal transform) type. Accordingly, reduction of the code quantity of the residual signal is achievable. Conversely, in a block including a relatively large code quantity of AMT mode information and a small code quantity of a residual signal, the number of candidates of an orthogonal transform (inverse orthogonal transform) type decreases, and therefore, the orthogonal transform (inverse orthogonal transform) type is selectable from a smaller number of candidates. Accordingly, reduction of the code quantity of the AMT mode information is achievable.

For example, the number of candidates of an orthogonal transform (inverse orthogonal transform) type can be made larger depending on an increase in a code quantity of a residual signal in a block corresponding to a processing target (decrease in AMT mode information) to select the orthogonal transform (inverse orthogonal transform) type from a larger number of candidates. In other words, the number of candidates of an orthogonal transform (inverse orthogonal transform) type can be made smaller depending on a decrease in a code quantity of a residual signal in a block corresponding to a processing target (increase in AMT mode information) to select the orthogonal transform (inverse orthogonal transform) type from a smaller number of candidates.

Accordingly, reduction of a drop of coding efficiency (improvement of coding efficiency) is achievable.

Note that code quantities of a residual signal of a processing target block and AMT mode information are estimated on the basis of coding parameters as described above. These coding parameters may be any parameters as long as each of the parameters is information associated with coding and decoding. For example, as indicated in a table 11 of FIG. 1, the number of candidates of an orthogonal transform (inverse orthogonal transform) type (# of Transform Pair) may be variable according to parameters indicating whether the processing target is a luminance signal or a chromatic signal (whether a component is luminance (Luma) or chrominance (Chroma)), whether a prediction mode is intra prediction (intra) or inter prediction (Inter), and others.

In general, a chromatic signal has a smaller code quantity of a residual signal than that of a luminance signal. Accordingly, as in the example of the table 11, the number of candidates of an orthogonal transform (inverse orthogonal transform) in a case of a chromatic signal is made smaller than that number in a case of a luminance signal (in other words, the number of candidates of the orthogonal transform (inverse orthogonal transform) type in the case of the luminance signal is made smaller than that number in the case of the chromatic signal). In this manner, more efficient code quantity reduction is achievable, and therefore, reduction of a drop of coding efficiency (improvement of coding efficiency) is achievable in either cases of the luminance signal or the chromatic signal.

Note that a bit length of an index may be variable according to the number of candidates of a transform of AMT as in the example of the table 11 in a case where a flag and the index are used as AMT mode information (in a case where an applied orthogonal transform (inverse orthogonal transform) type is represented by a flag and the index).

For example, as in the example indicated in the table 11, the bit length of the index may be made larger as a code quantity of a residual signal in a block corresponding to a processing target increases (as AMT mode information decreases). In other words, the bit length of the index may be made smaller as the code quantity of the residual signal in the block corresponding to the processing target decreases (as AMT mode information increases).

Note that values of the number of candidates of the orthogonal transform. (inverse orthogonal transform) type (# of Transform Pair), the flag, the index, and the like in the table 11 are indicated by way of example. These values are not limited to the examples herein but may be any values.

<Transform Set>

A one-dimensional orthogonal transform in a horizontal direction and a vertical direction may be performed as an orthogonal transform, and a type may be controlled (set) for each. For example, as in a table 12 indicated in FIG. 2, a combination (transform pair) of a one-dimensional orthogonal transform type (TrH) in the horizontal direction and a one-dimensional orthogonal transform type (TrV) in the vertical direction may be selected on the basis of a prediction mode or the like.

In a case of the table 12, a combination of desired types is selected from a candidate group (transform set) of orthogonal transform types corresponding to a prediction mode on the basis of an index (or emt_flag and emt_idx). Note that the transform set is set on the basis of an intra prediction mode (Intra Mode) using a table 31 of FIG. 3 or the like, for example.

In the case of the table 12 described above, the number of candidates of an orthogonal transform (inverse orthogonal transform) type can be varied by changing a range of allowable values of the index (or emt_flag and emt_idx) (controlling the range on the basis of the coding parameters) as described with reference to the table 11.

For example, in a case of a luminance signal (Luma/{Intra, inter}), candidates may be combinations within a range surrounded by a frame line 21. In a case of intra prediction of a chromatic signal (Chroma/Intra), candidates may be combinations within a range surrounded by a frame line 22. In a case of inter prediction of a chromatic signal (Chroma/Inter), candidates may be combinations within a range surrounded by a frame line 23.

In this manner, a code quantity can be more efficiently decreased. Accordingly, reduction of a drop of coding efficiency (improvement of coding efficiency) is achievable.

Note that inverse orthogonal transforms in the tables 12 and 31 are similar to the orthogonal transforms described above. Description of these inverse orthogonal transforms is therefore omitted herein.

<2-1. Image Coding Apparatus>

Configurations and processes for achieving the above orthogonal transform control will be subsequently described. FIG. 4 is a block diagram depicting an example of a main configuration of an image coding apparatus according to one mode of an image processing apparatus to which the present technology is applied. An image coding apparatus 100 depicted in FIG. 4 is an apparatus for coding image data of a moving image.

As depicted in FIG. 4, the image coding apparatus 100 includes an orthogonal transform control section 101, an orthogonal transform section 102, and a coding section 103.

The orthogonal transform control section 101 is configured to perform a process associated with control of orthogonal transforms. For example, the orthogonal transform control section 101 acquires coding parameters as information associated with coding (decoding) and controls an orthogonal transform type (transform matrix used for orthogonal transform) performed by the orthogonal transform section 102 on the basis of the coding parameters.

For example, the orthogonal transform control section 101 sets the number of candidates of an orthogonal transform type according to coding parameters, and selects (sets) a orthogonal transform type performed by the orthogonal transform section 102 from the set candidates. The orthogonal transform control section 101 supplies information associated with the set orthogonal transform type (AMT mode information) to the orthogonal transform section 102. For example, the orthogonal transform control section 101 supplies, to the orthogonal transform section 102, a transform type index which is an identifier indicating the set orthogonal transform type as the AMT mode information. In the case of the example depicted in FIG. 4, the orthogonal transform control section 101 supplies, to the orthogonal transform section 102, a horizontal transform type index TrTypeH and a vertical transform type index TrTypeV as the transform type index. The horizontal transform type index TrTypeH is an identifier indicating a one-dimensional orthogonal transform type in the horizontal direction. The vertical transform type index TrTypeV is an identifier indicating a one-dimensional orthogonal transform type in the vertical direction.

In addition, the orthogonal transform control section 101 supplies information associated with the set orthogonal transform type (AMT mode information) to the coding section 103 and causes the coding section 103 to transmit the information to the decoding side. For example, the orthogonal transform control section 101 supplies, to the coding section 103, information associated with a transform pair index which is an identifier for identifying a transform pair corresponding to a combination of a one-dimensional orthogonal transform type in the horizontal direction and a one-dimensional orthogonal transform type in the vertical direction as the AMT mode information. In the case of the example of FIG. 4, the orthogonal transform control section 101 supplies, to the coding section 103, a transform flag emt_flag and a transform index emt_idx as information associated with the transform pair index. The transform flag emt_flag is a flag indicating whether to adaptively change an orthogonal transform type. The transform index emt_idx is an identifier for narrowing candidates of a combination of orthogonal transform types in a case where an orthogonal transform type is adaptively changed.

The orthogonal transform section 102 is configured to perform a process associated with orthogonal transforms. For example, the orthogonal transform section 102 orthogonally transforms image data input to the image coding apparatus 100 under control by the orthogonal transform control section 101 to generate orthogonal transform coefficients. For example, the orthogonal transform section 102 performs an orthogonal transform of a type designated by a transform type index supplied from the orthogonal transform control section 101 (orthogonal transform using a transform matrix designated by the transform type index). In the case of the example of FIG. 4, the orthogonal transform section 102 performs, as an orthogonal transform, a one-dimensional orthogonal transform in the horizontal direction and a one-dimensional orthogonal transform in the vertical direction. At this time, the orthogonal transform section 102 performs the one-dimensional orthogonal transform in the horizontal direction using a transform matrix designated by the horizontal transform type index TrTypeH supplied from the orthogonal transform control section 101. In addition, the orthogonal transform section 102 performs the one-dimensional orthogonal transform in the vertical direction using a transform matrix designated by the vertical transform type index TrTypeV supplied from the orthogonal transform control section 101.

The orthogonal transform section 102 supplies orthogonal transform coefficients generated by the orthogonal transform thus performed to the coding section 103. Note that the orthogonal transform section 102 may orthogonally transform a prediction residue which is a difference between image data and prediction image data, for example, instead of the image data. In other words, "image data" in the present specification may represent not only "image data" itself, but also a "prediction residue."

The coding section 103 is configured to perform a process associated with coding. For example, the coding section 103 codes orthogonal transform coefficients supplied from the orthogonal transform section 102 to generate coded data. The coding section 103 further codes information associated with an orthogonal transform type (AMT mode information) supplied from the orthogonal transform control section 101 and adds the coded information to the coded data. (generates coded data including information associated with the orthogonal transform type). For example, the coding section 103 codes information associated with a transform pair index supplied from the orthogonal transform control section 101 to generate coded data including the information. In the case of the example depicted in FIG. 4, the coding section 103 codes the transform flag emt_flag and the transform index emt_idx supplied from the orthogonal transform control section 101 as information associated with the transform pair index to generate coded data including these indexes.

The coding section 103 outputs the coded data thus generated to the outside of the image coding apparatus 100. Note that any method may be used for coding performed by the coding section 103. In addition, the orthogonal transform coefficients may be quantized, and the coding section 103 may code quantization coefficients generated by this quantization instead of the orthogonal transform coefficients.

Note that the orthogonal transform section 102 and the coding section 103 may be constituted by one processing section (block) (coding section 110). More specifically, the coding section 110 orthogonally transforms and codes image data under control by the orthogonal transform control section 101 to generate coded data. Note that the orthogonal transform control section 101 and the orthogonal transform section 102 may be constituted by one processing section (block). For example, the orthogonal transform control section 101 may be included in the orthogonal transform section 102. Moreover, the orthogonal transform control section 101 and the coding section 103 may be constituted by one processing section (block). For example, the orthogonal transform control section 101 may be included in the coding section 103. Furthermore, the orthogonal transform control section 101 may be constituted by one independent apparatus. This is similarly applicable to each of the orthogonal transform section 102, the coding section 103, and the coding section 110.

<Flow of Image Coding Process>

Figure 5:
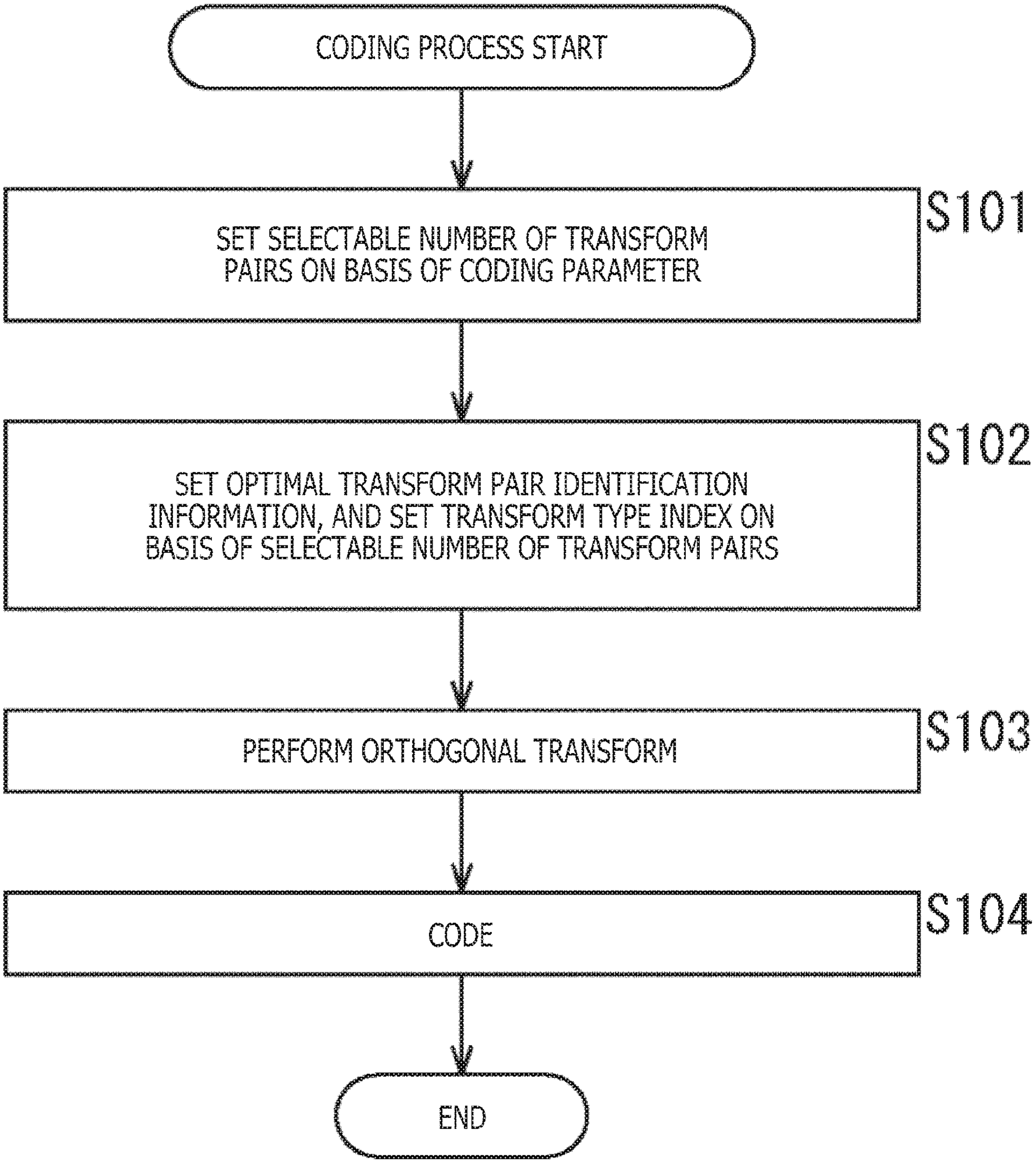
FIG. 5 is a flowchart explaining an example of a flow of a coding process.

An example of a flow of a coding process executed by the image coding apparatus 100 thus configured will be described with reference to a flowchart of FIG. 5.

With a start of the coding process, the orthogonal transform control section 101 sets a selectable number of transform pairs (number of transform pair candidates) on the basis of coding parameters step S101.

In step S102, the orthogonal transform control section 101 sets optimal transform pair identification information (information associated with a transform pair index) on the basis of the selectable number of the transform pairs and further sets a transform type index. More specifically, the orthogonal transform control section 101 selects an optimal transform pair (sets the transform pair index) from the number of transform pair candidates set in step S101 on the basis of RD cost or the like, for example, and sets information associated with the transform pair index (for example, a transform flag and a transform index). Moreover, the orthogonal transform control section 101 generates a transform type index (a horizontal transform type index and a vertical transform type index) corresponding to the selected transform pair.

In step S103, the orthogonal transform section 102 performs an orthogonal transform using a transform matrix of the type indicated by the transform type index generated in step S102 to generate orthogonal transform coefficients.

In step S104, the coding section 103 codes the orthogonal transform coefficients generated in step S103 to generate coded data. The coding section 103 further codes information associated with the transform pair index set in step S102 and adds the coded information to the coded data.

After completion of processing in step S104, the coding process ends.

As described above, code quantity reduction is more efficiently realizable according to relative code quantities of a residual signal and AMT mode information by controlling an orthogonal transform type according to coding parameters (for example, selecting the orthogonal transform type from the number of candidates corresponding to the number of coding parameters). Accordingly, reduction of a drop of coding efficiency (improvement of coding efficiency) is achievable.

Moreover, by controlling the number of candidates of the orthogonal transform type according to the coding parameters as described above, a needless increase of the number of candidates of the orthogonal transform type can be reduced. Accordingly, the orthogonal transform type can be more easily selected. In other words, reduction of a load increase during the coding process is achievable.

<2-2. Image Decoding Apparatus>

Figure 6:
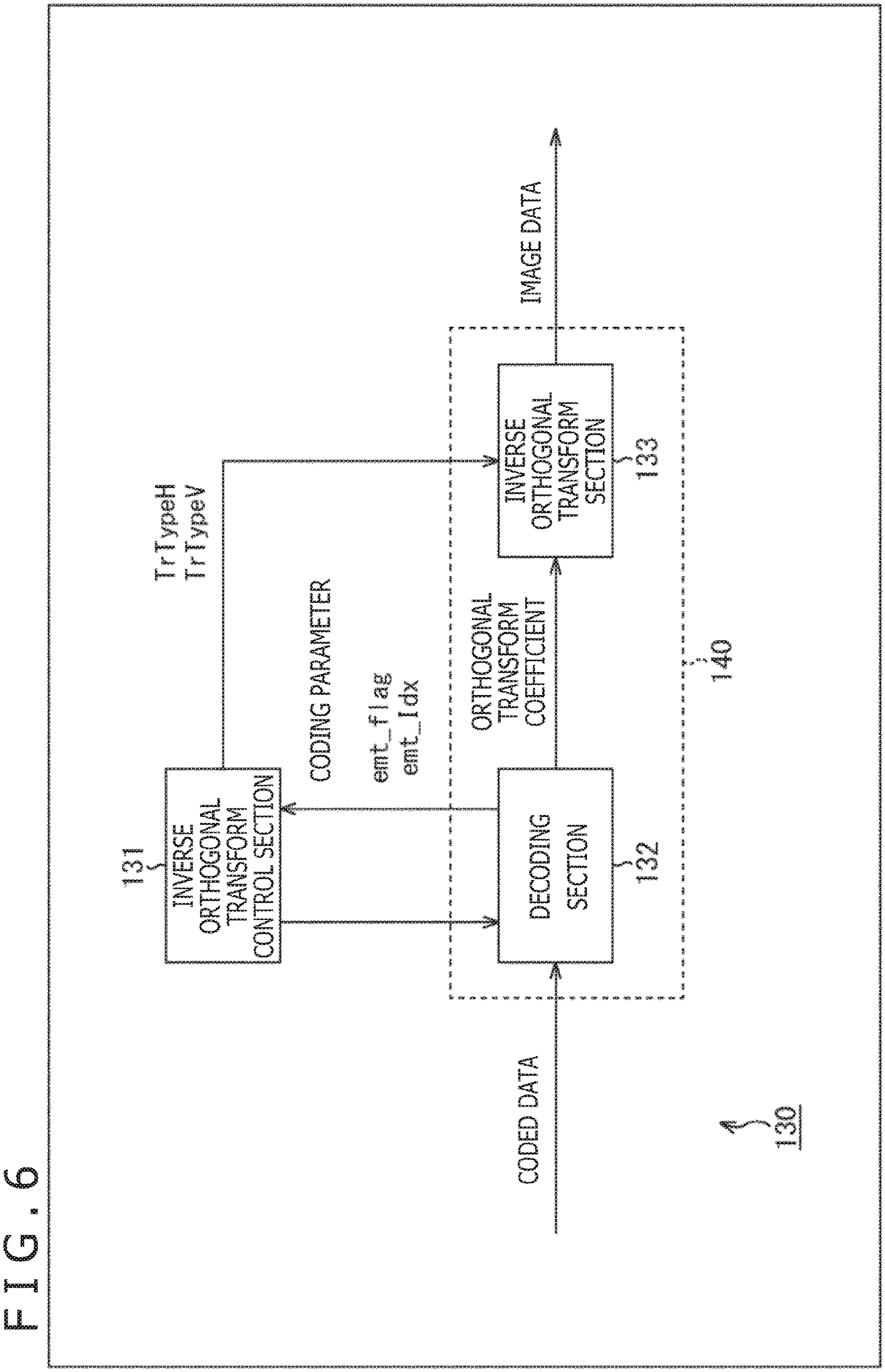
FIG. 6 is a block diagram depicting a main configuration example of an image decoding apparatus.

Configurations and processes for achieving control of inverse orthogonal transforms described above will be subsequently described. FIG. 6 is a block diagram depicting an example of a main configuration of an image decoding apparatus according to one mode of an image processing apparatus to which the present technology is applied. An image decoding apparatus 130 depicted in FIG. 6 is an apparatus for decoding coded data indicating image data of a moving image.

As depicted in FIG. 6, the image decoding apparatus 130 includes an inverse orthogonal transform control section 131, a decoding section 132, and an inverse orthogonal transform section 133.

The inverse orthogonal transform control section 131 is configured to perform a process associated with control of inverse orthogonal transforms. For example, the inverse orthogonal transform control section 131 acquires coding parameters as information associated with coding (decoding) and controls an inverse orthogonal transform type (transform matrix used for inverse orthogonal transform) performed by the inverse orthogonal transform section 133 on the basis of the coding parameters.

For example, the inverse orthogonal transform control section 131 sets the number of candidates of an inverse orthogonal transform type according to coding parameters, and causes the decoding section 132 to parse and extract information associated with a transform pair index (for example, transform flag emt_flag and transform index emt_idx) corresponding to the set number of candidates. The inverse orthogonal transform control section 131 acquires the information extracted and associated with the transform pair index (for example, transform flag emt_flag and transform index emt_idx) corresponding to the set number of candidates.

The inverse orthogonal transform control section 131 sets a transform type index corresponding to the transform pair index on the basis of the information acquired and associated with the transform pair index (for example, transform flag emt_flag and transform index emt_idx), prediction mode information, and the like. In the case of the example depicted in FIG. 6, the inverse orthogonal transform control section 131 sets the horizontal transform type index TrTypeH and the vertical transform type index TrTypeV as the transform type index. The inverse orthogonal transform control section 131 supplies, to the inverse orthogonal transform section 133, the set horizontal transform type index TrTypeH and vertical transform type index TrTypeV.

The decoding section 132 is configured to perform a process associated with decoding. For example, the decoding section 132 decodes coded data input to the image decoding apparatus 130 to generate orthogonal transform coefficients. The decoding section 132 supplies the orthogonal transform coefficients to the inverse orthogonal transform section 133.

Moreover, the decoding section 132 parses and extracts information associated with a transform pair index (for example, transform flag emt_flag and transform index emt_idx) corresponding to the number of candidates set by the inverse orthogonal transform control section 131 and included in coded data input to the image decoding apparatus 130 under control by the inverse orthogonal transform control section 131. The decoding section 132 supplies information associated with the transform pair index to the inverse orthogonal transform control section 131.

The inverse orthogonal transform section 133 is configured to perform a process associated with inverse orthogonal transforms. For example, the inverse orthogonal transform section 133 performs an inverse orthogonal transform for orthogonal transform coefficients supplied from the decoding section 132 under control by the inverse orthogonal transform control section 131 to generate image data. For example, the inverse orthogonal transform section 133 performs an inverse orthogonal transform of a type designated by a transform type index supplied from the inverse orthogonal transform control section 131 (inverse orthogonal transform using a transform matrix designated by the transform type index). In the case of the example of FIG. 6, the inverse orthogonal transform section 133 performs, as an inverse orthogonal transform, an inverse one-dimensional orthogonal transform in the horizontal direction and an inverse one-dimensional orthogonal transform in the vertical direction. At this time, the inverse orthogonal transform section 133 performs the inverse one-dimensional orthogonal transform in the horizontal direction using a transform matrix designated by the horizontal transform type index TrTypeH supplied from the inverse orthogonal transform control section 131. In addition, the inverse orthogonal transform section 133 performs the inverse one-dimensional orthogonal transform in the vertical direction using a transform matrix designated by the vertical transform type index TrTypeV supplied from the inverse orthogonal transform control section 131.

The inverse orthogonal transform section 133 supplies image data generated by the above inverse orthogonal transform to the outside (for example, a processing section in a following stage) of the image decoding apparatus 130. Note that the inverse orthogonal transform section 133 may inversely quantize the orthogonal transform coefficients, for example, to generate a prediction residue which is a difference between image data and prediction image data. Accordingly, "image data" in the present specification may refer to not only "image data" itself, but also a "prediction residue." Moreover, the decoding section 132 may decode coded data and generate quantization coefficients instead of the orthogonal transform coefficients. In this case, the inverse orthogonal transform section 133 may perform an inverse orthogonal transform for orthogonal transform coefficients generated by inversely quantizing the quantization coefficients.

Note that the decoding section 132 and the inverse orthogonal transform decoding section 133 may be constituted by one processing section (block) (decoding section 140). More specifically, the decoding section 140 decodes and performs an inverse orthogonal transform for coded data under control by the inverse orthogonal transform control section 131 to generate image data. Note that the inverse orthogonal transform control section 131 and the inverse orthogonal transform section 133 may be constituted by one processing section (block). For example, the inverse orthogonal transform control section 131 may be included in the inverse orthogonal transform section 133. Moreover, the inverse orthogonal transform control section 131 and the decoding section 132 may be constituted by one processing section (block). For example, the inverse orthogonal transform control section 131 may be included in the decoding section 132. Furthermore, the inverse orthogonal transform control section 131 may be constituted by one independent apparatus. This is similarly applicable to each of the decoding section 132, the inverse orthogonal transform section 133, and the decoding section 140.

<Flow of Image Decoding Process>

Figure 7:
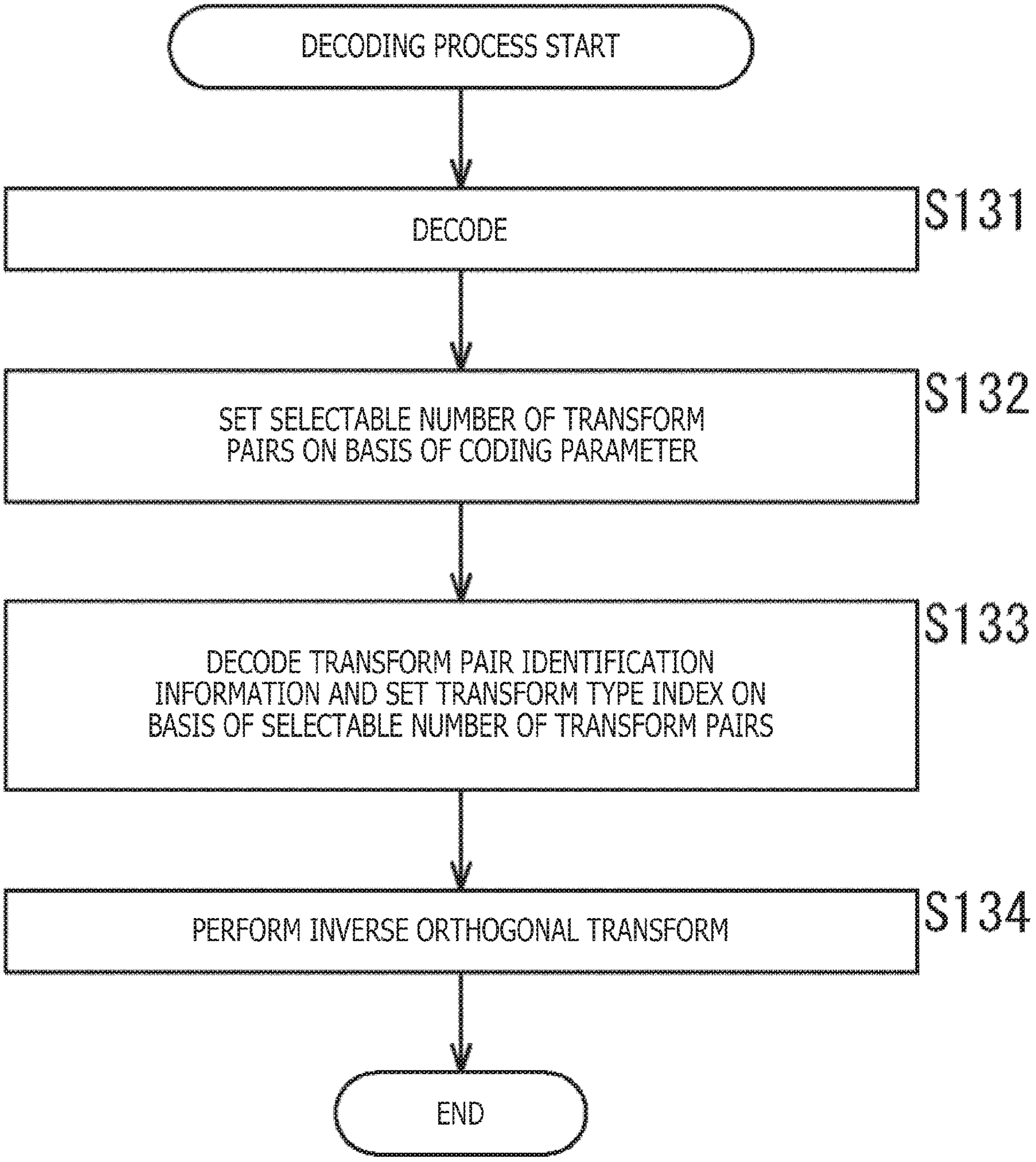
FIG. 7 is a flowchart explaining an example of a flow of a decoding process.

An example of a flow of a decoding process executed by the image decoding apparatus 130 thus configured will be described with reference to a flowchart of FIG. 7.

With a start of the decoding process, the decoding section 132 decodes coded data to generate orthogonal transform coefficients in step S131. The decoding section 132 further parses and extracts coding parameters included in the coded data.

In step S132, the inverse orthogonal transform control section 131 sets the selectable number of transform pairs (the number of transform pair candidates) on the basis of the coding parameters extracted an step S131.

In step S133, the inverse orthogonal transform control section 131 causes the decoding section 132 to decode transform pair identification information (for example, a transform flag and a transform index) included in the coded data on the basis of the selectable number of transform pairs set in step S132, and acquires the decoded transform pair identification information. The inverse orthogonal transform control section 131 sets a transform type index (a horizontal transform type index and a vertical transform type index) on the basis of the acquired transform pair identification information.

In step S134, the inverse orthogonal transform section 133 performs an inverse orthogonal transform using a transform matrix of a type indicated by the transform type index (horizontal transform type index and vertical transform type index) set in step S133 to generate image data.

After completion of processing in step S134, the decoding process ends.

As described above, code quantity reduction is more efficiently realizable on the coding side according to relative code quantities of a residual signal and AMT mode information by controlling an inverse orthogonal transform type according to coding parameters (for example, selecting the inverse orthogonal transform type from the number of candidates corresponding to the number of coding parameters). Accordingly, reduction of a drop of coding efficiency (improvement of coding efficiency) is achievable.

<2-3. Coding Parameter Variations (Method List)>

Coding parameters used for control of the number of candidates of an orthogonal transform (inverse orthogonal transform) type described above may be any information as long as the information is associated with coding (decoding). A table 151 of FIG. 8 indicates an example of coding parameters.

For example, the coding parameters may include a value of a syntax element transmitted as coded data from the coding side to the decoding side. In this manner, the image coding apparatus 100 is capable of easily obtaining coding parameters used for control of the number of candidates of an orthogonal transform type by setting the syntax element. In addition, the image decoding apparatus 130 is capable of easily obtaining coding parameters used for control of the number of candidates of an inverse orthogonal transform type by parsing coded data and extracting the syntax element.

<Method #1>

In this case, coding parameters may include a value of a syntax element associated with a component type (for example, a component ID (componentID)), for example. The component ID (componentID) is an identifier for identifying a luminance signal or a chromatic signal (any one of Y, Cb, and Cr). More specifically, the number of candidates of an orthogonal transform (inverse orthogonal transform) type may be controlled according to whether a processing target of the orthogonal transform (inverse orthogonal transform) is a luminance signal or a chromatic signal (a method #1 of the table 151).

In a case of a chromatic signal, for example, the number of candidates of the orthogonal transform (inverse orthogonal transform) type may be set to the number smaller than that the number in a case of a luminance signal. In general, a chromatic signal has a smaller code quantity of a residual signal than that of a luminance signal. Accordingly, in the case of the chromatic signal, a code quantity of AMT mode information can be reduced by reducing the number of candidates of the orthogonal transform (inverse orthogonal transform) type. In this manner, the code quantity more efficiently decreases, and therefore, reduction of a drop of coding efficiency (improvement of coding efficiency) is achievable. Conversely, in the case of the luminance signal, the code quantity of the residual signal can be reduced by increasing the number of candidates of the orthogonal transform (inverse orthogonal transform) type. In this manner, the code quantity more efficiently decreases, and therefore, reduction of a drop of coding efficiency (improvement of coding efficiency) is achievable.

Note that the number of candidates of the orthogonal transform (inverse orthogonal transform) type may be also controlled depending on the number of non-zero coefficients in the case of the method #1. Alternatively, the number of candidates of the type may be controlled depending on information associated with other transform coefficients (a last coefficient position, a sum of absolute values of non-zero coefficients).

<Method #2>

In addition, for example, coding parameters may include a value of a syntax element associated with a prediction mode.

<Method #2-1>

For example, the number of candidates of the orthogonal transform (inverse orthogonal transform) type may be controlled according to whether the prediction mode of the processing target block of the orthogonal transform (inverse orthogonal transform) is intra prediction (for example, intra CU) or inter prediction (for example, inter CU) (a method #2-1 of the table 151).

In a case of inter prediction, for example, the number of candidates of the orthogonal transform (inverse orthogonal transform) type may be set to the number smaller than the number in a case of intra prediction. In general, an inter CU has a smaller code quantity of a residual signal than that of an intra CU. Accordingly, in the case of the inter prediction, the code quantity of AMT mode information can be reduced by reducing the number of candidates of the orthogonal transform (inverse orthogonal transform) type. In this manner, the code quantity more efficiently decreases, and therefore, reduction of a drop of coding efficiency (improvement of coding efficiency) is achievable. Conversely, in the case of the intra prediction, the code quantity of the residual signal can be reduced by increasing the number of candidates of the orthogonal transform (inverse orthogonal transform) type. In this manner, the code quantity more efficiently decreases, and therefore, reduction of a drop of coding efficiency (improvement of coding efficiency) is achievable.

Note that the number of candidates of the orthogonal transform (inverse orthogonal transform) type may be also controlled according to the number of non-zero coefficients in the case of the method #2-1. Alternatively, the number of candidates of the type may be controlled according to information associated with other transform coefficients (a last coefficient position, a sum of absolute values of non-zero coefficients).

<Method #2-2>

For example, the number of candidates of the orthogonal transform (inverse orthogonal transform) type may be controlled according to forward prediction or bi-prediction in a case where the prediction mode of the processing target block of the orthogonal transform (inverse orthogonal transform) is inter prediction (for example, inter CU) (a method #2-2 of the table 151).

In a case of bi-prediction, for example, the number of candidates of the orthogonal transform (inverse orthogonal transform) type may be set to the number smaller than the number in a case of forward prediction. In general, bi-prediction achieves higher prediction accuracy and has a smaller code quantity of a residual signal in comparison with forward prediction. Accordingly, in the case of the hi-prediction, the code quantity of AMT mode information can be reduced by reducing the number of candidates of the orthogonal transform (inverse orthogonal transform type. In this manner, the code quantity more efficiently decreases, and therefore, reduction of a drop of coding efficiency (improvement of coding efficiency) is achievable. Conversely, in the case of the forward prediction, the code quantity of the residual signal can be reduced by increasing the number of candidates of the orthogonal transform (inverse orthogonal transform) type. In this manner, the code quantity more efficiently decreases, and therefore, reduction of a drop of coding efficiency (improvement of coding efficiency) is achievable.

Rote that the number of candidates of the orthogonal transform (inverse orthogonal transform) type may be also controlled according to the number of non-zero coefficients in the case of the method #2-2. Alternatively, the number of candidates of the type may be controlled according to information associated with other transform coefficients (a last coefficient position, a sum of absolute values of non-zero coefficients).

<Method #2-3>

For example, the number of candidates of the orthogonal transform (inverse orthogonal transform) type may be controlled according to whether the prediction mode of the processing target block of the orthogonal transform (inverse orthogonal transform) is a predetermined mode determined beforehand or other modes (a method #2-3 of the table 151).

In a case where the prediction mode is the predetermined mode determined beforehand, for example, the number of candidates of the orthogonal transform (inverse orthogonal transform) type may be set to the number smaller than the corresponding number in a case of other modes. For example, it is assumed that a code quantity of a residual signal in the case where the prediction mode is the predetermined mode is smaller than that quantity in a case where the prediction mode is any other mode. In this case, the code quantity of AMT mode information can be reduced by reducing the number of candidates of the orthogonal transform (inverse orthogonal transform) type when the prediction mode is the predetermined mode. In this manner, the code quantity more efficiently decreases, and therefore, reduction of a drop of coding efficiency (improvement of coding efficiency) is achievable. Conversely, the code quantity of the residual signal can be reduced by increasing the number of candidates of the orthogonal transform (inverse orthogonal transform) type when the prediction mode is any other mode. In this manner, the code quantity more efficiently decreases, and therefore, reduction of a drop of coding efficiency (improvement of coding efficiency) is achievable.

Note that it is sufficient if an increase or decrease of the number of candidates of the orthogonal transform (inverse orthogonal transform) type is reversed when the code quantity of the residual signal in the case where the prediction mode is the predetermined mode is larger than that quantity in the case where the prediction mode is any other mode.

This predetermined mode may be any mode as long as the code quantity of the residual signal is smaller that mode than the corresponding quantity in other modes. For example, a linear model mode (tMChroma) of luminance-chrominance prediction (CCP (Cross-component prediction)) which predicts a pixel value of a chromatic component using a linear function of a luminance component dynamically constructed as a prediction function may be adopted as the predetermined mode. In general, in a case of LMChroma described above, a code quantity of a residual signal smaller than that of other intra prediction modes. Accordingly, in a case where the prediction mode is LMChroma described above, the number of candidates of the orthogonal transform (inverse orthogonal transform) may be set to the number smaller than the corresponding number in a case of other modes. In this manner, a code quantity of AMT mode information can be reduced. Accordingly, the code quantity more efficiently decreases, and therefore, reduction of a drop of coding efficiency (improvement of coding efficiency) is achievable.

Note that the number of candidates of the orthogonal transform (inverse orthogonal transform) type may be also controlled according to the number of non-zero coefficients in the case of the method #2-3. Alternatively, the number of candidates of the type may be controlled according to information associated with other transform coefficients (a last coefficient position, a sum of absolute values of non-zero coefficients).

<Method #3>

In addition, for example, coding parameters may include a value of a syntax element associated with a block size of a processing target of an orthogonal transform. (inverse orthogonal transform). For example, the number of candidates of the orthogonal transform (inverse orthogonal transform) type may be controlled according to a block size of a processing target of the orthogonal transform (inverse orthogonal transform) (a method #3 of the table 151).

For example, the number of candidates of the orthogonal transform (inverse orthogonal transform) type may be set to a smaller number as the block size decreases. In general, a code quantity of a residual signal becomes smaller as the block size decreases. Accordingly, a code quantity of AMT mode information can be more reduced by reducing the number of candidates of the orthogonal transform (inverse orthogonal transform) type according to a decrease in the block size. In this manner, the code quantity more efficiently decreases, and therefore, reduction of a drop of coding efficiency (improvement of coding efficiency) is achievable.

In other words, the code quantity of the residual signal becomes larger as the block size increases. Accordingly, the code quantity of the residual signal can be more reduced by increasing the number of candidates of the orthogonal transform (inverse orthogonal transform) type according to an increase in the block size. In this manner, the code quantity more efficiently decreases, and therefore, reduction of a drop of coding efficiency (improvement of coding efficiency) is achievable.

For example, the block size may be classified into multiple stages using predetermined thresholds (the block size may be classified into a plurality of groups according to the value of the block size) to set the corresponding number of candidates for each of the classified groups.

Note that the number of candidates of the orthogonal transform (inverse orthogonal transform) type may be controlled according to the number of non-zero coefficients in the case of the method #3. Alternatively, the number of candidates of the type may be controlled according to information associated with other transform coefficients (a last coefficient position, a sum of absolute values of non-zero coefficients).

<Method #4>

In addition, for example, coding parameters may include a value of a syntax element associated with a quantization parameter.

<Method #4-1>

For example, the number of candidates of the orthogonal transform. (inverse orthogonal transform) type may be controlled according to a value of a quantization parameter QP (a method #4-1 of the table 151).

For example, the number of candidates of the orthogonal transform (inverse orthogonal transform) type may be set to a smaller number as the value of the quantization parameter QP increases. In general, a code quantity of a residual signal deceases as the value of the quantization parameter QPincreases. Accordingly, a code quantity of AMT mode information can be reduced by reducing the number of candidates of the orthogonal transform (inverse orthogonal transform) type according to an increase in the value of the quantization parameter QP. In this manner, the code quantity more efficiently decreases, and therefore, reduction of a drop of coding efficiency (improvement of coding efficiency) is achievable.

In other words, the code quantity of the residual signal increases as the value of the quantization parameter QP decreases. Accordingly, the code quantity of the residual signal can be more reduced by increasing the number of candidates of the orthogonal transform (inverse orthogonal transform) type according to a decrease in the value of the quantization parameter QP. In this manner, the code quantity more efficiently decreases, and therefore, reduction of a drop of coding efficiency (improvement of coding efficiency) is achievable.

For example, the quantization parameter QP may be classified into multiple stages using predetermined thresholds (the quantization parameter QP may be classified into a plurality of groups according to the value of the quantization parameter QP) to set the corresponding number of candidates for each of classified groups.

Note that the number of candidates of the orthogonal transform (inverse orthogonal transform) type may be also controlled according to the number of non-zero coefficients in the case of the method #4-1. Alternatively, the number of candidates of the type may be controlled according to information associated with other transform coefficients (a last coefficient position, a sum of absolute values of non-zero coefficients).

<Method #4-2>

For example, instead of the quantization parameter QP, the number of candidates of the orthogonal transform. (inverse orthogonal transform) type may be controlled according to a temporal ID (temporalID) which is identification information indicating a hierarchy in hierarchical coding in a time direction (a method #4-2 of the table 151).

For example, the number of candidates of the orthogonal transform (inverse orthogonal transform) type may be set to a smaller number as a hierarchy of a coding parameter in hierarchical coding in the time direction rises. In general, a value of the quantization parameter (QP) increases as a value of the temporal ID (temporalID) becomes larges, i.e., as a hierarchy in the hierarchical coding in the time direction rises. Accordingly, a code quantity of AMT mode information can be reduced by reducing the number of candidates of the orthogonal transform (inverse orthogonal transform) type according to an increase in the value of the temporal ID (temporalID). In this manner, the code quantity more efficiently decreases, and therefore, reduction of a drop of coding efficiency (improvement of coding efficiency) is achievable.

In other words, a code quantity of a residual signal increases as the value of the temporal ID (temporalID) decreases. Accordingly, the code quantity of the residual signal can be more reduced by increasing the number of candidates of the orthogonal transform (inverse orthogonal transform) type according to a decrease in the value of the temporal ID (temporalID). In this manner, the code quantity more efficiently decreases, and therefore, reduction of a drop of coding efficiency (improvement of coding efficiency) is achievable.

For example, the value of the temporal ID (temporalID) may be classified into multiple stages using predetermined thresholds (the temporal ID (temporalID) may be classified into a plurality of groups according to the value of the temporal ID) to set the corresponding number of candidates for each of the classified groups.

Note that the number of candidates of the orthogonal transform (inverse orthogonal transform) type may be further controlled according to the number of non-zero coefficients in the case of the method #4-2. Alternatively, the number of candidates of the type may be also controlled according to information associated with other transform coefficients (a last coefficient position, a sum of absolute values of non-zero coefficients).

<Method #5>

For example, the coding parameters may include a variable derived from a value of a syntax element transmitted as coded data from the coding side to the decoding side. In this manner, the image coding apparatus 100 is capable of controlling the number of candidates of the orthogonal transform (inverse orthogonal transform) type on the basis of a wider variety of coding parameters. In addition, the image decoding apparatus 130 is capable of controlling the number of candidates of the inverse orthogonal transform type on the basis of a wider variety of coding parameters.

This variable may be any value. For example, this variable may be a variable derived from transform coefficients.

<Method. #5-1>

For example, the number of candidates of the orthogonal transform (inverse orthogonal transform) type may be controlled according to the number of non-zero coefficients in a block corresponding to a processing target of the orthogonal transform (inverse orthogonal transform) (a method. #5-1 of the table 151).

For example, the number of candidates of the orthogonal transform (inverse orthogonal transform) type may be set to a smaller number as the number of non-zero coefficients in the block corresponding to the processing target of the orthogonal transform. (inverse orthogonal transform) decreases. In general, a code quantity of a residual signal becomes smaller as the number of non-zero coefficients decreases. Accordingly, a code quantity of AMT mode information can be reduced by reducing the number of candidates of the orthogonal transform (inverse orthogonal transform) type according to a decrease in the number of non-zero coefficients in the block corresponding to the processing target of the orthogonal transform (inverse orthogonal transform). In this manner, the code quantity more efficiently decreases, and therefore, reduction of a drop of coding efficiency (improvement of coding efficiency) is achievable.

In other words, the code quantity of the residual signal becomes larger as the number of non-zero coefficients increases. Accordingly, the code quantity of the residual signal can be more reduced by increasing the number of candidates of the orthogonal transform (inverse orthogonal transform) type according to an increase in the number of non-zero coefficients. In this manner, the code quantity more efficiently decreases, and therefore, reduction of a drop of coding efficiency (improvement of coding efficiency) is achievable.

For example, the number of non-zero coefficients may be classified into multiple stages using predetermined thresholds (the number of non-zero coefficients may be classified into a plurality of groups according to the value of the number of non-zero coefficients) to set the corresponding number of candidates for each of the classified groups.

<Method #5-2>

For example, the number of candidates of the orthogonal transform (inverse orthogonal transform) type may be controlled according to a position of a last coefficient in a block corresponding to a processing target of the orthogonal transform (inverse orthogonal transform) (a method #5-2 of the table 151). The last coefficient is the last non-zero coefficient in the block corresponding to the processing target of the orthogonal transform (inverse orthogonal transform) in an order of scanning. The number of candidates of the orthogonal transform (inverse orthogonal transform) type may be controlled according to the position of the last coefficient (for example, a distance from a scanning start position in the order of scanning).

For example, the number of candidates of the orthogonal transform (inverse orthogonal transform) type may be set to a smaller number as the position of the last coefficient in the block corresponding to the processing target of the orthogonal transform (inverse orthogonal transform) is located closer to the scanning start position. In general, the position of the last coefficient is located closer to the scanning start position as the number of non-zero coefficients decreases. In other words, a code quantity of a residual signal decreases. Accordingly, a code quantity of AMT mode information can be reduced by reducing the number of candidates of the orthogonal transform (inverse orthogonal transform) type as the position of the last coefficient in the block corresponding to the processing target of the orthogonal transform (inverse orthogonal transform) is located closer to the scanning start position. In this manner, the code quantity more efficiently decreases, and therefore, reduction of a drop of coding efficiency (improvement of coding efficiency) is achievable.

In other words, the code quantity of the residual signal increases as the position of the last coefficient is located farther from the scanning start position. Accordingly, the code quantity of the residual signal can be more reduced by increasing the number of candidates of the orthogonal transform (inverse orthogonal transform) type as the position of the last coefficient is located farther from the scanning start position. In this manner, the code quantity more efficiently decreases, and therefore, reduction of a drop of coding efficiency (improvement of coding efficiency) is achievable.

For example, the distance from the scanning start position to the position of the last coefficient may be classified into multiple stages using predetermined thresholds (this distance may be classified into a plurality of groups according to the value of the distance) to set the corresponding number of candidates for each of the classified groups.

<Method #5-3>

For example, the number of candidates of the orthogonal transform (inverse orthogonal transform) type may be controlled according to a sum total of absolute values of non-zero coefficients in a block corresponding to a processing target of the orthogonal transform (inverse orthogonal transform) (a method #5-3 of the table 151).

For example, the number of candidates of the orthogonal transform (inverse orthogonal transform) type may be set to a smaller number as the sum total of the absolute values of the non-zero coefficients in the block corresponding to the processing target of the orthogonal transform (inverse orthogonal transform) decreases. In general, a code quantity of a residual signal becomes smaller as the sum total of the absolute values of the non-zero coefficients decreases. Accordingly, a code quantity of AMT mode information can be reduced by reducing the number of candidates of the orthogonal transform (inverse orthogonal transform) type according to a decrease in the sum total of the absolute values of the non-zero coefficients. In this manner, the code quantity more efficiently decreases, and therefore, reduction of a drop of coding efficiency (improvement of coding efficiency) is achievable.

In other words, the code quantity of the residual signal increases as the sum total of the absolute values of the non-zero coefficients in the block corresponding to the processing target of the orthogonal transform (inverse orthogonal transform) increases. Accordingly, the code quantity of the residual signal can be more reduced by increasing the number of candidates of the orthogonal transform (inverse orthogonal transform) type according to an increase in the sum total of the absolute values of the non-zero coefficients. In this manner, the code quantity more efficiently decreases, and therefore, reduction of a drop of coding efficiency (improvement of coding efficiency) is achievable.

For example, the sum total of the absolute values of the non-zero coefficients in the block corresponding to the processing target of the orthogonal transform (inverse orthogonal transform) may be classified into multiple stages using predetermined thresholds (the sum total of the absolute values of the non-zero coefficients may be classified into a plurality of groups according to the value of the sum total) to set the corresponding number of candidates for each of the classified groups.

<Combination of Methods>

Note that a plurality of any methods in the methods described above may be combined. For example, the method #5-1, method #2-1, and method #1 may be combined and applied.

<2-4. Image Coding Apparatus>

Figure 9:
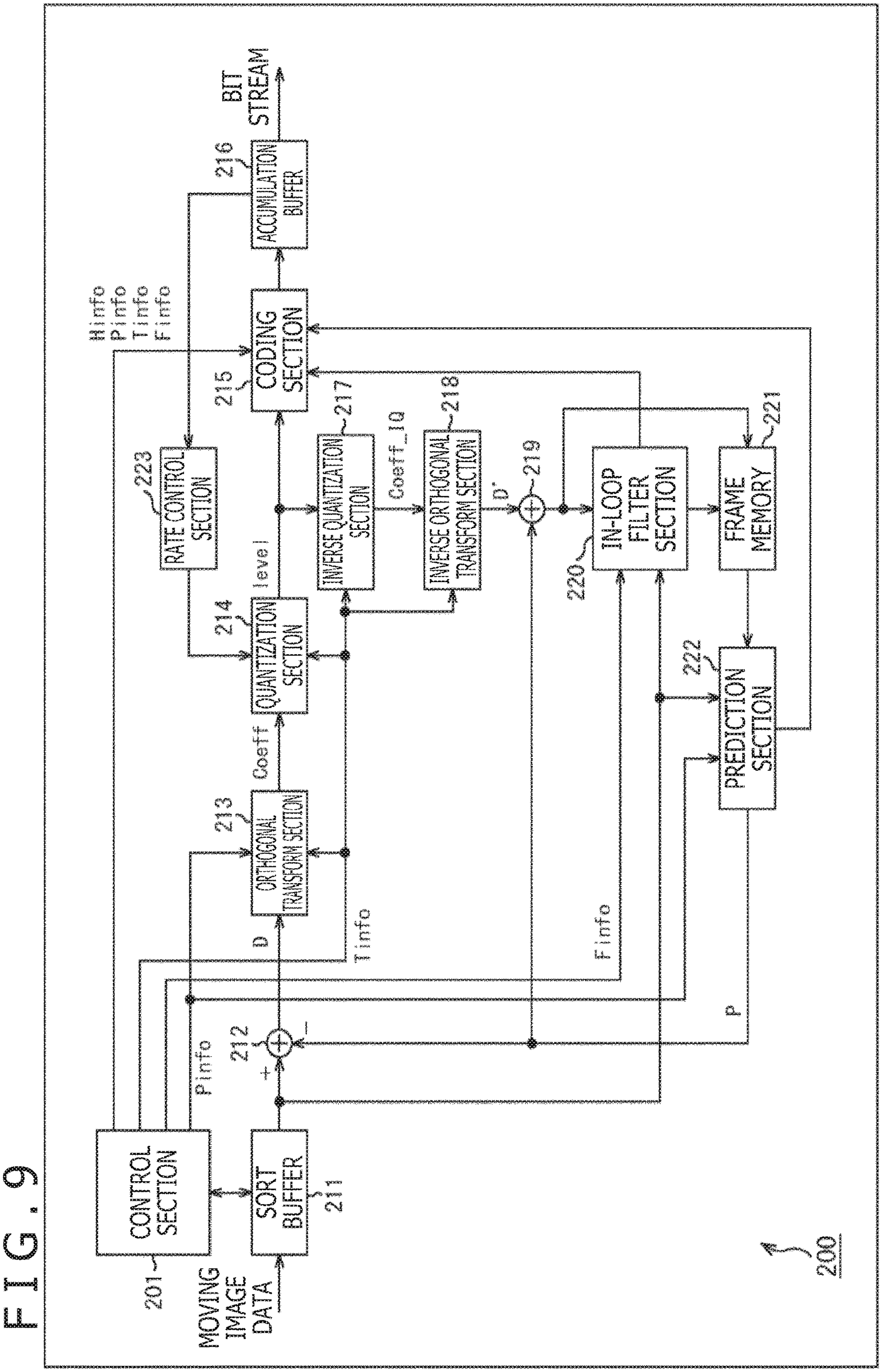
FIG. 9 is a block diagram depicting a main configuration example of an image coding apparatus.

Described next will be a more specific application example of orthogonal transform (inverse orthogonal transform) control described above. FIG. 9 is a block diagram depicting an example of a configuration of an image coding apparatus in one mode of an image processing apparatus to which the present technology is applied. An image coding apparatus 200 depicted in FIG. 9 is an apparatus for coding image data of a moving image. For example, the image coding apparatus 200 incorporates a technology described in NPL 1, NPL 3, or NPL 4, and codes image data indicating a moving image using a method in conformity with standards described in any one of these documents.

Note that FIG. 9 depicts main processing sections (blocks), main data flows, and the like, and does not necessarily depict all. Accordingly, a processing section not depicted as a block in FIG. 9, or a flow of processing or data not indicated by an arrow or the like in FIG. 9 may be present in the image coding apparatus 200. This is similarly applicable to other figures explaining processing sections or the like within the image coding apparatus 200.

As depicted in FIG. 9, the image coding apparatus 200 includes a control section 201, a sort buffer 211, a calculation section 212, an orthogonal transform section 213, a quantization section 214, a coding section 215, an accumulation buffer 216, an inverse quantization section 217, an inverse orthogonal transform section 218, a calculation section 219, an in-loop filter section 220, a frame memory 221, a prediction section 222, and a rate control section 223.

<Control Section>

The control section 201 divides moving image data retained in the sort buffer 211 into blocks as units of processing (CUB, PUs, transform blocks, or the like) on the basis of a block size as a unit of processing designated from the outside or in advance. The control section 201 further decides coding parameters (header information Hinfo, prediction mode information Pinfo, transform information Tinfo, filter information Finfo, and the like) to be supplied to the respective blocks on the basis of RDO (Rate-Distortion Optimization), for example.

Details of these coding parameters will be described below. After deciding the coding parameters described above, the control section 201 supplies the decided coding parameters to the respective blocks. Specifically, the coding parameters are supplied in following manners.

The header information Hinfo is supplied to each of the blocks.

The prediction mode information Pinfo is supplied to the coding section 215 and the prediction section 222.

The transform information Tinfo is supplied to the coding section 215, the orthogonal transform section 213, the quantization section 214, the inverse quantization section 217, and the inverse orthogonal transform section 218.

The filter information Finfo is supplied to the in-loop filter section 220.

<Control of Orthogonal Transform and Inverse Orthogonal Transform>

Note that the control section 201 sets and derives information associated with control of orthogonal transforms performed by the orthogonal transform section 213 and inverse orthogonal transforms performed by the inverse orthogonal transform section 218. The control section 201 supplies the information thus obtained to the orthogonal transform section 213 and the inverse orthogonal transform section 218 to control orthogonal transforms performed by the orthogonal transform section 213 and inverse orthogonal transforms performed by the inverse orthogonal transform section 218.

Moreover, during the control, the control section 201 controls an orthogonal transform (inverse orthogonal transform) type on the basis of the various coding parameters described above. More specifically, the control section 201 controls a selectable number of transform pairs (number of transform pair candidates) NumTrPair on the basis of the various coding parameters described above.

For example, the control section 201 sets the number of candidates of the orthogonal transform (inverse orthogonal transform) type (selectable number of transform pairs NumTrPair) according to the coding parameters, and selects an orthogonal transform (inverse orthogonal transform) type from the set candidates of the orthogonal transform (inverse orthogonal transform) type. The control section 201 supplies control information indicating the selected type to the orthogonal transform section 213 and the inverse orthogonal transform section 218 to control the orthogonal transform and the inverse orthogonal transform performed by these sections.

By this control, the image coding apparatus 200 is capable of realizing more efficient code quantity reduction by a method corresponding to relative coding quantities of a residual signal of a processing target block and AMT mode information. Accordingly, reduction of a drop of coding efficiency (improvement of coding efficiency) is achievable. Moreover, a needless increase in candidates can be reduced, and therefore, reduction of a load increase in the coding process is achievable.

<Sort Buffer>

Fields (inputs images) of moving image data are input to the image coding apparatus 200 in a reproduction order (display order) of the data. The sort buffer 211 acquires the input images in the reproduction order (display order) and retains (stores) the input images. The sort buffer 211 sorts the input images in a coding order (decoding order) and divides the input images into blocks as units of processing under control by the control section 201. The sort buffer 211 supplies the input images after processing to the calculation section 212. The sort buffer 211 also supplies the input images (original images) to the prediction section 222 and the in-loop filter section 220.

<Calculation Section>

The calculation section 212 receives an image I corresponding to a block as a unit of processing and a prediction image P supplied from the prediction section 222 as inputs, subtracts the prediction image P from the image I as expressed in the following Expression (6) to derive a prediction residue D and supplies the prediction residue D to the orthogonal transform section 213.

[Math. 4]

$$D-I-P \tag{6}$$

<Orthogonal Transform Section>

The orthogonal transform section 213 receives the prediction residue D supplied from the calculation section 212 and the transform information Tinfo supplied from the control section 201 as inputs and performs an orthogonal transform for the prediction residue D on the basis of the transform information Tinfo to derive a transform coefficient Coeff. Note that the orthogonal transform section 213 is capable of performing adaptive primary core transforms (AMT) which adaptively selects an orthogonal transform type (transform coefficients). The orthogonal transform section 213 supplies the obtained transform coefficient Coeff to the quantization section 214.

<Quantization Section>

The quantization section 214 receives the transform coefficient Coeff supplied from the orthogonal transform section 213 and the transform information Tinfo supplied from the control section 201 as inputs, and scales (quantizes) the transform coefficient Coeff on the basis of the transform information Tinfo. Note that a rate of this quantization is controlled by the rate control section 223. The quantization section 214 supplies transform coefficients after quantization obtained by the above quantization, i.e., a quantization transform coefficient level (level) to the coding section 215 and the inverse quantization section 217.

<Coding Section>

The coding section 215 receives, as inputs, the quantization transform coefficient level (level) supplied from the quantization section 214, the various coding parameters (header information Hinfo, prediction mode information Pinfo, transform information Tinfo, filter information Finfo, and the like) supplied from the control section 201, information associated with a filter such as a filter coefficient supplied from the in-loop filter section 220, and information associated with an optimal prediction mode and supplied from the prediction section 222. The coding section 215 codes the quantization transform coefficient level (level) by variable-length coding (for example, arithmetic coding) to generate a bit string (coded data).

The coding section 215 further derives residual information Rinfo from the quantization transform coefficient level (level), and codes the residual information. Rinfo to generate a bit string.

The coding section 215 further adds the information associated with the filter and supplied from the in-loop filter section 220 to the filter information. Finfo and adds the information associated with the optimal prediction mode and supplied from the prediction section 222 to the prediction mode information Pinfo. Thereafter, the coding section 215 codes the various coding parameters described above (header information Hinfo, prediction mode information. Pinfo, transform information Tinfo, filter information Finfo, and the like) to generate a bit string.

Furthermore, the coding section 215 multiplexes the bit strings of the various pieces of information generated as described above to generate coded data. The coding section 215 supplies the generated coded data to the accumulation buffer 216.

<Accumulation Buffer>

The accumulation buffer 216 temporarily retains coded data obtained at the coding section 215. The accumulation buffer 216 outputs the retained coded data to the outside of the image coding apparatus 200 as a bit stream, for example, at a predetermined timing. For example, this coded data is transmitted to the decoding side via any recording medium, any transmission medium, any information processing apparatus, or the like. Accordingly, the accumulation buffer 216 also functions as a transmitting section which transmits coded data (bit stream).

<Inverse Quantization Section>

The inverse quantization section 217 performs a process associated with inverse quantization. For example, the inverse quantization section 217 receives, as inputs, the quantization transform coefficient level (level) supplied from the quantization section 214 and the transform information Tinfo supplied from the control section 201 and scales (inversely quantizes) a value of the quantization transform coefficient level (level) on the basis of the transform information Tinfo. Note that this inverse quantization is an inverse process of the quantization performed at the quantization section 214. The inverse quantization section 217 supplies a transform coefficient Coeff_IQ obtained by this inverse quantization to the inverse orthogonal transform section 218.

<Inverse Orthogonal Transform Section>

The inverse orthogonal transform section 218 performs a process associated with inverse orthogonal transforms. For example, the inverse orthogonal transform section 218 receives, as inputs, the transform coefficient. Coeff_IQ supplied from the inverse quantization section 217 and the transform information Tinfo supplied from the control section 201 and performs an inverse orthogonal transform for the transform coefficient Coeff_IQ on the basis of the transform information Tinfo to derive a prediction residue D'. Note that this inverse orthogonal transform is an inverse process of the orthogonal transform performed at the orthogonal transform section 213. Accordingly, the inverse orthogonal transform section 218 is capable of performing adaptive inverse orthogonal transforms (AMT) Which adaptively selects an inverse orthogonal transform type (transform coefficients).

The inverse orthogonal transform section 218 supplies the prediction residue D' obtained by this inverse orthogonal transform to the calculation section 219. Note that the inverse orthogonal transform section 218 is similar to the inverse orthogonal transform section on the decoding side (described below). Accordingly, description for the decoding side (described below) is applicable to the inverse orthogonal transform section 218.

<Calculation Section>

The calculation section 219 receives, as inputs, the prediction residue D' supplied from the inverse orthogonal transform section 218, and a prediction image P supplied from the prediction section 222. The calculation section 219 adds the prediction residue D' to the prediction image P corresponding to the prediction residue D' to derive a local decoded image Rlocal. The calculation section 219 supplies the derived local decoded image Rlocal to the in-loop filter section 220 and the frame memory 221.

<In-Loop Filter Section>

The in-loop filter section 220 performs a process associated with an in-loop filtering process. For example, the in-loop filter section 220 receive, as inputs, s the local decoded image Rlocal supplied from the calculation section 219, the filter information Finfo supplied from the control section 201, and an input image (original image) supplied from the sort buffer 211. Note that information input to the in-loop filter section 220 is any information and may be information other than these pieces of information. For example, information such as a prediction mode, motion information, a code quantity target value, a quantization parameter QP, a picture type, and a block (CU, CTU, or the like) may be input to the in-loop filter section 220 as necessary.

The in-loop filter section 220 appropriately performs a filtering process for the local decoded image Rlocal on the basis of the filter information Finfo. The in-loop filter section 220 uses the input image (original image) or other input information for the filtering process as necessary.

For example, as described in NPL 1, the in-loop filter section 220 applies four in-loop filters, i.e., a bilateral filter, a deblocking filter (DBF (DeBlocking Filter)), an adaptive offset filter (SAO (Sample Adaptive Offset)), and an adaptive loop filter (ALF (Adaptive Loop Filter)) in this order. Note that any filters are applicable in any order and selectable in appropriate manners.

Needless to say, the filtering process performed by the in-loop filter section 220 is not limited to the example described above but may be any process. For example, a Wiener filter or the like may be applied to the in-loop filter section 220.

The in-loop filter section 220 supplies the local decoded image Rlocal subjected to the filtering process to the frame memory 221. Note that the in-loop filter section 220 supplies information associated with the filter such as the filtering coefficients to the coding section 215 in a case of transmission of the information associated with the filter to the decoding side, for example.

<Frame Memory>

The frame memory 221 performs a process associated with storage of data corresponding to an image. For example, the frame memory 221 receives, as inputs, the local decoded image Rlocal supplied from the calculation section 219, and the local decoded image Rlocal supplied from the in-loop filter section 220 and subjected to the filtering process and retains (stores) the received images. Moreover, the frame memory 221 reconstructs a decoded image R for each unit of picture using the local decoded image Rlocal and retains (stores in a buffer within the frame memory 221) the reconstructed decoded image R. The frame memory 221 supplies the decoded image R (or a part of the decoded image R) to the prediction section 222 in response to a request from the prediction section 222.

<Prediction Section>

The prediction section 222 performs a process associated with generation of a prediction image. For example, the prediction section 222 receives, as inputs, the prediction mode information Pinfo supplied from the control section 201, the input image (original image) supplied from the sort buffer 211, and the decoded image R (or a part of the decoded image R) read from the frame memory 221. The prediction section 222 performs a prediction process such as inter prediction and intra prediction using the prediction mode information Pinfo and the input image (original image), performs prediction with reference to the decoded image R as a reference image, and performs a motion compensation process on the basis of a prediction result to generate the prediction image P. The prediction section 222 supplies the generated prediction image P to the calculation section 212 and the calculation section 219. Moreover, the prediction section 222 supplies information associated with a prediction mode selected by the foregoing processing, i.e., an optimal prediction mode to the coding section 215 as necessary.

<Rate Control Section>

The rate control section 223 performs a process associated with rate control. For example, the rate control section 223 controls a rate of a quantization operation of the quantization section 214 such that no overflow or underflow is caused on the basis of a code quantity of coded data accumulated in the accumulation buffer 216.

According to the image coding apparatus 200 configured as above, the control section 201 as an orthogonal transform control section or an inverse orthogonal transform control section performs the above process to which the present technology is applied. Moreover, the orthogonal transform section 213 as an orthogonal transform section performs the above process to which the present technology is applied. Furthermore, the coding section 215 as a coding section performs the above process to which the present technology is applied. In addition, the inverse orthogonal transform section 218 as an inverse orthogonal transform section performs the above process to which the present technology is applied. Accordingly, the image coding apparatus 200 is capable of reducing a drop of coding efficiency (improving coding efficiency).

<Details of Control Section>

Figure 10:
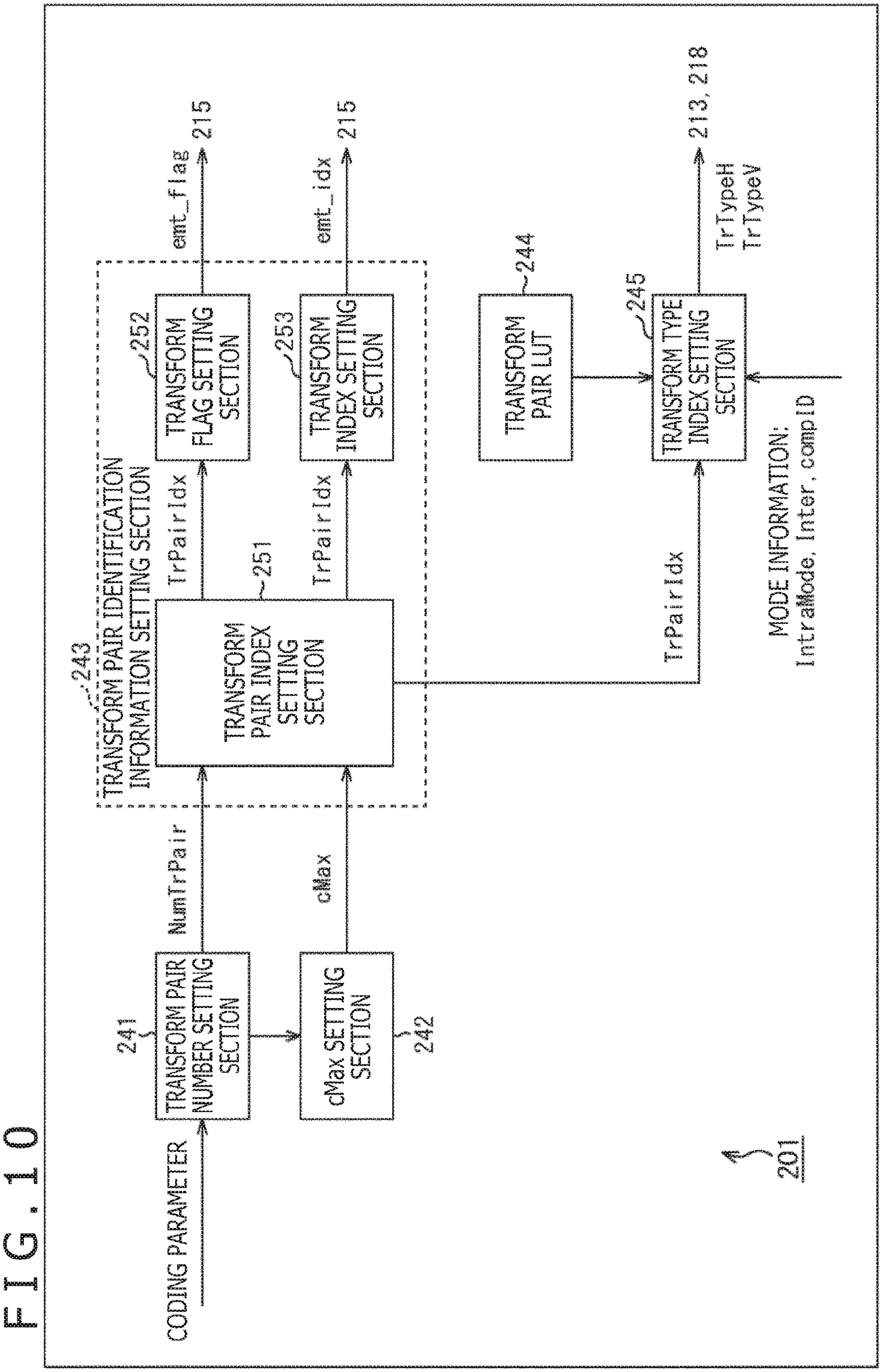
FIG. 10 is a block diagram depicting a main configuration example associated with control of orthogonal transforms and included in a control section.

FIG. 10 is a block diagram depicting a main configuration example associated with control of orthogonal transforms and included in the control section 201 of FIG. 9. As depicted in FIG. 10, the control section 201 includes, as a configuration for controlling orthogonal transforms, a transform pair number setting section 241, a cMax setting section 242, a transform pair identification information setting section 243, a transform pair LUT 244, and a transform type index setting section 245.

The transform pair number setting section 241 is configured to perform a process associated with setting of a selectable number of transform pairs NumIrPair. The selectable number of transform pairs NumIrPair refers to the number of selectable transform pairs. The selectable transform pairs refer to transform pair candidates. Each of the transform pairs is a combination of a one-dimensional orthogonal transform type (TrH) in the horizontal direction and a one-dimensional orthogonal transform type (TrV) in the vertical direction (or a combination of an inverse one-dimensional orthogonal transform type in the vertical direction and an inverse one-dimensional orthogonal transform type is the horizontal direction).

The transform pair number setting section 241 receives coding parameters as inputs. These coding parameters may be set by the control section 201 (a configuration of the control section 201 other than a configuration depicted in FIG. 10) or may be supplied from the outside of the image coding apparatus 200. In addition, the coding parameters correspond to information associated with coding (decoding) and are not particularly limited to specific parameters as long as the parameters are available for control of orthogonal transforms. For example, the coding parameters include the various parameters described with reference to FIG. 8.

The transform pair number setting section 241 sets the selectable number of transform pairs NumTrPair on the basis of these coding parameters. The transform pair number setting section 241 supplies the set selectable number of transform pairs NumTrPair to the cMax setting section 242 and the transform pair identification information setting section 243.

The cMax setting section 242 is configured to perform a process associated with setting of cMax. This cMax is a variable indicating a maximum value of the selectable number of transform pairs (i.e., the number of transform pair candidates). The cMax setting section 242 receives, as inputs, the selectable number of transform pairs NumTrPair supplied from the transform pair number setting section 241. The cMAx setting section 242 sets the cMax on the basis of the selectable number of transform pairs NumTrPair. The cMax setting section 242 supplies the set cMax to the transform pair identification information setting section 243.

The transform pair identification information setting section 243 is configured to perform a process associated with setting of transform pair identification information. The transform pair identification information is information associated with a transform pair index TrPairIdx which is an identifier indicating a transform pair selected from candidates. Specifically, this transform pair identification information is one of information associated with an orthogonal transform (inverse orthogonal transform) type (AMT mode information).

For example, the transform pair identification information includes the transform pair index TrPairIdx. Moreover, for example, the transform pair identification information includes a transform flag emt_flag and a transform index emt_idx corresponding to the transform pair index TrPairIdx. The transform flag emt_flag is a flag indicating whether to adaptively change an orthogonal transform (inverse orthogonal transform) type. The transform index emt_idx is an identifier for narrowing transform pair candidates in a case where an orthogonal transform type is adaptively changed. Note that the transform pair index TrPairIdx corresponds to index in the table 12 of FIG. 2, for example.

The transform pair identification information setting section 243 receives, as inputs, the selectable number of transform pairs NumTrPair supplied from the transform pair number setting section 241 and the cMax supplied from the cMax setting section 242. The transform pair identification information setting section 243 sets transform pair identification information on the basis of these pieces of information.

As depicted in FIG. 10, the transform pair identification information setting section 243 includes a transform pair index setting section 251, a transform flag setting section 252, and a transform index setting section 253.

The transform pair index setting section 251 is configured to perform a process associated with setting of the transform pair index TrPairIdx. The transform pair index setting section 251 receives, as inputs, the selectable number of transform pairs NumTrPair supplied from the transform pair number setting section 241 and the cMax supplied from the cMax setting section 242. The transform pair index setting section 251 sets the transform pair index TrPairIdx on the basis of these pieces of information. The transform pair index setting section 251 supplies the set transform pair index TrPairIdx to the transform flag setting section 252 and the transform index setting section 253. The transform pair index setting section 251 also supplies the set transform pair index TrPairIdx to the transform type index setting section 245.

The transform flag setting section 252 is configured to perform a process associated with setting of the transform emt_flag. The transform flag setting section 252 receives the transform pair index TrPairIdx supplied from the transform pair index setting section 251 as an input. The transform flag setting section 252 sets the transform flag emt_flag corresponding to the transform pair index TrPairIdx. The transform flag setting section 252 supplies the set transform flag emt_flag to the coding section 215 as AMT mode information (information associated with the transform pair index) and causes the coding section 215 to transmit the transform flag emt_flag to the decoding side as coded data.

The transform index setting section 253 is configured to perform a process associated with setting of the transform index emt_idx. The transform index setting section 253 receives the transform pair index TrPairIdx supplied from the transform pair index setting section 251 as an input. The transform index setting section 253 sets the transform index emt_idx corresponding to the transform pair index TrPairIdx. The transform index setting section 253 supplies the set transform index emt_idx to the coding section 215 as AMT mode information (information associated with the transform pair index) and causes the coding section 215 to transmit the transform index emt_idx to the decoding side as coded data.

The coding section 215 codes the transform flag emt_flag supplied from the transform flag setting section 252 and adds the quantization transform coefficient level (level) to the coded data subjected to variable-length coding (generates coded data including the transform flag emt_flag). Similarly, the coding section 215 codes the transform index emt_idx supplied from the transform index setting section 253 and adds the quantization transform coefficient level (level) to the coded data subjected to variable-length coding (generates coded data including the transform index emt_idx). In other words, the coding section 215 generates coded data including information associated with the transform pair index (coded data including the transform flag emt_flag and the transform index emt_idx).

The transform pair LUT 244 includes any storage medium such as a semiconductor memory, for example, and stores a look up table (LUT (Look Up Table)) for selecting transform pairs. This LUT has information included in the table 12 indicated in FIG. 2, for example. This LUT may be determined beforehand or may be able to be redesigned on the basis of RD cost or the like. The transform pair LUT 244 supplies the LUT to the transform type index setting section 245 as necessary.

The transform type index setting section 245 is configured to perform a process associated with setting of a transform type index TrType. The transform type index TrType is an identifier for identifying an orthogonal transform (inverse orthogonal transform) type (transform matrix). For example, the transform type index TrType include s a horizontal transform type index TrTypeH and a vertical transform type index TrTypeV. The horizontal transform type index TrTypeH is an identifier for identifying a one-dimensional orthogonal transform (inverse one-dimensional orthogonal transform) type (transform matrix) in the horizontal direction. The vertical transform type index TrTypeV is an identifier for identifying a one-dimensional orthogonal transform (inverse one-dimensional orthogonal transform) type (transform matrix) in the vertical direction.

The transform type index setting section 245 receives, as inputs, the transform pair index TrPairIdx supplied from the transform pair index setting section 251, the LUT supplied from the transform pair LUT 244, and mode information. For example, this mode information includes coding parameters such as mode information indicating intra prediction (IntraMode), mode information indicating inter prediction (Inter), and a component ID (compID). The mode information may be set by the control section 201 (a configuration of the control section 201 other than the configuration depicted in FIG. 10) or may be supplied from the outside of the image coding apparatus 200.

The transform type index setting section 245 sets the horizontal transform type index TrTypeH and the vertical transform type index TrTypeV as the transform type index TrType on the basis of these pieces of information. More specifically, the transform type index setting section 245 selects a transform pair corresponding to the transform pair index TrPairIdx and the mode information according to the LUT supplied from the transform pair LUT 244 and sets the horizontal transform type index TrTypeH and the vertical transform type index TrTypeV for identifying the selected transform pair.

The transform type index setting section 245 supplies the set horizontal transform type index TrTypeH and vertical transform type index TrTypeV to the orthogonal transform section 213 and the inverse orthogonal transform section 218 as the transform information Tinfo.

Accordingly, the control section 201 supplies the horizontal transform type index TrTypeH and the vertical transform type index TrTypeV to the orthogonal transform section 213 and the inverse orthogonal transform section 218 to control orthogonal transforms and inverse orthogonal transforms. In addition, as described above, the control section 201 controls the number of transform pair candidates (NumTrPair) on the basis of the coding parameters at the time of setting of the horizontal transform type index TrTypeH and the vertical transform type index TrTypeV. Accordingly, the image coding apparatus 200 is capable of reducing a drop of coding efficiency (improving coding efficiency) as described above with reference to FIG. 8 and other figures.

<Details of Orthogonal Transform Section>

Figure 11:
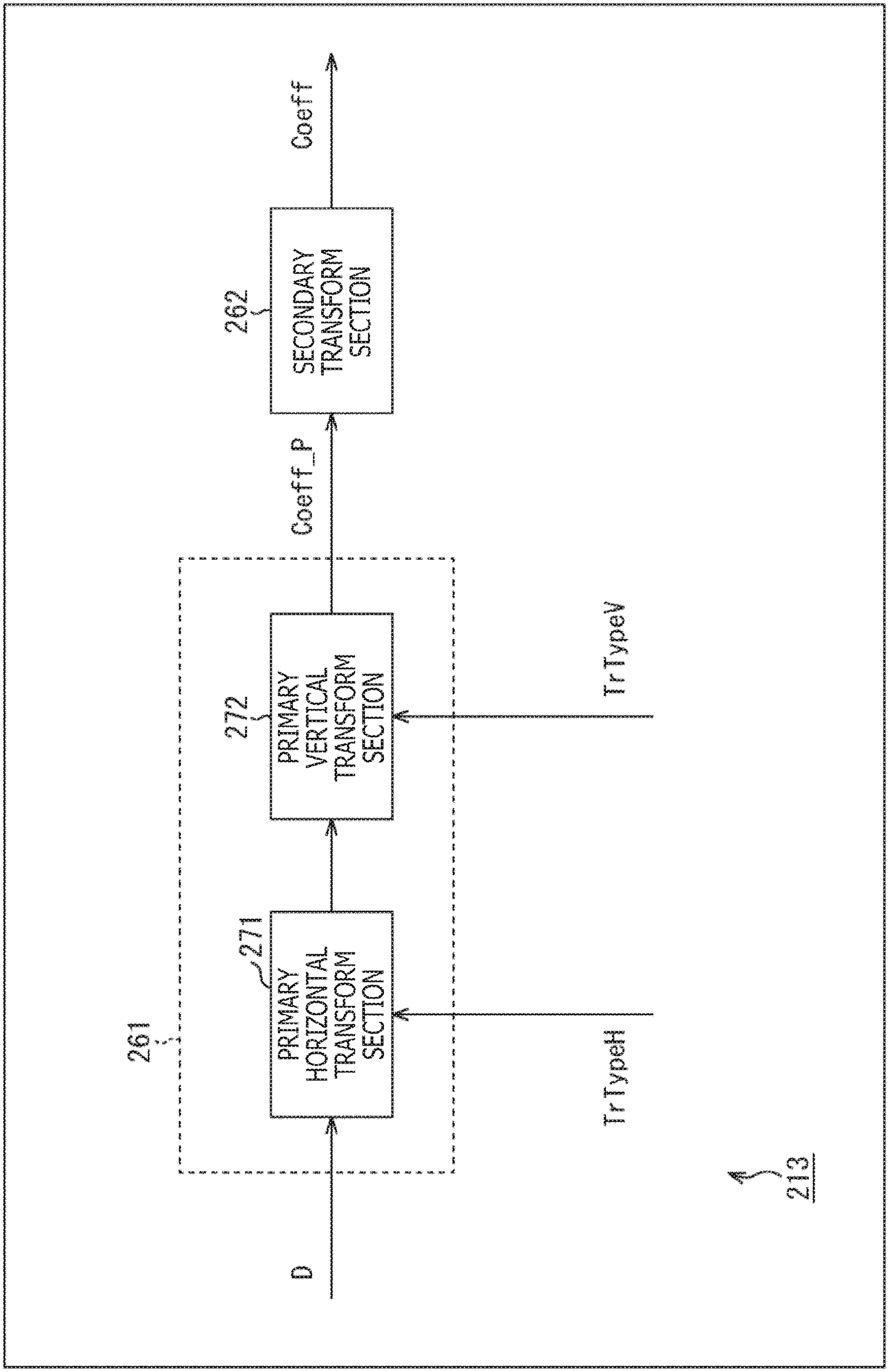
FIG. 11 is a block diagram depicting a main configuration example of an orthogonal transform section.

FIG. 11 is a block diagram depicting a main configuration example of the orthogonal transform section 213 of FIG. 9. As depicted in FIG. 11, the orthogonal transform section 213 includes a primary transform section 261 and a secondary transform section 262.

For example, the primary transform section 261 is configured to perform a process associated with primary transforms and corresponding to a predetermined transform process such as orthogonal transforms. For example, the primary transform section 261 receives a prediction residue D and transform information Tinfo (e.g., horizontal transform type index TrTypeH and vertical transform type index TrTypeV) as an input.

The primary transform section 261 performs a primary transform for the prediction residue D using a transform matrix corresponding to the horizontal transform type index TrTypeH and a transform matrix corresponding to the vertical transform type index TrTypeV to derive a transform coefficient Coeff_P after the primary transform. The primary transform section 261 supplies the derived transform coefficient Coeff_P to the secondary transform section 262.

As depicted in FIG. 11, the primary transform section 261 includes a primary horizontal transform section 271 and a primary vertical transform section 272.

The primary horizontal transform section 271 is configured to perform a process associated with primary horizontal transforms which are one-dimensional orthogonal transforms in the horizontal direction. For example, the primary horizontal transform section 271 receives, as inputs, the prediction residue D and the transform information Tinfo (horizontal transform type index TrTypeH and the like). The primary horizontal transform section 271 performs a primary horizontal transform for the prediction residue D using a transform matrix corresponding to the horizontal transform type index TrTypeH. The primary horizontal transform section 271 supplies transform coefficients after the primary horizontal transform to the primary vertical transform section 272.

The primary vertical transform section 272 is configured to perform a process associated with primary vertical transforms which are one-dimensional orthogonal transforms in the vertical direction. For example, the primary vertical transform section 272 receives, as inputs, transform coefficients after a primary horizontal transform and the transform information Tinfo (vertical transform type index TrTypeV and the like). The primary vertical transform section 272 performs a primary vertical transform for the transform coefficients after the primary horizontal transform using a transform matrix corresponding to the vertical transform type index TrTypeV. The primary vertical transform section 272 supplies transform coefficients after the primary vertical transform (i.e., transform coefficient Coeff_P after the primary transform) to the secondary transform section 262.

For example, the secondary transform section 262 is configured to perform a process associated with secondary transforms and corresponding to a predetermined transform process such as orthogonal transforms. For example, the secondary transform section 262 receives, as inputs, the transform coefficient Coeff_P and the transform information Tinfo. The secondary transform section 262 performs a secondary transform for the transform coefficient Coeff_P on the basis of the transform information Tinfo to derive a transform coefficient Coeff after the secondary transform. The secondary transform section 262 outputs the transform coefficient Coeff to the outside of the orthogonal transform section 213 (supplies the transform coefficient Coeff to the quantization section 214).

Note that the orthogonal transform section 213 can skip (omit) primary transforms performed by the primary transform section 261, secondary transforms performed by the secondary transform section 262, or both. In addition, primary horizontal transforms performed by the primary horizontal transform section 271 may be skipped (omitted). Similarly, primary vertical transforms performed by the primary vertical transform section 272 may be skipped (omitted).

<Primary Horizontal Transform Section>

Figure 12:
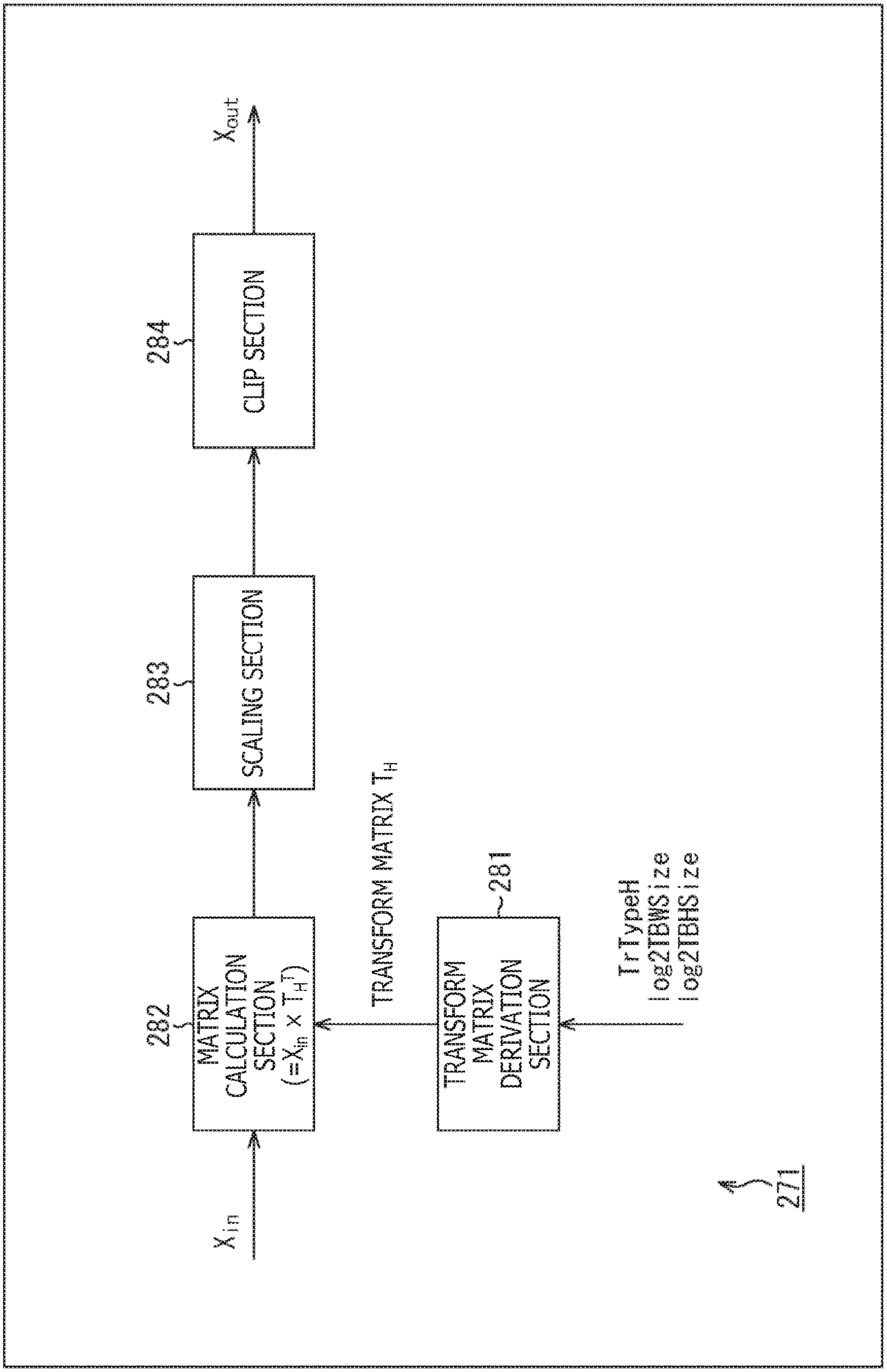
FIG. 12 is a block diagram depicting a main configuration example of a primary horizontal transform section.

FIG. 12 is a block diagram depicting a main configuration example of the primary horizontal transform section 271 of FIG. 11. As depicted in FIG. 12, the primary horizontal transform section 271 includes a transform matrix derivation section 281, a matrix calculation section 282, a scaling section 283, and a clip section 284.

The transform matrix derivation section 281 has a configuration necessary for performing a process associated with derivation of at least a transform matrix $T_H$ for primary horizontal transform (transform matrix $T_H$ for one-dimensional orthogonal transform in the horizontal direction). For example, the transform matrix derivation section 281 receives, as inputs, a horizontal transform type index TrTypeH, and information associated with a size of a transform block. The transform matrix derivation section 281 derives the transform matrix $T_H$ for primary horizontal transform as a transform matrix having the same size as the size of the transform block and corresponding to the horizontal transform type index TrTypeH. The transform matrix derivation section 281 supplies the transform matrix $T_H$ to the matrix calculation section 282.

The matrix calculation section 282 has a configuration necessary for performing a process associated with at least matrix calculation. For example, the matrix calculation section 282 receives, as inputs, the transform matrix $T_H$ supplied from the transform matrix derivation section 281, and input data $X_{in}$ (i.e., a transform block of the prediction residue D). The matrix calculation section 282 performs a one-dimensional orthogonal transform in the horizontal direction for the input data $X_{in}$ (i.e., the transform block of the prediction residue D) using the transform matrix $T_H$ supplied from the transform matrix derivation section 281 to obtain intermediate data Y1. This calculation can be expressed by a determinant in the following Expression (7).

[Math. 5]

$$Y1=X_{in}\times T_H^{\,T} \tag{7}$$

The matrix calculation section 282 supplies the intermediate data Y1 to the scaling section 283.

The scaling section 283 scales coefficients Y1[i,j] of respective i-by-j components of the intermediate data Y1 with a predetermined shift amount $S_H$ to obtain intermediate data Y2. This scaling can be expressed by the following Expression (8). In the following description, an i-by-j component ((i,j) component) of a certain two-dimensional matrix (two-dimensional array) X will be expressed as X[i,j].

[Math. 6]

$$Y2[i,j]=Y1[i,j]>>S_H \tag{8}$$

The scaling section 283 supplies the intermediate data Y2 to the clip section 284.

The clip section 284 clips values of coefficients Y2[i,j] of respective i-by-j components of the intermediate data Y2 to derive output data $X_{out}$ (i.e., transform coefficients after the primary horizontal transform). This process can be expressed by the following Expression (9).

[Math. 7]

$$X_{out}[i,j]=\mathrm{Clip3}(\mathrm{mincoef}Val,\mathrm{maxCoef}Val,Y2[i,j] \tag{9}$$

The clip section 284 outputs the output data $X_{out}$ (transform coefficients after the primary horizontal transform) to the outside of the primary horizontal transform section 271 (supplies the output data $X_{out}$ to the primary vertical transform section 272).

<Transform Matrix Derivation Section>

Figure 13:
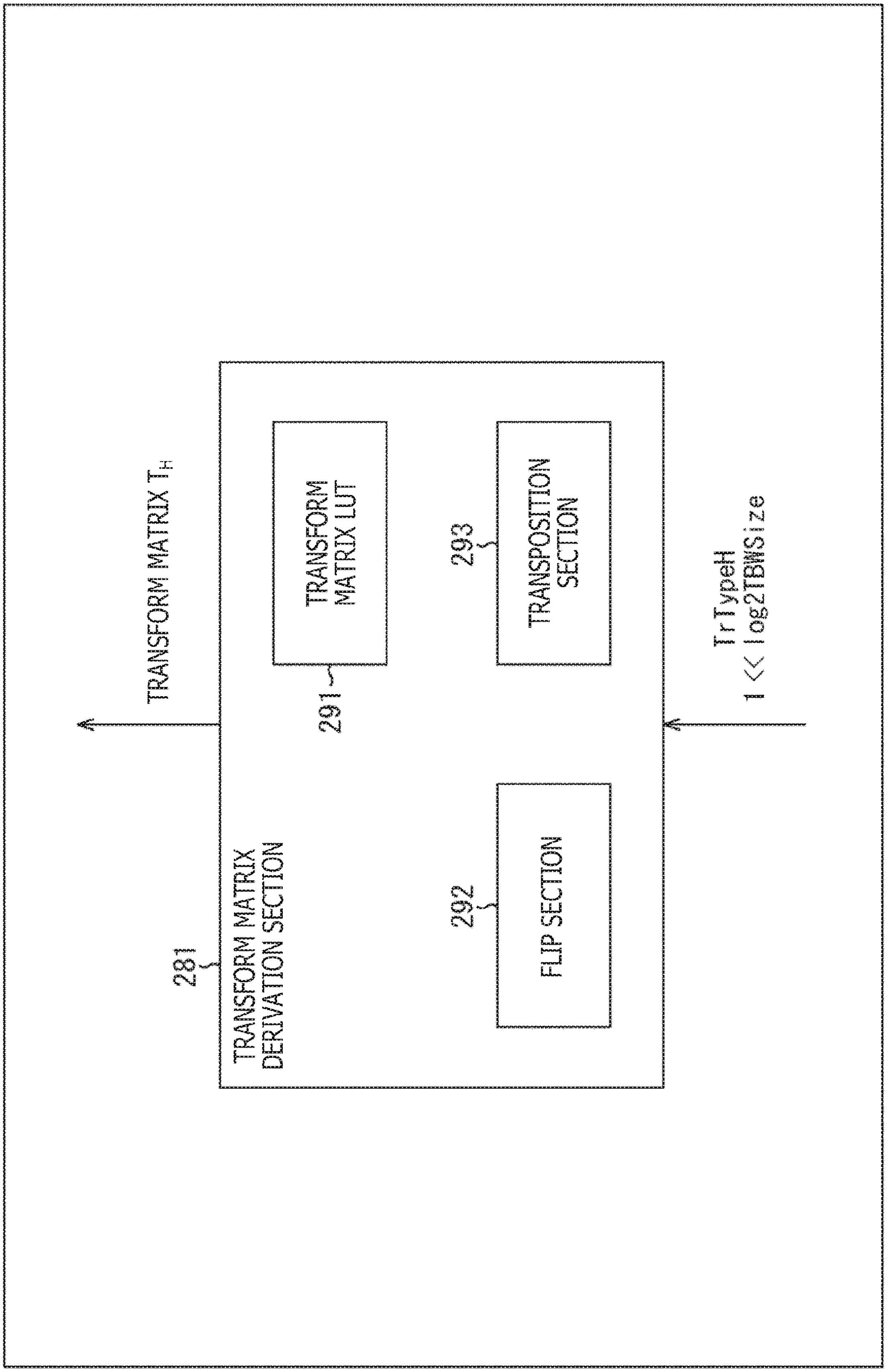
FIG. 13 is a block diagram depicting a main configuration example of a transform matrix derivation section.

FIG. 13 is a block diagram depicting a main configuration example of the transform matrix derivation section 281 of FIG. 12. As depicted in FIG. 13, the transform matrix derivation section 281 includes a transform matrix LUT 291, a flip section 292, and a transposition section 293. While FIG. 13 does not depict arrows indicating sending and receiving of data, the transform matrix derivation section 281 is capable of sending and receiving any data to and from any processing sections (processing blocks).

The transform matrix LUT 291 is a look up table for retaining (storing) a transform matrix corresponding to the horizontal transform type index TrTypeH and a transform block size N. The transform matrix LUT 291 selects and outputs a transform matrix corresponding to the horizontal transform type index TrTypeH and the transform block size N in response to designation of these. In a case of this derivation example, the transform matrix LUT 291 supplies the transform matrix to the flip section 292, the transposition section 293, or both as a base transform matrix $T_{base}$.

The flip section 292 flips a transform matrix T which is an input. N-by-N matrix, and outputs a transform matrix $T_{flip}$ after the flip in the case of this derivation example, the flip section 292 receives, as an input, an N-by-N base transform matrix $T_{base}$ supplied from the transform matrix LUT 291, flips the base transform matrix in the row direction (horizontal direction), and outputs the transform matrix $T_{flip}$ after the flip to the outside of the transform matrix derivation section 281 (supplies the transform matrix $T_{flip}$ to the matrix calculation section 282) as a transform matrix $T_H$.

The transposition section 293 transposes a transform matrix T which is an input N-by-N matrix, and outputs a transform matrix $T_{transpose}$ after the transposition. In the case of this derivation example, the transposition section 293 receives, as as input, the N-by-N base transform matrix $T_{base}$ supplied from the transform matrix LUT 291, transposes the base transform matrix $T_{base}$, and outputs the transform matrix $T_{transpose}$ after the transposition to the outside of the transform matrix derivation section 281 (supplies the transform matrix $T_{transpose}$ to the matrix calculation section 282) as the transform matrix $T_H$.

<Primary Vertical Transform Section>

Figure 14:
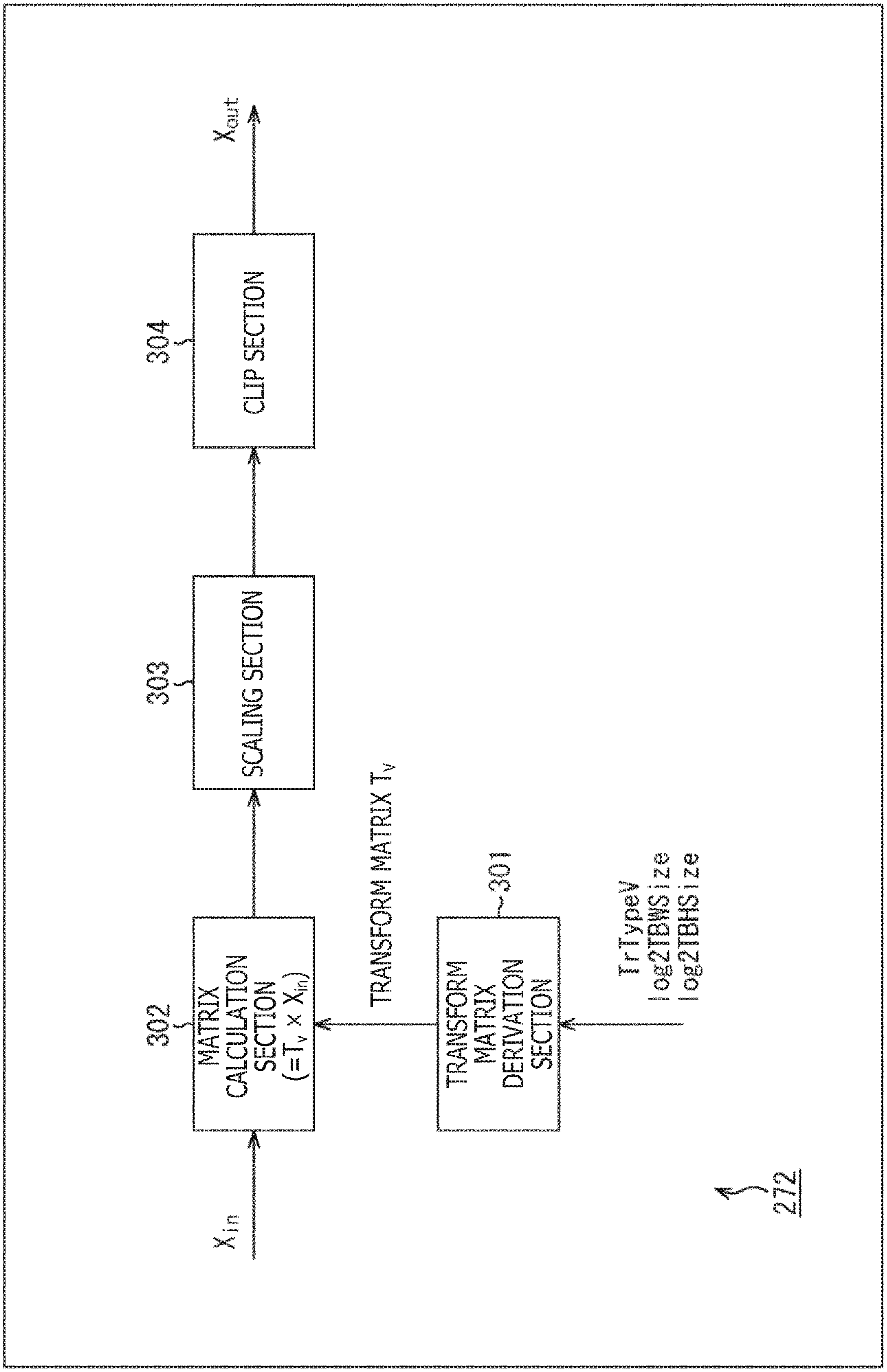
FIG. 14 is a block diagram depicting a main configuration example of a primary vertical transform section.

FIG. 14 is a block diagram depicting a main configuration example of the primary vertical transform section 272 of FIG. 11. As depicted in FIG. 14, the primary vertical transform section 272 includes a transform matrix derivation section 301, a matrix calculation section 302, a scaling section 303, and a clip section 304.

The transform matrix derivation section 301 has a configuration necessary for performing a process associated with derivation of at least a transform matrix $T_v$ for primary vertical transform (transform matrix $T_v$ for one-dimensional orthogonal transform in the vertical direction). For example, the transform matrix derivation section 301 receives, as inputs, a vertical transform type index TrTypeV and information associated with a size of a transform block. The transform matrix derivation section 301 derives the transform matrix $T_v$ for primary vertical transform as a transform matrix having the same size as the size of the transform block and corresponding to the vertical transform type index TrTypeV. The transform matrix derivation section 301 supplies the transform matrix $T_v$ to the matrix calculation section 302.

The matrix calculation section 302 has a configuration necessary for performing a process associated with at least matrix calculation. For example, the matrix calculation section 302 receives, as inputs, the transform matrix $T_v$ supplied from the transform matrix derivation section 301 and input data $X_{in}$. For example, the matrix calculation section 302 performs a one-dimensional orthogonal transform in the vertical direction for the input data $X_{in}$ (i.e., the transform block of the transform coefficients after the primary horizontal transform) using the transform matrix $T_v$ supplied from the transform matrix derivation section 301 to obtain intermediate data Y1. This calculation can be expressed by a determinant in the following Expression (10).

[Math. 8]

$$Y1=T_v \times T_{in} \tag{10}$$

The matrix calculation section 302 supplies the intermediate data Y1 to the scaling section 303.

The scaling section 303 scales coefficients Y1[i,j] of respective i-by-j components of the intermediate data Y1 with a predetermined shift amount $S_v$ to obtain intermediate data Y2. This scaling can be expressed by the following Expression. (11).

[Math. 9]

$$Y2[i,j]=Y1[i,j]>>S_v \tag{11}$$

The scaling section 303 supplies the intermediate data Y2 to the clip section 304.

The clip section 304 clips values of coefficients Y2[i,j] of respective i-by-j components of the intermediate data Y2 to derive output data $X_{out}$ (i.e., transform coefficients after the primary vertical transform). This process can be expressed by the following Expression (12).

[Math. 10]

$$X_{out}[i,j]=\mathrm{Clip3}(\mathrm{minCoef}Val,\mathrm{maxCoe}fVal,Y2[i,j]) \tag{12}$$

The clip section 304 outputs the output data $X_{out}$ (transform coefficients after the primary vertical transform) to the outside of the primary vertical transform section 272 (supplies the output data $X_{out}$ to the secondary transform section 262) as a transform coefficient. Coeff_P after the primary transform.

<Transform Matrix Derivation Section>

Figure 15:
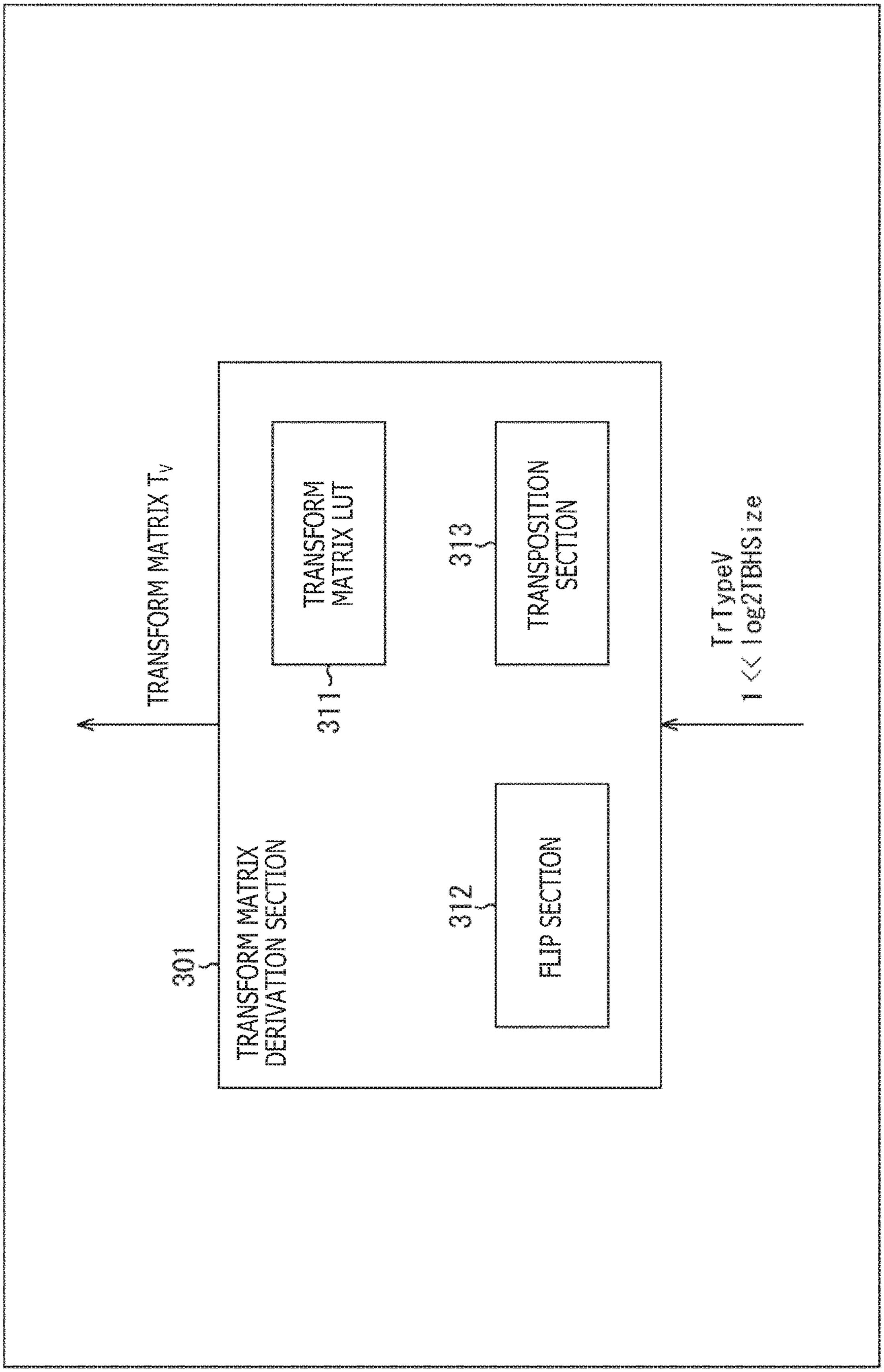
FIG. 15 is a block diagram depicting a main configuration example of a transform matrix derivation section.

FIG. 15 is a block diagram depicting a main configuration example of the transform matrix derivation section 301 of FIG. 14. As depicted in FIG. 15, the transform matrix derivation section 301 includes a transform matrix LUT 311, a flip section 312, and a transposition section 313. While FIG. 15 does not depict arrows indicating sending and receiving of data, the transform matrix derivation section 301 is capable of sending and receiving any data to and from any processing sections (processing blocks).

The transform matrix LUT 311 is a look up table for retaining (storing) a transform matrix corresponding to a vertical transform type index TrTypeV and a transform block size N. The transform matrix LUT 311 selects and outputs a transform matrix corresponding to the vertical transform type index TrTypeIdxV and the transform block size N in response to designation of these. In a case of this derivation example, the transform matrix LUT 311 supplies the transform matrix to the flip section 312, the transposition section 313, or both as a base transform matrix $T_{base}$.

The flip section 312 flips a transform matrix T which is an input N-by-N matrix and outputs a transform matrix $T_{flip}$ after the flip. In the case of this derivation example, the flip section 312 receives, as an input, an N-by-N base transform matrix $T_{base}$ supplied from the transform matrix LUT 311, flips the base transform matrix in the row direction (horizontal direction), and outputs the transform matrix $T_{flip}$ after the flip to the outside of the transform matrix derivation section 301 (supplies the transform matrix $T_{flip}$ to the matrix calculation section 302) as a transform matrix $T_v$.

The transposition section 313 transposes a transform matrix T which is an input N-by-N matrix and outputs a transform matrix $T_{transpose}$ after the transposition. In the case of this derivation example, the transposition section 313 receives, as an input, the N-by-N base transform matrix $T_{base}$ supplied from the transform matrix LUT 311, transposes the base transform matrix and outputs the transform matrix $T_{transpose}$ after the transposition to the outside of the transform matrix derivation section 301 (supplies the transform matrix $T_{transpose}$ to the matrix calculation section 302) as the transform matrix $T_v$.

<Flow of Image Coding Process>

Described next will be flows of processes executed by the image coding apparatus 100 configured as described above. An example of a flow or an image coding process will be described with reference to a flowchart of FIG. 16.

With a start of the image coding process, the sort buffer 211 in step S201 switches an order of flames of input moving image data from a display order to a coding order under control by the control section 201.

In step S202, the control section 201 sets a unit of processing (divides blocks) for an input image retained by the sort buffer 211.

In step S203, the control section 201 decides (sets) coding parameters for the input image retained by the sort buffer 211.

In step S204, the control section 201 performs an orthogonal transform control process and performs a process associated with control of an orthogonal transform such as setting of a transform type index, for example.

In step S205, the prediction section 222 performs a prediction process to generate a prediction image in an optimal prediction mode and the like. For example, in this prediction process, the prediction section 222 generates a prediction image in an optimal intra prediction mode and the like by performing intra prediction, generates a prediction image in an optimal inter prediction mode and the like by performing inter prediction, and selects an optimal prediction mode from these images on the basis of a cost function value or the like.

In step S206, the calculation section 212 calculates a difference between the input image and the prediction image in the optimal mode selected by the prediction process in step S205. In other words, the calculation section 212 generates a prediction residue D between the input image and the prediction image. The prediction residue D obtained in this manner has a smaller data volume than a data volume of original image data. Accordingly, the data volume can be compressed to a volume smaller than the data volume of the image coded without change.

In step S207, the orthogonal transform section 213 performs an orthogonal transform process for the prediction residue D generated by processing in step S206 under control performed in step S204 to derive a transform coefficient Coeff.

In step S208, the quantization section 214 quantizes the transform coefficient Coeff obtained by processing in step S207 by using quantization parameters calculated by the control section 201, for example, to derive a quantization transform level (level).

In step S209, the inverse quantization section 217 inversely quantizes the quantization transform coefficient level (level) generated by processing in step S208 according to characteristics corresponding to characteristics of the quantization in step S208 to derive a transform coefficient Coeff_IQ.

In step S210, the inverse orthogonal transform section 218 performs an inverse orthogonal transform for the transform coefficient Coeff_IQ obtained by processing in step S209 under control performed in step S204 using a method corresponding to the orthogonal transform process in step S207 to derive a prediction residue D'. Note that this inverse orthogonal transform process is similar to an inverse orthogonal transform process performed on the decoding side (described below). Accordingly, description for the decoding side (described below) is applicable to this inverse orthogonal transform process in step S210.

In step S211, the calculation section 219 adds the prediction image obtained by the prediction process in step S205 to the prediction residue D' derived by processing in step S210 to generate a decoded image which has been locally decoded.

In step S212, the in-loop filter section 220 performs an in-loop filtering process for the decoded image locally decoded and derived by processing in step S211.

In step S213, the frame memory 221 stores the decoded image locally decoded and derived by processing in step S211 and the decoded image locally decoded and subjected to the filtering process in step S212.

In step S214, the coding section 215 codes the quantization transform coefficient level (level) obtained by processing in step S208. For example, the coding section 215 codes the quantization transform coefficient level (level) which is information associated with an image by arithmetic coding or other methods to generate coded data. Moreover, at this time, the coding section 215 codes various coding parameters (header information Hinfo, prediction mode information Pinfo, and transform information Tinfo). The coding section 215 further derives residual information RInfo from the quantization transform coefficient level (level) and codes the residual information RInfo.

In step S215, the accumulation buffer 216 accumulates the coded data obtained in this manner and outputs the coded data to the outside of the image coding apparatus 200 as a bit stream, for example. For example, this bit stream is transmitted to the decoding side via a transmission path or a recording medium. In addition, the rate control section 223 performs rate control as necessary.

After completion of processing in step S214, the image coding process ends.

<Flow of Orthogonal Transform Control Process>

Described next with reference to a flowchart of FIG. 17 will be an example of a flow of an orthogonal transform control process executed in step S204 in FIG. 16.

With a start of the orthogonal transform control process, the transform pair number setting section 241 of the control section 201 in step S231 sets a selectable number of transform pairs (number of transform pair candidates) on the basis of coding parameters.

In step S232, the transform pair number setting section 241 determines whether or not the selectable number of transform pairs NumTrPair set in step S231 is "1." In a case where the selectable number of transform pairs NumTrPair is not "1," the process proceeds to step S233.

In step S233, the transform pair number setting section 241 determines whether or not the selectable number of transform gaits NumTrPair set in step S231 is "2." In a case of determination that the selectable number of transform pairs NumTrPair is not "2," the process proceeds to step S234.

In step S234, the cMax setting section 242 sets a maximum value cMax of the selectable number of transform pairs NumTrPair.

In step S235, the transform pair index setting section 251 of the transform pair identification information setting section 243 sets an optimal transform pair index TrPairIdx on the basis of the selectable number of the transform pairs NumTrPair set in step 3231 and the maximum value cMax set in step 3234.

The transform pair index setting section 251 sets transform pair candidates corresponding to the selectable number of transform pairs NumTrPair and the maximum value cMax, sets an optimal transform pair from these candidates on the basis of RD cost or the like, and sets a transform pair index. TrPairIdx for identifying the optimal transform pair.

After completion of processing in step S235, the process proceeds to step S238.

Moreover, in a case of determination that the selectable number of transform pairs NumTrPair is "1" in step S232, the process proceeds to step S236.

In step S236, the transform pair index setting section 251 sets the transform pair index irPairIdx to "0." After completion of processing in step S236, the process proceeds to step S238.

In addition, in a case of determination that the selectable number of transform pairs NumTrPair is "2" in step S233, the process proceeds to step S237.

In step S237, the transform pair index setting section 251 sets the transform pair index irPairIdx to "1." After completion of processing in step S237, the process proceeds to step S238.

When the optimal transform pair index TrPairIdx is set in the manner described above, the transform flag setting section 252 sets a transform flag emt_flag corresponding to the optimal transform pair index TrPairIdx in step S238. For example, in a case where the transform pair index TrPairIdx is "0," the transform flag setting section 252 sets the transform flag emt_flag to "0." Moreover, for example, in a case where the transform pair index TrPairIdx is "1" or larger, the transform flag setting section 252 sets the transform flag emt_flag to "1."

In step S239, the transform index setting section 253 sets a transform index emt_idx corresponding to the optimal transform pair index TrPairIdx. For example, in a case where the transform pair index TrPairIdx is "1" or larger, the transform flag setting section 252 sets the transform flag emt_flag to (transform pair index TrPairIdx—1).

In step S240, the transform type index setting section 245 sets a horizontal transform type index TrTypeH and a vertical transform type index TrTypeV corresponding to the optimal transform pair index TrPairIdx and prediction mode information on the basis of an LUT retained by the transform pair LUT 244.

Figure 16:
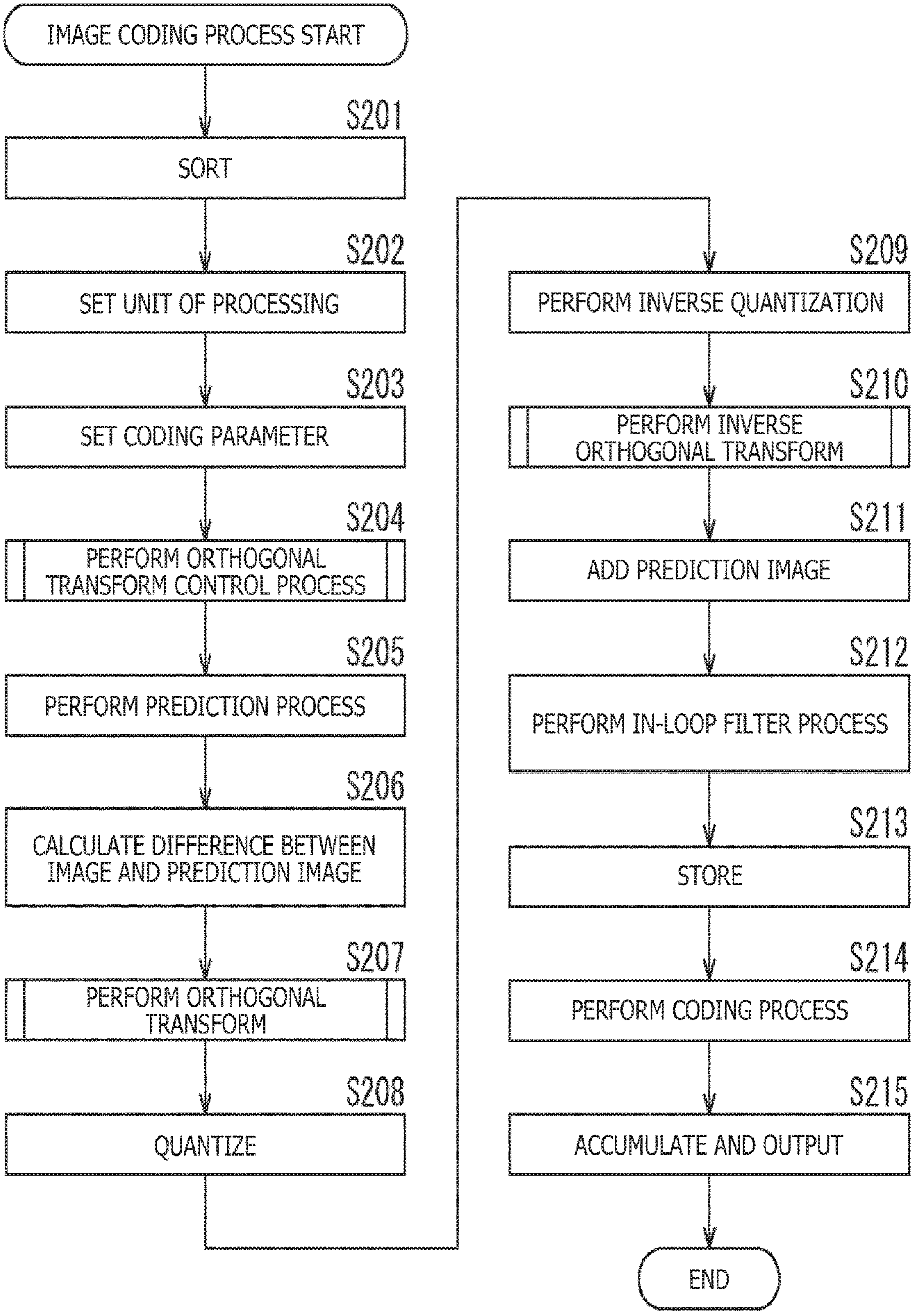
FIG. 16 is a flowchart depicting an example of a flow of an image coding process.

After completion of processing in step S240, the orthogonal transform control process ends, and the process returns to FIG. 16.

By controlling the number of transform pair candidates on the basis of the coding parameters in the orthogonal transform control in the manner described above, more efficient code quantity reduction is realizable by a method corresponding to relative code quantities of a residual signal of a processing target block and AMT mode information. Accordingly, reduction of a drop of coding efficiency (improvement of coding efficiency) is achievable. Moreover, needless increase in number of transform pair candidates can be reduced, and therefore, reduction of a load increase in the coding process is achievable.

<Flow of Orthogonal Transform Process>

Described next with reference to a flowchart of FIG. 18 will be an example of a flow of an orthogonal transform process executed in step S207 in FIG. 16.

With a start of the orthogonal transform process, the orthogonal transform section 213 in step S251 determines whether or not a transform skip flag ts_flag is 2D_TS (indicating two-dimensional transform skip) (e.g., 1 (true)) or whether or not a transform quantization bypass flag transquant_bypass_flag is 1 (true). In a case of determination that the transform skip flag ts_flag is 2D_TS (e.g., 1 (true)) or that the transform quantization bypass flag is 1 (true), the orthogonal transform process ends, and the process returns to FIG. 16. In this case, the orthogonal transform process (primary transform and secondary transform) is omitted, and the input prediction residue D is designated as a transform coefficient Coeff.

Figure 18:
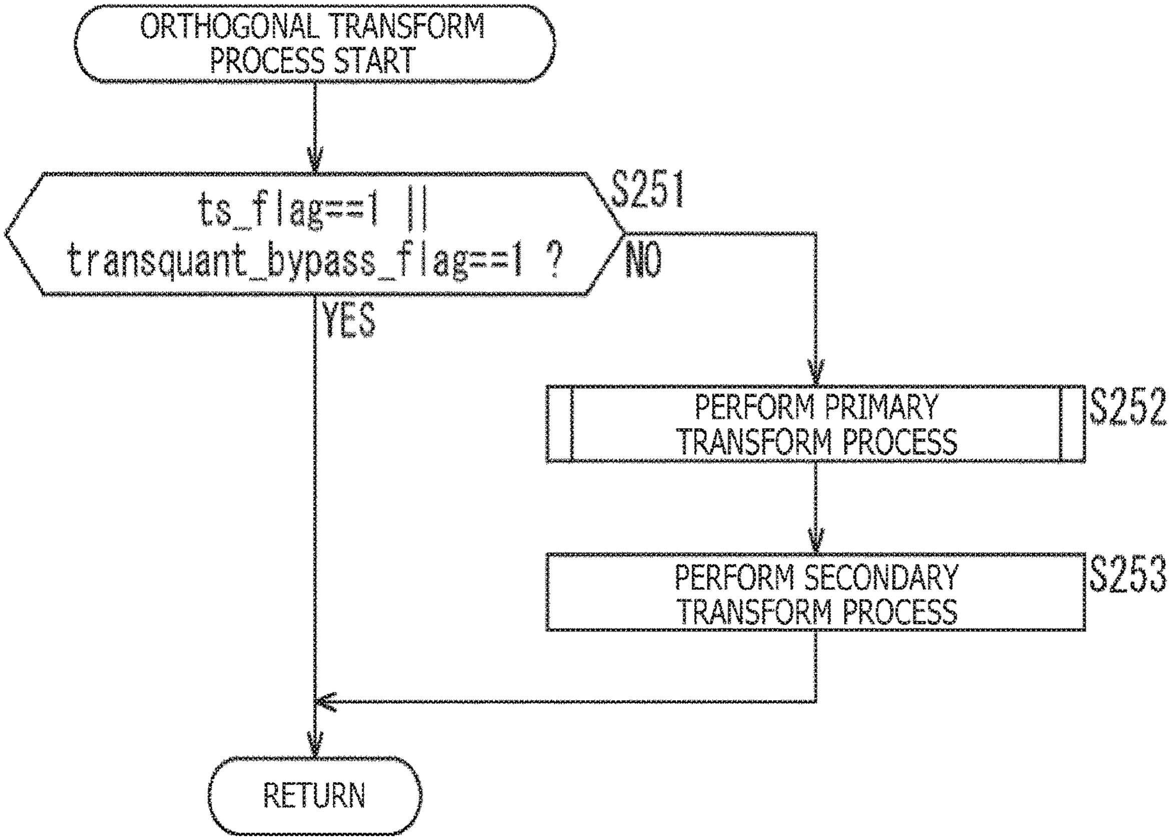
FIG. 18 is a flowchart explaining an example of a flow of an orthogonal transform process.

In addition, in a case of determination that the transform skip flag ts_flag is not 2D_TS (not indicating two-dimensional transform skip) (e.g., 0 (false)) and that the transform quantization bypass flag transquant_bypass_flag is 0 (false) in step S251 of FIG. 18, the process proceeds to step S252, In this case, a primary transform process and a secondary transform process are performed.

In step S252, the primary transform section 261 performs a primary transform process for an input prediction residue D to derive a transform coefficient Coeff_P after the primary transform.

In step S253, the secondary transform section 262 performs a secondary transform process for the transform coefficient Coeff_P to derive a transform coefficient Coeff after the secondary transform.

After completion of processing in step S253, the orthogonal transform process ends.

<Flow of Primary Transform Process>

Described next with reference to a flowchart of FIG. 19 will be an example of a flow of the primary transform process executed in step S252 in FIG. 18.

With a start of the primary transform process, the primary horizontal transform section 271 of the primary transform section 261 in step S261 performs a primary horizontal transform process for a prediction residue D to derive transform coefficients after the primary horizontal transform.

In step S262, the primary vertical transform section 272 of the primary transform section 261 performs a primary vertical transform process for a primary horizontal transform result (transform coefficients after the primary horizontal transform) obtained in step S261 to derive transform coefficients after the primary vertical transform (transform coefficient Coeff_P after the primary transform).

After completion of processing in step S262, the primary transform process ends, and the process returns to FIG. 18.

<Flow of Primary Horizontal Transform Process>

Described with reference to a flowchart of FIG. 20 will be a flow of the primary horizontal transform process executed in step S261 in FIG. 19.

With a start of the primary horizontal transform process, the transform matrix derivation section 281 of the primary horizontal transform section 271 in step S271 derives a transform matrix. $T_H$ corresponding to a horizontal transform type index TrTypeH.

In step S272, the matrix calculation section 282 performs a one-dimensional orthogonal transform in the horizontal direction for input data $X_{in}$ (prediction residue D) using the derived transform matrix $T_H$ to obtain intermediate data Y1. This process expressed as a determinant can be indicated by Expression (7) described above. In addition, this process expressed as calculation for each element can be indicated by the following Expression. (13).

[Math. 11]

$$Y1[i,j]=X_{in}[i,j]\times T_H^T[:,j]=\sum_{k=0}^{N-1}X_{in}[i,k]T_H[j,k] \quad (13)$$

More specifically, an inner product of an its row vector $X_{in}$[i,:] of the input data X and a transposed matrix $T_H^T$[:,j] of a jth sow vector $T_H$[j,:] of a transform matrix $T_H$ is set as coefficients Y1[i,j] of i-by-j components of the intermediate data Y1(j=0, . . . , M−1, i=0 . . . , N−1). In this case, M is a size of the input data $X_{in}$ an x direction, while N is a size of the input data X in a Y direction. In addition, M and N can be expressed by the following Expression (14).

[Math. 12]

$M$=1<<log 2TBWSize $N$=1<<log 2TBHSize (14)

Returning to FIG. 20, in step S273, the scaling section 283 scales the coefficients Y1[i,j] of the respective i-by-j components of the intermediate data Y1 derived by processing in step S272 with a shift amount $S_H$ to derive intermediate data Y2. This scaling can be expressed by Expression (8) described above.

In step S274, the clip section 284 clips values of coefficients Y2[i,j] of respective i-by-j components of the intermediate data Y2 derived by processing in step S273 to obtain output data $X_{out}$ (i.e., transform coefficients after the primary horizontal transform). This process can be expressed by Expression (9) described above.

Figure 19:
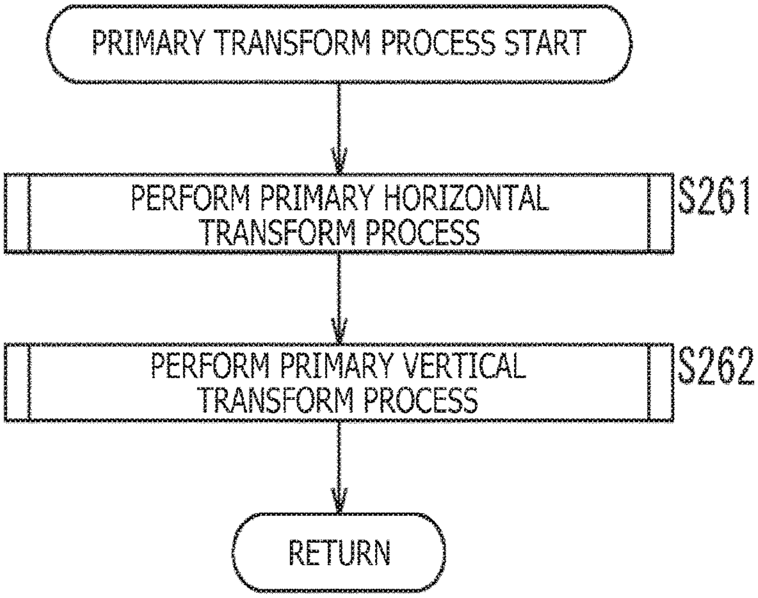
FIG. 19 is a flowchart explaining an example of a flow of a primary transform process.

After completion of processing in step S274, the primary horizontal transform process ends, and the process returns to FIG. 19.

<Flow of Transform Matrix Derivation Process>

Described next with reference to a flowchart of FIG. 21 will be an example of a flow of the transform matrix derivation process executed in step S271 in FIG. 20.

With a start of the transform matrix derivation process, the transform matrix derivation section 281 in step S281 calculates a base transform type BaseTrType corresponding to a horizontal transform type index TrTypeH. Note that this process expressed as a numerical expression is indicated by Expression (15), for example. The transform matrix derivation section 281 reads an N-by-N transform matrix of the calculated base transform type from the transform matrix LUT and sets the read transform matrix as a base transform matrix $T_{base}$ as expressed in the following Expression (16).

[Math. 13]

BaseTrType=$LUT$_TrTypeIdxToBaseTrType[TrTypeIdxH] (15)

$T_{base}$=$T$[NaseTrTyoe][log 2$N$−1] (16)

Moreover, the transform matrix derivation section. 281 sets a value corresponding to the horizontal transform type index TrTypeH as a flip flag FlipFlag as expressed in the following Expression (17). Furthermore, the transform matrix derivation section 281 sets a value corresponding to a transform type identifier TrTypeIdxH as a transposition flag TransposeFlag as expressed in the following Expression (18).

[Math. 14]

FlipFlag=$LUT$_TrTypeIdxToFlipFlag[TrTypeIdxH] (17)

TransposeFlag=$LUT$_TrTypeIdxToTransposeFlag[TrTypeIdxH] (18)

In step S282, the transform matrix derivation section 281 determines whether or not each of the flip flag FlipFlag and the transposition flag TransposeFlag meets a condition (ConditionA1) expressed by the following Expression (19).

[Math. 15]

ConditionA1: FlipFlag==$F$ && TransposeFlag==$F$ (19)

In a case where the above condition (ConditionA1) is met an a case where both the flip flag FlipFlag and the transposition flag TransposeFlag are false (0)), the process proceeds to step S283.

In step S283, the transform matrix derivation section 281 sets the transform matrix as a transform matrix $T_H$ as expressed in the following Expression (20).

[Math. 16]

$T_H=T_{base}$ (20)

Figure 20:
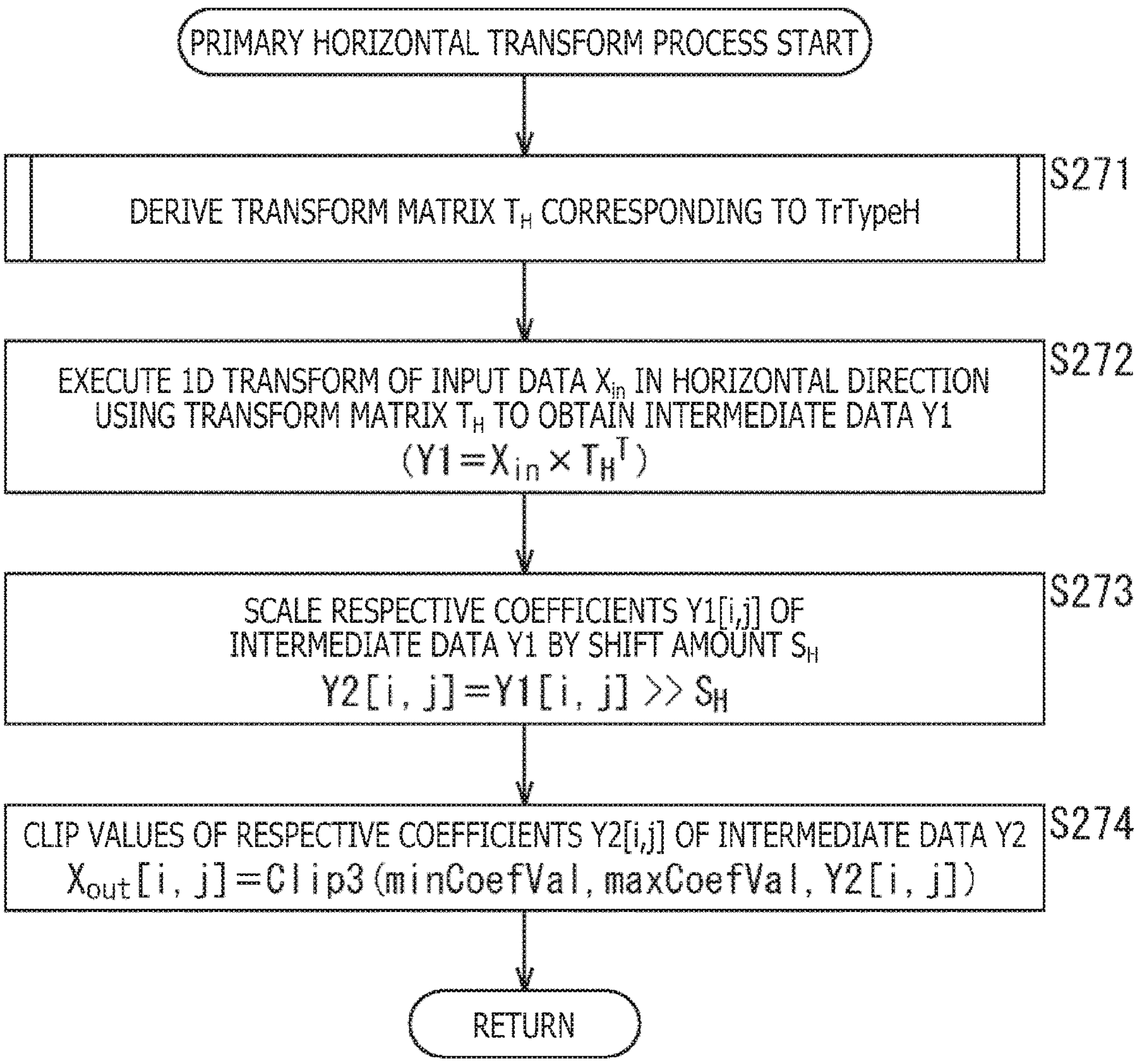
FIG. 20 is a flowchart explaining an example of a flow of a primary horizontal transform process.
Figure 21:
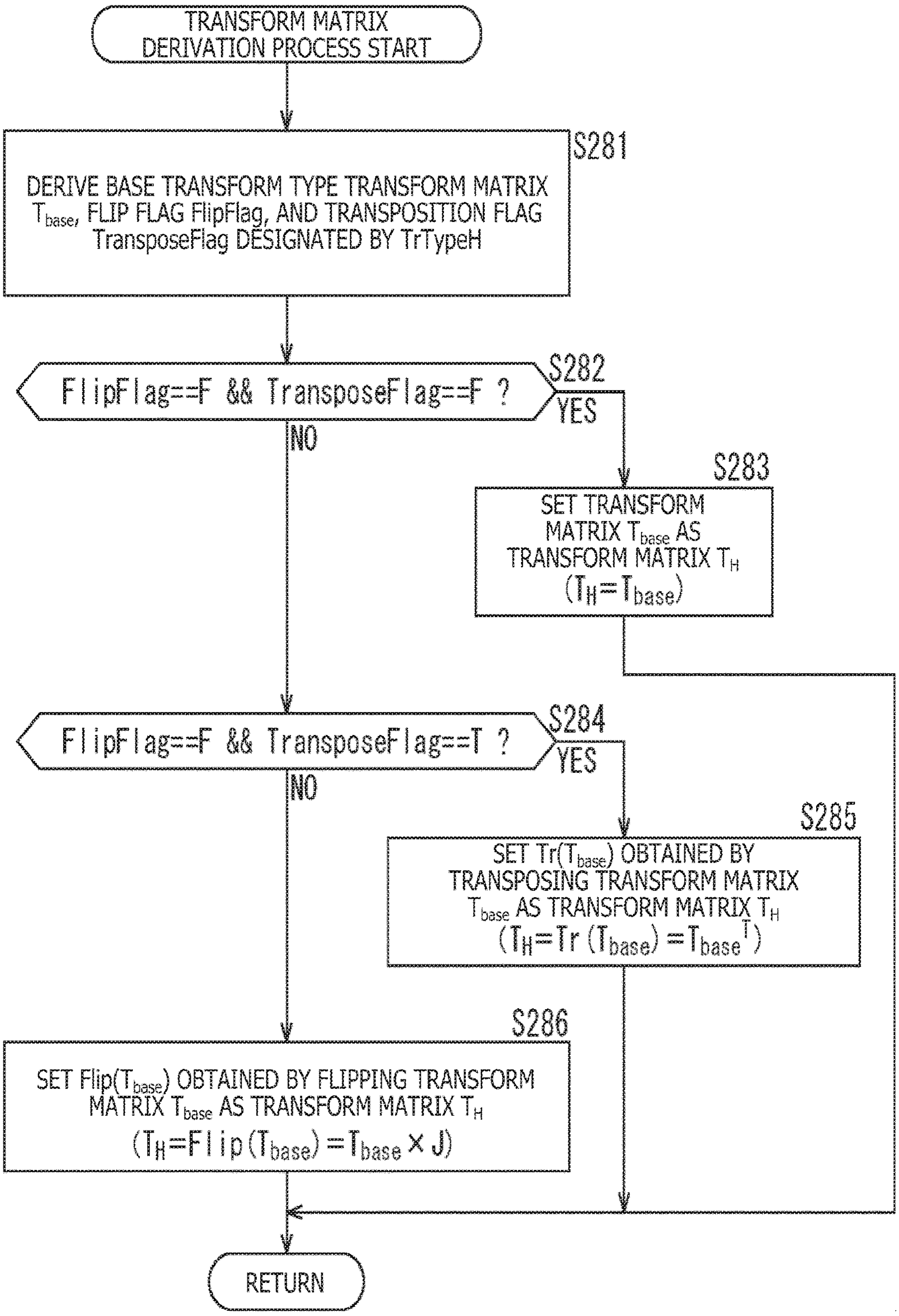
FIG. 21 is a flowchart explaining an example of a flow of a transform matrix derivation process.

After completion of processing in step S283, the transform matrix derivation process ends, and the process returns to FIG. 20. In a case of determination that the above condition (ConditionA1) is not met (in a case where the flip flag FlipFlag or the transposition flag TransposeFlag is true (1)), the process proceeds to step S284.

In step S284, the transform matrix derivation section 281 determines whether or not each of the flip flag FlipFlag and the transposition flag TransposeFlag meets a condition (ConditionA2) expressed by the following Expression (21).

[Math. 17]

ConditionA2: FlipFlog==$F$ && TransposeFlag==$T$ (21)

In a case of determination that the above condition (ConditionA2) is met (in a case where the flip flag FlipFlag is false (0) and the transposition flag TransposeFlag is true (1)), the process proceeds to step S285.

In step S285, the transform matrix derivation section 281 transposes the base transform matrix $T_{base}$ using the transposition section 293 to obtain the transposition section $T_H$. This process can be expressed by a determinant as indicated by the following Expression (22).

[Math. 18]

$T_H=Tr(T_{base})=T_{base}^T$ (22)

Moreover, in a case where this process is expressed as calculation for each element, the transform matrix derivation section 281 sets i-by-1 components ((i,j) components) of the base transform matrix $T_{base}$ as (j,i) components of the transform matrix $T_H$ as expressed in the following Expression (23).

[Math. 19]

$T_H[i,j]=T_{base}[i,j]$for $i,j$=0, . . . ,$N$−1 (23)

The i-by-j components ((i,j) components) of the N-by-N transform matrix $T_H$ are herein expressed as $T_H$[i, j]. In addition, "for i,j=0, . . . , N−1" in a second line indicates that each of i and j has a value ranging from 0 to N−1 Accordingly, this line means that $T_H$[j,i] represents all elements of the N-by-N transform matrix $T_H$.

By expressing processing in step S285 as calculation for each element in this manner, a transposition operation can be achieved by simple access to a two-dimensional array. After completion of processing in step S285 the transform matrix derivation process ends, and the process returns to FIG. 20.

Also, in a case where the above condition (ConditionA2) is not met (in a case where the flip flag FlipFlag is true (1) or the transposition flag TransposeFlag is false (0)) in step S284, the process proceeds to step S286.

In step S286, the transform matrix derivation section 281 flips a base transform matrix Tbase using the flip section 292 to obtain a transform matrix $T_H$. This process can be expressed by a determinant as indicated the following Expression (24).

[Math. 20]

$$T_H = T_{base} \times J \tag{24}$$

In this expression, × is an operator expressing matrix multiplication. In addition, a flip matrix J (Cross-Identity Matrix) is a matrix obtained by flip horizontal of an N-by-N unit matrix I.

Furthermore, in a case where this process is expressed as calculation for each element, the transform matrix derivation section 281 sets (i, N−1−j) components of the base transform matrix $T_{base}$ as i-by-j components ((i,j) components) of the transform matrix $T_H$ as expressed in the following Expression (25).

[Math. 21]

$$T_H[i,j] = T_{base}[i, N-1-j] \text{ for } i,j=0, \ldots, N-1 \tag{25}$$

The i-by-j components ((i,j) components) of the N-by-N transform matrix $T_H$ are herein expressed as $T_H$[i,j]. In addition, "for i, j=0, . . . N−1" a second line indicates that each of i and j has a value from 0 to N−1. Accordingly, this line means that $T_H$[i, j] represents all elements of the N-by-N transform matrix $T_H$.

By expressing the process in step S286 as calculation for each element. In this manner, a transposition operation can be achieved by simple access to a two-dimensional array without performing matrix calculation of the base transform matrix $T_{base}$ and a flip matrix J. In addition, the flip matrix J is unnecessary. After completion of processing in step S286, the transform matrix derivation process ends, and the process returns to FIG. 20.

Note that a branch described below may be inserted between processing in step S284 and processing in step S286. Specifically, in this step, the transform matrix derivation section 281 determines whether or not each of the flip flag FlipFlag and the transposition flag TransposeFlag meets a condition (ConditionA3) expressed by the following Expression (26).

[Math. 22]

$$\text{ConditionA3: FlipFlag}==T \ \&\& \ \text{TransposeFlag}==F \tag{26}$$

In a case of determination that the above condition (ConditionA3) is met (in a case where the flip flag FlipFlag is true (1) and the transposition flag TransposeFlag is false (0)), the process proceeds to step S286.

Also, is a case of determination that the above condition (ConditionA3) is not met (in a case where the flip flag FilpFlag is false (0) or where the transposition flag Transpose Flag is true (1)), the transform matrix derivation process ends, and the process returns to FIG. 20.

<Flow of Primary Vertical Transform Process>

Figure 22:
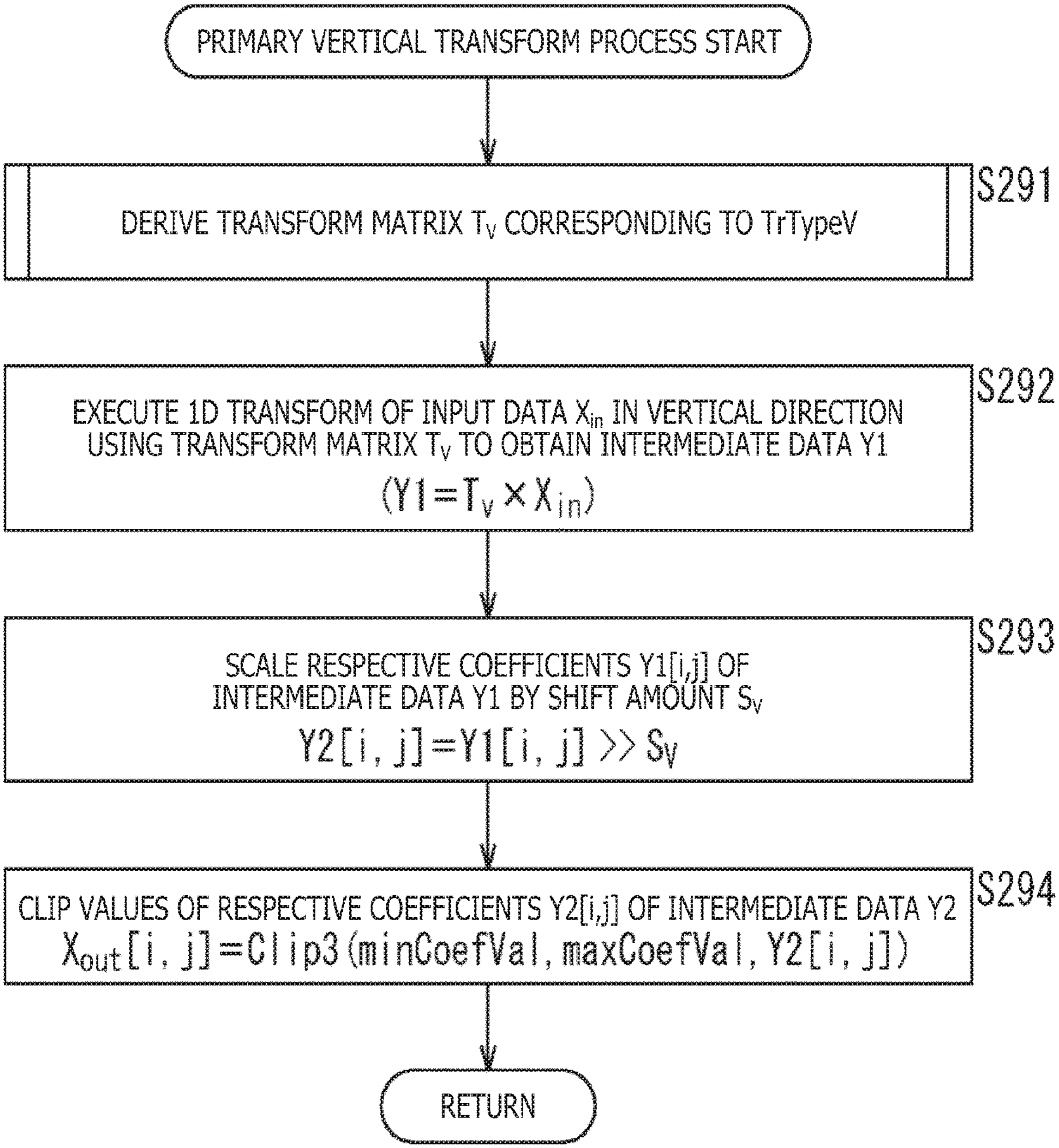
FIG. 22 is a flowchart explaining an example of a flow of a primary vertical transform process.

Described next with reference to a flowchart of FIG. 22 will be a flow of the primary vertical transform process executed in step S262 in FIG. 19.

With a start of the primary vertical transform process, the transform matrix derivation section 301 of the primary vertical transform section 272 in step S291 executes a transform matrix derivation process to derive a transform matrix $T_v$ corresponding to the vertical transform type index TrTypeV.

A flow of this transform matrix derivation process is similar to the corresponding flow in the case of the primary horizontal transform described with reference to the flowchart of FIG. 21. Accordingly, description of this flow is omitted. For example, it is sufficient if the description associated with the horizontal direction in the description given with reference to FIG. 21 is replaced with description associated with the vertical direction. For example, the horizontal transform type index TrTypeH is replaced with a vertical transform type index TrTypeV, or the derived transform matrix $T_H$ for primary horizontal transform is replaced with a transform matrix $T_v$ for vertical transform.

In step S292, the matrix calculation section 302 performs a one-dimensional orthogonal transform in the vertical direction for input data $X_{in}$ (transform coefficients after primary horizontal transform) using the derived transform matrix $T_v$ to obtain intermediate data Y1. This process expressed as a determinant can be indicated by Expression (10) described above. In addition, this process expressed as calculation for each element can be indicated by the following Expression (27).

[Math. 23]

$$Y1[i,j] = T_V[i,:] \times X_{in}[:,j] = \sum_{k=0}^{N-1} T_V[i,k] X_{in}[k,j] \tag{27}$$

More specifically, in this case, an inner product of an ith row vector $T_v$[i,:] of the transform matrix $T_v$ and a jth row vector $X_{in}$[:,j] of the input data $X_{in}$ is set as coefficients Y1[i,j] of i-by-j components of the intermediate data Y1 (j=0, . . . , M−1, i=0, . . . , N−1).

In step S293, the scaling section 303 scales coefficients Y1[i,j] of respective i-by-j components of the intermediate data Y1 derived by processing in step S292 with a shift amount $S_v$ to derive intermediate data Y2. This scaling can be expressed by Expression (11) described above.

In step S294, the clip section 304 clips values of coefficients Y2[i,1] of respective i-by-j components of the intermediate data Y2 derived by processing in step S293 to obtain output data $X_{out}$ (i.e., transform coefficients after the primary vertical transform). This process can be expressed by Expression (12) described above.

After completion of processing in step S294, the primary vertical transform process ends, and the process returns to FIG. 19.

By executing the processes in the manner described above, the image coding apparatus 200 is capable of realizing more efficient code quantity reduction by a method corresponding to relative coding quantities of a residual signal of a processing target block and AMT mode information. Accordingly, reduction of a drop of coding efficiency (improvement of coding efficiency) is achievable. Moreover, needless increase in number of transform pair candidates can be reduced, and therefore, reduction of a load increase in the coding process is achievable.

<2-5. Image Decoding Apparatus>

Figure 23:
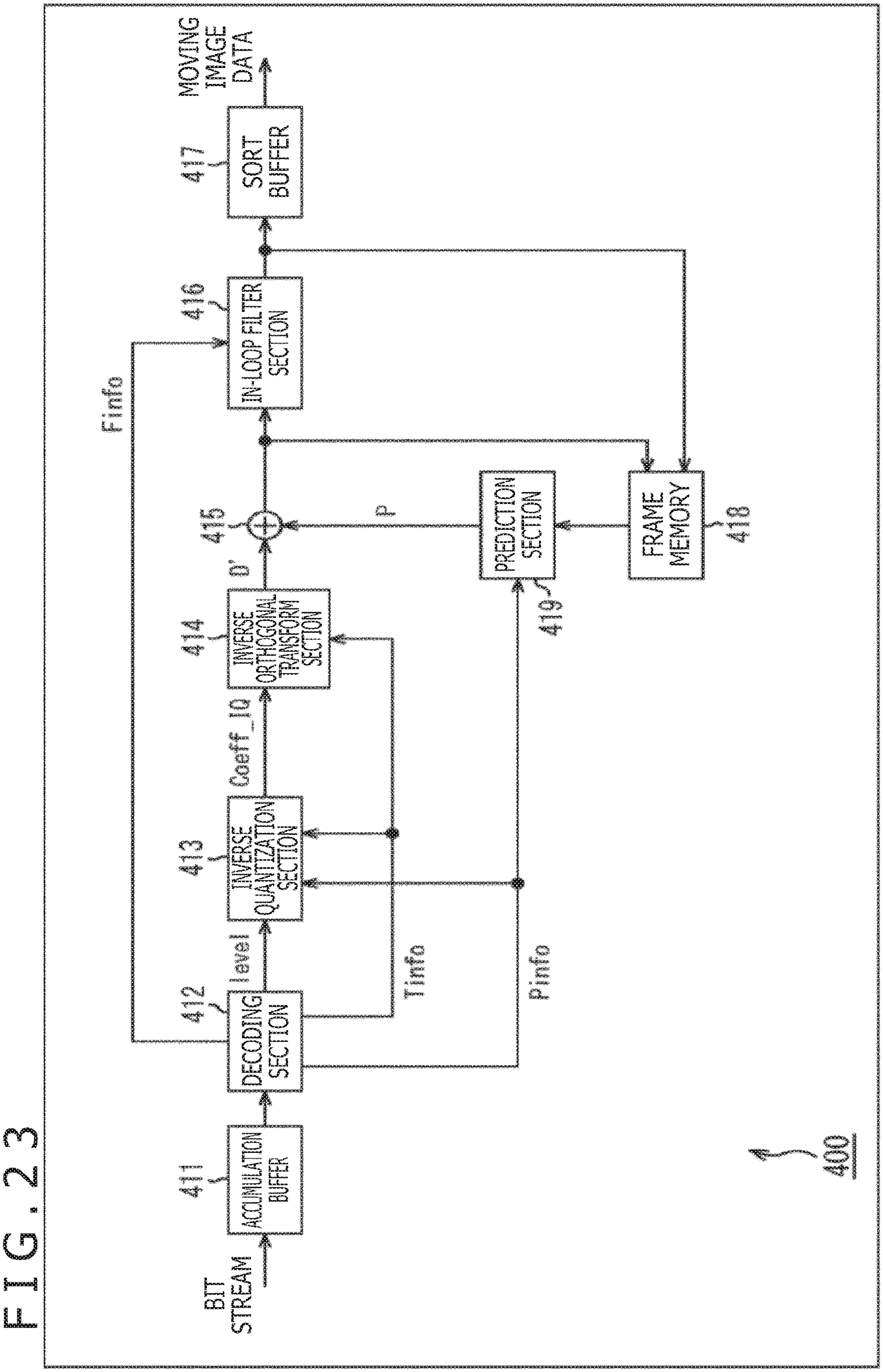
FIG. 23 is a block diagram depicting a main configuration example of an image decoding apparatus.

FIG. 23 is a block diagram depicting an example of a configuration of an image decoding apparatus according to one mode of an image processing apparatus to which the present technology is applied. An image decoding apparatus 400 depicted in FIG. 23 is an apparatus that decodes coded data indicating a coded prediction residue between an image and a prediction image of the image, such as AVC and HEVC. For example, the image decoding apparatus 400 incorporates the technology described in NPL 1, NPL 3, or NPL 4, and decodes coded data of image data indicating a moving image using a method in conformity with standards described in any one of these documents. For example, the image decoding apparatus 400 decodes coded data (bit streams) generated by the image coding apparatus 200 described above.

Note that FIG. 23 depicts main processing sections, main data flows, and the like, and does not necessarily depict all. In other words, a processing section not depicted as a block in FIG. 23, or a flow of processing or data not indicated by an arrow or the like in FIG. 23 may be present in the image decoding apparatus 400. This is similarly applicable to other figures explaining processing sections or the like within the image decoding apparatus 400.

As depicted in FIG. 23, the image decoding apparatus 400 includes an accumulation buffer 411, a decoding section 412, an inverse quantization section 413, an inverse orthogonal transform section 414, a calculation section 415, an in-loop filter section 416, a sort buffer 417, a frame memory 418, and a prediction section 419. Note that the prediction section 419 includes not-depicted intra prediction section and inter prediction section. The image decoding apparatus 400 is an apparatus which decodes coded data (bit streams) to thereby generate moving image data.

<Accumulation Buffer>

The accumulation buffer 411 acquires and retains (stores) a bit stream input to the image decoding apparatus 400. At a predetermined timing or in a case where a predetermined condition is met, for example, the accumulation buffer 411 supplies an accumulated bit stream to the decoding section 412.

<Decoding Section>

The decoding section 412 performs a process associated with decoding of images. For example, the decoding section 412 receives a bit stream supplied from the accumulation buffer 411 as an input and derives parameters from the bit string by variable-length decoding of syntax values of respective syntax elements according to definitions in a syntax table.

For example, parameters derived from syntax elements and syntax values of syntax elements include header information Hinfo, prediction mode information Pinfo, transform information Tinfo, residual information Rinfo, filter information Finfo, and others. In this case, the decoding section 412 parses (analyzes and acquires) these pieces of information from the bit stream. These pieces of information will be described below.

<Header Information Hinfo>

For example, the header information Hinfo includes header information such as VPS (Video Parameter Set)/SPS (Sequence Parameter Set)/PPS (Picture Parameter Sett)/and SH (slice header). For example, the header information Hinfo includes information which specifies an image size (horizontal width PicWidth, vertical width PicHeight), a bit depth (luminance bitDepthY, chrominance bitDepthC), a chrominance array type ChromaArrayType, a maximum value MaxCUSize/a minimum value MinCUSize of a CU size, a maximum depth MaxQTDepth/a minimum depth MinQTDepth of quadtree division (also referred to as Quad-tree division), a maximum depth MaxBIDepth/a minimum depth MinBTDepth of binary tree division (Binary-tree division), a maximum value MaxTSSize of a transform skip block (also referred to as maximum transform skip block size), an on-off flag of each coding tool (also referred to as valid flag), and the like.

Examples of the on-off flag of each coding tool included in the header information Hinfo include an on-off flag associated with a transform and a quantization process described below. Note that the on-off flag of each coding tool can also be interpreted as a flag indicating whether or not syntax associated with each coding tool is present in coded data. Moreover, it is indicated that the coding tools are enabled in a case where the on-off flag is 1 (true), and it is indicated that the coding tools are disabled in a case where the on-off flag is 0 (false). Note that the flag values may be oppositely interpreted.

A cross-component prediction enabled flag (ccp_enabled_flag) is flag information indicating whether or not cross-component prediction (CCP (Cross-Component Prediction), also referred to as CC prediction) is enabled. For example, it is indicated that cross-component prediction is enabled in a case where the flag information is "1" (true), and it is indicated that cross-component prediction is disabled. In a case where the flag information is "0" (false).

Note that this CCP is also referred to as cross-component linear prediction (CCLM or CCLMP).

<Prediction Mode Information Pinfo>

For example, the prediction mode information Pinfo includes information such as processing target PB (prediction block) size information PBSize (prediction block size), intra prediction mode information IPinfo, and motion prediction information MVinfo.

For example, the intra prediction mode information IPinfo includes prev_intra_luma_pred_flag, mpm_idx, and rem_intra_pred_mode in JCTVC-W1005, 7.3.8.5 Coding Unit syntax, luminance intra prediction mode IntraPredModeY derived from this syntax, and others.

In addition, for example, the intra prediction mode information. IPinfo includes a cross-component prediction flag (ccp_flag (cclmp_flag)), a multi-class linear prediction mode flag (mclm_flag), a chromatic sample position type identifier (chroma_sample_loc_type_idx), a chromatic PPM identifier (chroma_mpm_idx), a luminance intra prediction mode (IntraPredModeC) derived from these items of syntax, and others.

The cross-component prediction flag (ccp_flag (cclmp_flag)) is flag information indicating whether or not to apply cross-component linear prediction. For example, it is indicated that cross-component prediction is applied in a case of ccp_flag==1, and it is indicated that cross-component prediction is not applied in a case of ccp_flag==0.

The multi-class linear prediction mode flag (mclm_flag) is information associated with a linear prediction mode (linear prediction mode information). More specifically, the multi-class linear prediction mode flag (mclm_flag) is flag information indicating whether or not to apply the multi-class linear prediction mode. For example, it is indicated that the mode is 1-class mode (single-class mode) (e.g., CCLMP) in a case of "0," and it is indicated that the mode is 2-class mode (multi-class mode) (e.g., MCLMP) in a case of "1."

The chromatic sample position type identifier (chroma_sample_loc_type_idx) is an identifier for identifying a type of a pixel position of a chromatic component (also referred to as chromatic sample position type). For example, in a case where a chromatic array type (ChromaArrayType) which is information associated with a color format represents 420 format, the chromatic sample position type identifier indicates an allocation manner expressed by the following Expression (28).

[Math. 24]

$$\text{chroma\_sample\_}loc\text{\_type\_}ida{=}{=}0\text{: Type2}$$

$$\text{chroma\_sample\_}loc\text{\_type\_}idx{=}{=}1\text{: Type3}$$

chroma_sample_*loc*_type_*idc*==2: Type0 chroma_sample_*loc*_type_*idc*==3: Type1

Note that the chromatic sample position type identifier (chroma_sample_loc_type_idx) is transmitted as information associated with the pixel position of the chromatic component (chroma_sample_loc_info( )) (whale stored in this information).

The chromatic MPM identifier (chroma_mpm_idx) is an identifier representing designation of a prediction mode candidate in a chromatic intra prediction mode candidate list (intraPredModeCandListC) as a chromatic intra prediction mode.

For example, the motion prediction information MVinfo includes information such as merge_idx, merge_flag, inter_prod_idc, ref_idx_mvp_LX, mvp_lX_flag, X={0,1}, and mvd. (for example, see JCTVC-W1005, 7.3.8.6 Prediction Unit Syntax).

Needless to say, the prediction mode information Pinfo may include any information, including information other than the information described above.

<Transform Information Tinfo>

For example, the transform information Tinfo includes the following information. Needless to say, the transform information Tinfo may include any information, including information other than the following information.

A horizontal size TBWSize and a vertical size TBHSize of a processing target transform block (or base 2 logarithmic values log 2TBWSize and log 2TBHSize of TBWSize and TBHSize, respectively)

Transform skip flag (ts_flag): flag indicating whether or not to skip (inverse) primary transform and (inverse) secondary transform Scanning identifier (scanIdx)

Quantization parameter (qp)

Quantization matrix (scaling_matrix (for example, JCTVC-W1005, 7.3.4. Scaling list data syntax))

<Residual Information Rinfo>

For example, the residual information Rinfo (for example, see JCIVC-W1005, 7.3.8.11 Residual Coding syntax) includes the following syntax.

cbf (coded_block_flag): residual data presence/absence flag last_sig_coeff_x_pos: last non-zero coefficient X coordinate last_sig_coeff_y_pos: last non-zero coefficient Y coordinate coded_sub_block_flag: sub-block non-zero coefficient presence/absence flag sig_coeff_flag: non-zero coefficient presence/absence flag gr1_flag: flag indicating whether non-zero coefficent level is larger than 1 (also referred to as GR1 flag)

gr2_flag: flag indicating whether non-zero coefficient level is larger than 2 (also referred to as GR2 flag)

sign_flag: sign indicating plus or minus of non-zero coefficient (also referred to as sign code)

coeff_abs_level_remaining: remaining level of non-zero coefficient (also referred to as non-zero coefficient remaining level)

and others.

Needless to say, the residual information Rinfo may include any information, including information other than these pieces of information.

<Filter Information Finfo>

For example, the filter information Finfo includes control information associated with filtering processes indicated below.

Control information associated with deblocking filter (DBE)

Control information associated with pixel adaptive offset (SAO)

Control information associated with adaptive loop filter (ALF)

Control information associated with other linear and non-linear filters

More specifically, for example, included are pictures to which the filters are applied, information designating regions within the pictures, filter On/Off control information in units of CU, filter On/Off control information associated with boundaries between slices and tiles, and other information. Needless to say, the filter information Finfo may include any information, including information other than these pieces of information.

The description returns to the details of the decoding section 412. The decoding section 412 derives a quantization transform coefficient level (level) of each coefficient position within each of transform blocks with reference to the residual information Rinfo. The decoding section 412 supplies the quantization transform coefficient level (level) to the inverse quantization section 413.

Moreover, the decoding section 412 supplies, to each block, the header information Hinfo, the prediction mode information Pinfo, the quantization transform coefficient level (level), the transform information Tinfo, and the filter information Finfo, all of which have been parsed. Specifically, the pieces of information are supplied in the following manner.

The header information Hinfo is supplied to the inverse quantization section 413, the inverse orthogonal transform section 414, the prediction section 419, and the in-loop filter section 416.

The prediction mode information Pinfo is supplied to the inverse quantization section 413 and the prediction section 419.

The transform information Tinfo is supplied to the inverse quantization section 413 and the inverse orthogonal transform section 414.

The filter information Finfo is supplied to the in-loop filter section 416.

Needless to say, the example described above is provided only by way of example. Other examples may be adopted. For example, the coding parameters may be supplied to any processing section. Moreover, other information may be supplied to any processing section.

<Control of Inverse Orthogonal Transform>

Moreover, the decoding section 412 decodes and derives information associated with control of inverse orthogonal transforms. The decoding section 412 supplies information thus obtained to the inverse orthogonal transform section 414 to control inverse orthogonal transforms performed by the inverse orthogonal transform section 414.

In addition, during control of the inverse orthogonal transforms, the decoding section 412 controls an inverse orthogonal transform type on the basis of the various coding parameters described above in a manner similar to the manner described on the coding side. More specifically, the decoding section 412 controls a selectable number of transform pairs (number of transform pair candidates) NumTrPair on the basis of various coding parameters described above.

For example, the decoding section 412 sets the number of candidates of an inverse orthogonal transform type (selectable number of transform pairs NumTrPair) according to the coding parameters, parses information associated with the inversion orthogonal transform type included in coded data on the basis of the set number of candidates of the inverse orthogonal transform type, and sets the inverse orthogonal transform type on the basis of the parsed information associated with the inverse orthogonal transform type.

By this control, the image decoding apparatus 400 is capable of realizing more efficient code quantity reduction by a method corresponding to relative coding quantities of a residual signal of a processing target block and AMT mode information. Accordingly, reduction of a drop of coding efficiency (improvement of coding efficiency) is achievable.

<Inverse Quantization Section>

The inverse quantization section 413 has a configuration necessary for performing a process associated with at least quantization. For example, the inverse quantization section 413 receives, as inputs, transform information Tinfo and a quantization transform coefficient level (level) supplied from the decoding section 412 and scales (inversely quantizes) a value of the quantization transform coefficient level (level) on the basis of the transform information Tinfo to derive a transform coefficient Coeff_IQ after the inverse quantization.

Rote that this inverse quantization is performed as an inverse process of quantization performed by the quantization section 214. Moreover, this inverse quantization is a process similar to inversion quantization performed by the inverse quantization section 217. In other words, the inverse quantization section 217 performs a process similar to the process performed by the inverse quantization section 413 (inverse quantization).

The inverse quantization section 413 supplies the derived transform coefficient Coeff_IQ to the inverse orthogonal transform section 414.

<Inverse Orthogonal Transform Section>

The inverse orthogonal transform section 414 performs a process associated with inverse orthogonal transforms. For example, the inverse orthogonal transform section 414 receives, as inputs, the transform coefficient Coeff_IQ supplied from the inverse quantization section 413 and the transform information Tinfo supplied from the decoding section 412, and performs an inverse orthogonal transform process for the transform coefficient Coeff_IQ on the basis of the IQ transform information Tinfo to derive a prediction residue D'.

Note that this inverse orthogonal transform is performed as an inverse process of an orthogonal transform performed by the orthogonal transform section 213. Moreover, this inverse orthogonal transform is a process similar to an inversion orthogonal transform by the inverse orthogonal transform section 218. Accordingly, the inverse orthogonal transform section 218 performs a process similar to the process performed by the inverse orthogonal transform section 414 (inverse orthogonal transform).

The inverse orthogonal transform section 414 supplies the derived prediction residue D' to the calculation section 415.

<Calculation Section>

The calculation section 415 performs a process associated with addition of information indicating images. For example, the calculation section 415 receives, as inputs, the prediction residue D' supplied from the inverse orthogonal transform section 414 and a prediction image P supplied from the prediction section 419. The calculation section 415 adds the prediction residue D' to the prediction image P (prediction signal) corresponding to the prediction residue D' to derive a local decoded image $R_{local}$ as expressed in the following Expression (29).

[Math. 25]

$$R_{local}=D'+P \quad (29)$$

The calculation section 415 supplies the derived local decoded image $R_{local}$ to the in-loop filter section 416 and the frame memory 418.

<In-Loop Filter Section>

The in loop filter section 416 performs a process associated with as in-loop filtering process. For example, the in-loop filter section 416 receives, as inputs, the local decoded image $R_{local}$ supplied from the calculation section 415 and filter information Finfo supplied from the decoding section 412. Note that information input to the in-loop filter section 416 may be any information, including information other than these pieces of information described above.

The in-loop filter section 416 appropriately performs a filtering process for the local decoded image $R_{local}$ on the basis of the filter information Finfo.

For example, as described in NPL 1, the in-loop filter section 416 applies four in-loop filters, i.e., a bilateral filter, a deblocking filter (DBE (DeBlocKing Filter)), an adaptive offset filter (SAO (Sample Adaptive Offset)), and an adaptive loop filter (ALF (Adaptive Loop Filter)) in this order. Note that any filters are applicable in any order and selectable in appropriate manners.

The in-loop filter section 416 performs a filtering process corresponding to the filtering process performed on the coding side (for example, the in-loop filter section 220 of the image coding apparatus 200). Needless to say, the filtering process performed by the in-loop filter section 416 is not limited to the example described above but may be any process. For example, a Wiener filter or the like may be applied to the in-loop filter section 416.

The in-loop filter section 416 supplies the filtered local decoded image $R_{local}$ to the sort buffer 417 and the frame memory 418.

<Sort Buffer>

The sort buffer 417 receives as an input and retains (stores) the local decoded image $R_{local}$ supplied from the in-loop filter section 416. The sort buffer 417 reconstructs a decoded image R for each unit of picture using the local decoded image $R_{local}$, and retains (stores in the buffer) the decoded image R. The sort buffer 417 switches the order of the obtained decoded images R from a decoding order to a reproduction order. The sort buffer 417 outputs a sorted group of the decoded images R after sorting to the outside of the image decoding apparatus 400 as moving image data.

<Frame Memory>

The frame memory 418 performs a process associated with storage of data corresponding to an image. For example, the frame memory 418 receives, as an input, the local decoded image $R_{local}$ supplied from the calculation section 415, reconstructs the decoded image R for each unit of picture, and stores the decoded image R in a buffer within the frame memory 418.

In addition, the frame memory 418 receives, as an input, the local decoded image $R_{local}$ supplied from the in-loop filter section 416 and subjected to in-loop filtering, reconstructs the decoded image R for each unit of picture, and stores the decoded image R in the buffer within the frame memory 418. The frame memory 418 appropriately supplies the stored decoded image R (or a part of the decoded image R) to the prediction section 419 as a reference image.

Note that the frame memory 418 may store header information Hinfo, prediction mode information Pinfo, transform information Tinfo, filter information Finfo, and the like, all of which are associated with formation of a decoded image.

<Prediction Section>

The prediction section 419 performs a process associated with formation of a prediction image. For example, the prediction section 419 receives, as an input, prediction mode information. Pinfo supplied from the decoding section 412, and performs prediction by a prediction method designated by the prediction mode information Pinfo to derive a prediction image P. During this derivation, the prediction section 419 uses, as a reference image, a decoded image R (or a part of the decoded image R) designated by the prediction mode information Pinfo and stored in the frame memory 418 before or after filtering. The prediction section 419 supplies the derived prediction image P to the calculation section 415.

According to the image decoding apparatus 400 configured as above, the decoding section 412 as a decoding section and a control section performs the above process to which the present technology is applied. In addition, the inverse orthogonal transform section 414 as an inverse orthogonal transform section performs the above process to which the present technology is applied. The image decoding apparatus 400 is therefore capable of realizing more efficient code quantity reduction by a method corresponding to relative coding quantities of a residual signal of a processing target block and AMT mode information. Accordingly, reduction of a drop of coding efficiency (improvement of coding efficiency) is achievable.

<Details of Decoding Section>

Figure 24:
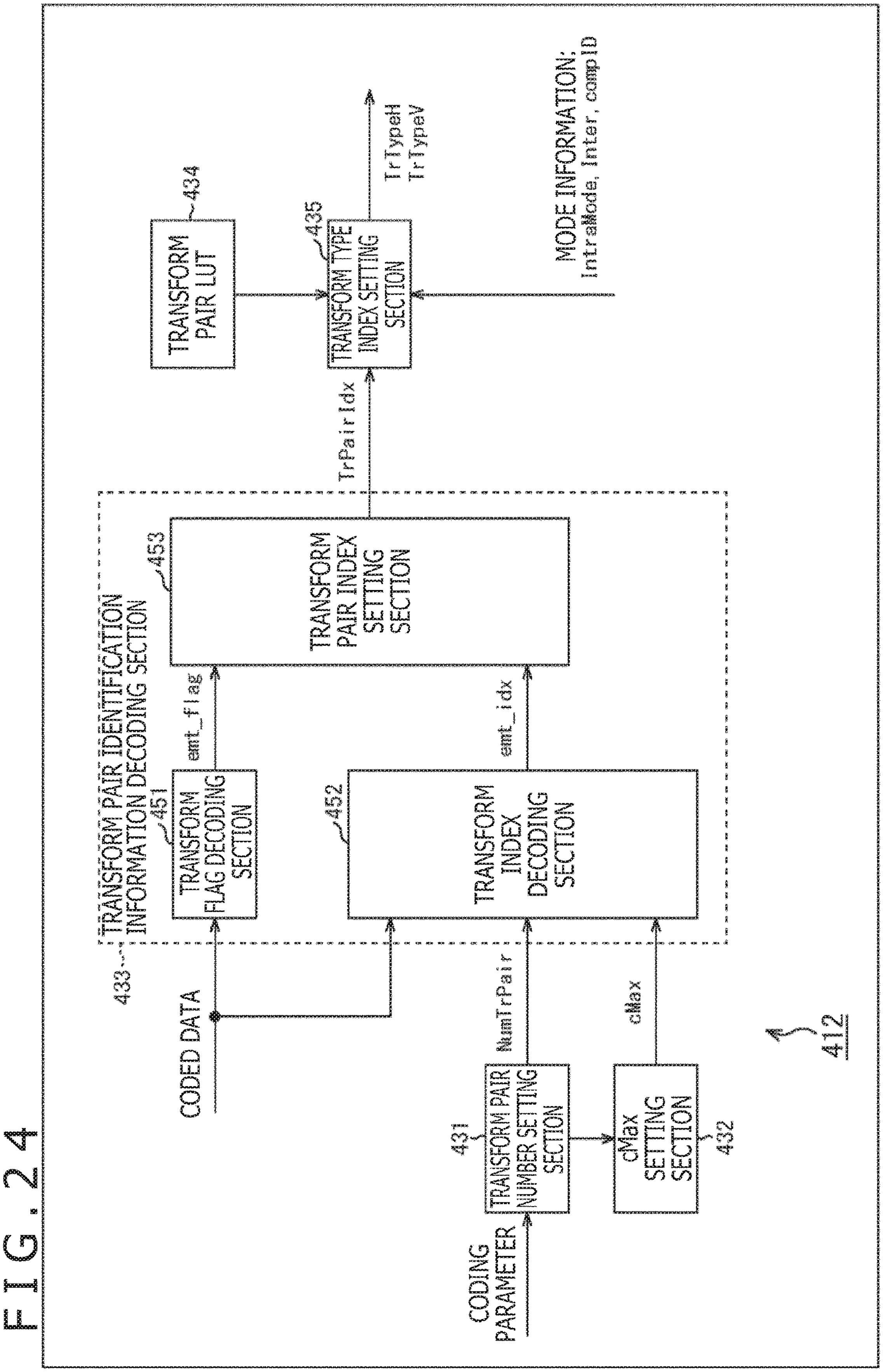
FIG. 24 is a block diagram depicting a main configuration example associated with control of inverse orthogonal transforms and included in a decoding section.

FIG. 24 is a block diagram depicting a main configuration example associated with control of inverse orthogonal transforms and included in the decoding section 412 of FIG. 23. As depicted in FIG. 24, the decoding section 412 includes, as a configuration for controlling inverse orthogonal transforms, a transform pair number setting section 431, a cMax setting section 432, a transform pair identification information decoding section 433, a transform pair LUT 434, and a transform type index setting section 435.

The transform pair number setting section 431 has a configuration necessary for performing a process associated with at least setting of a selectable number of transform pairs NumTrPair. The transform pair number setting section 431 receives coding parameters as inputs. These coding parameters may be extracted from coded data or may be supplied from the outside of the image decoding apparatus 400. In addition, the coding parameters correspond to information associated with coding (decoding) and are not particularly limited to specific parameters as long as the parameters are available for control of orthogonal transforms. For example, the coding parameters include the various parameters described with reference to FIG. 8.

The transform pair number setting section 431 sets the selectable number of transform pairs NumIrPair on the basis of these coding parameters. The transform pair number setting section 431 supplies the set selectable number of transform pairs NumIrPair to the cMax setting section 432 and the transform pair identification information decoding section 433.

The cMax setting section 432 has a configuration necessary for performing a process associated with at least setting of a maximum value cMax of the selectable number of transform pairs (i.e., the number of transform pair candidates). The cMax setting section 432 receives the selectable number of transform pairs Nu=Pair supplied from the transform pair number setting section 431 as an input. The cMAx setting section 432 sets a maximum value cMax on the basis of the selectable number of transform pairs NumTrPair. The cMax setting section 432 supplies the set maximum value cMax to the transform pair identification information decoding section 433.

The transform pair identification information decoding section 433 has a configuration necessary for performing a process associated with at least decoding of transform pair identification information. The transform pair identification information decoding section 433 receives, as inputs, coded data, the selectable number of transform pairs NumTrPair supplied from the transform pair number setting section 431, and the maximum value cMax supplied from the cMax setting section 432. The transform pair identification information decoding section 433 decodes the transform pair identification information (extracts from the coded data) on the basis of these pieces of information. The transform pair identification information decoding section 433 supplies a transform pair index TrPairIdx to the transform type index setting section 435 as decoded transform pair identification information.

As depicted in FIG. 24, the transform pair identification information decoding section 433 includes a transform flag decoding section 451, a transform index decoding section 452, and a transform pair index setting section 453.

The transform flag decoding section 451 has a configuration necessary for performing a process associated with decoding of a transform flag emt_flag. The transform flag decoding section 451 receives coded data as an input and parses and extracts (acquires) a transform flag emt_flag from the coded data. The transform flag decoding section 451 supplies the transform flag emt_flag acquired in the manner described above to the transform pair index setting section 453.

The transform index decoding section 452 has a configuration necessary for performing a process associated with at least decoding of a transform index emt_idx. The transform index decoding section 452 receives, as inputs, coded data, the selectable number of transform pairs NumTrPair supplied from the transform pair number setting section 431, and the maximum value cMax supplied from the cMax setting section 432.

The transform index decoding section 452 parses and extracts (acquires) a transform index emt_idx included in the coded data on the basis of the selectable number of transform pairs NumTrPair and the maximum value cMax. In other words, the transform index decoding section 452 specifies and extracts the transform index emt_idx included in the coded data on the basis of the selectable number of transform pairs NumTrPair and the maximum value cMax. The transform index decoding section 452 supplies the transform index emt_idx thus acquired to the transform pair index setting section 453.

The transform pair index setting section 453 has a configuration necessary for at least setting of transform pair index. In addition, the transform pair index setting section 453 receives, as inputs, the transform flag emt_flag supplied from the transform flag decoding section 451 and the transform index emt_idx supplied from the transform index decoding section 452. The transform pair index setting section 453 derives a transform pair index TrPairIdx corresponding to the transform flag emt_flag and the transform index emt_idx on the basis of these. The transform pair index setting section 453 supplies the derived transform pair index TrPairIdx to the transform type index setting section 435.

The transform pair LUT 434 includes any storage medium such as a semiconductor memory, for example, and stores a look up table (LUT (Look Up Table)) for selecting transform pairs. This LUT has information included in the table 12 indicated in FIG. 2. This LUT may be determined beforehand or may be redesigned on the basis of RD cost or the like. The transform pair LUT 434 supplies the LUT to the transform type index setting section 435 as necessary.

The transform type index setting section 435 has a configuration necessary for performing a process associated with at least setting of a transform type index TrType. The transform type index setting section 435 receives, as inputs, the transform pair index TrPairIdx supplied from the transform pair index setting section 453, the LUT supplied from the transform pair LUT 434, and mode information. For example, this mode information includes coding parameters such as mode information indicating intra prediction (IntraMode), mode information indicating inter prediction (Inter), and a component ID (compID). This mode information may be set by the decoding section 412 (a configuration of the decoding section 412 other than the configuration depicted in FIG. 24) or may be supplied from the outside of the image decoding apparatus 400.

The transform type index setting section 435 sets a horizontal transform type index TrTypeH and a vertical transform type index TrTypeV as the transform type index TrType on the basis of these pieces of information. More specifically, the transform type index setting section 435 selects a transform pair corresponding to the transform pair index TrPairIdx and the mode information according to the LUT supplied from the transform pair LUT 434 and sets the horizontal transform type index TrTypeH and the vertical transform type index TrTypeV for identifying the selected transform pair.

The transform type index setting section 435 supplies the set horizontal transform type index TrTypeH and the vertical transform type index TrTypeV to the inverse orthogonal transform section 414 as transform information Tinfo.

More specifically, the decoding section 412 supplies the horizontal transform type index TrTypeH and the vertical transform type index TrTypeV to the inverse orthogonal transform section 414 to control inverse orthogonal transforms. In addition, as described above, the decoding section 912 controls the number of transform pair candidates (NumTrPair) on the basis of the coding parameters at the time of setting of the horizontal transform type index TrTypeH and the vertical transform type index TrTypeV. Accordingly, the image decoding apparatus 400 is capable of reducing a drop of coding efficiency (improving coding efficiency) as described above with reference to FIG. 8 and other figures.

<Details of Inverse Orthogonal Transform Section>

Figure 25:
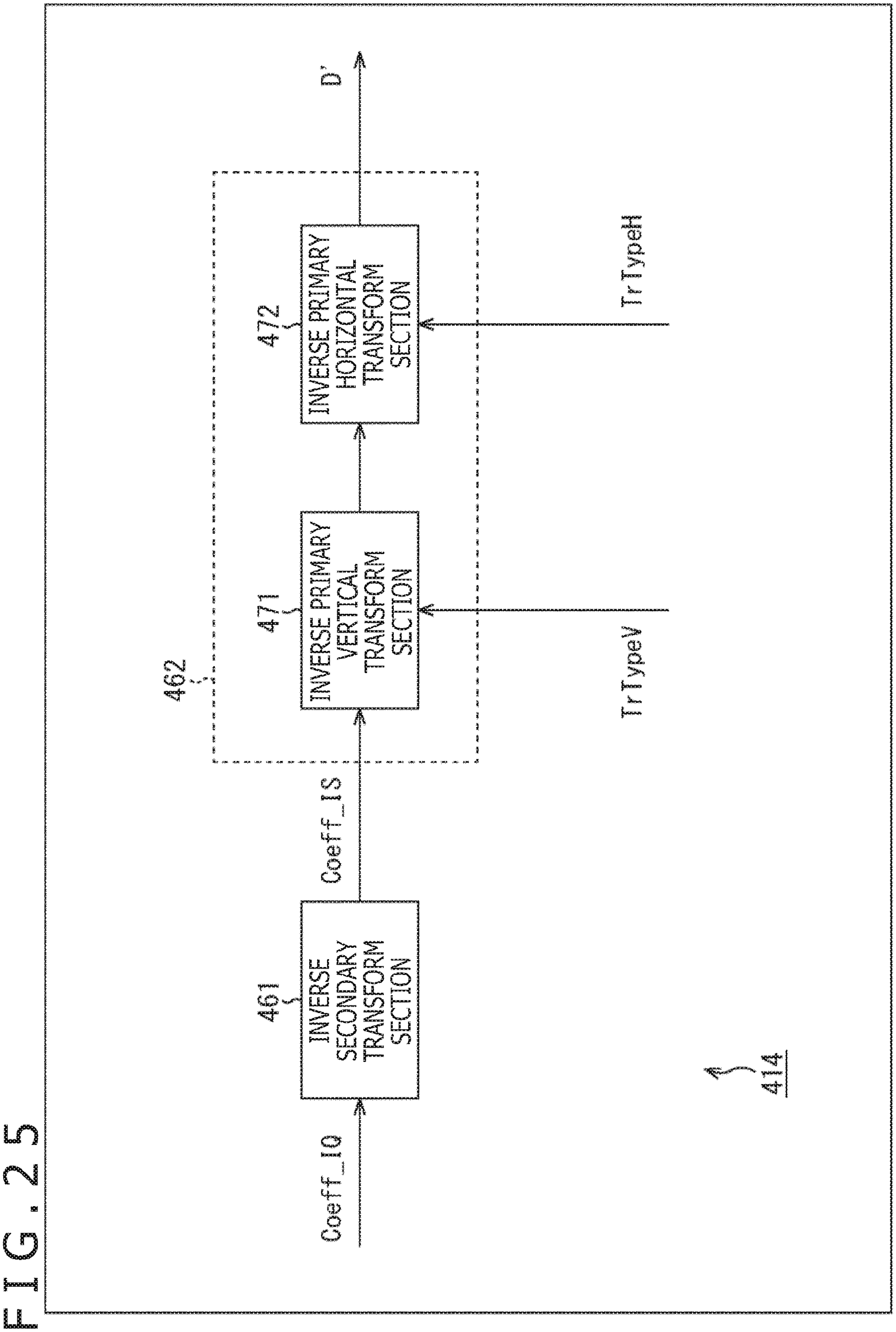
FIG. 25 is a block diagram depicting a main configuration example of an inverse orthogonal transform section.

FIG. 25 is a block diagram depicting a main configuration example of the inverse orthogonal transform section 414 of FIG. 23. As depicted in FIG. 25, the inverse orthogonal transform section 414 includes an inverse secondary transform section 461 and an inverse primary transform section 462.

The inverse secondary transform section 461 has a configuration necessary for performing a process associated with at least inverse secondary transforms corresponding to an inverse process of the secondary transforms performed on the coding side (for example, the secondary transform section 262 of the image coding apparatus 200). For example, the inverse secondary transform section 461 receives, as inputs, a transform coefficient Coeff_IQ and transform information Tinfo supplied from the inverse quantization section 413.

The inverse secondary transform section 461 performs an inverse secondary transform for the transform coefficient Coeff_IQ on the basis of the transform information Tinfo to derive a transform coefficient Coeff_IS after the inverse secondary transform. The inverse secondary transform section 461 supplies the transform coefficient Coeff_IS after the inverse secondary transform to the inverse primary transform section 462.

The inverse primary transform section 462 performs a process associated with inverse primary transforms corresponding to an inverse process of the primary transforms performed on the coding side (for example, the primary transform section 261 of the image coding apparatus 200). For example, the inverse primary transform section 462 receives, as inputs, the transform coefficient. Coeff_IS after the inverse secondary transform and transform type indexes (vertical transform type index TrTypeV and horizontal transform type index TrTypeH).

The inverse primary transform section 462 performs an inverse primary transform for the transform Coeff_IS after the inverse secondary transform using a transform matrix corresponding to the horizontal transform type index TrTypeH and a transform matrix corresponding to the vertical transform type index TrTypeV to derive a transform coefficient after the inverse primary transform. (i.e., prediction residue D'). The inverse primary transform section 462 supplies the derived prediction residue D' to the calculation section 415.

As depicted in FIG. 25, the inverse primary transform section 462 includes an inverse primary vertical transform section 471 and an inverse primary horizontal transform section 472.

The inverse primary vertical transform section 471 is configured to perform a process associated with inverse primary vertical transforms which are inverse one-dimensional orthogonal transforms in the vertical direction. For example, the inverse primary vertical transform section 471 receives, as inputs, the transform coefficient Coeff_IS and the transform information Tinfo (vertical transform type index TrTypeV and the like). The inverse primary vertical transform section 471 performs an inverse primary vertical transform for the transform coefficient. Coeff_IS using a transform matrix corresponding to the vertical transform type index TrTypeV. The inverse primary vertical transform section 471 supplies the transform coefficients after the inverse primary vertical transform to the inverse primary horizontal transform section 472.

The inverse primary horizontal transform section 472 is configured to perform a process associated with primary horizontal transforms which are one-dimensional orthogonal transforms is the horizontal direction. For example, the inverse primary horizontal transform section 472 receives, as inputs, the transform coefficient after the inverse primary vertical transform and the transform information Tinfo (horizontal transform type index TrTypeH and the like). The inverse primary horizontal transform section 472 performs an inverse primary horizontal transform for the transform coefficients after the inverse primary vertical transform using a transform matrix corresponding to the horizontal transform type index. TrTypeH. The inverse primary horizontal transform section 472 supplies transform coefficients after the primary horizontal transform (i.e., prediction residue D') to the calculation section 415.

Note that the inverse orthogonal transform section 414 can skip (omit) inverse secondary transforms performed by the inverse secondary transform section 461, inverse primary transforms performed by the inverse primary transform section 462, or both. In addition, inverse primary vertical transforms performed by the inverse primary vertical transform section 471 may be skipped (omitted). Similarly, inverse primary horizontal transforms performed by the inverse primary horizontal transform section 472 may be skipped (omitted).

<Inverse Primary Vertical Transform Section>

Figure 26:
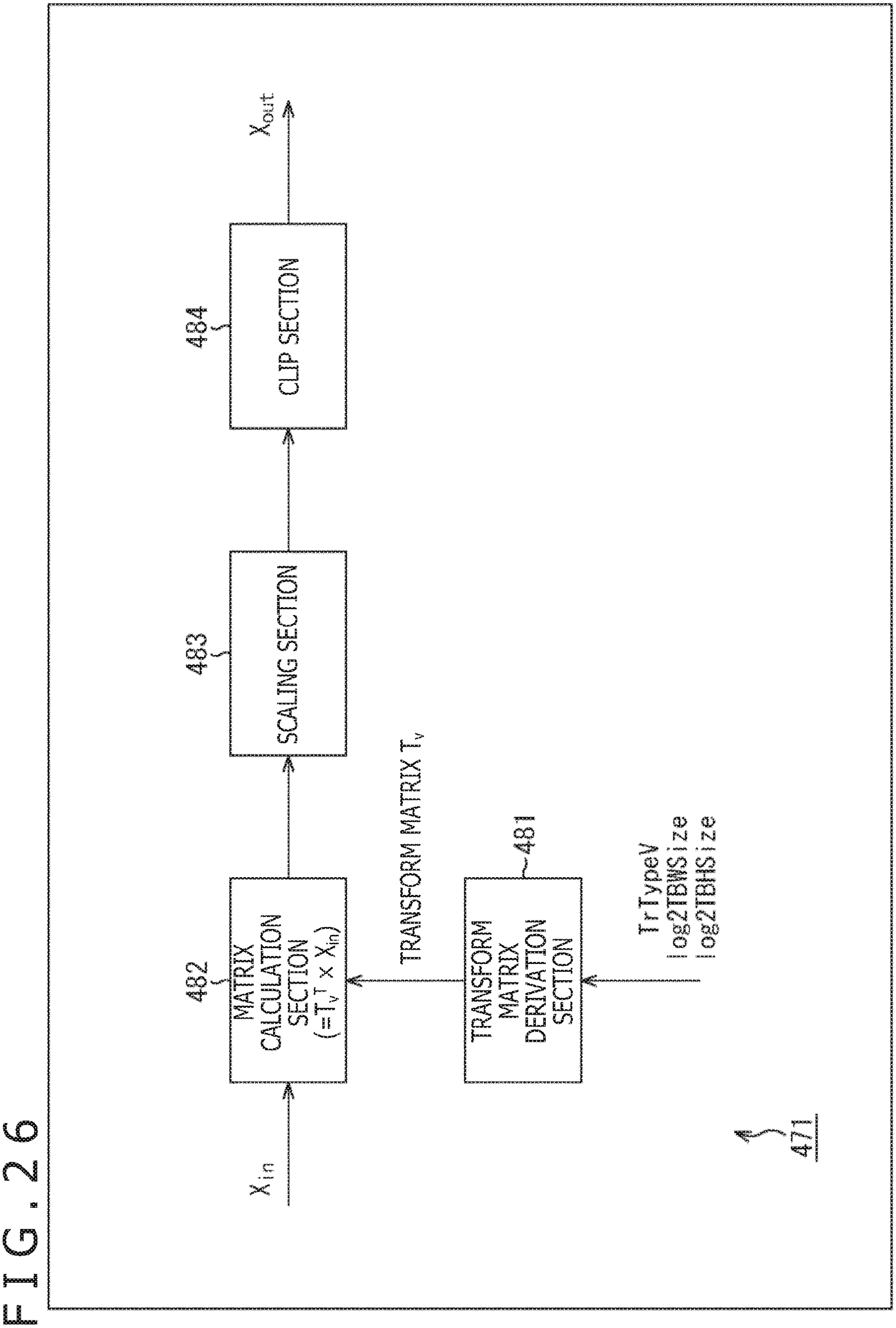
FIG. 26 is a block diagram depicting a main configuration example of as inverse primary vertical transform section.

FIG. 26 is a block diagram depicting a main configuration example of the inverse primary vertical transform section 471 of FIG. 25. As depicted in FIG. 26, the inverse primary vertical transform section 471 includes a transform matrix derivation section 481, a matrix calculation section 482, a scaling section 483, and a clip section 484.

The transform matrix derivation section 481 receives, as an input, information associated with a vertical transform type index TrTypeV and a size of a transform block, and derives a transform matrix $T_v$ for inverse primary vertical transform. (transform matrix $T_v$ for inverse one-dimensional orthogonal transform in the vertical direction) as a matrix having the same size as the size of the transform block and corresponding to the vertical transform type index TrTypeV. The transform matrix derivation section 481 supplies the transform matrix $T_v$ to the matrix calculation section 482.

The matrix calculation section 482 performs an inverse one-dimensional orthogonal transform in the vertical direction for input data $X_{in}$ (i.e., transform block of a transform coefficient Coeff_IS after an inverse secondary transform) using the transform matrix $T_v$ supplied from the transform matrix derivation section 481 to obtain intermediate data Y1. This calculation can be expressed by a determinant in the following Expression (30).

[Math. 26]

$$Y1 = Tv^T \times X_{in} \quad (30)$$

The matrix calculation section 482 supplies the intermediate data Y1 to the scaling section 483.

The scaling section 483 scales coefficients Y1[i,j] of respective i-by-j components of the intermediate data Y1 with a predetermined shift amount $S_{IV}$ to obtain intermediate data Y2. This scaling can be expressed by the following Expression (31).

[Math. 27]

$$Y2[i,j] = Y1[i,j] >> S_{IV} \quad (31)$$

The scaling section 483 supplies the intermediate data Y2 to the clip section 484.

The clip section 484 clips values of coefficients Y2[i,j] of respective i-by-j components of the intermediate data Y2 to derive output data transform coefficients after the inverse primary vertical transform). This process can be expressed by Expression (12) described above.

The clip section 484 outputs the output data $X_{out}$ (transform coefficients after the inverse primary vertical transform) to the outside of the inverse primary vertical transform section 471 (supplies the output data $X_{out}$ to the inverse primary horizontal transform section 472).

<Transform Matrix Derivation Section>

Figure 27:
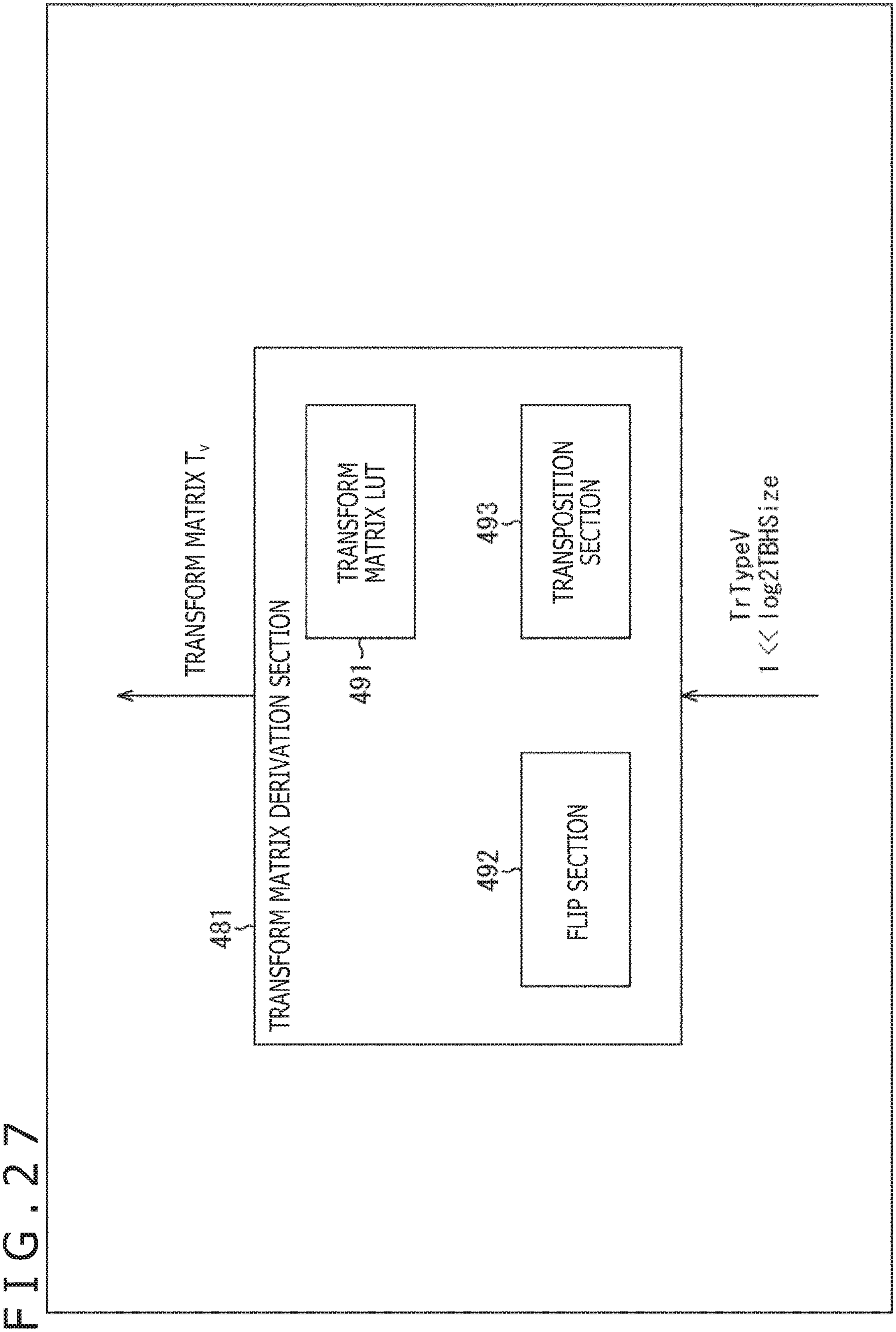
FIG. 27 is a block diagram depicting a main configuration example of a transform matrix derivation section.

FIG. 27 is a block diagram depicting a main configuration example of the transform matrix derivation section 481 of FIG. 26. As depicted in FIG. 27, the transform matrix derivation section 481 includes a transform matrix LUT 491, a flip section 492, and a transposition section 493. While FIG. 27 does not depict arrows indicating sending and receiving of data, the transform matrix derivation section 481 is capable of sending and receiving any data to and from any processing sections (processing blocks).

The transform matrix LUT 491 is a look up table for retaining (storing) a transform matrix corresponding to a vertical transform type index TrTypeV and a transform block size N. The transform matrix LUT 491 selects and outputs a transform matrix corresponding to the vertical transform type index TrTypeV and the transform block size N in response to designation of these. In a case of this derivation example, the transform matrix LUT 491 supplies the transform matrix to the flip section 492, the transposition section 493, or both as a base transform matrix. $T_{base}$.

The flip section 492 flips a transform matrix T which is an input N-by-N matrix and outputs a transform matrix $T_{flip}$ after the flip. In the case of this derivation example, the flip section 492 receives an N-by-N base transform matrix $T_{base}$ supplied from the transform matrix LUT 491 as an input, flips the base transform matrix $T_{base}$ in the row direction (horizontal direction), and outputs a transform matrix. $T_{flip}$ after the flip to the outside of the transform matrix derivation section 481 (supplies the transform matrix $T_{flip}$ to the matrix calculation section 482) as a transform matrix $T_v$.

The transposition section 493 transposes a transform matrix I which is an input N-by-N matrix, and outputs a transform matrix $T_{transpose}$ after the transposition. In the case of this derivation example, the transposition section 493 receives the N-by-N base transform matrix $T_{base}$ supplied from the transform matrix LUT 491 as an input, transposes the base transform matrix and outputs the transform matrix $T_{transpose}$ after the transposition to the outside of the transform matrix derivation section 481 (supplies the transform matrix $T_{transpose}$ to the matrix calculation section 482) as the transform matrix $T_v$.

<Inverse Primary Horizontal Transform Section>

Figure 28:
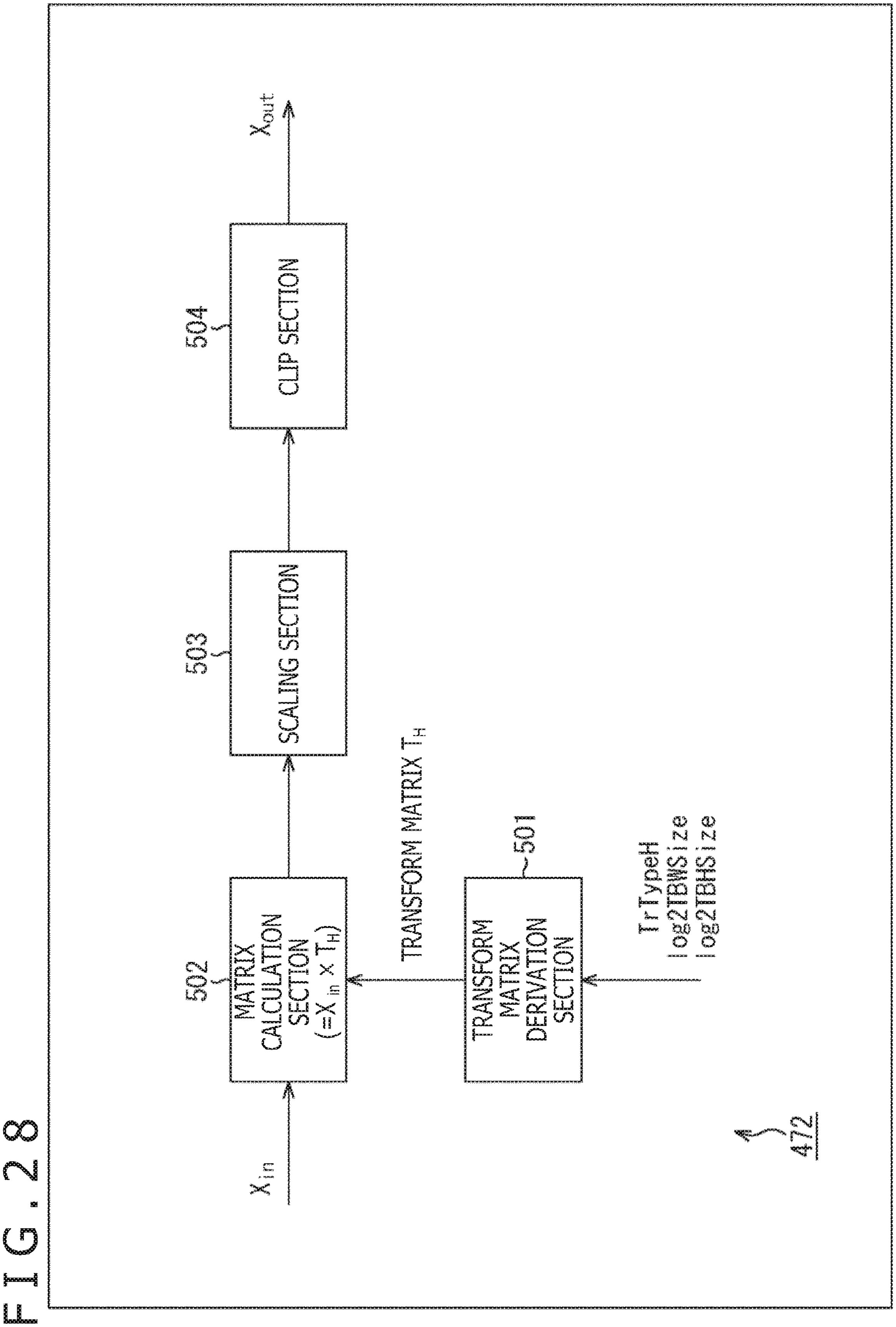
FIG. 28 is a block diagram depicting a main configuration example of an inverse primary horizontal transform section.

FIG. 28 is a block diagram depicting a main configuration example of the inverse primary horizontal transform section 472 of FIG. 25. As depicted in FIG. 28, the inverse primary horizontal transform section 472 includes a transform matrix derivation section 501, a matrix calculation section 502, a scaling section 503, and a clip section 504.

The transform matrix derivation section 501 receives, as inputs, information associated with a horizontal transform type index TrTypeH and a size of a transform block, and derives a transform matrix $T_H$ for horizontal transform (transform matrix $T_H$ for inverse one-dimensional orthogonal transform matrix in the horizontal direction) as a matrix having the same size as the size of the transform block and corresponding to the horizontal transform type index TrTypeH. The transform matrix derivation section 501 supplies the transform matrix $T_H$ to the matrix calculation section 502.

The matrix calculation section 502 performs an inverse one-dimensional orthogonal transform in the horizontal direction for input data $X_{in}$ (i.e., a transform block of transform coefficients after an inverse primary vertical transform) using the transform matrix $T_H$ supplied from the transform matrix derivation section 501 to obtain intermediate data Y1. This calculation can be expressed by a determinant in the following Expression (32).

[Math. 28]

$$Y1 = X_{in} \times T_H \quad (32)$$

The matrix calculation section 502 supplies the intermediate data Y1 to the scaling section 503.

The scaling section 503 scales coefficients Y1[i,j] of respective i-by-j components of the intermediate data Y1 with a predetermined shift amount $S_{IH}$ to obtain intermediate data Y2. This scaling can be expressed by following Expression (33).

[Math. 29]

$$Y2[i,j]=Y1[i,j]>>S_{IH} \quad (33)$$

The scaling section 503 supplies the intermediate data Y2 to the clip section 504.

The clip section 504 clips values of coefficients Y2[i,j] of respective i-by-j components of the intermediate data Y2 to derive output data $X_{out}$ (i.e., transform coefficients after the inverse primary horizontal transform). This process can be expressed by Expression (9) described above.

The clip section 504 outputs the output data $X_{out}$ (transform coefficients after the inverse primary horizontal transform (transform coefficient Coeff_IP after inverse primary transform)) to the outside of the inverse primary horizontal transform section 472 (supplies the output data $X_{out}$ to the calculation section 415) as a prediction residue D'.

<Transform Matrix Derivation Section>.

Figure 29:
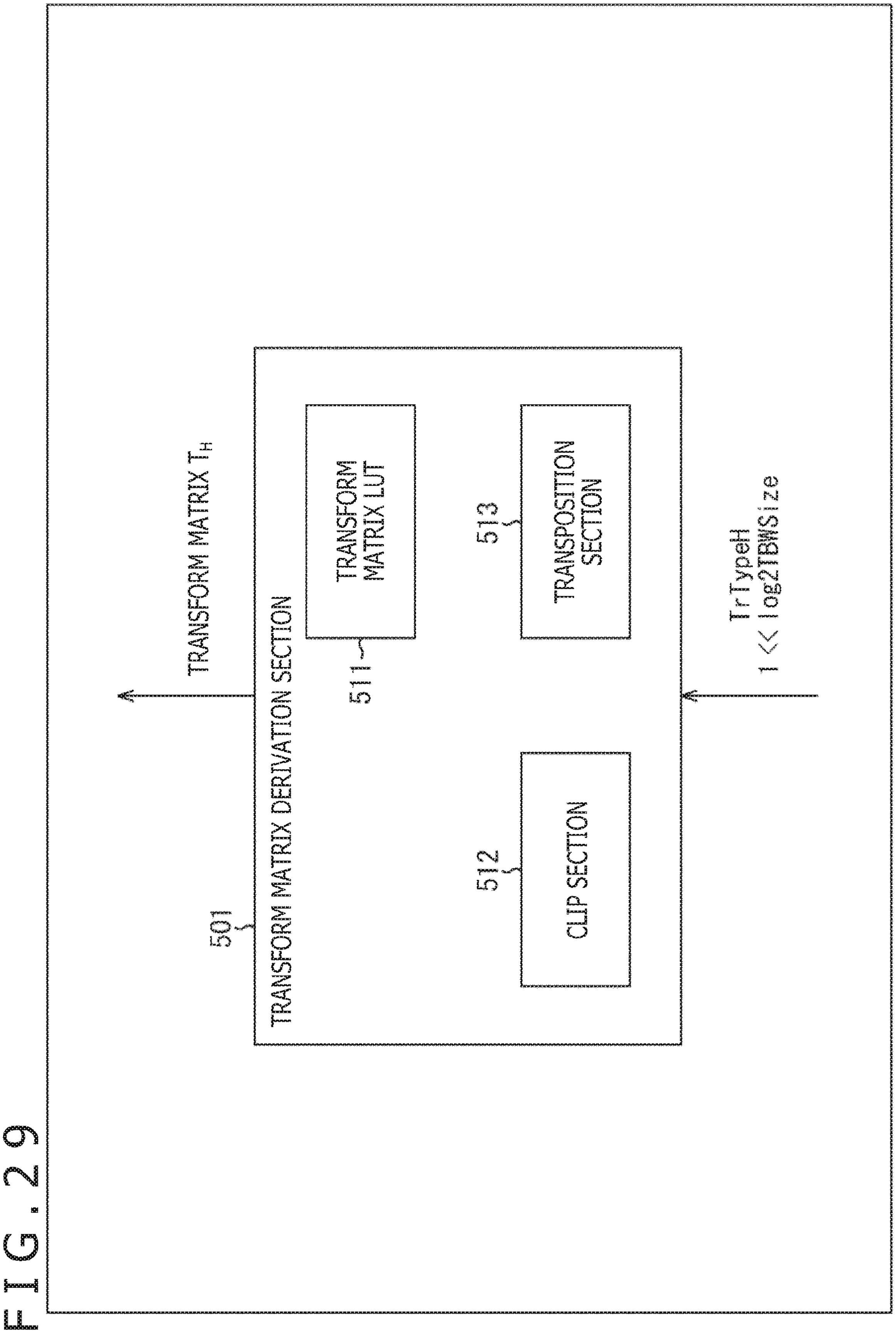
FIG. 29 is a block diagram depicting a main configuration example of a transform matrix derivation section.

FIG. 29 is a block diagram depicting a main configuration example of the transform matrix derivation section 501 of FIG. 28. As depicted in FIG. 29, the transform matrix derivation section 501 includes a transform matrix LUT 511, a flip section 512, and a transposition section 513. While FIG. 29 does not depict arrows indicating sending and receiving of data, the transform matrix derivation section 501 is capable of sending and receiving any data to and from any processing sections (processing blocks).

The transform matrix LUT 511 is a look up table for retaining (storing) a transform matrix corresponding to a horizontal transform type index TrTypeIdxH and a transform block size N. The transform matrix LUT 511 selects and outputs a transform matrix corresponding to the horizontal transform type index TrTypeIdxH and the transform block size N in response to designation of these. In a case of this derivation example, the transform matrix LUT 511 supplies the transform matrix to the flip section 512, the transposition section 513, or both as a base transform matrix $T_{base}$.

The flip section 512 flips a transform matrix I which is an input N-row N-column matrix and outputs a transform matrix $T_{flip}$ after the flip. In the case of this derivation example, the flip section 512 receives, as an input, the N-by-N base transform matrix $T_{base}$ supplied from the transform matrix LUT 511, flips the base transform matrix $T_{base}$ in the row direction (horizontal direction), and outputs a transform matrix $T_{flip}$ after the flip to the outside of the transform matrix derivation section 501 (supplies the transform matrix $T_{flip}$ to the matrix calculation section 502) as a transform matrix $T_H$.

The transposition section 513 transposes a transform matrix T which is an input N-by-N matrix T and outputs a transform matrix $T_{transpose}$ after the transposition. In the case of this derivation example, the transposition section 513 receives, as an input, the N-by-N base transform matrix $T_{base}$ supplied from the transform matrix LUT 511, transposes the base transform matrix $T_{base}$, and outputs the transform matrix $T_{transpose}$ after the transposition to the outside of the transform matrix derivation section 501 (supplies the transform matrix $T_{transpose}$ to the matrix calculation section 502) as the transform matrix $T_H$.

<Flow of Image Decoding Process>

Described next will be flows of processes executed by the image decoding apparatus 400 configured as described above. An example of a flow of an image coding process will be first described with reference to a flowchart of FIG. 30.

With a start of the image decoding process, the accumulation buffer 411 in step S401 acquires and retains (accumulates) coded data (bit stream) supplied from the outside of the image decoding apparatus 400.

In step S402, the decoding section 412 decodes the coded data (bit stream) to obtain a quantization transform coefficient level (level). Moreover, the decoding section 412 parses (analyzes and acquires) various coding parameters from the coded data (bit stream) by this decoding.

In step S403, the decoding section 412 performs an inverse orthogonal transform control process for controlling an inverse orthogonal transform type according to the coding parameters.

In step S404, the inverse quantization section 413 performs inverse quantization which is an inverse process of quantization performed on the coding side for the quantization transform coefficient level (level) obtained by processing in step S402 to obtain a transform coefficient Coeff_IQ.

In step S405, the inverse orthogonal transform section 414 performs an inverse orthogonal transform process, which is an inverse process of the orthogonal transform process performed on the coding side, for the transform coefficient Coeff_IQ obtained by processing in step S404 under control performed in step S403 to obtain a prediction residue D'.

In step S406, the prediction section 419 executes a prediction process by a prediction method designated by the coding side on the basis of the information parsed in step S402 and generates a prediction image P with reference to a reference image stored in the frame memory 418, for example.

In step S407, the calculation section 415 adds the prediction residue D' obtained in step S405 to the prediction image P obtained in step S406 to derive a local decoded image $R_{local}$.

In step S408, the in-loop filter section 416 performs an in-loop filtering process for the decoded image $R_{local}$ obtained by processing in step S407.

In step S409, the sort buffer 417 derives a decoded image R using the decoded image $R_{local}$ obtained by processing in step S408 and filtered and switches the order of a group of the decoded images R from a decoding order to a reproduction order. The sorted group of the decoded images R in the reproduction order are output to the outside of the image decoding apparatus 400 as moving images.

Moreover, in step S410, the frame memory 418 stores at least either the local decoded image $R_{local}$ obtained by processing in step S407 or the local decoded image $R_{local}$ after the filtering process obtained by processing in step S408.

After completion of processing in step S410, the image decoding process ends.

In the image decoding process performed in the above manner of the flow, the above process to which the present technology is applied is performed as processing in step S403. In addition, an inverse orthogonal transform process is performed as processing in step S405 under control in step S403. Accordingly, reduction of a drop of coding efficiency (improvement of coding efficiency) is achievable by executing this image decoding process.

<Flow of Inverse Orthogonal Transform Control Process>

Described next with reference to a flowchart of FIG. 31 will be an example of a flow of an inverse orthogonal transform control process executed in step S403 in FIG. 30.

With a start of the inverse orthogonal transform control process, the transform flag decoding section 451 decodes and acquires a transform flag emt_flag included in coded data in step S421. Accordingly, the transform flag emt_flag is extracted from the coded data by this processing.

In step S422, the decoding section 412 decodes the coded data to acquire various coding parameters. These coding parameters include values of syntax elements included in the coded data as well as variables derived from the values of the syntax elements. Specific contents of the coding parameters are not particularly limited but may be any contents. For example, the various parameters described with reference to FIG. 8 are included.

In step S423, the transform pair number setting section 431 sets a selectable number of transform pairs (number of transform pair candidates) NumTrPair on the basis of the coding parameters acquired in step S422.

In step S424, the transform pair number setting section 431 determines whether or not the value of the selectable number of transform pairs NumTrPair set in step S423 is "1." in a case of determination that the value of the selectable number of transform pairs NumTrPair is not "1," the process proceeds to step S425.

In step S425, the transform pair number setting section 431 determines whether or not the value of the selectable number of transform pairs NumTrPair set an step S423 is "2." In a case of determination that the value of the selectable number of transform pairs NumTrPair is not "2," the process proceeds to step S426.

In step S426, the cMax setting section 432 sets a maximum value cMax of the selectable number of transform pairs NumTrPair.

In step S427, the transform index decoding section 452 arithmetically decodes the coded data to acquire a bin string binString.

In step S428, the transform index decoding section 452 derives a transform index emt_idx from the bin string binString on the basis of the maximum value cMax set in step S426 and an inverse process of a designated binarization method (multi-valued method). In other words, the transform index emt_idx is extracted from the coded data by processing in step S427 and step S428.

In step S429, the transform pair index setting section 453 derives (sets) a transform pair index TrPairIdx on the basis of the transform flag emt_flag and the transform index ems_idx extracted from the coded data in step S421 and step S428. For example, this derivation is achieved by the following Expression (34).

[Math. 30]

$$\text{TrPairIdx}=emt\_\text{flag}==0?0:emt\_idx+1 \quad (34)$$

For example, if the transform flag emt_flag is 0, the value of the transform pair index TrPairIdx is set to "0." Moreover, the transform flag emt_flag is not 0, the value of the transform pair index TrPairIdx is set to "transform index emt_idx+1." Needless to say, this calculation method of the transform pair index TrPairIdx is not limited to this example but may be any methods.

After completion of processing in step S429, the process proceeds to step S432. In addition, in a case of determination that the value of the selectable number of transform pairs NumTrPair is "1" in step S424, the process proceeds to step S430. In step S430, the transform pair index setting section 453 sets the value of the transform pair index TrPairIdx to "0." After completion of processing in step S430, the process proceeds to step S432. In addition, in a case of determination that the value of the selectable number of transform pairs NumTrPair is "2" in step S425, the process proceeds to step S431. In step S431, the transform pair index setting section 453 sets the value of the transform pair index TrPairIdx to "1." After completion of processing in step S431, the process proceeds to step S432.

In step S432, the transform type index setting section 435 sets a horizontal transform type index TrTypeH and a vertical transform type index TrTypeV corresponding to the transform pair index TrPairIdx set as described above and prediction mode information (mode) on the basis of an LUT retained by the transform pair LUT 434. For example, this derivation can be expressed by the following Expression (35).

[Math. 31]

$$\text{TrTypeH}=LUT[\text{mode}][\text{TrPairIdx}][H]$$

$$\text{TrTypeV}=LUT[\text{mode}][\text{TrPairIdx}][V] \quad (35)$$

Figure 30:
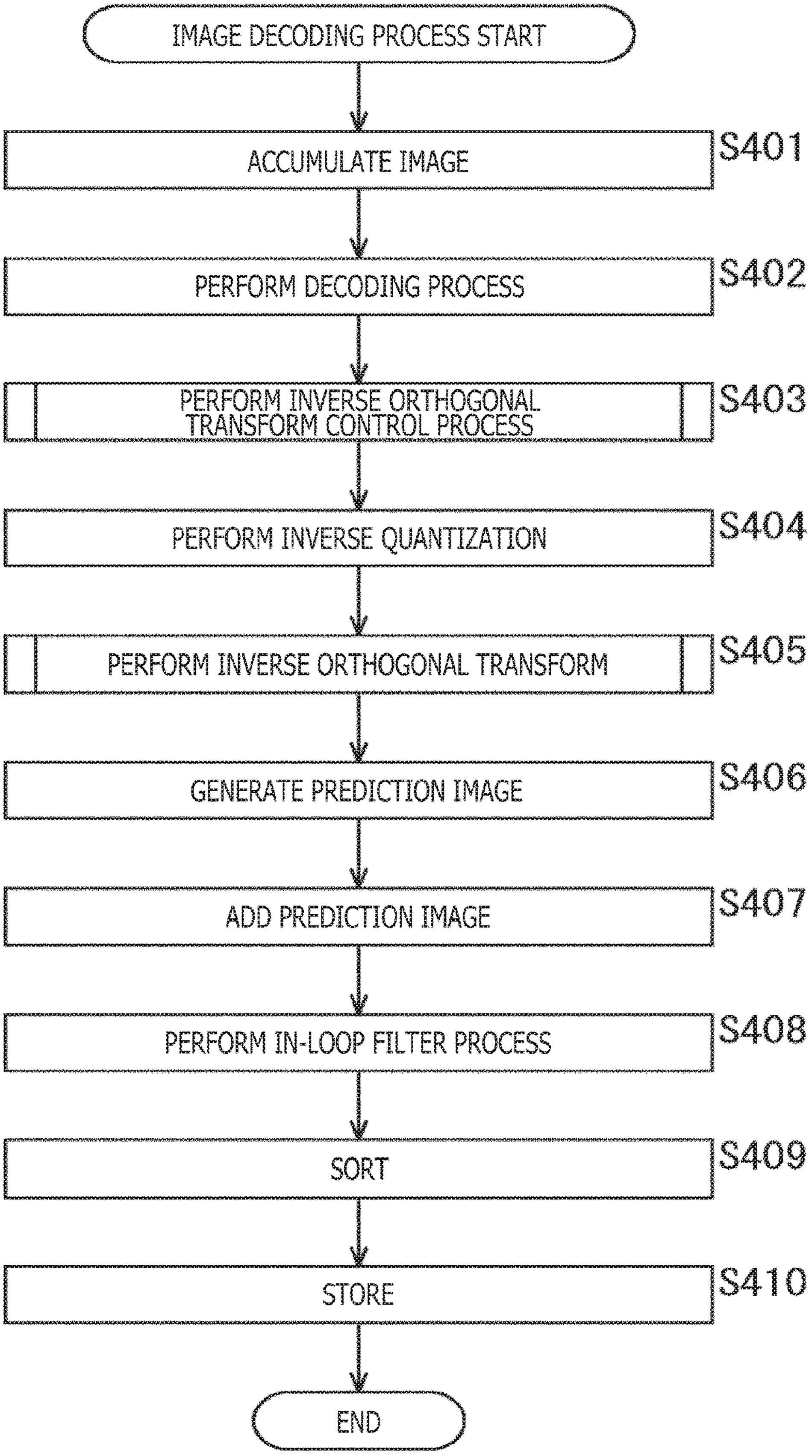
FIG. 30 is a flowchart explaining an example of a flow of an image decoding process.
Figure 31:
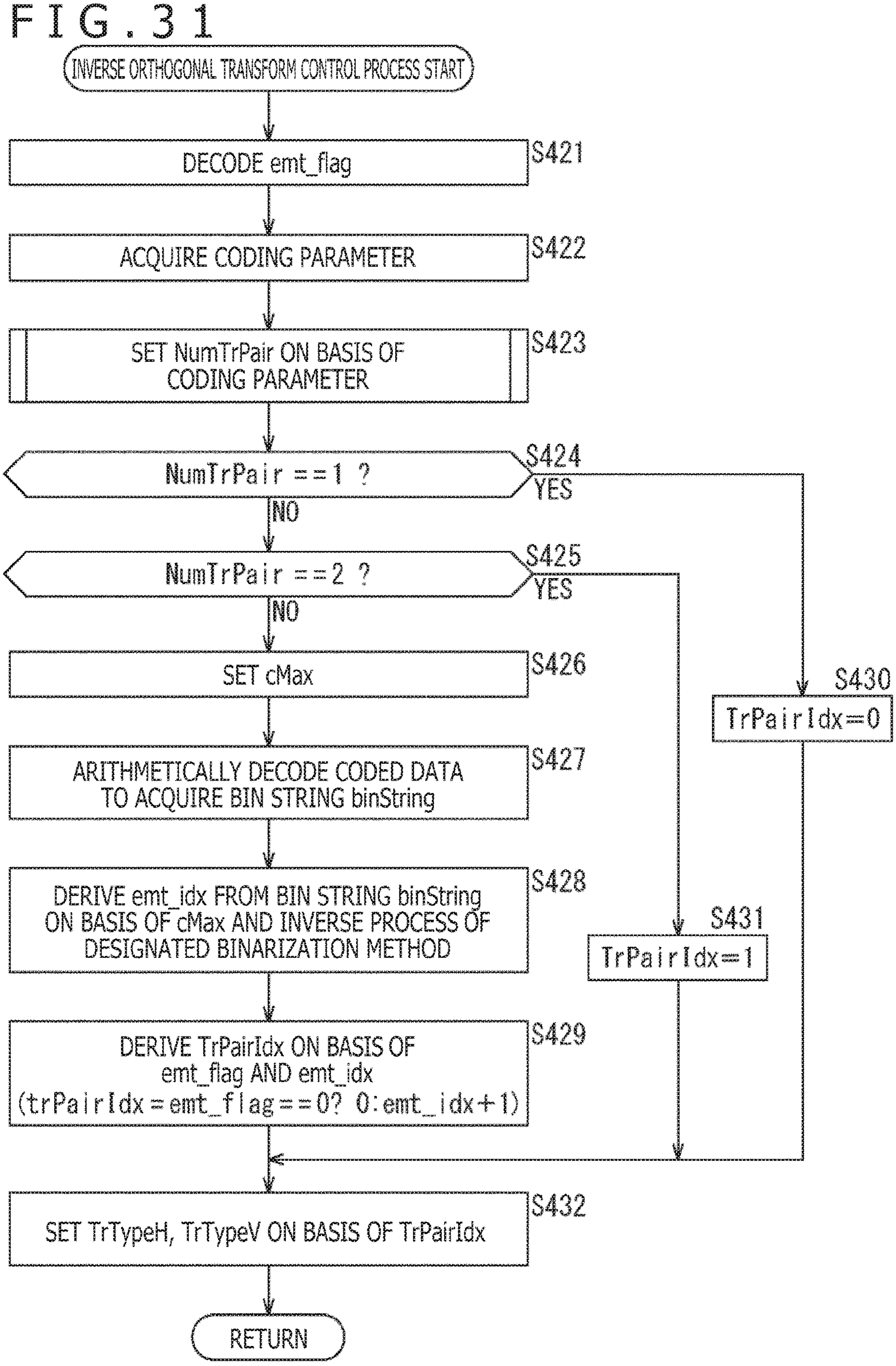
FIG. 31 is a flowchart explaining an example of a flow of an inverse orthogonal transform control process.

After completion of processing in step S432, the inverse orthogonal transform control process ends, and the process returns to FIG. 30.

By controlling the number of transform pair candidates on the basis of the coding parameters in inverse orthogonal transform control in the manner described above, code quantity reduction is more efficiently realizable by a method corresponding to relative code quantities of a residual signal of a processing target block and AMT mode information. Accordingly, reduction of a drop of coding efficiency (improvement of coding efficiency) is achievable.

<Flow of Inverse Orthogonal Transform Process>

Described next with reference to a flowchart of FIG. 32 will be an example of a flow of an inverse orthogonal transform process executed in step S405 in FIG. 30. With a start of the inverse orthogonal transform process, the inverse orthogonal transform section 414 in step S441 determines whether or not a transform skip flag ts_flag is 2D_TS (two-dimensional transform skip mode) (e.g., 1 (true)) or whether or not a transform quantization bypass flag transquant_bypass_flag is 1 (true). In a case of determination that the transform skip identifier ts_idx is 2D_TS or that the transform quantization bypass flag is 1 (true), the inverse orthogonal transform process ends, and the process returns to FIG. 30. In this case, the inverse orthogonal transform process (inverse primary transform and inverse secondary transform) is omitted, and a transform coefficient Coeff_IQ is designated as a prediction residue D'.

In addition, in a case of determination that the transform skip identifier ts_idx is not 2D_TS (mode other than two-dimensional transform skip) (e.g., 0 (false)) and that the transform quantization bypass flag is 0 (false) in step S441, the process proceeds to step S442. In this case, an inverse secondary transform process and an inverse primary transform process are performed.

In step S442, the inverse secondary transform section 461 performs an inverse secondary transform process for a transform coefficient Coeff_IQ on the basis of the secondary transform identifier st_idx to derive and output a transform coefficient Coeff_IS.

In step S443, the inverse primary transform section 462 performs an inverse primary transform process for the transform coefficient Coeff_IS to derive transform coefficients (prediction residue D') after the inverse primary transform.

After completion of processing in step S443, the inverse orthogonal transform process ends, and the process returns to FIG. 30.

<Flow of Inverse Primary Transform Process>

Described next with reference to a flowchart of FIG. 33 will be an example of a flow of the inverse primary transform process executed in step S443 in FIG. 32.

With a start of the inverse primary transform process, the inverse primary vertical transform section 471 of the inverse primary transform section 462 in step S451 performs an inverse primary vertical transform process for a transform coefficient Coeff_IS after an inverse secondary transform to derive transform coefficients after the inverse primary vertical transform.

In step S452, the inverse primary horizontal transform section 472 performs an inverse primary horizontal transform process for the transform coefficients after the inverse primary vertical transform to derive transform coefficients after the inverse primary horizontal transform (i.e., prediction residue D').

Figure 32:
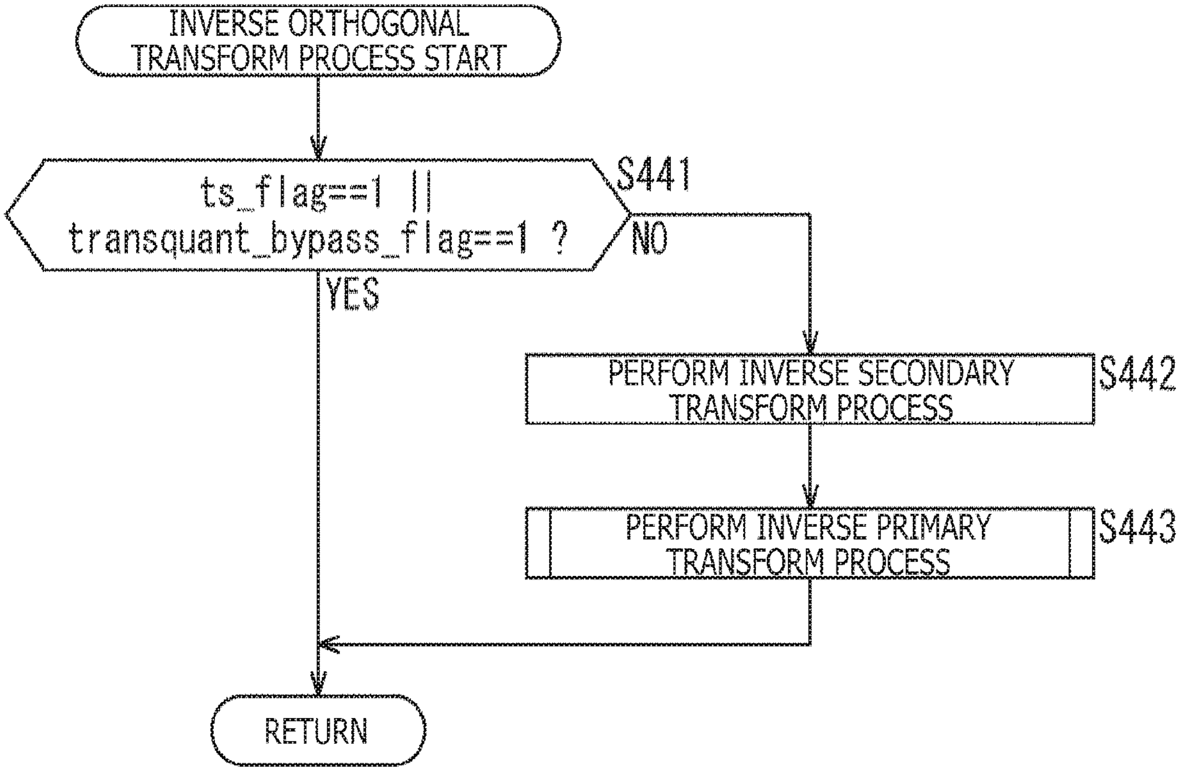
FIG. 32 is a flowchart explaining an example of a flow of an inverse orthogonal transform process.

After completion of processing in step S452, the inverse primary transform process ends, and the process returns to FIG. 32.

<Flow of Inverse Primary Vertical Transform Process>

Described next with reference to a flowchart of FIG. 34 will be an example of a flow of the inverse primary vertical transform process executed in step S451 in FIG. 33.

With a start of the inverse primary vertical transform process, the transform matrix derivation section 481 of the inverse primary vertical transform section 471 in step S461 executes a transform matrix derivation process to derive a transform matrix $T_v$ corresponding to a vertical transform type index TrTypeV.

A flow of the transform matrix derivation process to be performed in this case is similar to the corresponding flow in the case of the primary horizontal transform described with reference to the flowchart of FIG. 21. Accordingly, description of this process is omitted. For example, the description with reference to FIG. 21 is applicable to description for the transform matrix derivation process in this case. For example, the horizontal transform type index TrTypeH is replaced with a vertical transform type index TrTypeV, or the derived transform matrix $T_H$ for primary horizontal transform is replaced with a transform matrix $T_v$ for inverse primary vertical transform.

In step S462, the matrix calculation section 482 performs an inverse one-dimensional orthogonal transform in the vertical direction for input data $X_{in}$ (i.e., transform coefficient Coeff_IS after the inverse secondary transform) using the derived transform matrix T to obtain intermediate data Y1. This process expressed as a determinant can be indicated by Expression (30) described above.

In step S463, the scaling section 483 scales coefficients Y1[i,j] of respective i-by-j components of the intermediate data Y1 derived by processing in step S462 with a shift amount $S_{IV}$ to derive intermediate data Y2. This scaling can be expressed by Expression (31) described above.

In step S464, the clip section 484 clips values of coefficients Y2[i,j] of respective i-by-j components of the intermediate data Y2 derived by processing in step S463 to obtain output data $X_{out}$ (i.e., transform coefficients after the inverse primary vertical transform). This process can be expressed by Expression (12) described above.

Figure 33:
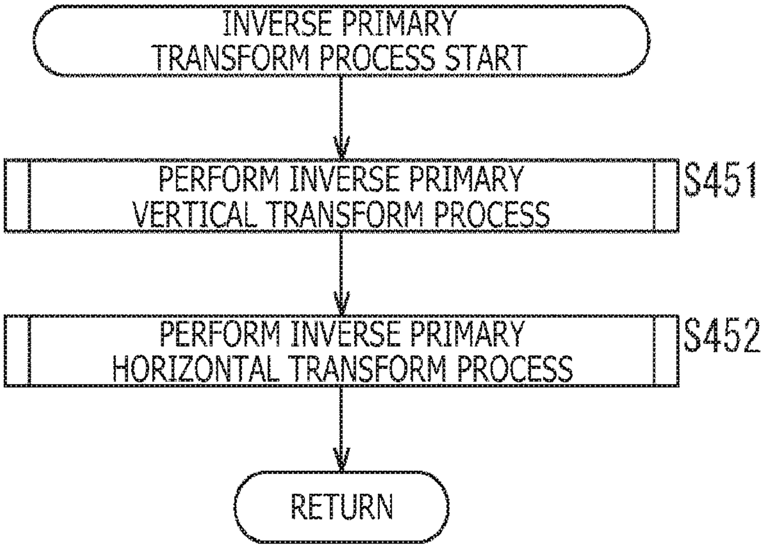
FIG. 33 is a flowchart explaining an example of a flow of an inverse primary transform process.
Figure 34:
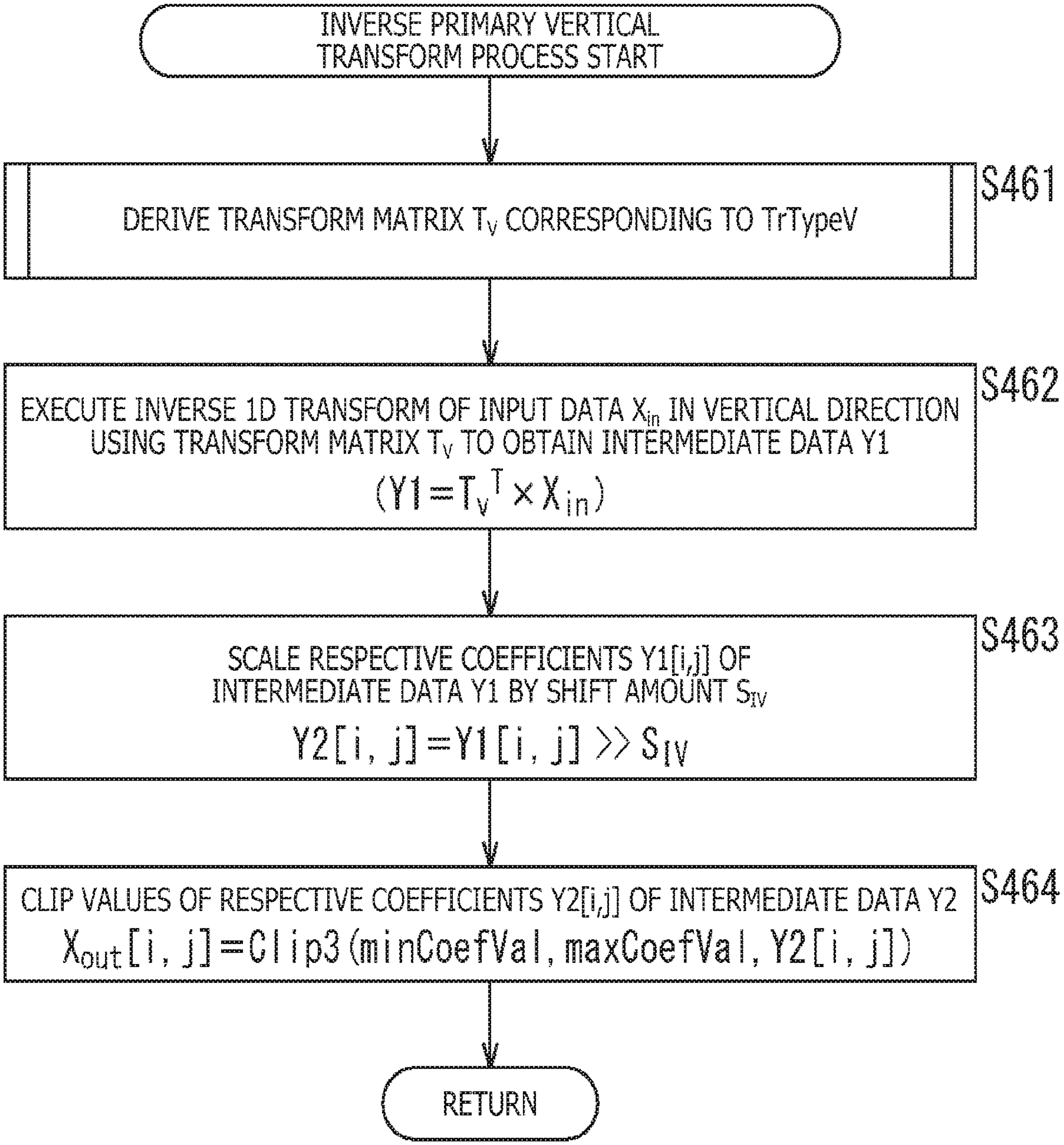
FIG. 34 is a flowchart explaining an example of a flow of an inverse primary vertical transform process.

After completion of processing in step S464, the inverse primary vertical transform process ends, and the Process returns to FIG. 33.

<Flow of Inverse Primary Horizontal Transform Process>

Figure 35:
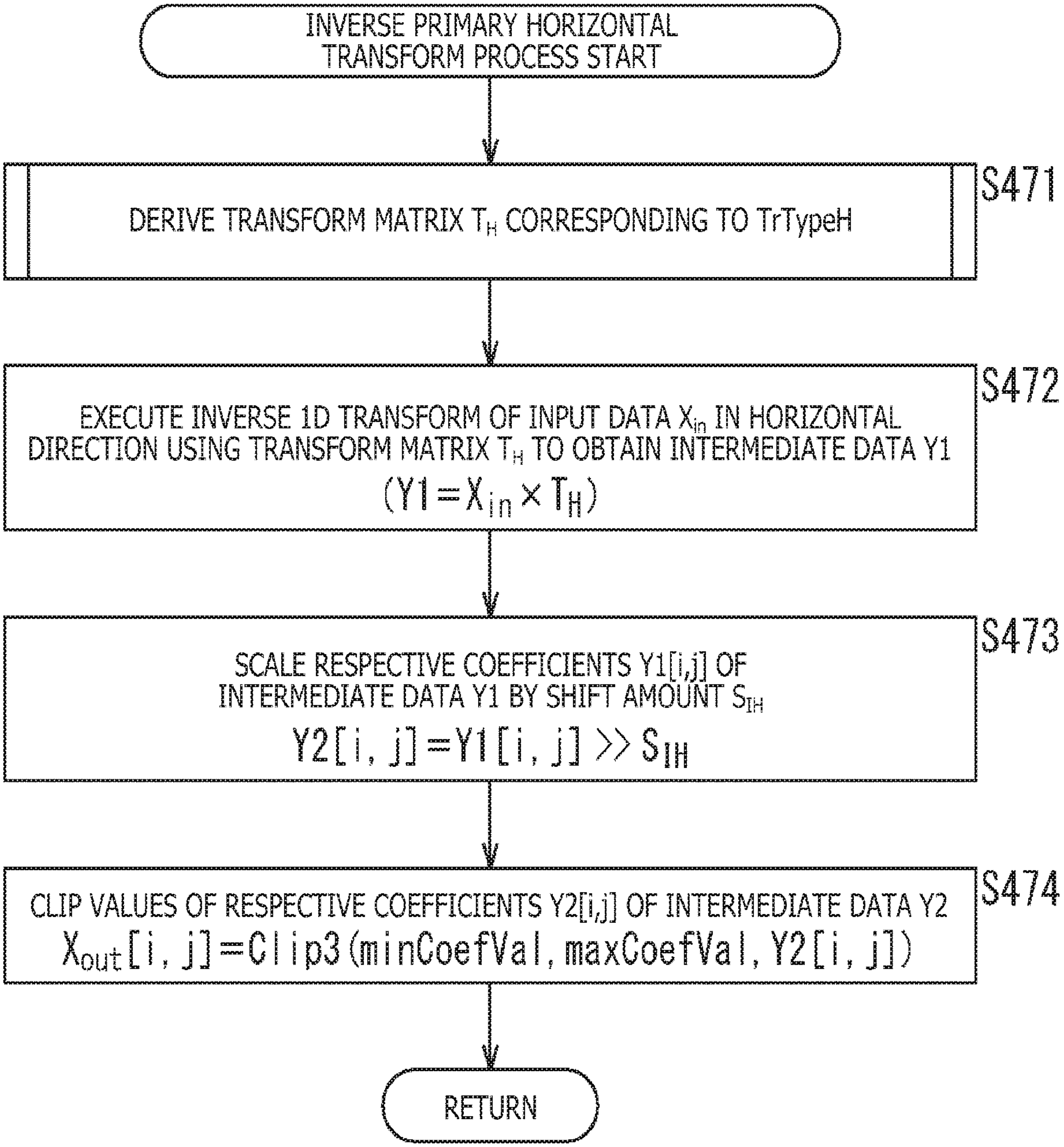
FIG. 35 is a flowchart explaining an example of a flow of an inverse primary horizontal transform process.

Described next with reference to a flowchart of FIG. 35 will be a flow of the inverse primary horizontal transform process executed in step S452 in FIG. 33.

With a start of the inverse primary horizontal transform process, the transform matrix derivation section 501 of the inverse primary horizontal transform section 472 in step S471 executes a transform matrix derivation process to derive a transform matrix $T_H$ corresponding to a horizontal transform type index TrTypeH.

A flow of the transform matrix derivation process to be performed in this case is similar to the corresponding flow in the case of the primary horizontal transform described with reference to the flowchart of FIG. 21. Accordingly, description of this process is omitted. The description with reference to FIG. 21 is applicable to description for the transform matrix derivation process in this case by replacing the primary horizontal transform with an inverse primary horizontal transform, for example.

In step S472, the matrix calculation section 502 performs an inverse one-dimensional orthogonal transform in the horizontal direction for input data $X_{in}$ (i.e., transform coefficients after the inverse primary vertical transform) using the derived transform matrix $T_H$ to obtain intermediate data Y1. This process expressed as a determinant can be indicated by Expression (32) described above.

In step S473, the scaling section 503 scales coefficients Y1[i,j] of respective i-by-j components of the intermediate data Y1 derived by processing in step S472 with a shift amount $S_{IH}$ to derive intermediate data Y2. This scaling can be expressed by Expression (33) described above.

In step S474, the clip section 504 clips values of coefficients Y2[i, j] of respective i-by-j components of the intermediate data Y2 derived by processing in step S473 to obtain output data $X_{out}$ (i.e., prediction residue D'). This process can be expressed by Expression (9) described above.

After completion of processing in step S474, the inverse primary horizontal transform process ends, and the process returns to FIG. 33.

By executing the processes in the manner described above, the image decoding apparatus 400 is capable of more efficiently realizing code quantity reduction by a method corresponding to relative coding quantities of a residual signal of a processing target block and AMT mode information. In other words, reduction of a drop of coding efficiency (improvement of coding efficiency) is achievable.

<2-6. Others>

A selectable number of transform pairs in each of orthogonal transforms and inverse orthogonal transforms is controlled in the manner described above. For example, this control expressed using the table 12 (FIG. 2) is indicated in FIG. 36. In FIG. 36, each of frame lines 531 to 534 indicates a range of selectable transform pairs (transform pair candidates). In other words, as indicated by the frame lines 531 to 534 of FIG. 36, the range of the selectable transform pairs (the number of rows table 12) is variable by the above control.

In other words, a range of allowable values of a transform pair index TrPairIdx (transform flag emt_flag and transform index emt_idx) is variable by the control described above.

For example, each of the transform flag emt_flag and the transform index emt_idx is binarized with a fixed length (FL (Fixed Length binarization)) as indicated in a table 541 in A of FIG. 37. Accordingly, a bit length of the transform flag emt_flag after binarization is fixed (1 bit), while a bit length of the transform index emt_idx after binarization is dependent on a maximum value cMax. In other words, this bit length is dependent on a selectable number of transform pairs NumTrPair (cMax=NumTrPair−2).

Accordingly, in a case of the table 12 of FIG. 36, a code quantity of information associated with the transform pair index (i.e., code quantity of AMT mode information) can be more reduced in a case of candidates in the range surrounded by the frame line 531 than in a case of candidates in the range surrounded by the frame line 534.

However, a code quantity of a residual signal can be generally more reduced as the number of candidates increases. More specifically, a code quantity of a residual signal can be more reduced in the case of candidates in the range surrounded by the frame line 534 than in the case of candidates in the range surrounded by the frame line 531.

In other words, as described above, a code quantity of a residual signal is more efficiently reduced in a block including a larger code quantity of a residual signal than a code quantity of AMT mode information. Conversely, more efficient code quantity reduction is achievable by reducing a code quantity of AMT mode information in a block including a larger code quantity of AMT mode information than a code quantity of a residual signal.

For achieving this control, therefore, each of the image coding apparatus 200 and the image decoding apparatus 400 controls the selectable number of transform pairs NumTrPair on the basis of coding parameters. In this manner, a code quantity of a residual signal can be reduced in a block including a larger code quantity of a residual signal than a code quantity of AMT mode information, while a code quantity of AMT mode information can be reduced in a block including a larger code quantity of AMT mode information than a code quantity of a residual signal. Accordingly, a code quantity can be more efficiently reduced in either of these cases, and reduction of a drop of coding efficiency (improvement of coding efficiency) is achievable.

Note that variable-length truncated rice binarization (TR (Truncated Rice binarization)) may be applied to binarization of the transform index emt_idx as indicated in a table 542 in B of FIG. 37, for example. Also, in this case, a bin bit length after binarization is dependent on a symbol value or a maximum value cMax. For example, if each of a value (prefixVal) of a prefix portion and a rice parameter cRiceParam as a parameter associated with decision of TR bin of the prefix portion is "0" at the time of binarization of syntax, TR coincides with truncated urinary binarization where a value of a symbol and a bit length coincide with each other. Accordingly, the bin bit length is dependent on the value of the symbol.

Also, in this case, therefore, each of the image coding apparatus 200 and the image decoding apparatus 400 controls the selectable number of transform pairs NumTrPair on the basis of the coding parameters similarly to the case of fixed-length binarization. Accordingly, the code quantity more efficiently decreases, and reduction of a drop of coding efficiency (improvement of coding efficiency) is achievable.

Note that described above is a case of coding and decoding performed using transform pair identification information (information associated with transform pair index irPairIdx) divided into transform flag emt_flag and transform index emt_idx. In this case, the transform flag emt_flag constitutes a 1-bit prefix portion indicating whether or not to select a transform pair having an index (transform pair index TrPairIdx)==0, while the transform index emt_idx constitutes a suffix portion designating a transform pair other than a pair having an index (transform pair index TrPairIdx)==0.

The transform pair identification information may indicate any manners of coding and decoding. Coding and decoding may be performed using an index (transform pair index TrPairIdx) as one syntax element without division into the prefix portion and the suffix portion as described above. In this case, the maximum value cMax becomes "(the number of transform pairs counted from index==0)−1" decided by current coding parameters in the transform pair candidate table (table 12).

Moreover, the transform pair index TrPairIdx (particularly transform index emt_idx) may have a variable length in multivalued data before binarization.

For example, in a case of candidates in the range surrounded by the frame line 531 in the example of the table 12 of FIG. 36 (assuming transform flag emt_flag==1), the transform index emt_idx is fixed to "0" and therefore may be set to 0 bits. Moreover, in a case of candidates in the range surrounded by the frame line 532, the transform index emt_idx is "0" or "1" and therefore needs one bit. Furthermore, in a case of candidates in the range surrounded by the frame line 533, the transform index emt_idx is any one of "0" to "3" and therefore is required to be two bits. In addition, in a case of candidates in the range surrounded by the frame line 534, the transform index emt_idx is any one of "0" to "7" and therefore needs three bits.

In this manner, the bit number required by the transform index emt_idx increases as the number of transform pair candidates increases. Specifically, the bit number required by the transform index emt_idx needs to be set while considering the maximum number of transform pair candidates. In other words, however, the bit number required by the transform index emt_idx decreases as the number of transform pair candidates decreases. That is, when the bit number required by the transform index emt_idx is set so as to correspond to the maximum number of transform pair candidates, the bit number of the transform index emt_idx needlessly increases (information volume needlessly increases) in a case of a small number of transform pair candidates.

Accordingly, this needless increase in the information volume can be reduced by varying the length of the multivalued data of the transform index emt_idx and setting a bit length corresponding to coding parameters. As a result, reduction of a drop of coding efficiency (improvement of coding efficiency) is achievable.

In this case, for example, it is sufficient if the transform index decoding section 452 (FIG. 24) parses and extracts the transform index emt_idx of coded data with a bit length corresponding to the coding parameters after the transform index setting section 253 (FIG. 10) sets the bit length of the transform index emt_idx according to the coding parameters.

3. First Embodiment

<Method #1>

Subsequently, examples of coding parameters used for the above control will be described. The method #1 of the table 151 of FIG. 8 will be herein described. In a case of the method #1, coding parameters include a value of a syntax element associated with a component type (for example, component ID (componentID)), for example. The number of candidates of an orthogonal transform (inverse orthogonal transform type is controlled according to whether a processing target of an orthogonal transform. (inverse orthogonal transform) is a luminance signal or a chromatic signal.

For example, control indicated in a table 601 of FIG. 38 may be adopted. In a case of transform flag emt_flag==0, for example, the selectable number of transform pairs NumTrPair is set to "1." Moreover, in a case of transform flag emt_flag==1 in a state where the number of non-zero coefficients numSIG is a predetermined threshold TH1 or smaller (numSIG<=TH1), the selectable number of transform pairs NumTrPair is set to "2."

Furthermore, in a case of transform flag emt_flag==1 in a state where the number of non-zero coefficients numSIG is larger than the predetermined threshold TH1 (numSIG>TH1) with a luminance signal (componentID==0) selected, the selectable number of transform pairs NumirPair is set to "N1." In addition, in a case of transform flag emt_flag==1 in a state where the number of non-zero coefficients numSIG is larger than the predetermined threshold. TH1 (numSIG>TH1) with a chromatic signal (componentID>0) selected, the selectable number of transform pairs NumTrPair is set to "N2" (N1>=N2).

For example, TN1=2, N1=9, and N2=3 may be adopted. In this case, allowable values of the transform index emt_idx lie in a range from "0" to "7" for the luminance signal and in a range of "0" and "1" for the chromatic signal. In other words, in the case of the chromatic signal, the number of candidates of the orthogonal transform (inverse orthogonal transform) type can be made smaller than that number in the case of the luminance signal. Accordingly, a code quantity can decrease more efficiently, and reduction of a drop of coding efficiency (improvement of coding efficiency) is achievable.

<Flow of Transform Pair Number Setting Process>

Figure 39:
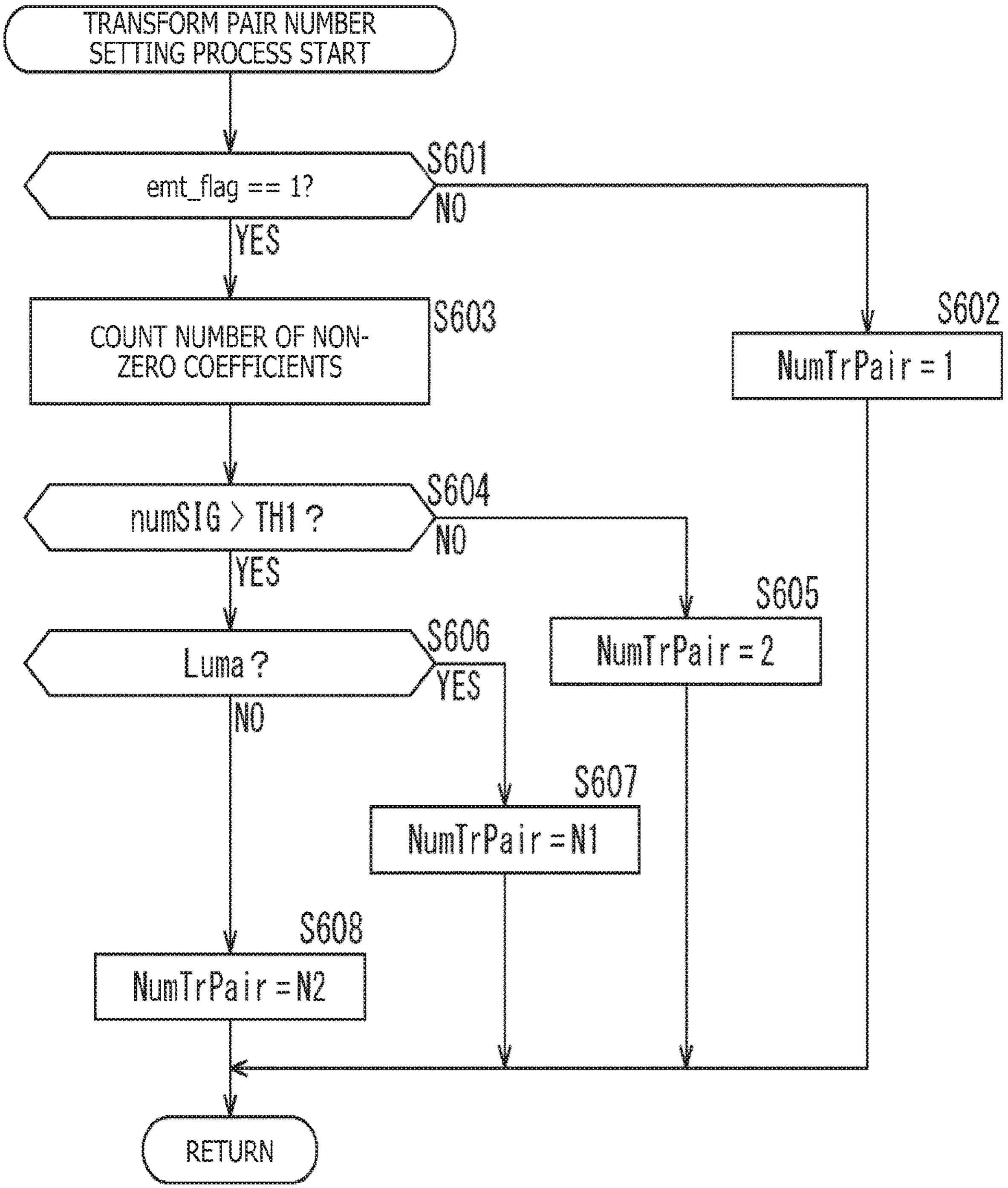
FIG. 39 is a flowchart explaining an example of a flow of a transform pair number setting process.

Described with reference to a flowchart of FIG. 39 will be an example of a flow of a transform pair number setting process executed in step S231 in FIG. 17 in this case.

With a start of the transform pair number setting process, the transform pair number setting section 241 determines whether or not to set a value of a transform flag emt_flag to "1" in step S601. In a case of determination that the value of the transform flag emt_flag is set to "0," the process proceeds to step S602.

In step S602, the transform pair number setting section 241 sets the number of transform pair candidates NumTrPair to "1" (NumTrPai=1). After completion of processing in step S602, the transform pair number setting process ends, and the process returns to FIG. 17.

Moreover, in a case of determination that the value of the transform flag emt_flag is set to "1" in step S601, the process proceeds to step S603.

In step S603, the transform pair number setting section 241 counts non-zero coefficients of a processing target block to derive the number of non-zero coefficients numSIG.

In step S604, the transform pair number setting section 241 determines whether or not the number of non-zero coefficients numSIG is larger than a predetermined threshold TH1. In a case of determination that the number of non-zero coefficients numSIG is the predetermined threshold TH1 or smaller (numSIG<=TH1), the process proceeds to step S605.

In step S605, the transform pair number setting section 241 sets the number of transform pair candidates NumTrPair to "2" (NumTrPair=). After completion of processing in step S605, the transform pair number setting process ends, and the process returns to FIG. 17.

Moreover, in a case of determination that the number of non-zero coefficients numSIG is larger than the predetermined threshold TH1 (numSIG>TH1) in step S604, the process proceeds to step S606.

In step S606, the transform pair number setting section 241 refers to a component ID and determines whether or not a processing target is a luminance signal. In a case of determination that the processing target is a luminance signal (Loma) (componentID==0), the process proceeds to step S607.

In step S607, the transform pair number setting section 241 sets the number of transform pair candidates NumTrPair to a predetermined value "N1" (NumTrPair=N1). After completion of processing in step S607, the transform pair number setting process ends, and the process returns to FIG. 17.

In addition, in a case of determination that the processing target is a chromatic signal (Chroma) (componentID>0) in step S606, the process proceeds to step S608.

In step S608, the transform pair number setting section 241 sets the number of transform pair candidates NuTrPair to a predetermined value "N2" (N1>N2) (NumTrPair=N2). After completion of processing in step S608, the transform pair number setting process ends, and the process returns to FIG. 17.

By performing the above process, the number of transform pair candidates can be controlled according to whether the processing target is a luminance signal or a chromatic signal. Accordingly, a code quantity can decrease more efficiently, and therefore, reduction of a drop of coding efficiency (improvement of coding efficiency) is achievable.

Rote that it is sufficient if the transform pair number setting process is performed in a similar manner in a case of decoding (case of control of inverse orthogonal transforms). More specifically, it is sufficient if the transform pair number setting process is performed in a similar manner also in step S423 of FIG. 31. In this case, the above description is applicable by replacing the transform pair number setting section 241 with the transform pair number setting section 431 for executing the process.

4. Second Embodiment

<Method #2>

A method #2 of the table 151 of FIG. 8 will be subsequently described. In a case of the method #2, coding parameters include a value of a syntax element associated with a prediction mode, for example.

<4-1. Method #2-1>

Moreover, in the case of #2-1 of the table 151 of FIG. 8, the number of candidates of an orthogonal transform (inverse orthogonal transform) type is controlled according to whether a prediction mode of a processing target block of the orthogonal transform (inverse orthogonal transform) is intra prediction (for example, intra CU) or inter prediction (for example, inter CU).

For example, control indicated in a table 611 in A of FIG. 40 may be adopted. In a case of transform flag emt_flag==0, for example, a selectable number of transform pairs NumirPair is set to "1." Moreover, in a case of transform flag emt_flag==1 in a state where the number of non-zero coefficients numSIG is a predetermined threshold TH1 or smaller (numSIG<=TH1), the selectable number of transform pairs NumTrPair is set to "2."

Furthermore, in a case of transform flag emt_flag==1 in a state where the number of non-zero coefficients numSIG is larger than the predetermined threshold TH1 (numSIG>TH1) with intra prediction (Intra) selected as a prediction mode, the selectable number of transform pairs NumTrPair is set to "N1." Furthermore, in a case of transform flag emt_flag==1 in a state where the number of non-zero coefficients numSIG is larger than the predetermined threshold TH1 (numSIG>TH1) with inter prediction (Inter) selected as a prediction mode, the selectable number of transform pairs NumTrPair is set to "N2" (N1>=N2).

For example, TH1=2, N1=9, and N2=5 may be adopted. In this case, allowable values of the transform index emtidx_idx in a range from "0" to "7" for intra prediction, and in a range of "0" and "1" for inter prediction. In other words, in the case of inter prediction, the number of candidates of the orthogonal transform (inverse orthogonal transform) type can be set to the number smaller than that number in the case of intra prediction. Accordingly, a code quantity can decrease more efficiently, and reduction of a drop of coding efficiency (improvement of coding efficiency) is achievable.

<Flow of Transform Pair Number Setting Process>

Figure 41:
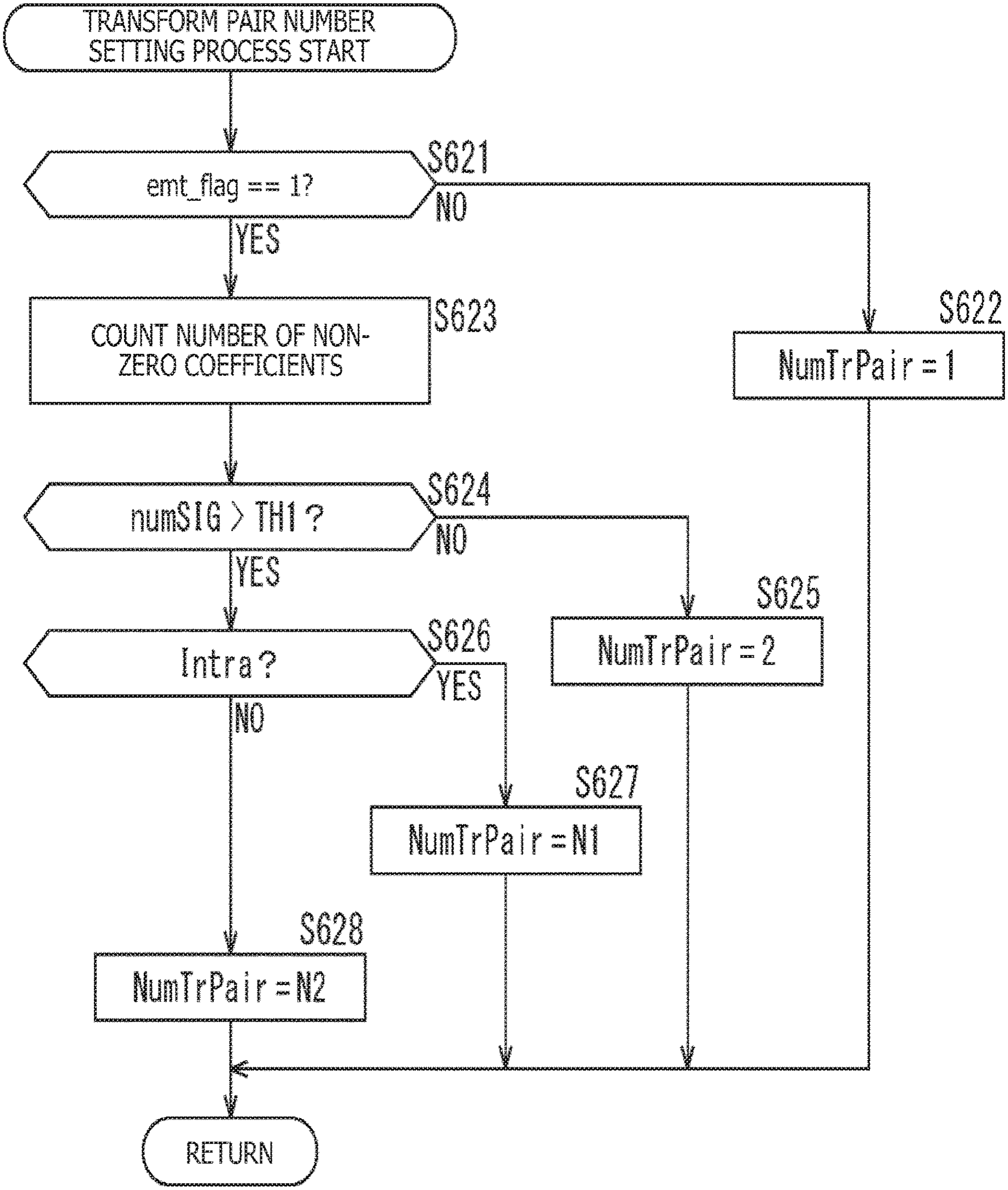
FIG. 41 is a flowchart explaining an example of a flow of a transform pair number setting process.

Described with reference to a flowchart of FIG. 41 will be an example of a flow of a transform pair number setting process executed in step S231 in FIG. 17 in this case.

With a start of the transform pair number setting process, the transform pair number setting section 241 determines whether or not to set a value of a transform flag emt_flag to "1" in step S621. In a case of determination that the value of the transform flag emt_flag is set to "0," the process proceeds to step S622.

In step S622, the transform pair number setting section 241 sets the number of transform pair candidates NumTrPair to "1" (NumTrPair=1). After completion of processing in step S622, the transform pair number setting process ends, and the process returns to FIG. 17.

Moreover, in a case of determination that the value of the transform flag emt_flag is set to "1" in step S621, the process proceeds to step S623.

In step S623, the transform pair number setting section 241 counts non-zero coefficients of a processing target block to derive the number of non-zero coefficients numSIG.

In step S624, the transform pair number setting section 241 determines whether or not the number of non-zero coefficients numSIG is larger than a predetermined threshold TH1. In a case of determination that the number of non-zero coefficients numSIG is the predetermined threshold TH1 or smaller (numSIG<=TH1), the process proceeds to step S625.

In step S625, the transform pair number setting section 241 sets the number of transform pair candidates NumTrPair to "2" (NumTrPair=2). After completion of processing in step S625, the transform pair number setting process ends, and the process returns to FIG. 17.

Moreover, in a case of determination that the number of non-zero coefficients numSIG is larger than the predetermined threshold TH1 (numSIG>TH1) in step S624, the process proceeds to step S626.

In step S626, the transform pair number setting section 241 determines whether or not a prediction mode of a processing target is intra prediction (intra). In a case of determination that the prediction mode of the processing target is intra prediction (Intra), the process proceeds to step S5627.

In step S627, the transform pair number setting section 241 sets the number of transform pair candidates NumirPair to a predetermined value "N1" (NumIrPair=N1). After completion of processing in step S627, the transform pair number setting process ends, and the process returns to FIG. 17.

Moreover, in a case of determination that the prediction mode of the processing target is inter prediction. (Inter) in step S626, the process proceeds to step S628.

In step S628, the transform pair number setting section 241 sets the number of transform pair candidates NumTrPair to a predetermined value "N2" (N1>=N2) (NumirPair=N2). After completion of processing in step S628, the transform pair number setting process ends, and the process returns to FIG. 17.

By performing the above process, the number of transform pair candidates can be controlled according to whether the prediction mode of the processing target is intra prediction or inter prediction. Accordingly, a code quantity can decrease more efficiently, and therefore, reduction of a drop of coding efficiency (improvement of coding efficiency) is achievable.

Note that it is sufficient if the transform pair number setting process is performed in a similar manner also in a case of decoding (case of control of inverse orthogonal transforms). More specifically, it is sufficient if the transform pair number setting process is performed in a similar manner also in step S423 of FIG. 31. In this case, the above description is applicable by replacing the transform pair number setting section 241 with the transform pair number setting section 431 for executing the process.

<Modifications>

Note that selection of intra prediction or inter prediction as a prediction mode of a processing target may be made prior to the number of non-zero coefficients as indicated in a table 612 in B of FIG. 40. In other words, these determinations may be made in any order.

<4-2. Method #2-2>

Moreover, in the case of the method #2-2 of the table 151 of FIG. 8, the number of candidates of an orthogonal transform (inverse orthogonal transform) type is controlled according to whether a prediction direction is forward prediction or bi-prediction in a case where a prediction mode of a processing target of an orthogonal transform. (inverse orthogonal transform) is inter prediction (for example, inter CU).

For example, control indicated in a table 621 of FIG. 42 may be adopted. In a case of transform flag emt_flag==0, for example, a selectable number of transform pairs NumTrPair is set to "1." Moreover, in a case of transform flag emt_flag==1 in a state where the number of non-zero coefficients numSIG is a predetermined threshold TH1 or smaller (numSIG<=TH1), the selectable number of transform pairs NumTrPair is set to "2."

Furthermore, in a case of transform flag emt_flag==1 in a state where the number of non-zero coefficients numSIG is larger than the predetermined threshold TH1 (numSIG>TH1) with intra prediction (Intra) selected as a prediction mode, the selectable number of transform pairs NumTrPair is set to "N1." Furthermore, in a case of transform flag emt_flag==1 in a state where the number of non-zero coefficients numSIG is larger than the predetermined threshold TH1 (numSIG>TH1) with inter prediction (Inter) selected as a prediction mode and in a state of forward prediction, the selectable number of transform pairs NumTrPair is set to "N2" (N1>=N2). Furthermore, in a case of transform flag ems_flag==1 in a state where the number of non-zero coefficients numSIG is larger than the predetermined threshold TH1 (numSIG>TH1) with inter prediction (Inter) selected as a prediction mode and in a state of bi-prediction, the selectable number of transform pairs NumTrPair is set to "N3" (N2>=N3).

For example, TH1=2, N1=16, N2=9, and N3=3 may be adopted. In this case, allowable values of the transform index emt_idx lie in a range from "0" to "14" for intra prediction, in a range from "0" to "7" for forward prediction of inter prediction and in a range of "0" and "1" for bi-prediction of inter prediction in other words, in the case of bi-prediction, the number of candidates of the orthogonal transform (inverse orthogonal transform) type can be set to the number smaller than that number in the case of forward prediction. Accordingly, a code quantity can decrease more efficiently, and reduction of a drop of coding efficiency (improvement of coding efficiency) is achievable.

<Flow of Transform Pair Number Setting Process>

Figure 43:
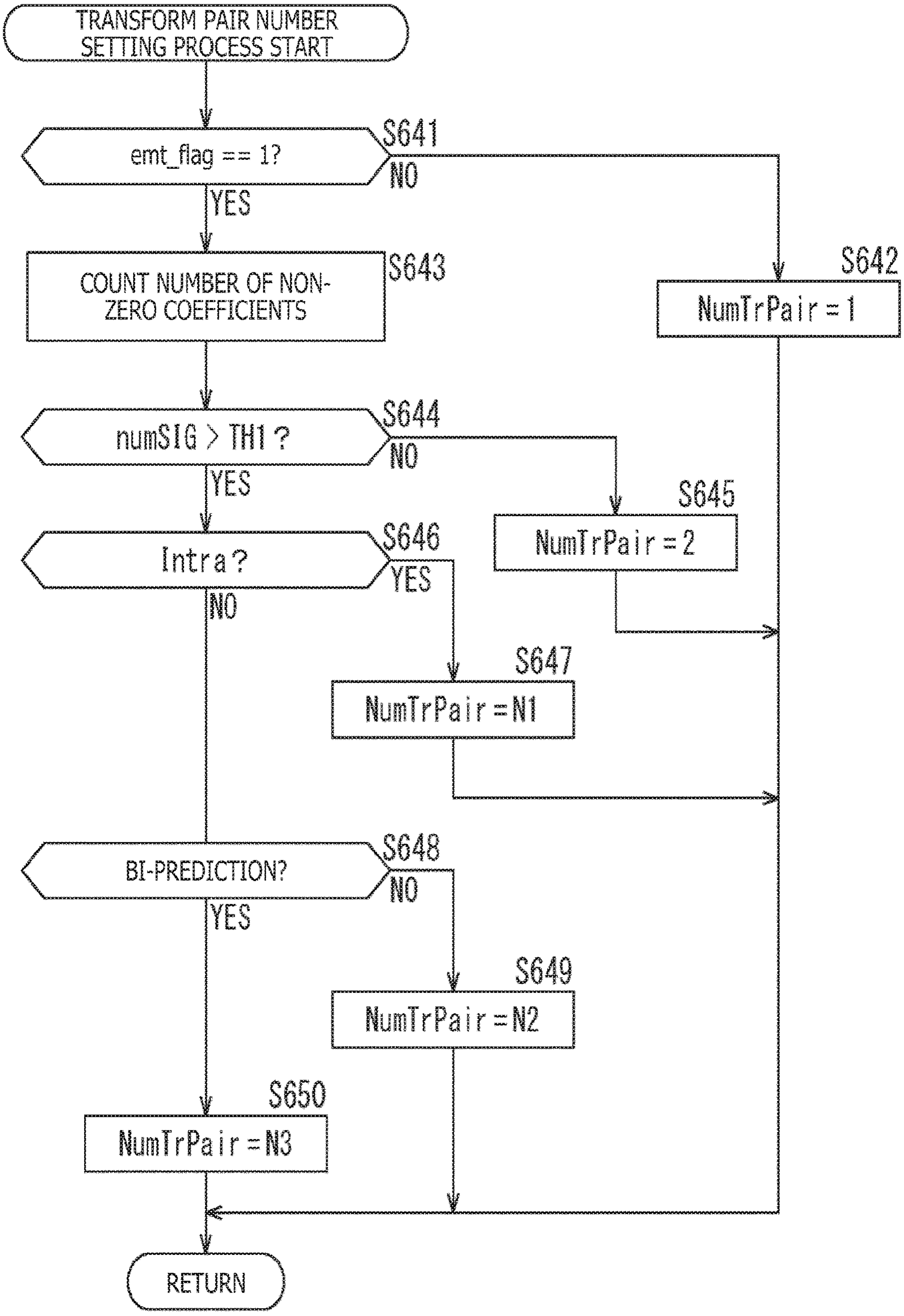
FIG. 43 is a flowchart explaining an example of a flow of a transform pair number setting process.

Described with reference to a flowchart of FIG. 43 will be an example of flow of a transform pair number setting process executed in step S231 in FIG. 17 in this case.

With a start of the transform pair number setting process, the transform pair number setting section 241 determines whether or not to set a value of a transform flag emt_flag to "1" in step S641. In a case of determination that the value of the transform flag emt_flag is set to "0," the process proceeds to step S642.

In step S642, the transform pair number setting section 241 sets the number of transform pair candidates NumTrPair to "1" (NumTrPair=1). After completion of processing in step S642, the transform pair number setting process ends, and the process returns to FIG. 17.

Moreover, in a case of determination that the value of the transform flag emt_flag is set to "1" in step S641, the process proceeds to step S643.

In step S643, the transform pair number setting section 241 counts non-zero coefficients of a processing target block to derive the number of non-zero coefficients numSIG.

In step S644, the transform pair number setting section 241 determines whether or not the number of non-zero coefficients numSIG is larger than a predetermined threshold TH1. In a case of determination that the number of non-zero coefficients numSIG is the predetermined threshold TH1 or smaller (numSIG<=TH1), the process proceeds to step S645.

In step S645, the transform pair number setting section 241 sets the number of transform pair candidates NumTrPair to "2" (NumTrPair=2). After completion of processing in step S645, the transform pair number setting process ends, and the process returns to FIG. 17.

Moreover, in a case of determination that the number of non-zero coefficients numSIG is larger than the predetermined threshold TH1 (numSIG>TH1) in step S644, the process proceeds to step S646.

In step S646, the transform pair number setting section 241 determines whether or not a prediction mode of a processing target is intra prediction. In a case of determination that the prediction mode of the processing target is intra prediction (intra), the process proceeds to step S647.

In step S647, the transform pair number setting section 241 sets the number of transform pair candidates NumTrPair to a predetermined value "N1" (NumIrPair=N1). After completion of processing in step S647, the transform pair number setting process ends, and the Process returns to FIG. 17.

Moreover, in a case of determination that the prediction mode of the processing target is inter prediction (Inter) in step S646, the process proceeds to step S648.

In step S648, the transform pair number setting section 241 determines whether or not a prediction direction is bi-prediction. In a case of determination that the prediction direction is forward prediction, the process proceeds to step S649.

In step S649, the transform pair number setting section 241 sets the number of transform pair candidates NumTrPair to a predetermined value "N2" (N1>=N2) (NumTrPair=N2). After completion of processing in step S649, the transform pair number setting process ends, and the process returns to FIG. 17.

Moreover, in a case of determination that the prediction direction is bi-prediction in step S648, the process proceeds to step S650.

In step S650, the transform pair number setting section 241 sets the number of transform pair candidates NumTrPair to a predetermined value "N3" (N2>=N3) (NumTrPair=N3). After completion of processing in step S650, the transform pair number setting process ends, and the process returns to FIG. 17.

By performing the above process, the number of transform pair candidates can be controlled according to selection of bi-prediction or forward prediction. Accordingly, a code quantity can decrease more efficiently, and therefore, reduction of a drop of coding efficiency (improvement of coding efficiency) is achievable.

Note that it is sufficient the transform pair number setting process is performed in a similar manner also in a case of decoding (case of control of inverse orthogonal transforms). More specifically, it is sufficient if the transform pair number setting process is performed in a similar manner also in step S423 of FIG. 31. In this case, the above description is applicable by replacing the transform pair number setting section 241 with the transform pair number setting section 431 for executing the process.

<4-3. Method #2-3>

Moreover, control similar to the control of the method. #2-1 is performed also in a case of the method #2-3 in the table 151 of FIG. 8. More specifically, the number of candidates of an orthogonal transform (inverse orthogonal transform) type is controlled according to whether a prediction mode of a processing target block of an orthogonal transform (inverse orthogonal transform) is a predetermined mode. For example, in a case where the prediction mode of the processing target block of the orthogonal transform (inverse orthogonal transform) is a predetermined mode, the number of candidates of an orthogonal transform (inverse orthogonal transform) type is set to the number smaller than that number in other modes.

More specifically, in a case where the prediction mode of the processing target block of the orthogonal transform. (inverse orthogonal transform) is LMChroma which linearly predicts a chromatic signal from a reconfigured luminance signal, the number of candidates of the orthogonal transform (inverse orthogonal transform) type is set to the number smaller than that number in other modes.

Since a manner of control in this case and a flow of the transform pair number setting process are similar to those of the method #2-1, the description thereof is omitted.

5. Third Embodiment

<Method #3>

The method #3 of the table 151 of FIG. 8 will be subsequently described. In a case of the method 83, coding parameters include a value of a syntax element associated with a block size of a processing target of an orthogonal transform (inverse orthogonal transform), for example. The number of candidates of an orthogonal transform (inverse orthogonal transform) type is controlled according to the block size of the processing target of the orthogonal transform (inverse orthogonal transform).

For example, control indicated in a table 631 of FIG. 44 may be adopted. In a case of transform flag emt_flag==0, for example, the selectable number of transform pairs NumTrPair is set to "1." Moreover, in a case of transform flag emt_flag==1 in a state where the number of non-zero coefficients numSIG is a predetermined threshold TH1 or smaller (numSIG<=TH1), the selectable number of transform pairs NumIrPair is set to "2."

Furthermore, in a case of transform flag emt_flag==1 in a state where the number of non-zero coefficients nu SIG is larger than the predetermined threshold TH1 (numSIG>TH1) with a block size (size) set to a predetermined threshold TH2 or smaller (size<=TH2), the selectable number of transform pairs NumirPair is set to "N3." In addition, in a case of transform flag emt_flag==1 in a state where the number of non-zero coefficients numSIG is larger than the predetermined threshold TH1 (numSIG>TH1) with the block size (size) set to a size larger than the predetermined threshold TH2 and equal to or smaller than a predetermined threshold TH3 (TH2<size<=TH3), the selectable number of transform pairs NumTrPair is set to "N2" (N2>=N3). Moreover, in a case of transform flag emt_flag==1 in a state where the number of non-zero coefficients numSIG is larger than the predetermined threshold. TH1 (numSIG>TH1) with a block size (size) larger than the predetermined threshold TH3 (size>TH3), the selectable number of transform pairs NumTrPair is set to "N1" (N1>=N2).

For example, TH1=2, TH2=32, TH3=256, N1=16, N2=9, and N3=3 may be adopted. In this case, allowable values of the transform index emt_idx lie in a range of "0" and "1" for the small block size (<=TH2), in a range from "0" to "7" for the middle block size (>TH2 &&<=TH3), and in a range from "0" to "14" for the large block size (>TH3). In other words, the number of candidates of the orthogonal transform (inverse orthogonal transform) type can be set to a smaller number as the block size decreases. Accordingly, a code quantity can decrease more efficiently, and reduction of a drop of coding efficiency (improvement of coding efficiency) is achievable.

<Flow of Transform Pair Number Setting Process>

Figure 45:
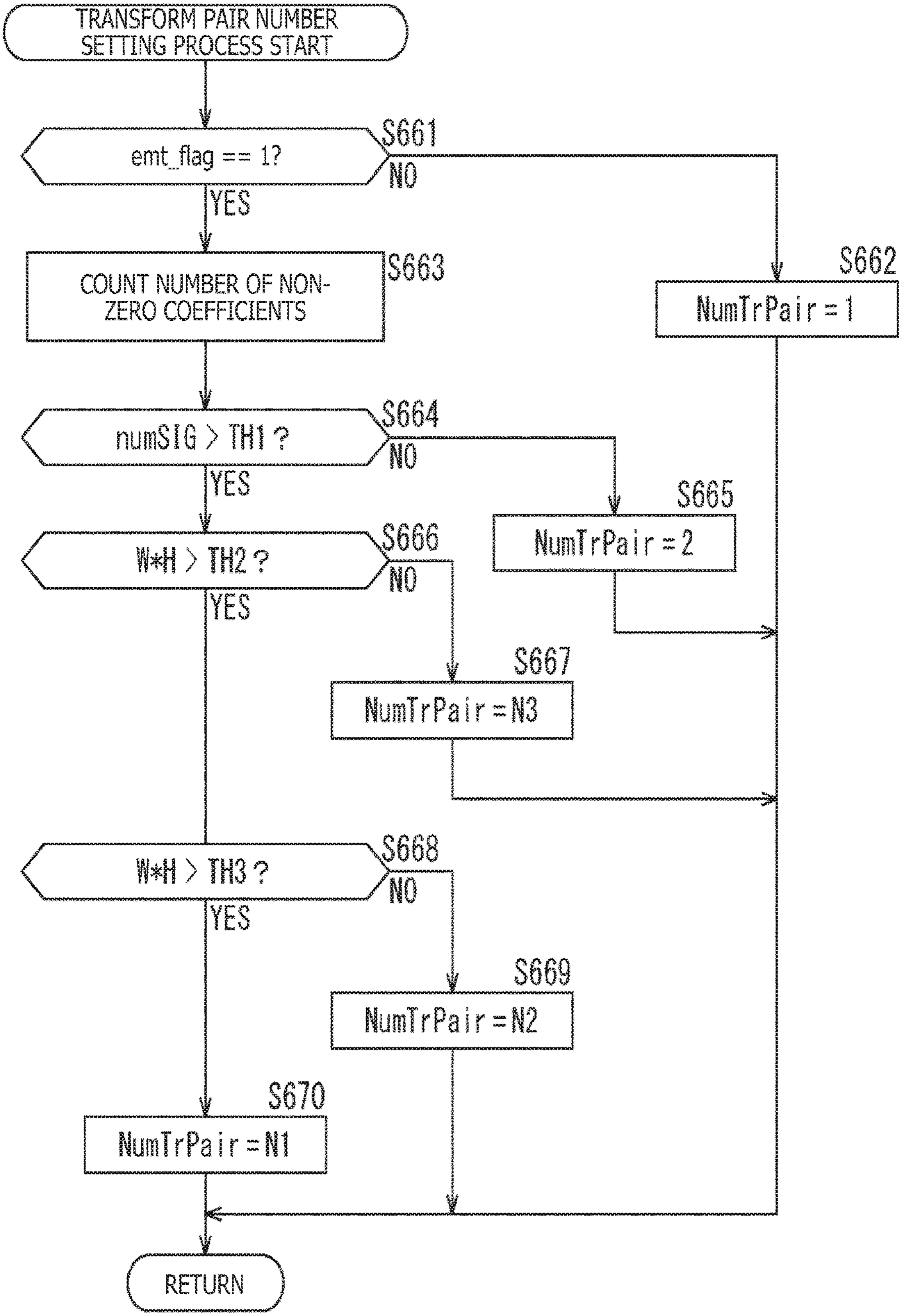
FIG. 45 is a flowchart explaining an example of a flow of a transform pair number setting process.

Described with reference to a flowchart of FIG. 45 will be an example of a flow of a transform pair number setting process executed in step S231 in FIG. 17 in this case.

With a start of the transform pair number setting process, the transform pair number setting section 241 determines whether or not to set a value of a transform flag emt_flag to "1" in step S661. In a case of determination that the value of the transform flag emt_flag is set to "0," the process proceeds to step S662.

In step S662, the transform pair number setting section 241 sets the number of transform pair candidates NumTrPair to "1" (NumirPair=1). After completion of processing in step S662, the transform pair number setting process ends, and the process returns to FIG. 17.

Moreover, in a case of determination that the value of the transform flag emt_flag is set to "1" in step S661, the process proceeds to step S663.

In step S663, the transform pair number setting section 241 counts non-zero coefficients of a processing target block to derive the number of non-zero coefficients numSIG.

In step S664, the transform pair number setting section 241 determines whether or not the number of non-zero coefficients numSIG is larger than a predetermined threshold TH1. In a case of determination that the number of non-zero coefficients numSIG is the predetermined threshold TH1 or smaller (numSIG<=TH1), the process proceeds to step S665.

In step S665, the transform pair number setting section 241 sets the number of transform pair candidates NumTrPair to "2" (NuTrPair=2). After completion of processing in step S665, the transform pair number setting process ends, and the process returns to FIG. 17.

Moreover, in a case of determination that the number of non-zero coefficients numSIG is larger than the predetermined threshold TH1 (numSIG>TH1) in step S664, the process proceeds to step S666.

In step S666, the transform pair number setting section 241 determines whether or not a processing target block size (W*H) is larger than a predetermined threshold TH2. In a case of determination that the processing target block size (W*H) is the predetermined threshold TH2 or smaller (W*H<=TH2), the process proceeds to step S667.

In step S667, the transform pair number setting section 241 sets the number of transform pair candidates NumTrPair to a predetermined value "N3" (NumTrPair=N3). After completion of processing in step S667, the transform pair number setting process ends, and the process returns to FIG. 17.

Moreover, in a case of determination that the processing target block size is larger than the predetermined threshold TH2 (W*H>TH2) in step S666, the process proceeds to step S668.

In step S668, the transform pair number setting section 241 determines whether or not a processing target block size (W*H) is larger than a predetermined threshold TH3 (TH3>TH2). In a case of determination that the processing target block size (W*H) is the predetermined threshold TH3 or smaller (TH2<W*H<=TH3), the process proceeds to step S5669.

In step S669, the transform pair number setting section 241 sets the number of transform pair candidates NumTrPair to a predetermined value "N2" (N2>=N3) (NumTrPair=N2). After completion of processing in step S669, the transform pair number setting process ends, and the process returns to FIG. 17.

Moreover, in a case of determination that the processing target block size is larger than the predetermined threshold TH3 (W*H>TH3) in step S668, the process proceeds to step S670.

In step S670, the transform pair number setting section 241 sets the number of transform pair candidates NumTrPair to a predetermined value "N1" (N1>=N2) (NumTrPair=N1). After completion of processing in step S670, the transform pair number setting process ends, and the process returns to FIG. 17.

By performing the above process, the number of transform pair candidates can be controlled according to the size of the processing target block. Accordingly, a code quantity can decrease more efficiently, and therefore, reduction of a drop of coding efficiency (improvement of coding efficiency) is achievable.

Note that it is sufficient if the transform pair number setting process is performed in a similar manner also in a case of decoding (case of control of inverse orthogonal transforms). More specifically, it is sufficient if the transform pair number setting process is performed in a similar manner also in step S423 of FIG. 31. In this case, the above description is applicable by replacing the transform pair number setting section 241 with the transform pair number setting section 431 for executing the process.

6. Fourth Embodiment

<Method #4>

A method #4 of the table 151 of FIG. 8 will be subsequently described. In a case of the method #4, coding parameters include a syntax element associated with a quantization parameter.

<6-1. Method #4-1>

Moreover, in a case of the method #4-1 of the table 151 of FIG. 8, the number of candidates of an orthogonal transform (inverse orthogonal transform) type is controlled according to a value of a quantization parameter QP of a processing target block of an orthogonal transform (inverse orthogonal transform).

For example, control indicated in a table 641 of FIG. 46 may be adopted. In a case of transform flag emt_flag==0, for example, a selectable number of transform pairs NumTrPair is set to "1." Moreover, in a case of transform flag emt_flag==1 in a state where the number of non-zero coefficients numSIG is a predetermined threshold TH1 or smaller (numSIG<=TH1), the selectable number of transform pairs NumTrPair is set to “2.”

Furthermore, in a case of transform flag emt_flag==1 in a state where the number of non-zero coefficients numSIG is larger than the predetermined threshold TH1 (numSIG>TH1) with the quantization parameter QP set to a predetermined threshold TH2 or smaller (QP<=TH2), the selectable number of transform pairs NumTrPair is set to “N1.” In addition, in a case of transform flag emt_flag=→1 in a state where the number of non-zero coefficients numSIG is larger than the predetermined threshold TH1 (numSIG>TH1) with the quantization parameter QP set to a size larger than the predetermined threshold TH2 and equal to or smaller than a predetermined threshold TH3 (TH2<QP<=TH3), the selectable number of transform pairs NumTrPair is set to “N2” (N1>=N2). Moreover, in a case of transform flag emt_flag==1 in a state where the number of non-zero coefficients numSIG is larger than the predetermined threshold TH1 (numSIG>TH1) with the quantization parameter QP larger than the predetermined threshold TH3 (TH3<QP), the selectable number of transform pairs NumTrPair is set to “N3” (N2>=N3).

For example, TH1=2, TH2=22, TH3=37, N1=9, N2=5, and N3=3 may be adopted. In this case, allowable values of a transform index emt_idx lie in a range from “0” to “7” for the small quantization parameter QP (QP<=TH2), is a range from “0” to “3” for the middle quantization parameter QP (TH2<QP<=TH3), and in a range of “0” and “1” for the large quantization parameter (QP>TH3). In other words, the number of candidates for the orthogonal transform (inverse orthogonal transform) type can be set to a smaller number as the quantization parameter QP increases. Accordingly, a code quantity can decrease more efficiently, and reduction of a drop of coding efficiency (improvement of coding efficiency) is achievable.

<Flow of Transform Pair Number Setting Process>

Figure 47:
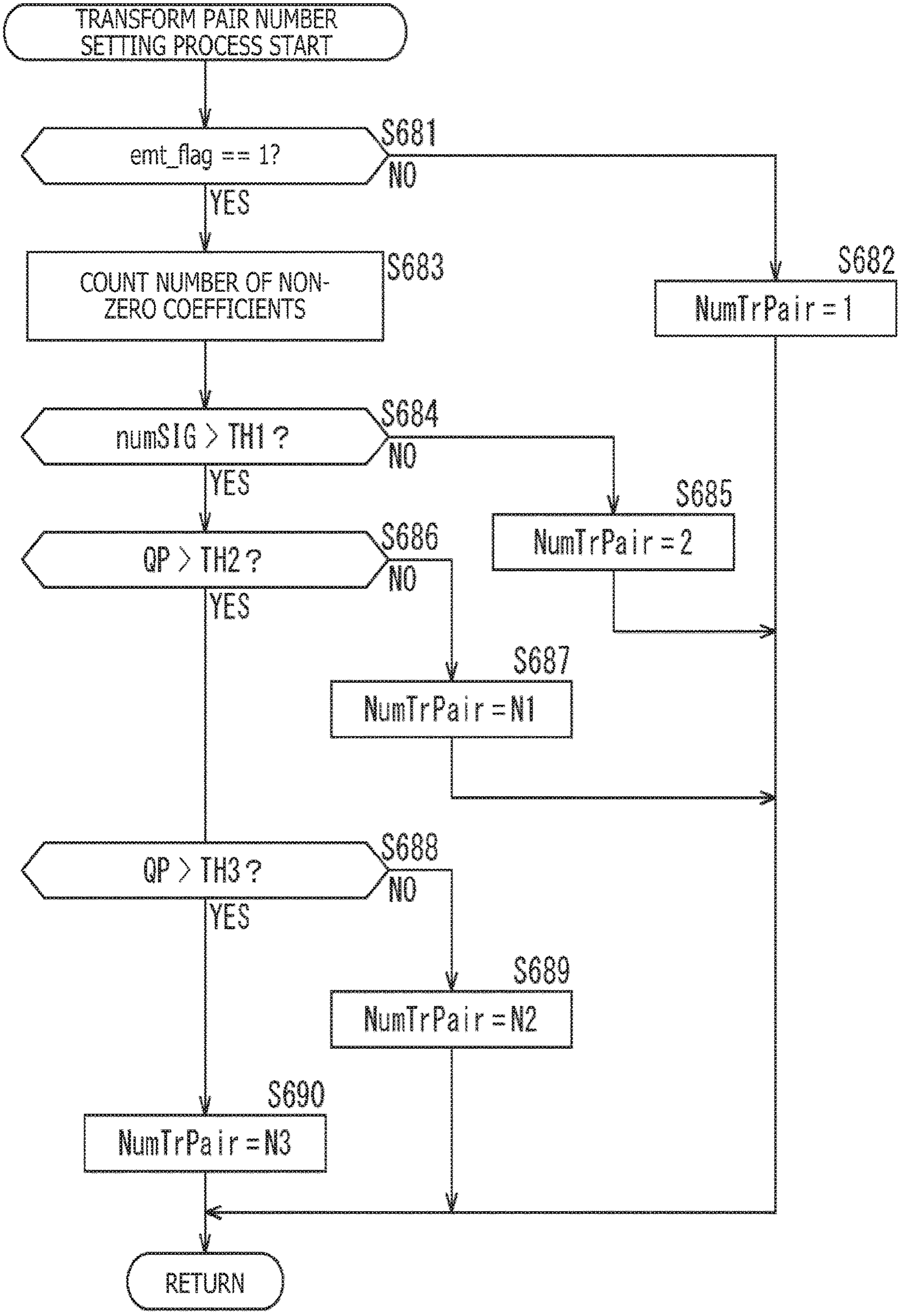
FIG. 47 is a flowchart explaining an example of a flow of a transform pair number setting process.

Described with reference to a flowchart of FIG. 47 will be an example of a flow of a transform pair number setting process executed in step S231 in FIG. 17 in this case.

With a start of the transform pair number setting process, the transform pair number setting section 241 determines whether or not to set a value of a transform flag emt_flag to “1” in step S681. In a case of determination that the value of the transform flag emt_flag is set to “0,” the process proceeds to step S682.

In step S682, the transform pair number setting section 241 sets the number of transform pair candidates NumirPair to “1” (NumirPair=1). After completion of processing in step S682, the transform pair number setting process ends, and the process returns to FIG. 17.

Moreover, in a case of determination that the value of the transform flag emt_flag is set to “1” in step S681, the process proceeds to step S683.

In step S683, the transform pair number setting section 241 counts non-zero coefficients of a processing target block to derive the number of non-zero coefficients numSIG.

In step S684, the transform pair number setting section 241 determines whether or not the number of non-zero coefficients numSIG is larger than a predetermined threshold TH1. In a case of determination that the number of non-zero coefficients numSIG is the predetermined threshold TH1 or smaller (numSIG<=TH1), the process proceeds to S685.

In step S685, the transform pair number setting section 241 sets the number of transform pair candidates NumTrPair to “2” (NtxmTrPair=2). After completion of processing in step S685, the transform pair number setting process ends, and the process returns to FIG. 17.

Moreover, in a case of determination that the number of non-zero coefficients numSIG is larger than the predetermined threshold. THA (numSIG>TH1) in step S684, the process proceeds to step S686.

In step S686, the transform pair number setting section 241 determines whether or not the quantization parameter QP is larger than a predetermined threshold TH2. In a case of determination that the quantization parameter QP is the predetermined threshold TH2 or smaller (QP<=TH2), the process proceeds to step S687.

In step S687, the transform pair number setting section 241 sets the number of transform pair candidates NumTrPair to a predetermined value “N1” (NamTrPair=N1). After completion of processing in step S687, the transform pair number setting process ends, and the Process returns to FIG. 17.

Moreover, in a case of determination that the quantization parameter QP is larger than the predetermined threshold TH2 (QP>TH2) in step S686, the process proceeds to step S688.

In step S688, the transform pair number setting section 241 determines whether or not quantization parameter QP is larger than a predetermined threshold TH3 (TH3>TH2). In a case of determination that the quantization parameter QP is the predetermined threshold TH3 or smaller (TH2<QP<=TH3), the process proceeds to step S689.

In step S689, the transform pair number setting section 241 sets the number of transform pair candidates NumTrPair to a predetermined value “N2” (NuTrPair=N2). After completion of processing in step S689, the transform pair number setting process ends, and the process returns to FIG. 17.

Moreover, in a case of determination that the quantization parameter QP is larger than the predetermined threshold TH3 (QP>TH3) in step S688, the process proceeds to step S690.

In step S690, the transform pair number setting section 241 sets the number of the transform pair candidates NumTrPair to a predetermined value “N3” (N2>=N3) (NumTrPair=N3). After completion of processing in step S690, the transform pair number setting process ends, and the process returns to FIG. 17.

By performing the above process, the number of transform pair candidates can be controlled according to the magnitude of the value of the quantization parameter QP. Accordingly, a code quantity can decrease more efficiently, and therefore, reduction of a drop of coding efficiency (improvement of coding efficiency) is achievable.

Note that it is sufficient if the transform pair number setting process is performed in a similar manner also in a case of decoding (case of control of inverse orthogonal transforms). More specifically, it is sufficient if the transform pair number setting process is performed in a similar manner also in step S423 of FIG. 31. In this case, the above description is applicable by replacing the transform pair number setting section 241 with the transform pair number setting section 431 for executing the process.

<6-2. Method #4-2>

Moreover, in a case of the method #4-2 of the table 151 of FIG. 8, the number of candidates of an orthogonal transform (inverse orthogonal transform) type is controlled according to a value of a temporal ID (temporalID) indicating a hierarchy in hierarchical coding of a processing target block of an orthogonal transform (inverse orthogonal transform) in a time direction instead of the quantization parameter QP.

For example, control indicated in a table 651 of FIG. 48 may be adopted. In a case of transform flag emt_flag==0, for example, the selectable number of transform pairs NumTrPair is set to "1." Moreover, in a case of transform flag emt_flag==1 in a state where the number of non-zero coefficients numSIG is a predetermined threshold TH1 or smaller (numSIG<=TH1), the selectable number of transform pairs NumTrPair is set to "2."

Furthermore, in a case of transform flag emt_flag==1 in a state where the number of non-zero coefficients numSIG is larger than a predetermined threshold TH1 (numSIG>TH1) with the temporal ID (temporalID) set to a predetermined threshold TH2 or smaller (temporalID<=TH2), the selectable number of transform pairs NumTrPair is set to "N1." In addition, in a case of transform flag emt_flag==1 in a state where the number of non-zero coefficients numSIG is larger than the predetermined threshold TH1 (numSIG>TH1) with the temporal ID (temporalID) set to a value larger than the predetermined threshold TH2 and equal to or smaller than a predetermined threshold. TH3 (TH2<temporalID<=TH3), the selectable number of transform pairs NumTrPair is set to "N2" (N1>=N2). Moreover, in a case of transform flag emt_flag==1 in a state where the number of non-zero coefficients numSIG is larger than the predetermined threshold TH1 (numSIG>TH1) with the temporal ID (temporalID) larger than the predetermined threshold TH3 (TH3<temporalID), the selectable number of transform pairs NumTrPair is set to "N3" (N2>=N3).

For example, TH1=2, TH2=b1, TH3=2, N1=9, N2=5, and N3=3 may be adopted. In this case, allowable values of the transform index emt_idx lie in a range from "0" to "7" for the small temporal ID (temporalID) (temporalID<=TH2), in a range from "0" to "3" for the middle temporal ID (temporalID) (TH2<temporalID<=TH3), and in a range of "0" and "1" for the large temporal ID (temporalID) (temporalID>TH3). In other words, the number of candidates for the orthogonal transform. (inverse orthogonal transform) type can be set to a smaller number as the temporal ID (temporalID) increases. Accordingly, a code quantity can decrease more efficiently, and reduction of a drop of coding efficiency (improvement of coding efficiency) is achievable.

<Flow of Transform Pair Number Setting Process>

Figure 49:
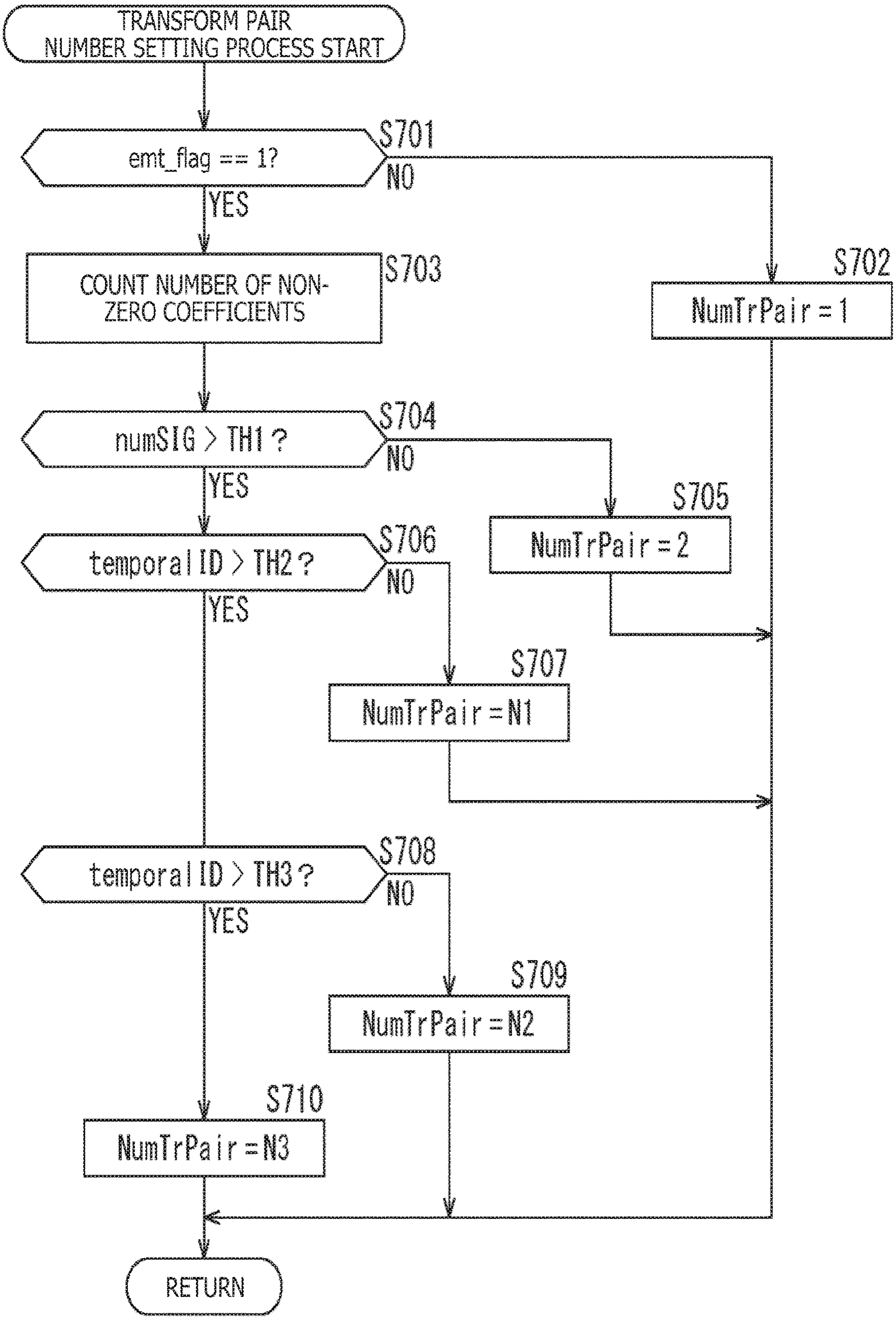
FIG. 49 is a flowchart explaining an example of a flow of a transform pair number setting process.

Described with reference to a flowchart of FIG. 49 will be an example of a flow of a transform pair number setting process executed in step S231 in FIG. 17 in this case.

With a start of the transform pair number setting process, the transform pair number setting section 241 determines whether or not to set a value of a transform flag emt_flag to "1" in step S701. In a case of determination that the value of the transform flag emt_flag is set to "0," the process proceeds to step S702.

In step S702, the transform pair number setting section 241 sets the number of transform pair candidates NumTrPair to "1" (NumTrPair=1). After completion of processing in step S682, the transform pair number setting process ends, and the process returns to FIG. 17.

Moreover, in a case of determination that the value of the transform flag emt_flag is set to "1" in step S701, the process proceeds to step S703.

In step S703, the transform pair number setting section 241 counts non-zero coefficients of a processing target block to derive the number of non-zero coefficients numSIG.

In step S704, the transform pair number setting section 241 determines whether or not the number of non-zero coefficients numSIG is larger than a predetermined threshold TH1. In a case of determination that the number of non-zero coefficients numSiG is the predetermined threshold TH1 or smaller (numSIG<=TH1), the process Proceeds to step S705.

In step S705, the transform pair number setting section 241 sets the number of transform pair candidates NumirPair to "2" (NumTrPair=2). After completion of processing in step S705, the transform pair number setting process ends, and the process returns to FIG. 17.

Moreover, in a case of determination that the number of non-zero coefficients numSIG is larger than the predetermined threshold TH1 (numSIG>TH1) in step S704, the process proceeds to step S706.

In step S706, the transform pair number setting section 241 determines whether or not the temporal ID (temporalID) is larger than a predetermined threshold TH2. In a case of determination that the temporal ID (temporalID) is a predetermined threshold TH2 or smaller (temporalID<=TH2), the process proceeds to step S707.

In step S707, the transform pair number setting section 241 sets the number of transform pair candidates NumIrPair to a predetermined value "N1" (NumTrPair=N1). After completion of processing in step S707, the transform pair number setting process ends, and the process returns to FIG. 17.

Moreover, in a case of determination that the temporal ID (temporalID) is larger than the predetermined threshold TH2 (temporalID>TH2) in step S706, the process proceeds to step S708.

In step S708, the transform pair number setting section 241 determines whether or not the temporal ID (temporalID) is larger than a predetermined threshold TH3 (TH3>TH2). In a case of determination that the temporal ID (temporalID) is the predetermined threshold TH3 or smaller (TH2<temporalID<=TH3), the process proceeds to step S709.

In step S709, the transform pair number setting section 241 sets the number of transform pair candidates NumTrPair to a predetermined value "N2" (NumTrPair=N2). After completion of processing in step S709, the transform pair number setting process ends, and the process returns to FIG. 17.

Moreover, in a case of determination that the temporal ID (temporalID) is larger than the predetermined threshold TH3 (temporalID>TH3) in step S708, the process proceeds to step S710.

In step S710, the transform pair number setting section 241 sets the number of transform pair candidates NumirPair to a predetermined value "N3" (N2>=N3) (NumTrPair=N3). After completion of processing in step S710, the transform pair number setting process ends, and the process returns to FIG. 17.

By performing the above process, the number of transform pair candidates can be controlled according to the magnitude of the value of the temporal ID (temporalID). Accordingly, a code quantity can decrease more efficiently, and therefore, reduction of a drop of coding efficiency (improvement of coding efficiency) is achievable.

Note that it is sufficient if the transform pair number setting process is performed in a similar manner also in a case of decoding (case of control of inverse orthogonal transforms). More specifically, it is sufficient if the transform pair number setting process is performed in a similar manner also in step S423 of FIG. 31. In this case, the above description is applicable by replacing the transform pair number setting section 241 with the transform pair number setting section 431 for executing the process.

7. Fifth Embodiment

<Method. #5>

A method #5 of the table 151 of FIG. 8 will be subsequently described. In a case of the method #5, coding parameters include a variable derived from a value of a syntax element. For example, the coding parameters include a variable derived from transform coefficients.

<7-1. Method #5-1>

Moreover, is a case of the method #5-1 of the table 151 of FIG. 8, the number of candidates of an orthogonal transform (inverse orthogonal transform) type is controlled according to the number of non-zero coefficients in a block corresponding to a processing target of an orthogonal transform (inverse orthogonal transform).

For example, control indicated in a table 661 of FIG. 50 may be adopted. In a case of transform flag emt_flag==0, for example, a selectable number of transform pairs NumTrPair is set to "1." Moreover, in a case of transform flag emt_flag==1 in a state where the number of non-zero coefficients numSIG is a predetermined threshold TH1 or smaller (numSIG<=TH1), the selectable number of transform pairs NumTrPair is set to "2."

Furthermore, in a case of transform flag emt_flag==1 in a state where the number of non-zero coefficients numSIG is larger than the predetermined threshold TR1 and equal to or smaller than a predetermined threshold TH2 (TH1<TH2) (TH1<numSIG<=TH2), the selectable number of transform pairs NumTrPair is set to "N2." Ia addition, in a case of transform flag emt_flag==1 in a state where the number of non-zero coefficients numSIG is larger than the predetermined threshold. TH2 (numSiG>TH2), the selectable number of transform pairs NumTrPair is set to "N1" (N1>N2).

For example, TH1=2, TH2=8, N1=9, and N2=5 may be adopted. In this case, allowable values of transform index emt_idx lie in a range from "0" to "3" for the middle number of non-zero coefficients numSIG (TH1<numSIG<=TH2), and in a range from "0" to "7" for the large number of numSIG (numSIG>TH2). In other words, the number of candidates for the orthogonal transform (inverse orthogonal transform) type can be set to a smaller number as the number of non-zero coefficients numSIG decreases. Accordingly, a code quantity can decrease more efficiently, and reduction of a drop of coding efficiency (improvement of coding efficiency) is achievable.

<Flow of Transform Pair Number Setting Process>

Figure 51:
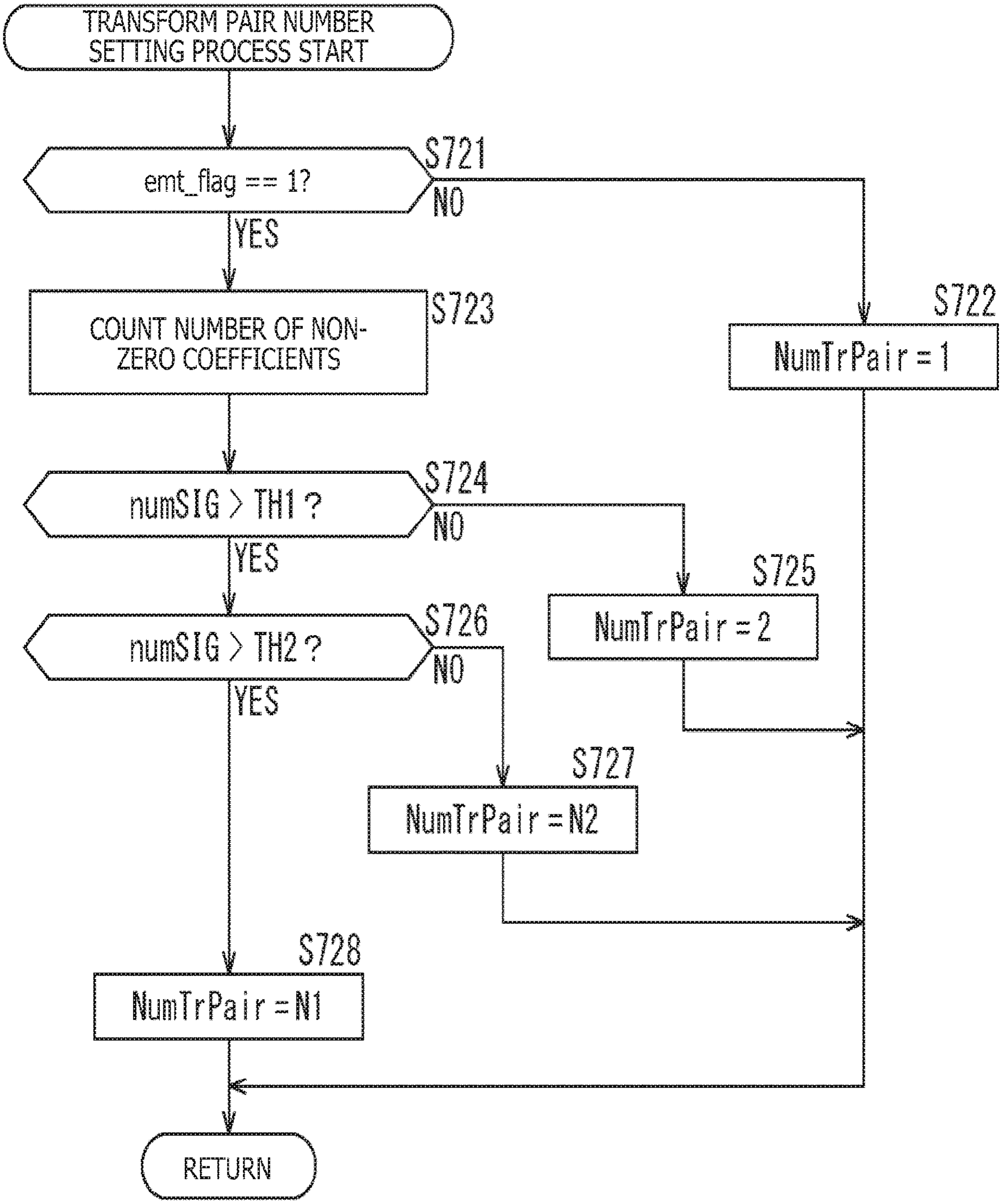
FIG. 51 is a flowchart explaining an example of a flow of a transform pair number setting process.
Figure 53:
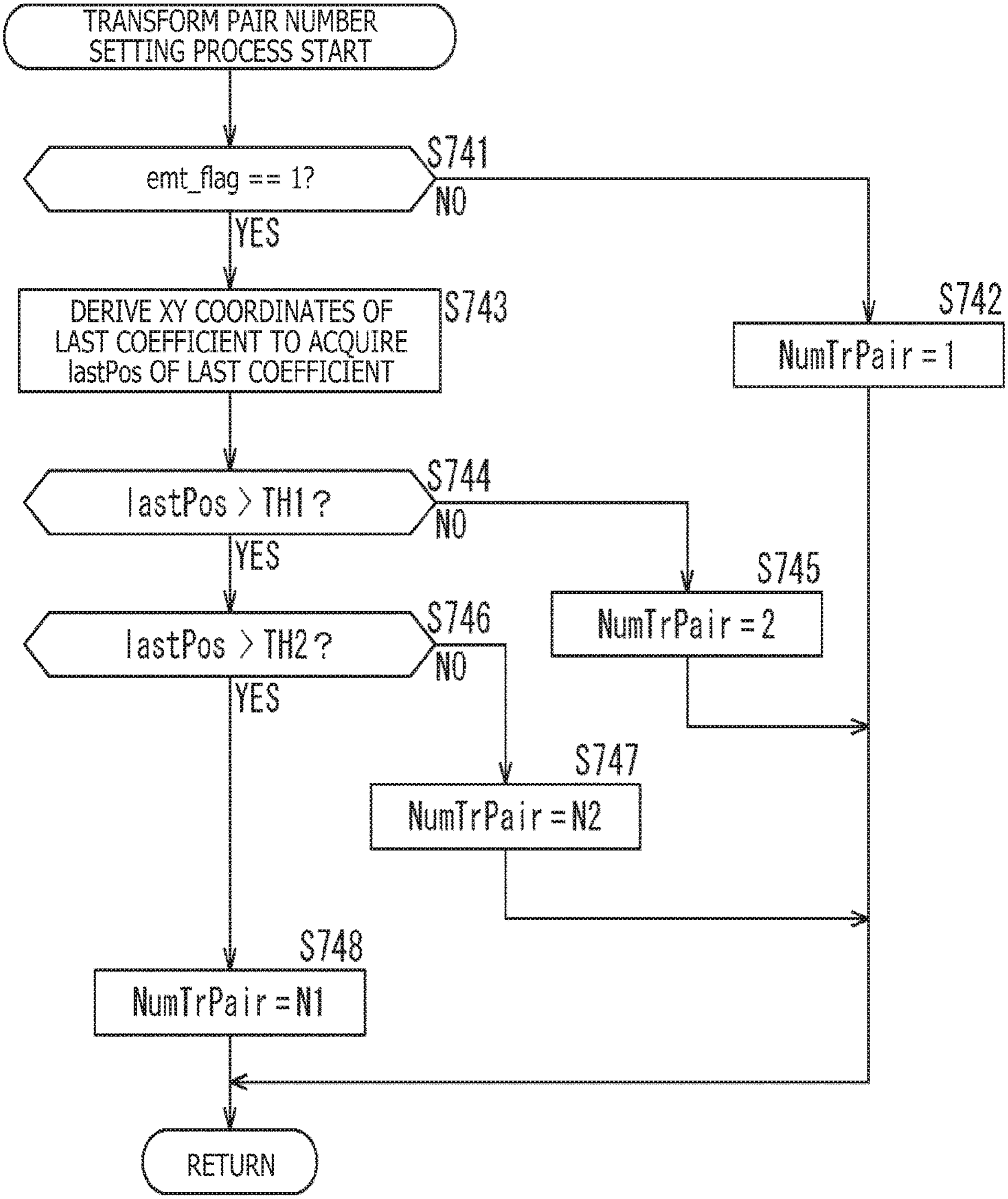
FIG. 53 is a flowchart explaining an example of a flow of a transform pair number setting process.

Described with reference to a flowchart of FIG. 51 will be an example of a flow of a transform pair number setting process executed in step S231 in FIG. 17 in this case.

With a start of the transform pair number setting process, the transform pair number setting section 241 determines whether or not to set a value of a transform flag emt_flag to "1" in step S721. In a case of determination that the value of the transform flag emt_flag is set to "0," the process proceeds to step S722.

In step S722, the transform pair number setting section 241 sets the number of transform pair candidates to "1" (NumTrPair=1). After completion of processing in step S722, the transform pair number setting process ends, and the process returns to FIG. 17.

Moreover, in a case of determination that the value of the transform flag emt_flag is set to "1" in step S721, the process proceeds to step S723.

In step S723, the transform pair number setting section 241 counts non-zero coefficients of a processing target block to derive the number of non-zero coefficients numSIG.

In step S724, the transform pair number setting section 241 determines whether or not the number of non-zero coefficients numSIG is larges than a predetermined threshold TH1. In a case of determination that the number of non-zero coefficients numSIG is the predetermined threshold TH1 or smaller (numSIG<=TH1), the process proceeds to step S725.

Figure 17:
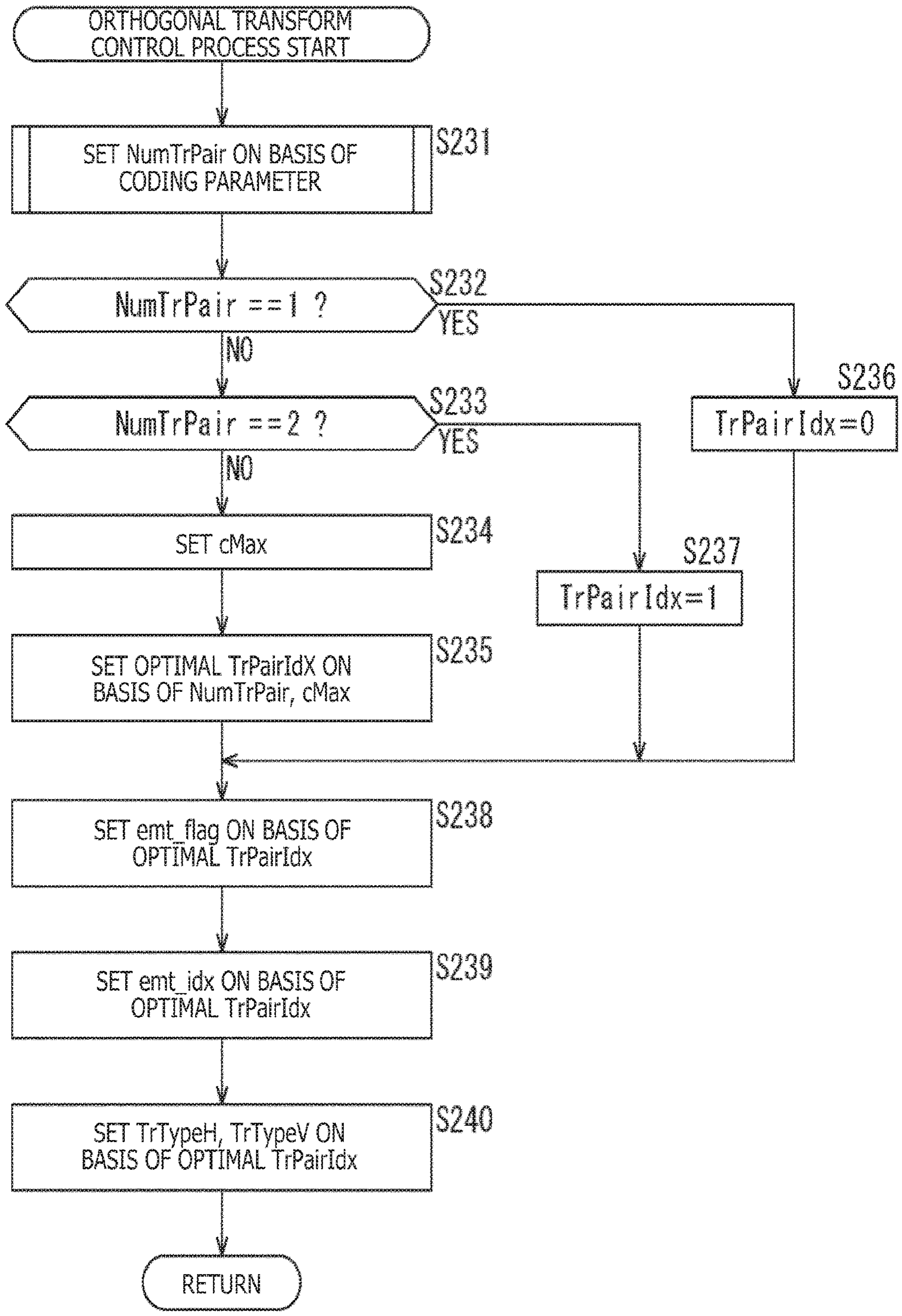
FIG. 17 is a flowchart explaining an example of a flow of an orthogonal transform control process.

In step S725, the transform pair number setting section 241 sets the number of transform pair candidates NumTrPair to "2" (NumIrPair=After completion of processing in step S725, the transform pair number setting process ends, and the process returns to FIG. 17.

Moreover, in a case of determination that the number of non-zero coefficients numSIG is larger than the predetermined threshold TH1 (numSIG>TH1) in step S724, the process proceeds to step S726.

In step S726, the transform pair number setting section 241 determines whether or not the number of non-zero coefficients numSIG is larger than a predetermined threshold TH2 (TH2>TH1). In a case of determination that the number of non-zero coefficients numSIG is the predetermined threshold TH2 or smaller (TH1<numSIG<=TH2), the process proceeds to step S727.

In step S727, the transform pair number setting section 241 sets the number of transform pair candidates NumTrPair to "N2" (NumTrPair=N2). After completion of processing in step S727, the transform pair number setting process ends, and the process returns to FIG. 17.

However, in a case of determination that the number of non-zero coefficients numSIG is larger than the predetermined threshold TH2 (numSIG>TH2) in step S726, the process proceeds to step S728.

In step S728, the transform pair number setting section 241 sets the number of transform pair candidates NumTrPair to "N1" (N1>N2) (NumTrPair=N1). After completion of processing in step S728, the transform pair number setting process ends, and the process returns to FIG. 17.

By performing the above process, the number of transform pair candidates can be controlled according to the number of non-zero coefficients numSIG. Accordingly, a code quantity can decrease more efficiently, and therefore, reduction of a drop of coding efficiency (improvement of coding efficiency) is achievable.

Note that it is sufficient if the transform pair number setting process is performed in a similar manner also in a case of decoding (case of control of inverse orthogonal transforms). More specifically, it is sufficient if the transform pair number setting process is performed in a similar manner also in step S423 of FIG. 31. In this case, the above description is applicable by replacing the transform pair number setting section 241 with the transform pair number setting section 431 for executing the process.

<7-2. Method #5-2>

Moreover, in a case of the method #5-2 of the table 151 of FIG. 8, the number of candidates of an orthogonal transform (inverse orthogonal transform) type is controlled according to a last coefficient position lastPos of a last coefficient which is a last non-zero coefficient in a scanning order in a block corresponding to a processing target of an orthogonal transform (inverse orthogonal transform). Note that the last coefficient position lastPos is a distance between a scanning start position and the position of the last coefficient (distance in the scanning order) (lastPos=XYtoScanOrder[Y][x]).

For example, control indicated in a table 671 of FIG. 52 may be adopted. In a case of transform flag emt_flag==0, for example, a selectable number of transform pairs NumTrPair is set to "1." Moreover, in a case of transform flag emt_flag==1 in a state where the last coefficient position lastPos is a predetermined threshold TH1 or smaller (lastPos<=TH1), the selectable number of transform pairs NumTrPair is set to "2."

Furthermore, in a case of transform flag emt_flag==1 in a state where the last coefficient position lastPos is larger than the predetermined threshold TH1 and equal to or smaller than a predetermined threshold TH2 (TH1<TH2) (TH1<lastPos<=TH2), the selectable number of transform pairs NumTrPair is set to "N2." In addition, in a case of transform flag emt_flag==1 in a state where the last coefficient position lastPos is larger than the predetermined threshold TH2 (lastPos>TH2), the selectable number of transform pairs NumTrPair is set to "N1" (N1>N2).

For example, TH1=2, TH2=8, N1=9, and N2=5 may be adopted. In this case, allowable values of the transform index emt_idx lie in a range from "0" to "3" for the middle last coefficient position lastPos (TH1<lastPos<=TH2), and in a range from "0" to "7" for the large last coefficient position lastPos (lastPos>TH2). In other words, the number of candidates for the orthogonal transform (inverse orthogonal transform) type can be set to a smaller number as the last coefficient position lastPos is closer. Accordingly, a code quantity can decrease more efficiently, and reduction of a drop of coding efficiency (improvement of coding efficiency) is achievable.

<Flow of Transform Pair Number Setting Process>

Described with reference to a flowchart of FIG. will be an example of a flow of a transform pair number setting process executed in step S231 in FIG. 17 in this case.

With a start of the transform pair number setting process, the transform pair number setting section 241 determines whether or not to set a value of a transform flag emt_flag to "1" in step S741. In a case of determination that the value of the transform flag emt_flag is set to "0," the process proceeds to step S742.

In step S742, the transform pair number setting section 241 sets the number of the transform pair candidates NumTrPair to "1" (NumTrPair=1). After completion of processing in step S742, the transform pair number setting process ends, and the process returns to FIG. 17.

Moreover, in a case of determination that the value of the transform flag emt_flag is set to "1" in step S741, the process proceeds to step S743.

In step S743, the transform pair number setting section 241 derives X-Y coordinates of a last coefficient of a processing target block to derive a position lastPos of the last coefficient.

In step S744, the transform pair number setting section 241 determines whether or not the last coefficient position lastPos is larger than a predetermined threshold TH1. In a case of determination that the last coefficient position lastPos is the predetermined threshold TH1 or smaller (lastPos<=TH1), the process proceeds to step S145.

In step S745, the transform pair number setting section 241 sets the number of the transform pair candidates NumTrPair to "2" (NumTrPair=2). After completion of processing in step S745, the transform pair number setting process ends, and the process returns to FIG. 17.

Moreover, in a case of determination that the last coefficient position lastPos is larger than the predetermined threshold. TH1 (lastPos>TH1) in step S744, the process proceeds to step S746.

In step S746, the transform pair number setting section 241 determines whether or not the last coefficient position lastPos is larger than a predetermined threshold TH2 (TH2>TH1). In a case of determination that the last coefficient position lastPos is the predetermined threshold TH2 or smaller (TH1<lastPos<=TH2), the process proceeds to step S747.

In step S747, the transform pair number setting section 241 sets the number of transform pair candidates NumirPair to "N2" (NumTrPair=N2). After completion of processing in step S747, the transform pair number setting process ends, and the process returns to FIG. 17.

Moreover, in a case of determination that the last coefficient position lastPos is larger than the predetermined threshold TH2 (lastPos>TH2) in step S746, the process proceeds to step S748.

In step S748, the transform pair number setting section 241 sets the number of the transform pair candidates NumTrPair to "N1" (N1>N2) (NumTrPair=N1). After completion of processing in step S748, the transform pair number setting process ends, and the process returns to FIG. 17.

By performing the above process, the number of the transform pair candidates can be controlled according to the last coefficient, position lastPos. Accordingly, a code quantity can decrease more efficiently, and therefore, reduction of a drop of coding efficiency (improvement of coding efficiency) is achievable.

Note that it is sufficient if the transform pair number setting process is performed in a similar manner also in a case of decoding (case of control of inverse orthogonal transforms). More specifically, it is sufficient if the transform pair number setting process is performed in a similar manner also in step S423 of FIG. 31. In this case, the above description is applicable by replacing the transform pair number setting section 241 with the transform pair number setting section 431 for executing the process.

<Modifications>

The last coefficient position lastPos is not limited to the above example. For example, the position of the last coefficient may be a sum of X coordinates and Y coordinates of the last coefficient (Manhattan distance: last dos=x+y).

Moreover, the threshold. TH1 and the threshold TH2 may be values corresponding to a transform block size. For example, the following Expression (36) may be adopted.

[Math. 32]

$$TH1=(\text{trWidth}+\text{trHeight})>>2$$

$$TH2=(\text{trWidth}+\text{trHeight})>>1$$

<7-3. Method #5-3>

Moreover, in a case of the method #5-3 of the table 151 of FIG. 8, the number of candidates of an orthogonal transform (inverse orthogonal transform) type is controlled according to a non-zero coefficient absolute value sum total sumAbsLevel which is a sum total of absolute values of non-zero coefficients in a block corresponding to a processing target of an orthogonal transform (inverse orthogonal transform). Note that the non-zero coefficient absolute value sum total sumAbstevel is a variable derived by the following Expression (37).

[Math. 33]

$$\text{sumAbsLevel}=\Sigma|\text{qcoef}[pos]|\text{over } pos$$

Note that qcoef[pos] in Expression (37) indicates an amplitude of a posth quantized coefficient is a scanning order. In addition, pos indicates a position of a coefficient in the scanning order.

For example, control indicated in a table 681 of FIG. 54 may be adopted. In a case of transform flag emt_flag==0, for example, a selectable number of transform pairs NumTrPair is set to "1." Moreover, in a case of transform flag emt_flag==1 in a state where the non-zero coefficient absolute sum total sumAbsLevel is a predetermined threshold TH1 or smaller (sumAbsLevel<=TH1), the selectable number of transform pairs NumTrPair is set to "2."

Furthermore, in a case of transform flag emt_flag==1 in a state where the non-zero coefficient absolute sum total sumAbslevel is larger than the predetermined threshold TH1 and equal to or smaller than a predetermined threshold TH2 (TH1<TH2) (TH1<sumAbsLevel<=TH2), the selectable number of transform pairs NumTrPair is set to "N2." In addition, in a case of transform flag emt_flag==1 in a state where the non-zero coefficient absolute sum total sumAbsLevel is larger than the predetermined threshold TH2 (sumAbsLevel>TH2), the selectable number of transform pairs NumTrPair is set to "N1" (N1>N2).

For example, TH1=2, TH2=8, N1=9, and N2=5 may be adopted. In this case, allowable values of the transform index emt_idx lie in a range from "0" to "3" for the middle non-zero coefficient absolute sum total sumAbsLevel (TH1<sumAbsLevel<=TH2), and in a range from "0" to "7" for the large non-zero coefficient absolute sum total sumAbsLevel (sumAbsLevel>TH2). In other words, the number of candidates for the orthogonal transform. (inverse orthogonal transform) type can be set to a smaller number as the non-zero coefficient absolute sum total sumAbsLevel decreases. Accordingly, a code quantity can decrease more efficiently, and reduction of a drop of coding efficiency (improvement of coding efficiency) is achievable.

<Flow of Transform Pair Number Setting Process>

Figure 55:
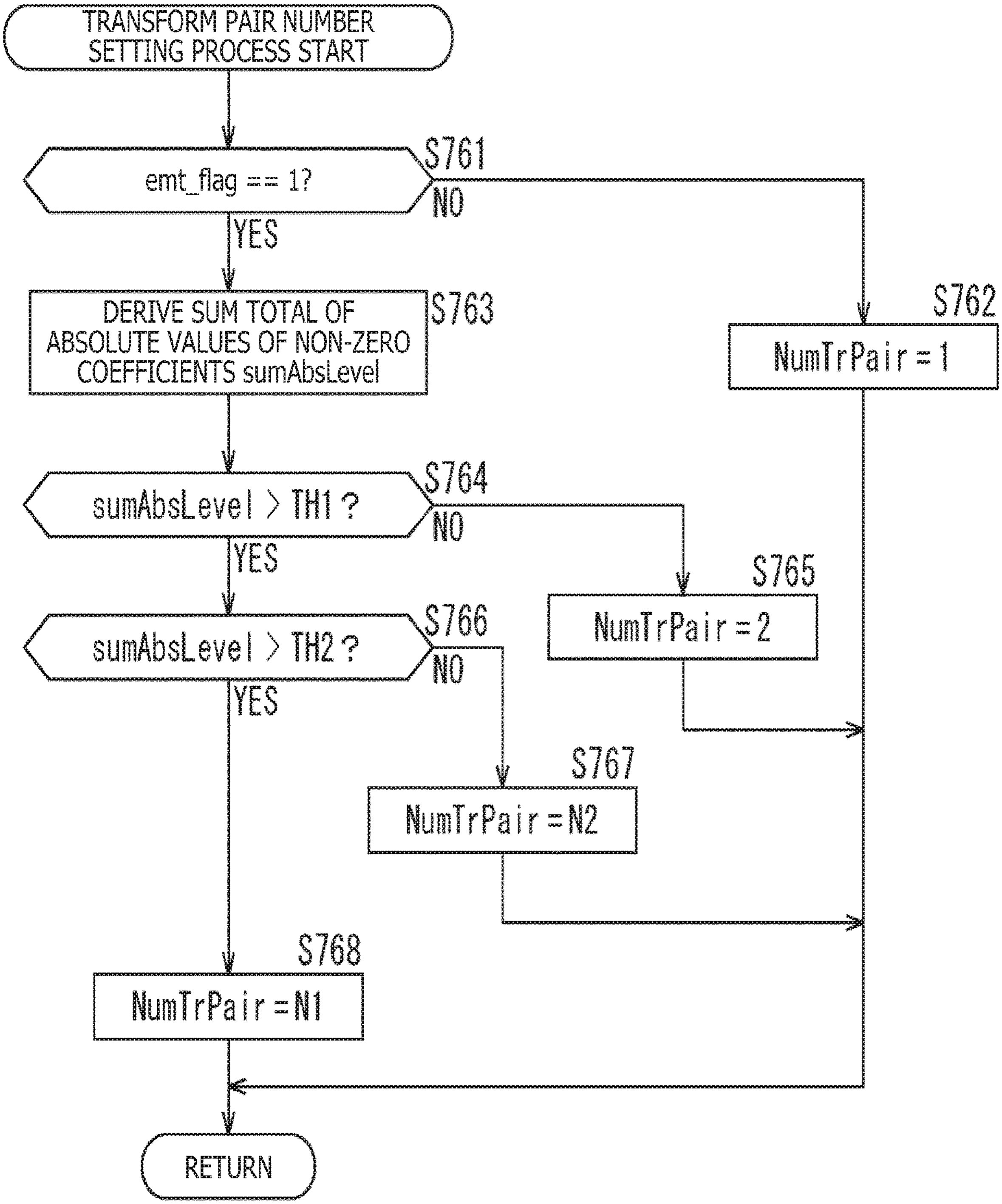
FIG. 55 is a flowchart explaining an example of a flow of a transform pair number setting process.

Described with reference to a flowchart of FIG. 55 will be an example of a flow of a transform pair number setting process executed in step S231 in FIG. 17 in this case.

With a start of the transform pair number setting process, the transform pair number setting section 241 determines whether or not to set a value of a transform emt_flag to "1" in step S761. In a case of determination that the value of the transform flag emt_flag is set to "0," the process proceeds to step S762.

In step S762, the transform pair number setting section 241 sets the number of transform pair candidates NumTrPair to "1" (NumTrPair=1). After completion of processing in step S762, the transform pair number setting process ends, and the process returns to FIG. 17.

Moreover, in a case of determination that the value of the transform flag emt_flag is set to "1" in step S761, the process proceeds to step S763.

In step S763, the transform pair number setting section 241 derives the non-zero coefficient absolute sum total sumAbstevel.

In step S764, the transform pair number setting section 241 determines whether or not the non-zero coefficient absolute sum total sumAbsLevel is larger than a predetermined threshold TH1. In a case of determination that the non-zero coefficient absolute sum total sumAbsLevel is the predetermined threshold TH1 or smaller (sumAbsLevel<=TH1), the process proceeds to step S765.

In step S765, the transform pair number setting section 241 sets the number of transform pair candidates NumIrPair to "2" (NumIrPair=After completion of processing in step S765, the transform pair number setting process ends, and the process returns to FIG. 17.

Moreover, in a case of determination that the non-zero coefficient absolute sum total sumAbsLevel is larger than the predetermined threshold TH1 (sumAbstevel>TH1) in step S764, the process proceeds to step S766.

In step S766, the transform pair number setting section 241 determines whether or not the non-zero coefficient absolute sum total sumAbsLevel is larger than a predetermined threshold TH2 (TH2>TH1). In a case of determination that the non-zero coefficient absolute sum total sumAbstevel is the predetermined threshold TH2 or smaller (TH1<sumAbsLevel<=TH2), the process proceeds to step S767.

In step S767, the transform pair number setting section 241 sets the number of transform pair candidates NumTrPair to "N2" (NumTrpair=N2). After completion of processing in step S767, the transform pair number setting process ends, and the process returns to FIG. 17.

Moreover, in a case of determination that the non-zero coefficient absolute sum total sumAbsLevel is larger than the predetermined threshold TH2 (sumAbsLevel>TH2) in step S766, the process proceeds to step S768.

In step S768, the transform pair number setting section 241 sets the number of transform pair candidates NumirPair to "N1" (N1>=N2) (NumTrPair=N1). After completion of processing in step S768, the transform pair number setting process ends, and the process returns to FIG. 17.

By performing the above process, the number of transform pair candidates can be controlled according to the non-zero coefficient absolute sum total sumAbstevel. Accordingly, a code quantity can decrease more efficiently, and therefore, reduction of a drop of coding efficiency (improvement of coding efficiency) is achievable.

Note that it is sufficient if the transform pair number setting process is performed in a similar manner also in a case of decoding (case of control of inverse orthogonal transforms). More specifically, it is sufficient if the transform pair number setting process is performed in a similar manner also in step S423 of FIG. 31. In this case, the above description is applicable by replacing the transform pair number setting section 241 with the transform pair number setting section 431 for executing the process.

<Modifications>

The last coefficient position lastPos is not limited to the above example. For example, the position of the last coefficient may be a sum of X coordinates and Y coordinates of the last coefficient (Manhattan distance: lastPos=x+y).

Moreover, each of the threshold TH1 and the threshold TH2 may be a value corresponding to a transform block size, a quantization parameter QP, a bit depth bitDepth, or a combination of these. For example, the following Expression (38) may be adopted.

[Math. 34]

$$THN=f(\text{trWidth}, \text{trHeight}, QP, \text{bitDepth}) \tag{38}$$

In Expression (38), f( ) is any function for deciding a threshold THN.

8. Application Examples

While the combination examples of transform pair numbers corresponding to respective conditions have been described in the above embodiments, combinations of transform pair numbers are not limited to these examples but may be any combinations. Any number of transform pairs without overlaps can be selected within the maximum selectable number of transform pairs.

For example, when the selectable number of transform pairs NumTrPair is 16, five types of candidates in a range surrounded by a frame line 711, in a range surrounded by a frame line 712, in a range surrounded by a frame line 713, in a range surrounded by a frame line 714, and in a range surrounded by a frame line 715 are assumed as indicated in a table 701 in FIG. 56. Any number of these ranges may be allocated to the conditions of the coding parameters.

For example, in the case of the example of the table 601 in FIG. 38, two types (N1 and N2) may be set as choices of the transform pair number for the componentID. For example, in a case where the five types of ranges of the table 701 are designated as candidates, any two types of the five types may be allocated to N1 and N2.

Moreover, the number of choices of the selectable number of transform pairs in each of the embodiments is not limited to the above example but may be any number. For example, two types of choices (N1 and N2) of the number of transform pairs have been prepared for the componentID in the example of the table 601 in FIG. 38 described above. However, needless to say, three or more types of choices (N1, N2, N3, . . . ) may be prepared.

For example, four types of choices (1, 2, N1, N2) of the selectable number of transform pairs NumTrPair have been described in the example of the table 661 in FIG. 50. However, for example, the number of choices may be five (1, 2, N1, N2, N3) as indicated in a table 721 in FIG. 57. Needless to say, the number of choices may be three or less, or six or more.

Moreover, for example, four types of choices (1, 2, N1, N2) of the selectable number of transform pairs NumTrPair have been described in the example of the table 671 in FIG. 52. However, for example, the number of choices may be five (1, 2, N1, N2, N3) as indicated in a table 722 in B of FIG. 57. Needless to say, the number of choices may be three or less, or six or more.

Furthermore, for example, four types of choices (1, 2, N1, N2) of the selectable number of transform pairs NumTrPair have been described in the example of the table 681 in FIG. 54. However, for example, the number of choices may be five (1, 2, N1, N2, N3) as indicated in a table 723 in C of FIG. 57. Needless to say, the number of choices may be three or less, or six or more.

In addition, combinations of the selectable number of transform pairs NumTrPair may be fixed in a picture, a sequence, a prediction mode, and QP, or may be variable. For example, the combinations of the number of transform pairs numTrPair or the {maximum value or minimum value} of the number of transform pairs may be signaled for each unit of any data, such as a CTU, a slice, a tile, a picture, and a sequence. In other words, the number of transform pairs may be controlled for each predetermined size.

More specifically, the control section on the coding side may set information associated with the maximum selectable number of transform pairs and information associated with the minimum selectable number of transform pairs, and the coding section may generate coded data including the information associated with the maximum number and the information associated with the minimum number.

Moreover, the control section (decoding section) on the decoding side may parse the information associated with the maximum selectable number of transform pairs and the information associated with the minimum selectable number of transform pairs, both included in the coded data, and set the number of candidates of an inverse orthogonal transform type according to the parsed information associated with the maximum number and information associated with the minimum number, and coding parameters.

In this manner, overhead associated with AMT control information in a simple residual signal can be reduced by decreasing the maximum number of transform pairs. Moreover, the number of combinations of transform pairs to be searched decreases on the coding side. Accordingly, a processing load lowers. In contrast, in a complicated residual signal, selection of an appropriate transform pair from a larger number of transform pair candidates is allowed by increasing the maximum number of transform pairs. Accordingly, coding efficiency improves.

Furthermore, a transform enable flag indicating whether to enable an adaptive change of an orthogonal transform type may be signaled (for each unit of predetermined data, for example).

For example, the control section on the coding side may set a transform enable flag indicating whether to enable an adaptive change of an orthogonal transform type, and the coding section may generate coded data including the transform enable flag.

Moreover, the control section on the decoding side may parse a transform enable flag indicating whether to enable an adaptive change of an inverse orthogonal transform type included in coded data, and controls an inverse orthogonal transform type on the basis of coding parameters in a case where the transform enable flag enables the adaptive change of the inverse orthogonal transform type.

In this manner, processing associated with AMT is omittable in a case where AMT is not enabled. Accordingly, an increase in loads of coding and decoding can be reduced.

Syntax 731 of FIG. 58 represents an example of syntax in this case. In the syntax 731, emt_enabled_flag (or amt_enabled_flag) is a transform enable flag indicating whether to enable an adaptive change of an inverse orthogonal transform type. Moreover, emt_max_num_trpair_minusN is a syntax element indicating "a maximum number of transform pairs—N." Furthermore, emt_min_num_trpair_minusN is a syntax element indicating "a minimum number of transform pairs—N."

In a case of this example, emt_max_num_trpair_minusN and emt_min_num_trpair_minusN are signaled when emt_enabled_flag is 1 (true). More specifically, the image decoding apparatus 400 decodes emt_max_num_trpair_minusN and emt_min_num_trpair_minusN in a case where em enabled flag is 1 (true).

The maximum number of transform pairs is derived by the following Expression (39). Moreover, the minimum number of transform pairs is derived by the following Expression (40).

[Math. 35]

$$\text{maxNumTrPair}=emt\_\text{max\_num\_trpair\_minus}N+N \tag{39}$$

$$\text{maxNumTrPair}=emt\_\text{min\_num\_trpair\_minus}N+N \tag{40}$$

For example, N=1 may be adopted herein. Note that N is not limited to 1 but may be 2 or other values. In this manner, reduction of a code quantity increase is achievable by coding with N subtraction from the maximum and minimum numbers of transform pairs.

Note that the combinations of the number of transform pairs may be also derived from the maximum and minimum numbers of transform pairs on the basis of rules determined beforehand.

For example, suppose that the combinations of the number of transform pairs are fixed to three types {a, b, c} (a<b<c). In this case, the maximum of transform pairs (maxNumTrPair) may be set as c, the minimum of transform pairs (=minNumTrPair) may be set as a, and an intermediate value between c and a may be set as b.

Moreover, for example, an average aveLog2NumTrPair of the base 2 logarithmic value of the maximum value and the base 2 logarithmic value of the minimum value is calculated, and a power of 2 of the average aveLog2NumTrPair may be set as h. In other words, a, b, and c may be derived by the following Expression (41).

[Math. 36]

$$c = \text{maxNumTrPair}$$

$$a = \text{minNumTrPair}$$

$$ave\ \text{Log 2NumTxPair} = \text{cell}(\text{log 2}(\text{maxNumTrPair}) = \text{log 2}(\text{minNumTrPair})|/2)$$

$$b = 2^{**} ave\ \text{Log 2NumTrPair} \quad (41)$$

For example, a, h, and c are derived in a following manner.

In a case of maxNumTrPair=8, minNumTrPair=1, {a, b, c}={1, 4, 8}.

In a case of maxNumTrPair=8, minNumTrPair=2, {a, b, c}={2, 4, 8}.

In a case of maxNumTrPair=16, minNumTrPair=1, {a, b, c}={1, 8, 16}.

In a case of maxNumTrPair=16, minNumTrPair=4, {a, b, c}={4, 8, 16}.

Note that the deriving method is not limited to this example. For example, Cell( ) function (round up after the decimal point) may be changed to floor( ) function (round down after the decimal point). Moreover, b=2(log 2(minNumTrPair)+1), or b=2(log 2(maxNumTrPair)−1) may be adopted.

The embodiments described above may be combined and applied. Combinations may be made in any manners. For example, the methods described in the first embodiment, the (2-1)th embodiment, and the (5-1)th embodiment may be combined and applied to the method described in NPL 1.

9. Supplementary Notes

<Computer>

A series of processes described above may be executed either by hardware or by software. Ia a case where the series of processes are executed by software, a program constituting the software is installed in a computer. Examples of the computer herein include a computer incorporated in dedicated hardware and a computer such as a general-purpose computer capable of executing various functions under various programs installed in the computer.

Figure 59:
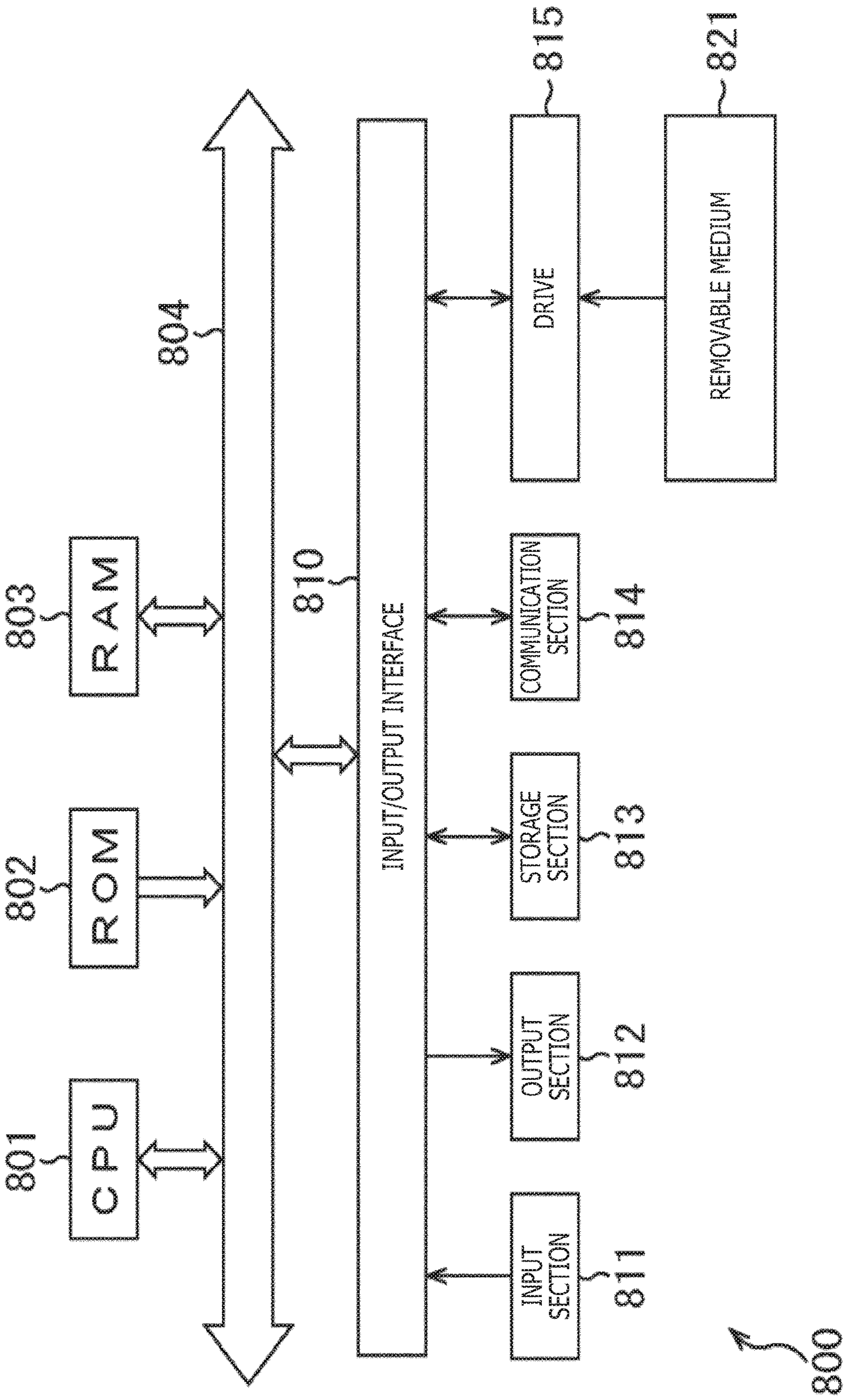
FIG. 59 is a block diagram depicting a main configuration example of a computer.

FIG. 59 is a block diagram depicting a configuration example of hardware of a computer which executes the series of processes described above under a program.

A computer 800 depicted in FIG. 59 includes a CPU (Central Processing Unit) 801, a ROM (Read Only Memory) 802, and a RAM (Random Access Memory) 803 are connected to each other via a bus 804.

An input/output interface 810 is also connected to the bus 804. An input section 811, an output section 812, a storage section 813, a communication section 814, and a drive 815 are connected to the input/output interface 810.

For example, the input section 811 includes a keyboard, a mouse, a microphone, a touch panel, an input terminal, and others. For example, the output section 812 includes a display, a speaker, an output terminal, and others. For example, the storage section 813 includes a hard disk, a RAM disk, a non-volatile memory, and others. For example, the communication section 814 includes a network interface. The drive 815 drives a removable medium 821 such as a magnetic disk, an optical disk, a magneto-optical disk, and a semiconductor memory.

According to the computer configured as described above, the CPU 801 loads a program stored in the storage section 813 into the RAM 803 via the input/output interface 810 and the bus 804 and executes the loaded program to perform the series of processes described above, for example. Data and the like necessary for executing the various processes by the CPU 801 are also appropriately stored in the RAM 803.

For example, the program executed by the computer (CPU 801) can be applied while recorded in the removable medium 821 which is a package medium or the like. In this case, the program can be installed into the storage section 813 via the input/output interface 810 from the removable medium 821 attached to the drive 815.

Moreover, the program can also be provided via a wired or wireless transmission medium such as a local area network, the Internet, and digital satellite broadcasting. In this case, the program can be received by the communication section 814 and installed into the storage section 813.

Moreover, the program can also be installed in the ROM 802 or the storage section 813 beforehand.

<Unit of Information and Processing>

A unit of data for setting the various pieces of information described above and a unit of data corresponding to targets of the various processes described above are not limited to the examples provided above but may be any unit. For example, these pieces of information and processes may be set for each of TU (Transform Unit), TB (Transform Block), PU (Prediction Unit), PB (Prediction Block), CU (Coding Unit), ICU (Largest Coding Unit), sub-block, block, tile, slice, picture, sequence, or component. Alternatively, data in these data units may be targeted. Needless to say, the data units may be set for each information and each process and need not be unified for all of the information and processes. Note that a storage place of each of these pieces of information may be any place and may be stored in a header, a parameter set, or the like in the data units described above. In addition, the pieces of information may be stored in a plurality of respective places.

<Control Information>

Control information associated with the present technology described in the above embodiments may be transmitted from the coding side to the decoding side. For example, control information indicating whether or not to enable (or disable) application of the present technology described above (for example, enabled flag) may be transmitted. Moreover, for example, control information indicating an application target (or a non-application target) of the present technology described above may be transmitted. For example, control information designating a block size (upper limit, lower limit, or both), a frame, a component, a layer, or the like to which the present technology is applied (or for which application is enabled or disabled) may be transmitted.

<Application Target of Present Technology>

The present technology is applicable to any image coding or decoding methods. More specifically, specifications of various processes associated with image coding and decoding, such as transforms (inverse transforms), quantization (inverse quantization), (decoding), and prediction are not limited to the examples described above but may be any specifications insofar as consistent with the present technology described above. In addition, a part of these processes may be omitted insofar as consistent with the present technology described above.

Moreover, the present technology is applicable to a multi-view image coding and decoding system which codes and decodes multi-view images including images having a plurality of viewpoints (views). In this case, it is sufficient if the present technology is applied to coding and decoding of each viewpoint (view).

Furthermore, the present technology is applicable to a hierarchical image coding (scalable coding) and decoding system which codes and decodes hierarchical images having a plurality of layers (hierarchies) to perform a scalability function for predetermined parameters. In this case, it is sufficient if the present technology is applied to coding and decoding of each hierarchy (layer).

Each of the image coding apparatus 100, the image decoding apparatus 130, the image coding apparatus 200, and the image decoding apparatus 400 according to the embodiments described above is, for example, applicable to various types of electronic devices such as a sender and a receiver (e.g., a television receiver and a cellular phone) used for wired broadcasting such as satellite broadcasting and cable TV, distribution via the Internet, and distribution to terminals via cellular communication, and apparatuses (e.g., a hard disk recorder and a camera) for recording images in a medium such as an optical disk, a magnetic disk, and a flash memory, and reproducing images from these recording media.

Moreover, the present technology can also be implemented as any configuration incorporated in an apparatus constituting any apparatus or system (i.e., a partial configuration of an apparatus), such as a processor (e.g., video processor) as a system LSI (Large Scale Integration) or the like, a module (e.g., video module) using a plurality of processors or the like, a unit (e.g., video unit) using a plurality of modules or the like, a set (e.g., video set) as a unit to which other functions are added.

Furthermore, the present technology is also applicable to a network system including a plurality of apparatuses. For example, the present technology is also applicable to a cloud service which provides services associated with images (moving images) for any terminals such as a computer, AV (Audio Visual) equipment, a portable information processing terminal, an IoT (Internet of Things) device.

Note that a system, an apparatus, a processing section, and the like to which the present technology is applied are available in any fields such as traffics, medical treatments, crime prevention, agriculture, stock breeding, mining, beauty, manufacturing, home appliances, meteorology, and nature monitoring. In addition, use applications of the system and the like may also be any applications.

For example, the present technology is applicable to a system and a device for providing appreciation content and the like. In addition, for example, the present technology is applicable also to a system and a device provided for traffics such as monitoring of traffic situations and autonomous driving control. Moreover, for example, the present technology is applicable also to a system and a device provided for security purposes. Furthermore, for example, the present technology is applicable to a system and a device provided for automatic control of machines and the like. In addition, for example, the present technology is applicable also to a system and a device provided for agriculture and stock breeding. Moreover, the present technology is applicable also to a system and a device for monitoring nature conditions such as volcanos, forests, and oceans, and wildlife. Furthermore, for example, the present technology is applicable also to a system and a device provided for sports.

<Others>

Note that the "flag" in the present specification is information provided for identifying a plurality of states and also including information for identifying three or more states as well as information for identifying two states of true (1) or false (0). Accordingly, the "flag" may have two values of 1 or 0, or three or more values, for example. In other words, a bit number constituting the "flag" may be any number and thus may be 1 or plural bits. Moreover, it is assumed that identification information (including the flag) is not only identification information included in a bit stream, but also information included in a bit stream as difference information which indicates a difference between identification information and information representing a certain reference. Accordingly, each of the "flag" and the "identification" in the present specification includes not only the information itself, but also difference information indicating a difference from the reference information.

In addition, pieces of information (metadata or the like) associated with coded data (bit stream) may be transmitted or recorded in any forms as long as the information is associated with the coded data. A term "associated" herein refers to a state where other data can be made available (made linked) during processing of one data, for example. In other words, pieces of data associated with each other may be collected into one-piece data or may be separated into individual pieces of data. For example, information associated with coded data (image) may be transmitted in a transmission path different from a transmission path of the corresponding coded data (image). Moreover, for example, information associated with coded data (image) may be recorded in a recording medium different from a recording medium of the corresponding coded data (image) (or a different recording area in the same recording medium). Note that not entire data but a part of data may be "associated."For example, an image and information corresponding to the image may be associated with each other in any unit, such as a plurality of frames, one frame, or a part of a frame.

Note that each term such as "synthesize," "multiplex," "add," "integrate," "include," "store," "incorporate," "put in," and "insert" in the present specification refers to collecting a plurality of things into one thing, for example, collecting coded data and metadata into one data, and indicates one method of "associating" described above.

Furthermore, embodiments of the present technology are not limited to the embodiments described above but may be modified in various manners without departing from subject matters of the present technology.

Moreover, for example, the present technology can also be implemented as any configuration included in an apparatus or a system (i.e., a partial configuration of an apparatus), such as a processor as a system LSI (Large Scale Integration) or the like, a module using a plurality of processors or the like, a unit using a plurality of modules or the like, and a set as a unit to which other functions are added.

Note that the system is the present specification refers to an assembly of a plurality of constituent elements (apparatuses, modules (parts), or the like) and that whether or not all the constituent elements are present within an identical housing does not matter. Accordingly, both a plurality of apparatuses stored in separate housings and connected via a network and one apparatus including a plurality of modules stored in one housing are considered as systems.

Moreover, for example, a configuration described as one apparatus (or processing section) may be divided into parts constituting a plurality of apparatuses (or processing sections). Conversely, a configuration described as a plurality of apparatuses (or processing sections) may be collected into one apparatus processing section). Furthermore, needless to say, configurations other than the configurations described above may be added to the configurations of the apparatuses (or processing sections). In addition, a part of a configuration of a certain apparatus (or a certain processing section) may be included in another apparatus (or another processing section) if configurations and operations as an overall system are substantially identical.

Moreover, for example, the present technology can have a configuration of cloud computing where one function is shared by a plurality of apparatuses and processed in cooperation with each other via a network.

Furthermore, for example, the program described above can be executed by any apparatus. In this case, it is sufficient if the apparatus has necessary functions (function blocks or the like) and obtain necessary information.

In addition, for example, steps described in the above flowcharts can be executed by one apparatus or shared and executed by a plurality of apparatuses. Moreover, in a case where a plurality of processes is included in one step, the plurality of processes included in the one step can be executed by one apparatus, or shared and executed by a plurality of apparatuses. In other words, the plurality of processes included in the one step can also be executed as processes in a plurality of steps. Conversely, processes described as a plurality of steps can also be collected and executed as one step.

Note that the program may be executed by the computer is such a manner that processes in steps describing the program are executed in time series in the order described in the present specification or may be executed in parallel or individually at necessary timing such as as occasion of a call. In other words, the processes to the steps may be executed in an order different from the order described above insofar as no inconsistency is caused. Furthermore, the processes of the steps describing the program may be executed in parallel with processes of other programs or may be executed in combination with processes of other programs.

Note that a plurality of items of the present technology described in the present specification can be implemented independently as a single item for each insofar as no inconsistency is caused. Needless to say, a plurality of any items of the present technology can also be implemented together. For example, a part or all of items of the present technology described in any one of the embodiments can also be implemented in combination with a part or all of items of the present technology described in other embodiments. Moreover, a part or all of any items of the present technology described above can also be implemented together with other technologies not described above.

REFERENCE SIGNS LIST

100 Image coding apparatus, 101 Orthogonal transform control section, 102 Orthogonal transform section, 103 Coding section, 110 Coding section, 130 Image decoding apparatus, 131 Inverse orthogonal transform control section, 132 Decoding section, 133 Inverse orthogonal transform section, 140 Decoding section, 200 Image coding apparatus, 201 Control section, 213 Orthogonal transform section, 215 Coding section, 218 Inverse orthogonal transform section, 241 Transform pair number setting section, 242 cMax setting section, 243 Transform pair identification information setting section, 244 Transform pair LUT, 245 Transform type index setting section, 251 Transform pair index setting section, 252 Transform flag setting section, 253 Transform index setting section, 261 Primary transform section, 262 Secondary transform section, 271 Primary horizontal transform section, 272 Primary vertical transform section, 400 Image decoding apparatus, 412 Decoding section, 414 Inverse orthogonal transform section, 431 Transform pair number setting section, 432 cMax setting section, 433 Transform pair identification information decoding section, 434 Transform pair LUT, 435 Transform type index setting section, 451 Transform flag decoding section, 452 Transform index decoding section, 453 Transform pair index setting section, 461 Inverse secondary transform section, 462 inverse primary transform section, 471 Inverse primary vertical transform section, 472 inverse primary horizontal transform section

The invention claimed is:

1. An image processing apparatus comprising:

circuitry configured to:

decode coded data to generate coefficient data;

set a number of candidates of an inverse orthogonal transform type according to a number of coding parameters;

select one inverse orthogonal transform type on a basis of the set number of candidates of the inverse orthogonal transform type;

perform an inverse orthogonal transform for the coefficient data generated according to the selected one inverse orthogonal transform type controlled on a basis of the number of coding parameters;

parse information associated with the selected one inverse orthogonal transform type included in the coded data on a basis of the number of the candidates of the inverse orthogonal transform type, wherein the information associated with the selected one inverse orthogonal transform type includes a transform index that is an identifier for narrowing candidates of a combination of an inverse one-dimensional orthogonal transform type in a vertical direction and an inverse one-dimensional orthogonal transform type in a horizontal direction in a case where the inverse orthogonal transform type is adaptively changed; and parse the transform index included in the coded data as data that has a bit length corresponding to the coding parameters.

2. The image processing apparatus according to claim 1, wherein the circuitry is further configured to:

perform an inverse orthogonal transform for the coefficient data using a transform matrix of the selected one inverse orthogonal transform type selected on a basis of the parsed information associated with the selected one inverse orthogonal transform type.

3. The image processing apparatus according to claim 2, wherein the coding parameters include a value of a syntax element included in the coded data or a variable derived from the value of the syntax element.

4. The image processing apparatus according to claim 3, wherein in a case of a chromatic signal, the circuitry is further configured to set the number of the candidates of the inverse orthogonal transform type to a number smaller than a number of the candidates of the inverse orthogonal transform type in a case of a luminance signal.

5. The image processing apparatus according to claim 3, wherein in a case of inter prediction, the circuitry is further configured to set the number of the candidates of the inverse orthogonal transform type to a number smaller than the number of the candidates of the inverse orthogonal transform type in a case of intra prediction.

6. The image processing apparatus according to claim 3, wherein in a case of bi-prediction, the circuitry is further configured to set the number of the candidates of the inverse orthogonal transform type to a number smaller than a number of the candidates of the inverse orthogonal transform type in a case of forward prediction.

7. The image processing apparatus according to claim 3, wherein in a case where a prediction mode is LMChroma which linearly predicts a chromatic signal from a reconfigured luminance signal, the circuitry is further configured to set the number of the candidates of the inverse orthogonal transform type to a number smaller than a number of the candidates of the inverse orthogonal transform type in other modes.

8. The image processing apparatus according to claim 3, wherein the circuitry is further configured to set the number of the candidates of the inverse orthogonal transform type to a smaller number as a block size decreases.

9. The image processing apparatus according to claim 3, wherein the circuitry is further configured to set the number of the candidates of the inverse orthogonal transform type to a smaller number as a value of a quantization parameter increases.

10. The image processing apparatus according to claim 3, wherein the circuitry is further configured to set the number of the candidates of the inverse orthogonal transform type to a smaller number as a hierarchy in hierarchical coding in a time direction rises.

11. The image processing apparatus according to claim 3, wherein the circuitry is further configured to set the number of candidates of the inverse orthogonal transform type to a smaller number as a number of non-zero coefficients in a block corresponding to a processing target of the inverse orthogonal transform decreases.

12. The image processing apparatus according to claim 3, wherein the circuitry is further configured to set the number of candidates of the inverse orthogonal transform type to a smaller number as a position of a last coefficient that is a last non-zero coefficient in a scanning order in a block corresponding to a processing target of the inverse orthogonal transform is closer.

13. The image processing apparatus according to claim 3, wherein the circuitry is further configured to set the number of candidates of the inverse orthogonal transform type to a smaller number as a sum total of absolute values of non-zero coefficients in a block corresponding to a processing target of the inverse orthogonal transform decreases.

14. The image processing apparatus according to claim 2, wherein the circuitry is further configured to:

perform an inverse one-dimensional orthogonal transform in the vertical direction using a transform matrix of the inverse one-dimensional orthogonal transform type in the vertical direction and set on a basis of the parsed information associated with the selected one inverse orthogonal transform type; and perform an inverse one-dimensional orthogonal transform in the horizontal direction using a transform matrix of the inverse one-dimensional orthogonal transform type in the horizontal direction and set on a basis of the parsed information associated with the selected one inverse orthogonal transform type.

15. The image processing apparatus according to claim 14, wherein the circuitry is further configured to:

set a transform pair index that is an identifier for narrowing the candidates of the combination of the inverse one-dimensional orthogonal transform type in the vertical direction and the inverse one-dimensional orthogonal transform type in the horizontal direction on a basis of the parsed information associated with the inverse orthogonal transform type; and set the inverse one-dimensional orthogonal transform type in the vertical direction and the inverse one-dimensional orthogonal transform type in the horizontal direction by selecting the combination on a basis of the transform pair index and a prediction mode.

16. The image processing apparatus according to claim 15, wherein the information associated with the selected one inverse orthogonal transform type further includes a transform flag indicating whether to adaptively change the inverse orthogonal transform type.

17. An image processing method comprising:

decoding coded data to generate coefficient data;

setting a number of candidates of an inverse orthogonal transform type according to a number of coding parameters;

selecting one inverse orthogonal transform type on a basis of the set number of candidates of the inverse orthogonal transform type;

performing an inverse orthogonal transform for the generated coefficient data according to the selected one inverse orthogonal transform type controlled on a basis of the number of coding parameters;

parsing information associated with the selected one inverse orthogonal transform type included in the coded data on a basis of the number of the candidates of the inverse orthogonal transform type, wherein the information associated with the selected one inverse orthogonal transform type includes a transform index that is an identifier for narrowing candidates of a combination of an inverse one-dimensional orthogonal transform type in a vertical direction and an inverse one-dimensional orthogonal transform type in a horizontal direction in a case where the inverse orthogonal transform type is adaptively changed; and parsing the transform index included in the coded data as data that has a bit length corresponding to the coding parameters.

18. An image processing apparatus comprising:

circuitry configured to:

set a number of candidates of an orthogonal transform type according to a number of coding parameters;

select one orthogonal transform type based on the set number of candidates of the orthogonal transform type;

perform an orthogonal transform for image data according to the selected one orthogonal transform type controlled on a basis of the number of coding parameters to generate coefficient data; and code the coefficient data to generate coded data;

wherein information associated with a selected one inverse orthogonal transform type included in the coded data is parsed on a basis of a number of candidates of an inverse orthogonal transform type included in the coded data, wherein the information associated with the selected one inverse orthogonal transform type includes a transform index that is an identifier for narrowing candidates of a combination of an inverse one-dimensional orthogonal transform type in a vertical direction and an inverse one-dimensional orthogonal transform type in a horizontal direction in a case where the inverse orthogonal transform type is adaptively changed, and wherein the transform index included in the coded data is parsed as data that has a bit length corresponding to the coding parameters.

19. An image processing method comprising:

setting a number of candidates of an orthogonal transform type according to a number of coding parameters;

selecting one orthogonal transform type on a basis of the set number of candidates of the orthogonal transform type;

performing an orthogonal transform for image data according to the selected one orthogonal transform type controlled on a basis of the number of coding parameters to generate coefficient data; and coding the generated coefficient data to generate coded data;

wherein information associated with a selected one inverse orthogonal transform type included in the coded data is parsed on a basis of a number of candidates of an inverse orthogonal transform type included in the coded data, wherein the information associated with the selected one inverse orthogonal transform type includes a transform index that is an identifier for narrowing candidates of a combination of an inverse one-dimensional orthogonal transform type in a vertical direction and an inverse one-dimensional orthogonal transform type in a horizontal direction in a case where the inverse orthogonal transform type is adaptively changed, and wherein the transform index included in the coded data is parsed as data that has a bit length corresponding to the coding parameters.

20. The image processing apparatus according to claim 1, wherein the number of candidates of the inverse orthogonal transform type corresponds to the number of the coding parameters.

* * * * *